United States Patent
Savarese et al.

(10) Patent No.: US 10,078,953 B2
(45) Date of Patent: Sep. 18, 2018

(54) GOLF CLUB APPARATUSES AND METHODS

(71) Applicant: Tag Golf, LLC, Ridgeland, MS (US)

(72) Inventors: Chris Savarese, Danville, CA (US); Noel H. C. Marshall, Gerringong (AU); Susan McGill, Redwood City, CA (US); Kenneth P. Gilliland, Petaluma, CA (US); Marvin L. Vickers, Quincy, CA (US)

(73) Assignee: TAG GOLF, LLC, Ridgeland, MS (US)

( * ) Notice: Subject to any disclaimer, the term of this patent is extended or adjusted under 35 U.S.C. 154(b) by 505 days.

(21) Appl. No.: 14/936,650

(22) Filed: Nov. 9, 2015

(65) Prior Publication Data

US 2016/0063839 A1    Mar. 3, 2016

Related U.S. Application Data

(60) Division of application No. 13/633,835, filed on Oct. 2, 2012, now Pat. No. 9,195,781, which is a
(Continued)

(51) Int. Cl.
*A63B 55/00* (2015.01)
*G08B 21/18* (2006.01)
(Continued)

(52) U.S. Cl.
CPC ............. *G08B 21/18* (2013.01); *A63B 53/00* (2013.01); *A63B 55/00* (2013.01); *G01S 19/19* (2013.01);
(Continued)

(58) Field of Classification Search
CPC .... G08B 13/14; G08B 13/1427; A63B 67/02; A63B 53/00; A63B 69/36
See application file for complete search history.

(56) References Cited

U.S. PATENT DOCUMENTS

| 4,991,850 | A |   | 2/1991 | Wilhlem |
|---|---|---|---|---|
| 6,023,225 | A | * | 2/2000 | Boley ................ A63B 55/00 340/568.6 |

(Continued)

FOREIGN PATENT DOCUMENTS

WO    WO 2009/009147 A1    1/2009

OTHER PUBLICATIONS

PCT International Search Report and Written Opinion for PCT International Appln No. PCT/US2013/030606 filed on Mar. 12, 2013 (15 pages).
(Continued)

*Primary Examiner* — Reginald Renwick
(74) *Attorney, Agent, or Firm* — Womble Bond Dickinson (US) LLP

(57) ABSTRACT

Methods and systems for managing golf clubs and for collecting golf data, such as golf strokes, are described. In one embodiment, a golf data collection system includes a golf accessory worn on the golfer's wrist, such as a watch, equipped with a GPS receiver, impact sensing and motion sensing means, and a transceiver to communicate with golf club tags (e.g. at 2.4 GHz such as Bluetooth). The golf accessory senses the motion of the golf club being swung by the golf and/or senses the impact of the golf club striking the golf ball. When swinging motion or impact is sensed the device uses the transceiver to communicate with golf club tags. The closest golf club (i.e. the club in the golfer's hand during the swing) is captured as the club used by the swing based on RSSI (Received Signal Strength Indicator). Other embodiments are also described.

9 Claims, 106 Drawing Sheets

Related U.S. Application Data continuation-in-part of application No. 12/813,465, filed on Jun. 10, 2010, now Pat. No. 8,624,738, and a continuation-in-part of application No. 12/405,223, filed on Mar. 16, 2009, now Pat. No. 8,226,495.

(60) Provisional application No. 61/652,831, filed on May 29, 2012, provisional application No. 61/610,436, filed on Mar. 13, 2012, provisional application No. 61/620,905, filed on Apr. 5, 2012, provisional application No. 61/186,771, filed on Jun. 12, 2009, provisional application No. 61/037,305, filed on Mar. 17, 2008.

(51) Int. Cl.
*G06F 17/40* (2006.01)
*G01S 19/19* (2010.01)
*G06F 1/32* (2006.01)
*A63B 53/00* (2015.01)
*G08B 13/14* (2006.01)
*G08B 21/24* (2006.01)

(52) U.S. Cl.
CPC ............ *G06F 1/3203* (2013.01); *G06F 17/40* (2013.01); *G08B 13/1481* (2013.01); *G08B 21/24* (2013.01)

(56) References Cited

U.S. PATENT DOCUMENTS

| | | | |
|---|---|---|---|
| 6,366,205 B1* | 4/2002 | Sutphen | G08B 21/0227 340/568.1 |
| 7,746,227 B2* | 6/2010 | Keays | G08B 13/1427 206/315.2 |
| 2005/0272516 A1* | 12/2005 | Gobush | A63B 24/0003 473/200 |
| 2006/0178110 A1 | 8/2006 | Nurminen et al. | |
| 2008/0085778 A1 | 4/2008 | Dugan | |
| 2009/0111602 A1 | 4/2009 | Savarese et al. | |
| 2009/0233735 A1 | 9/2009 | Savarese et al. | |
| 2009/0298605 A1 | 12/2009 | Wiegers | |
| 2010/0113174 A1* | 5/2010 | Ahern | A63B 57/00 473/222 |
| 2010/0144456 A1 | 6/2010 | Ahern | |
| 2011/0304460 A1* | 12/2011 | Keecheril | G06Q 10/087 340/572.1 |
| 2012/0035003 A1 | 2/2012 | Moran et al. | |

OTHER PUBLICATIONS

PCT Invitation to Pay Additional Fees for PCT International Appln No. PCT/US2013/030606 filed on Mar. 12, 2013 (6 pages).

* cited by examiner

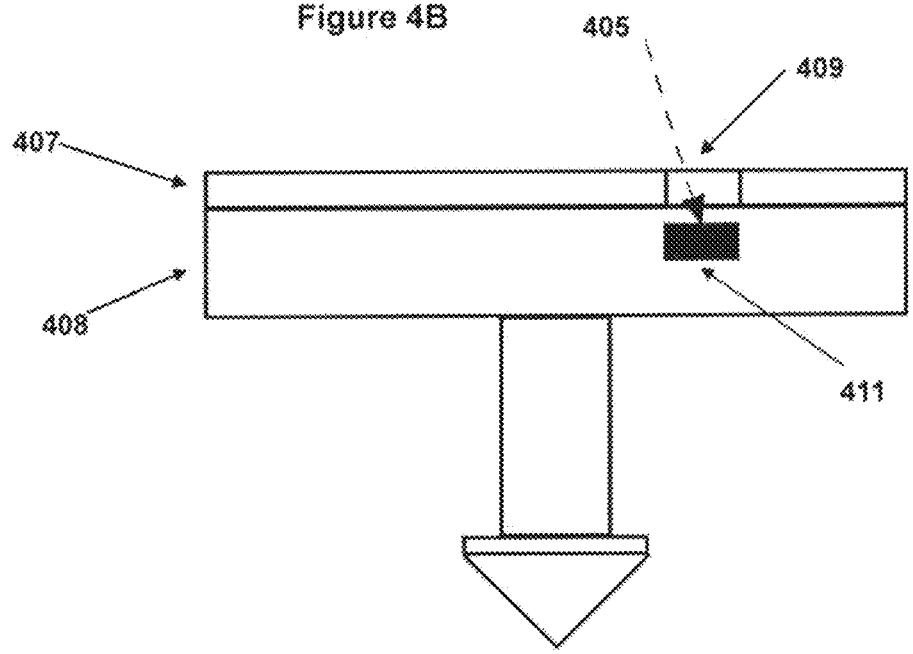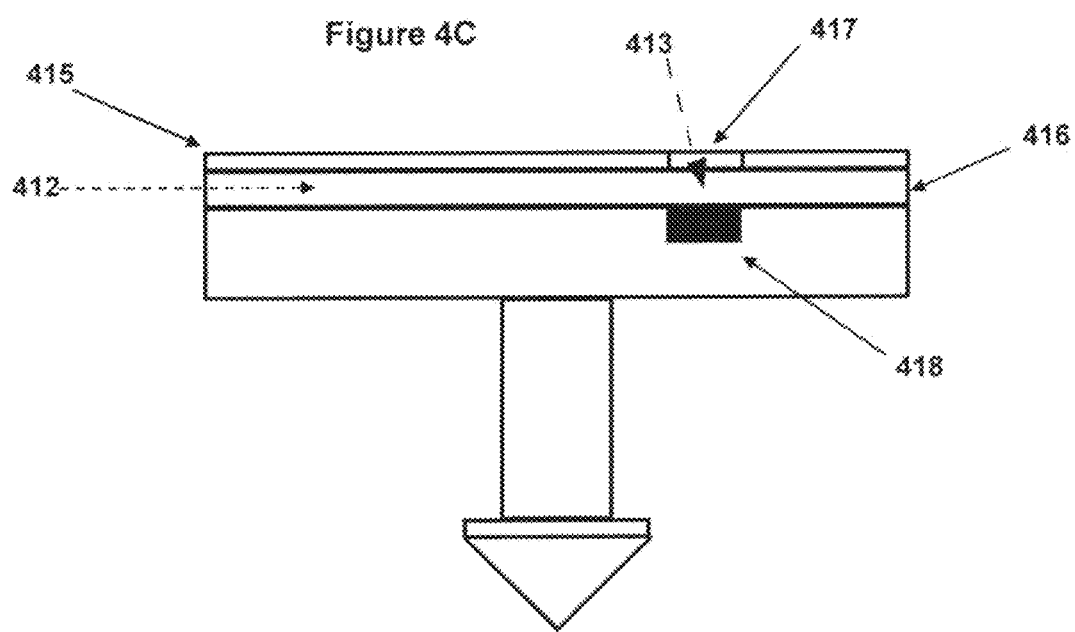

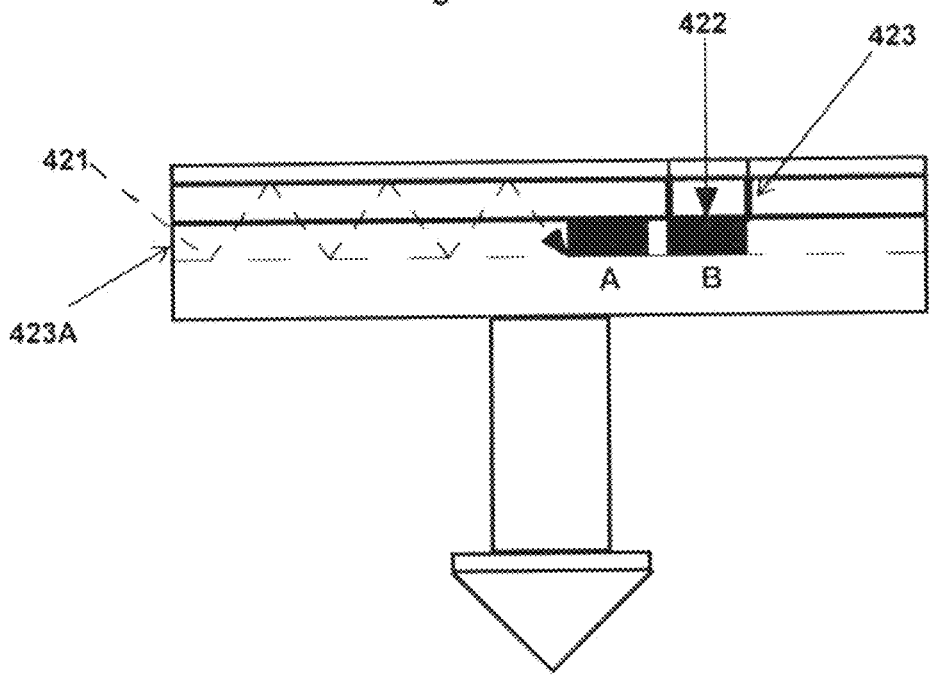

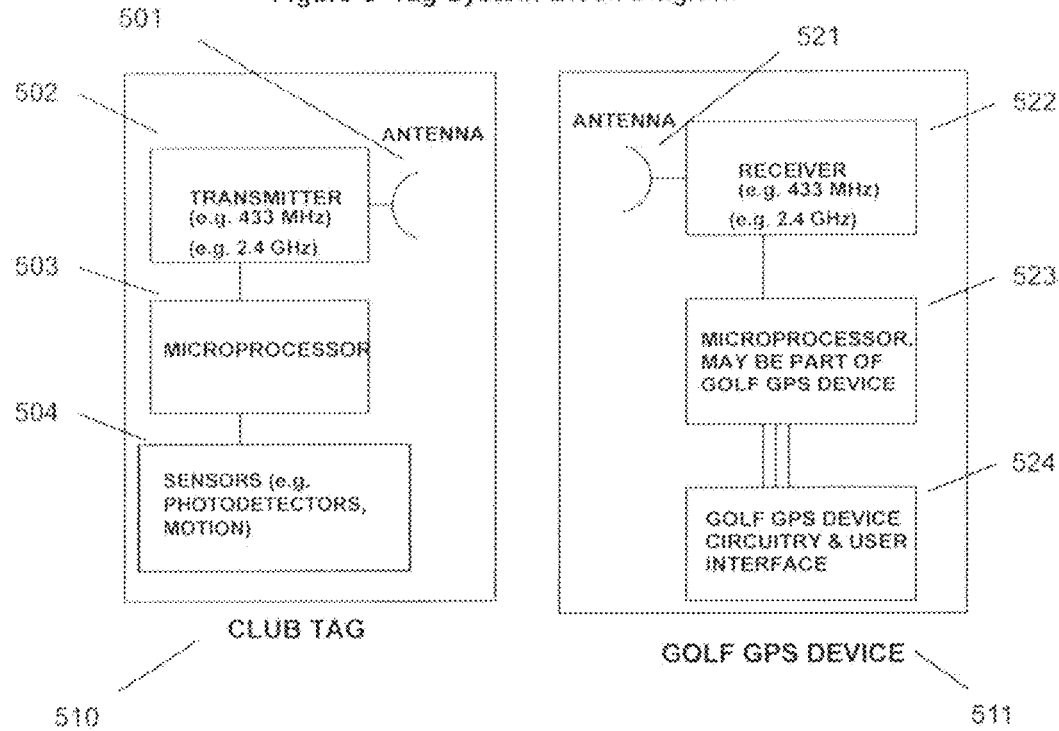

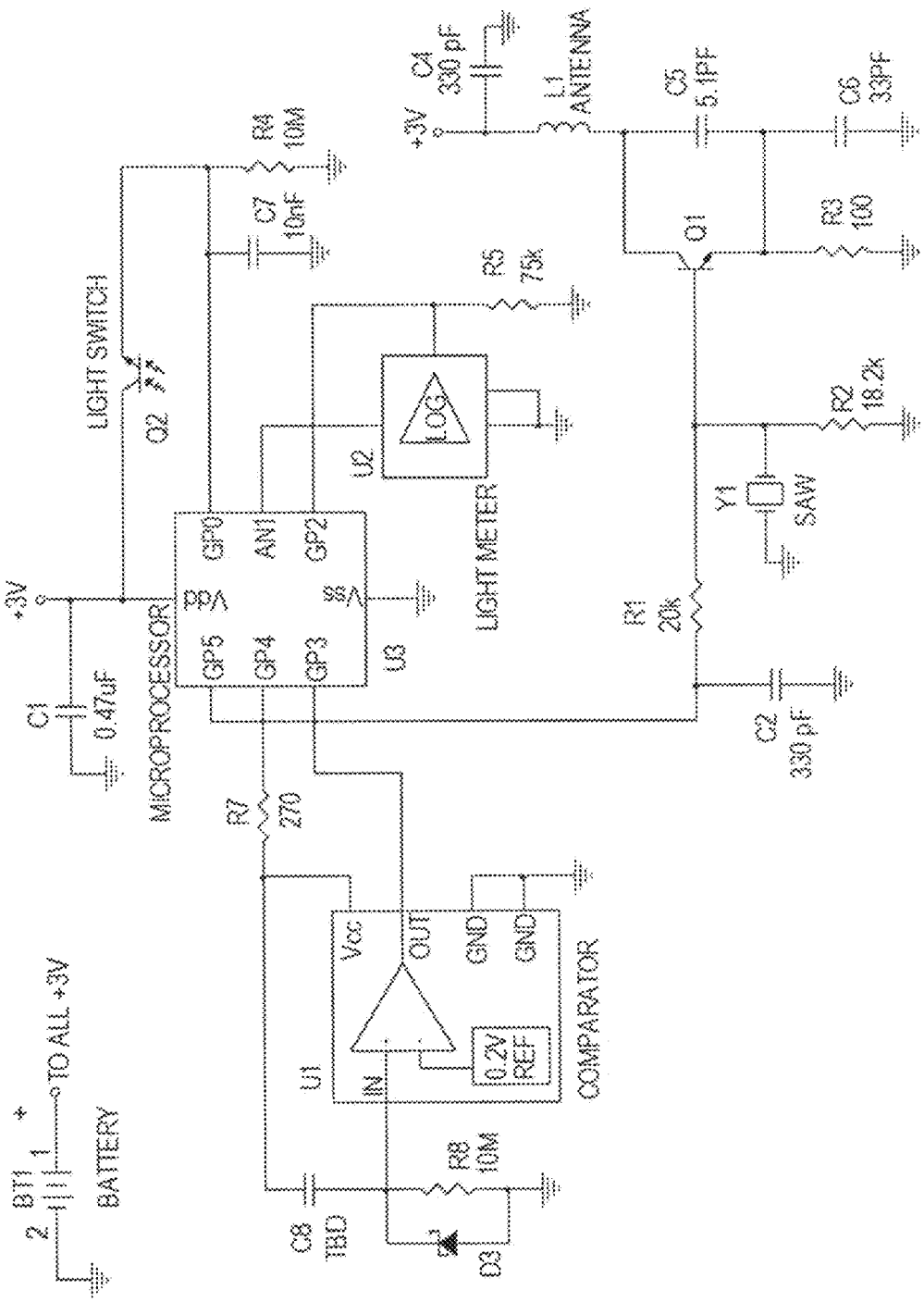
Figure 6A Tag Transmitter Schematic

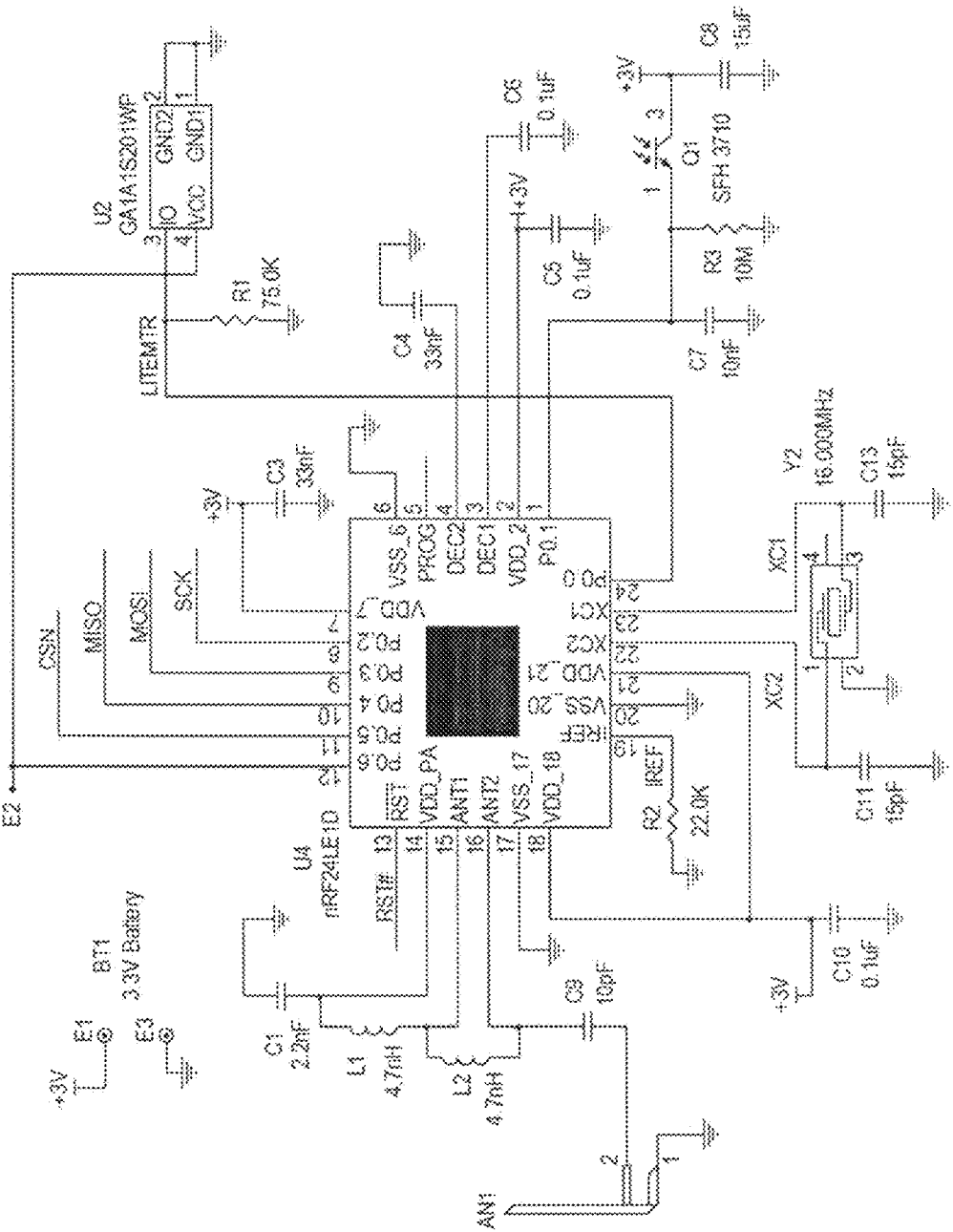

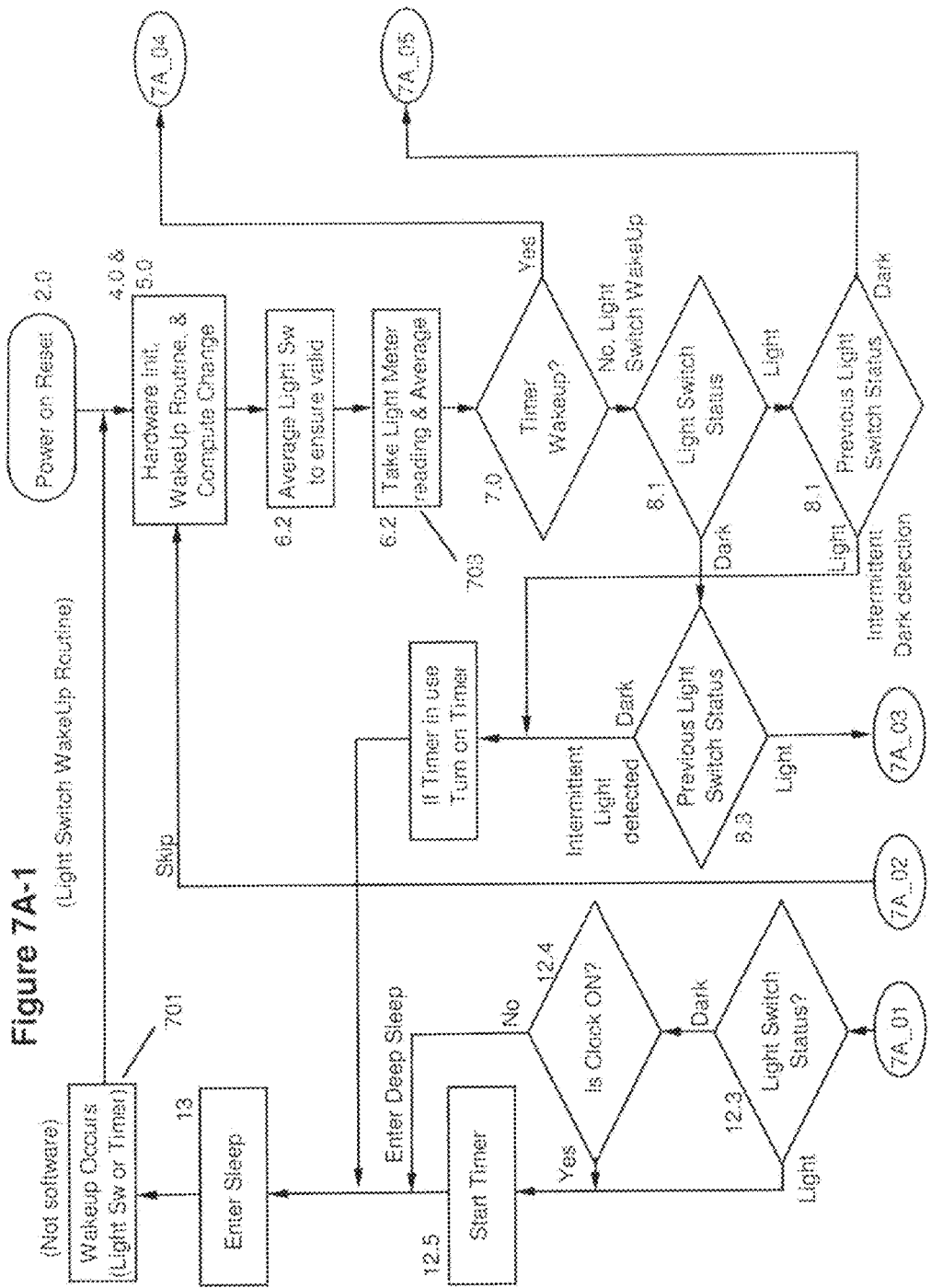
Figure 7A-1 (Light Switch WakeUp Routine)

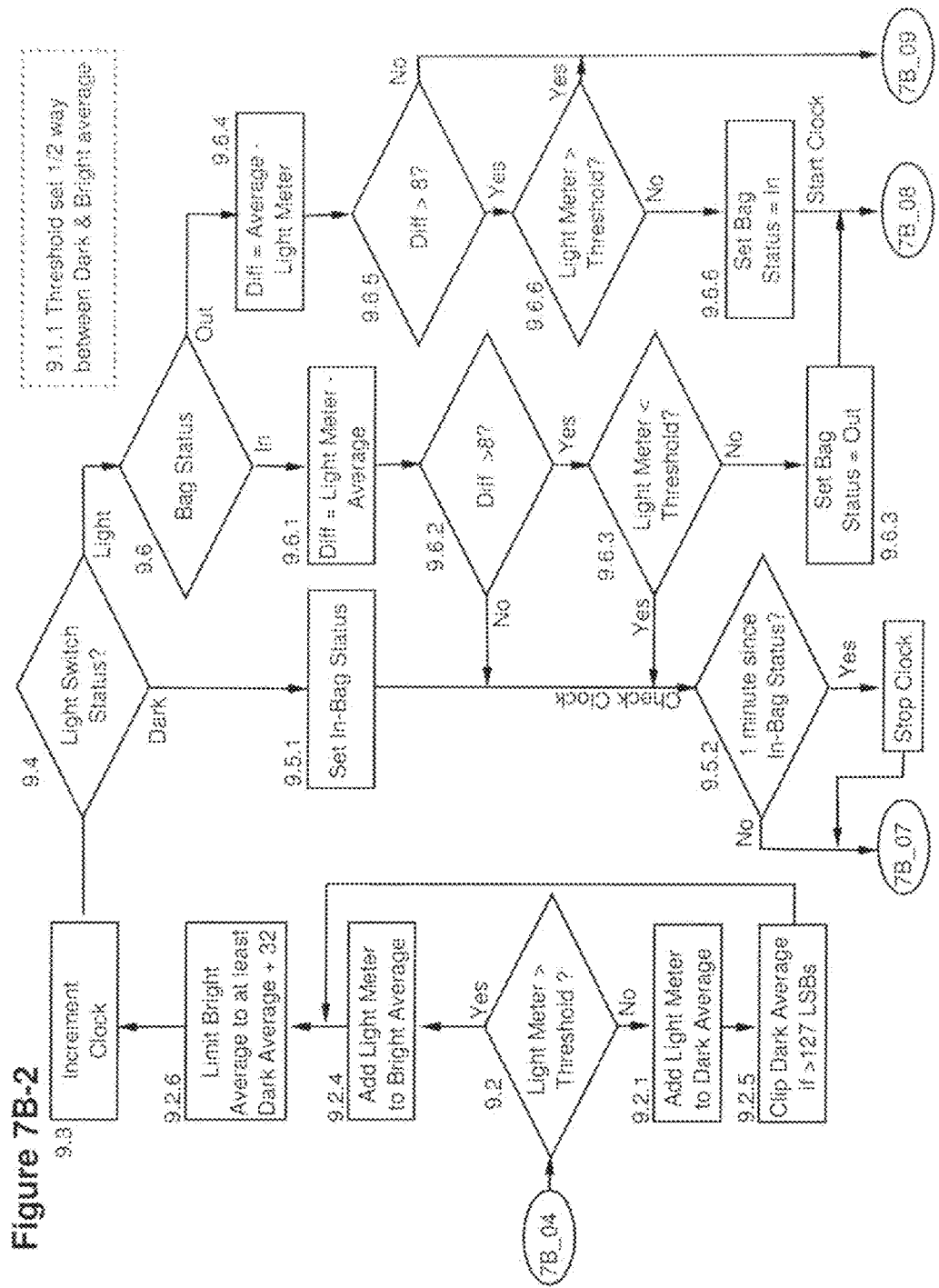

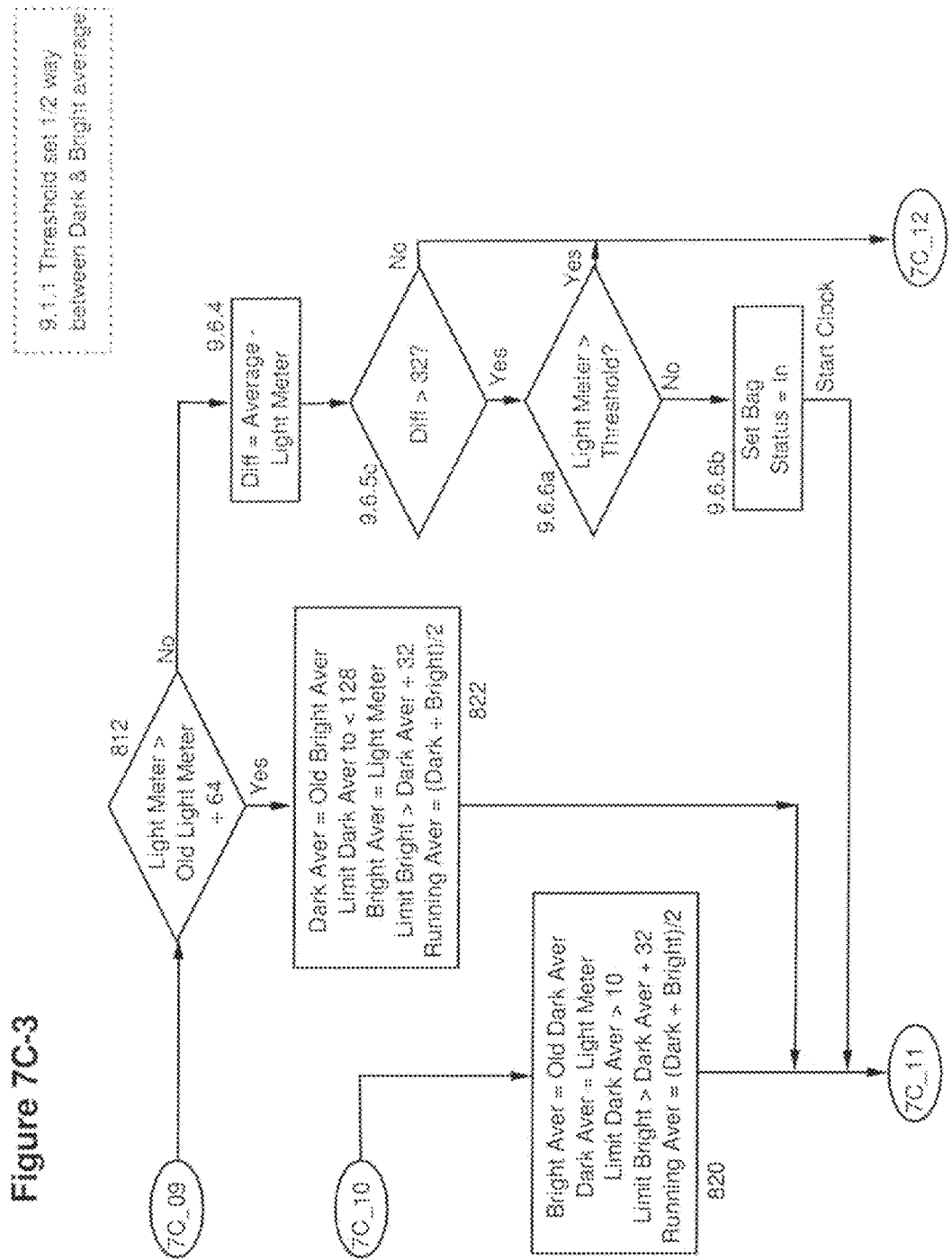

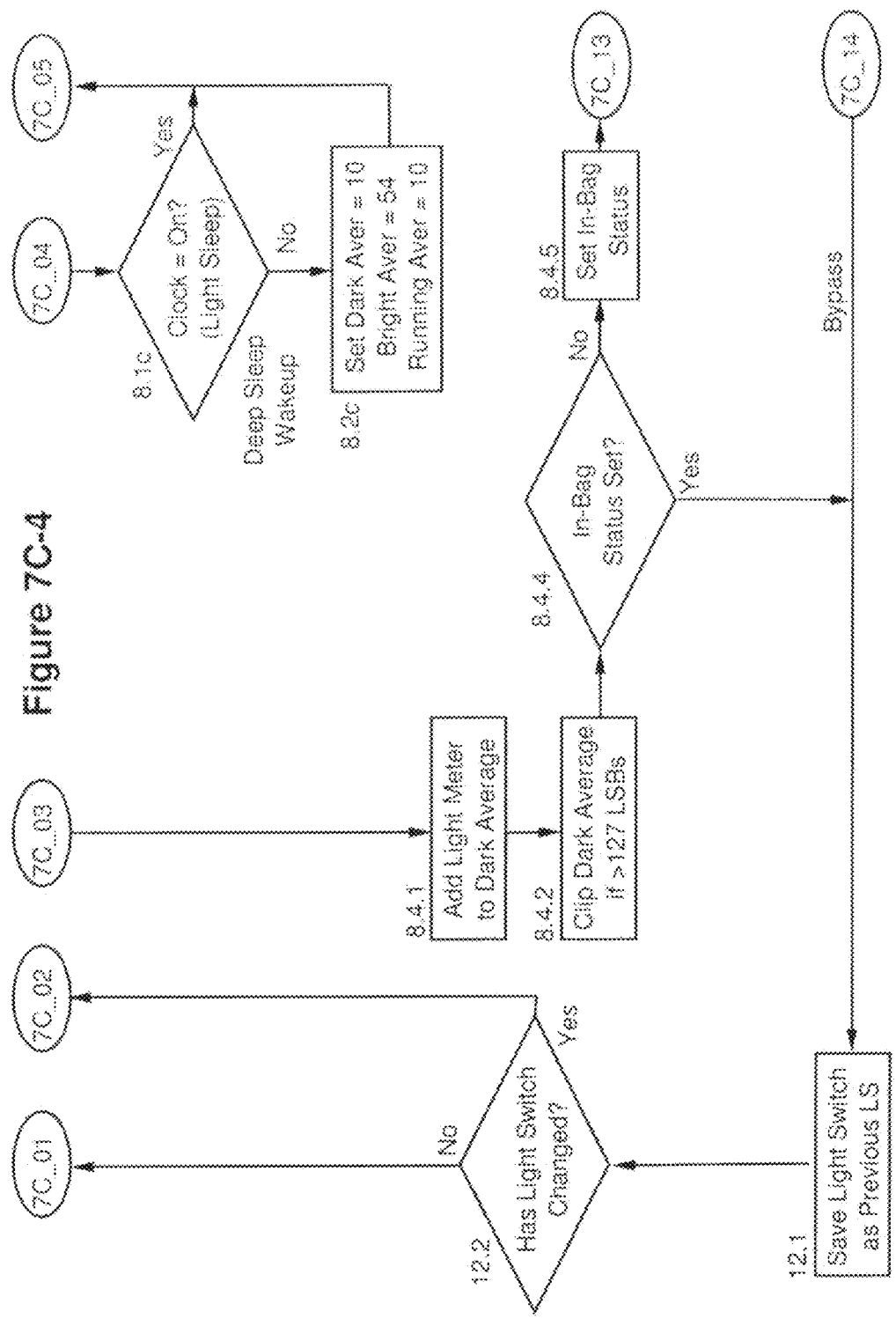

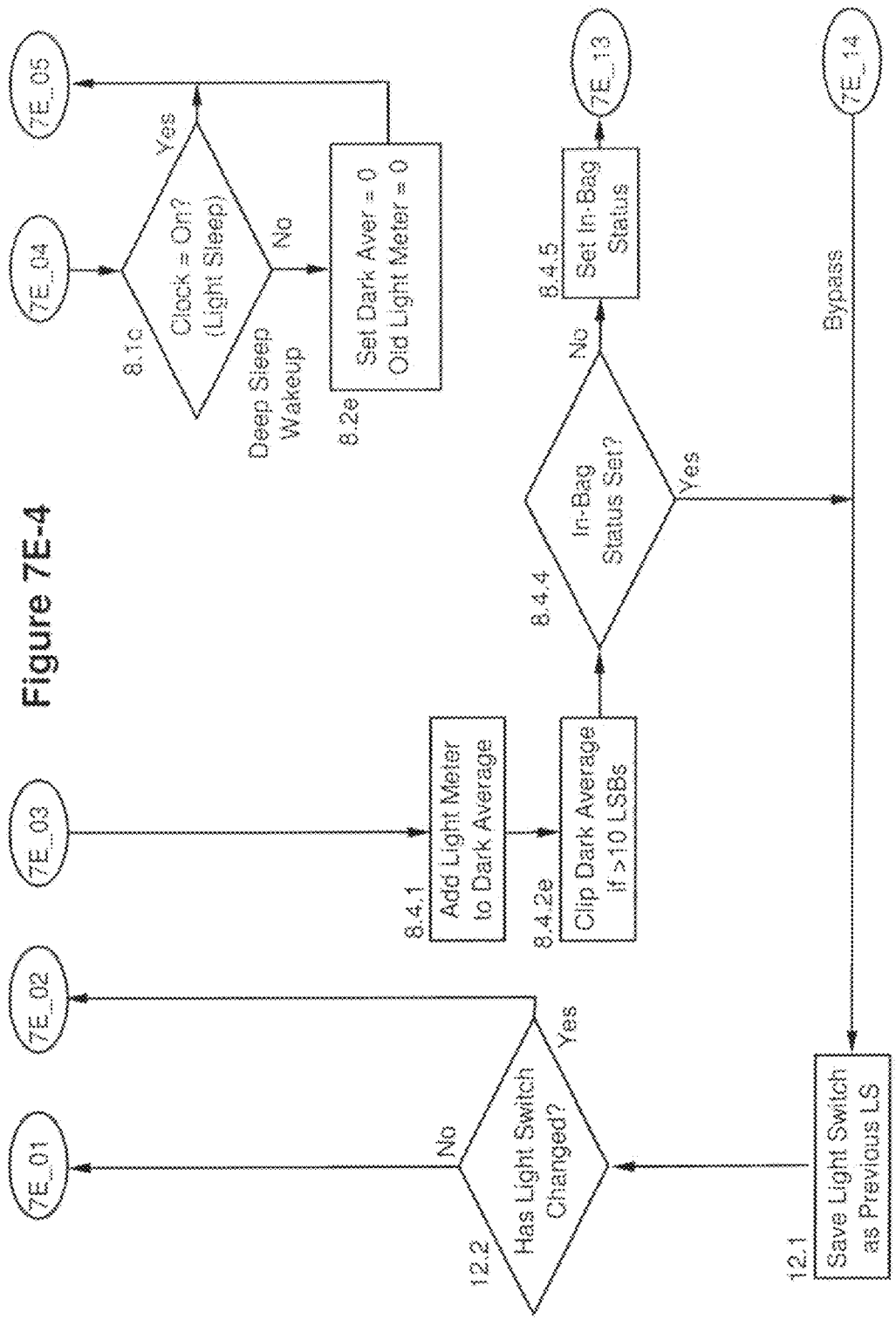

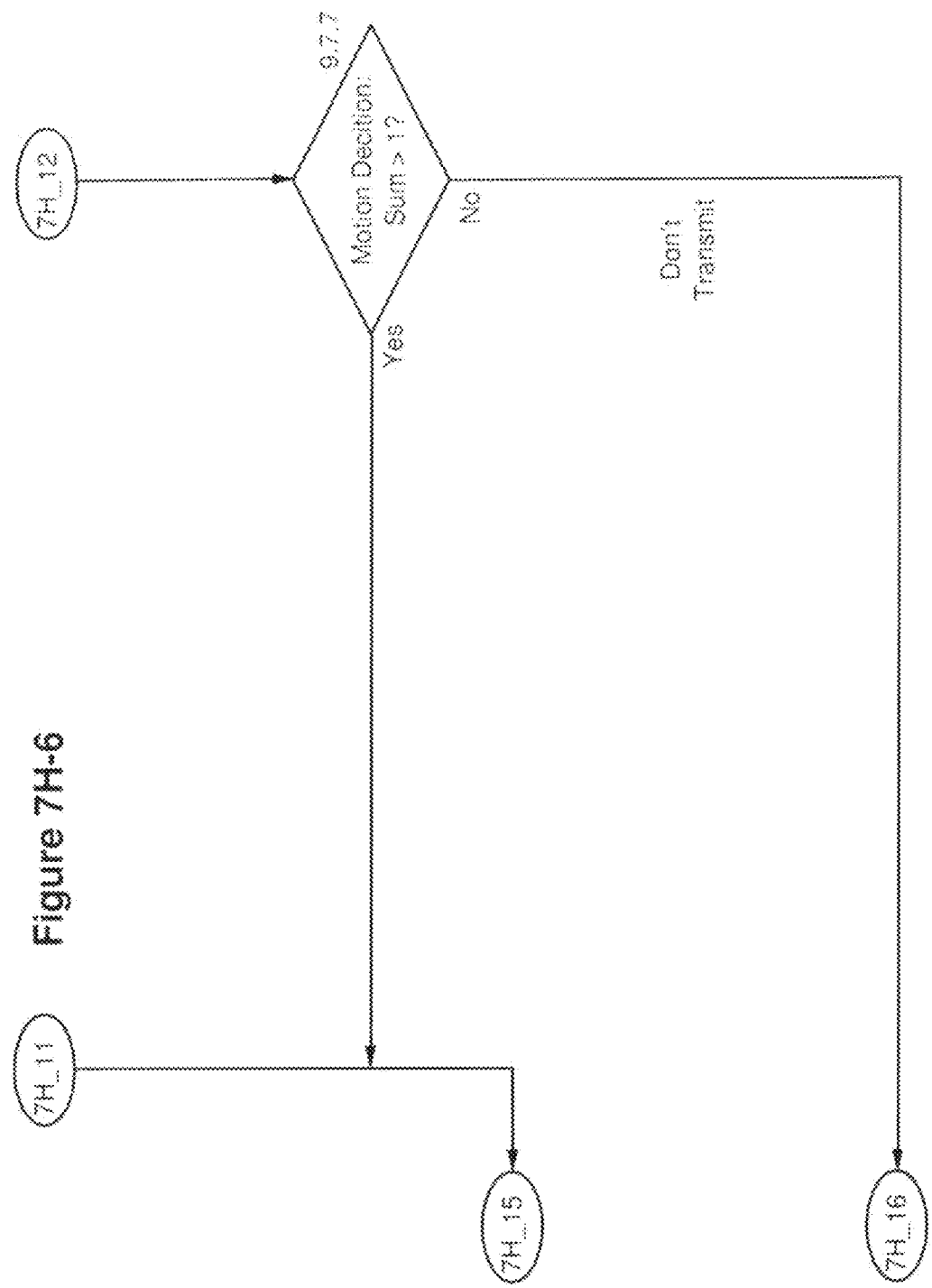

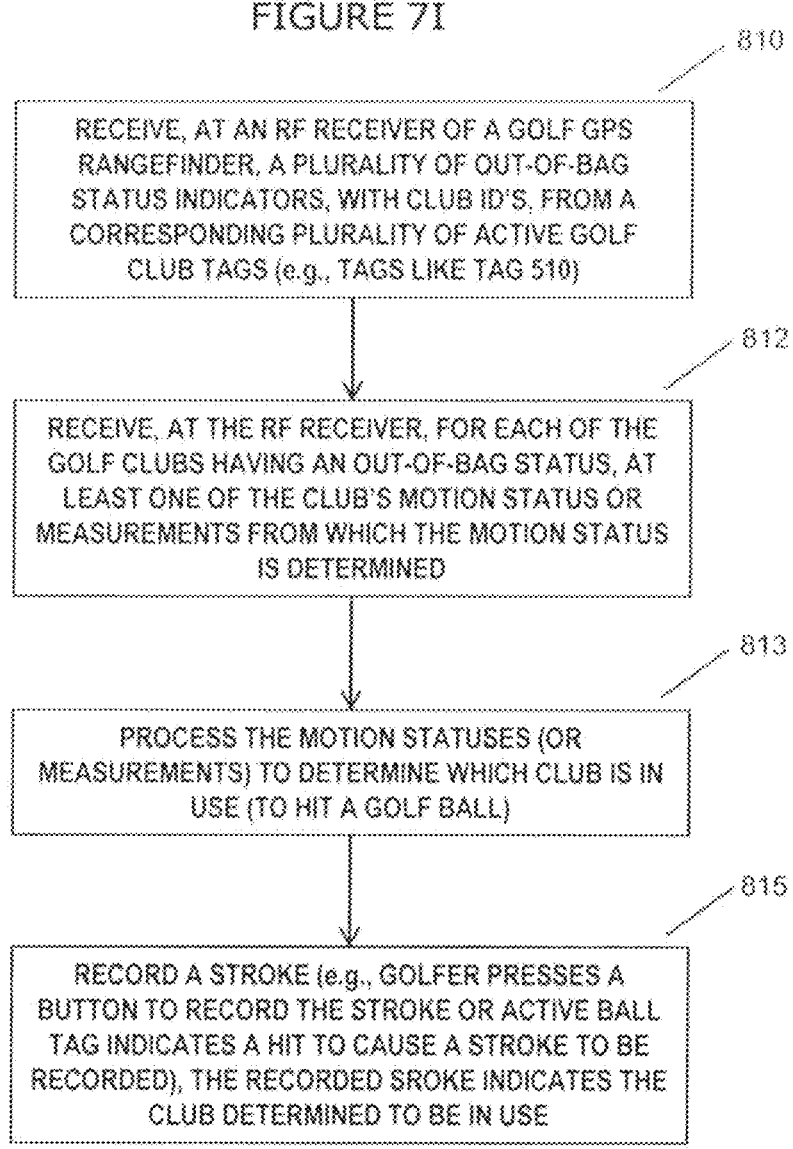

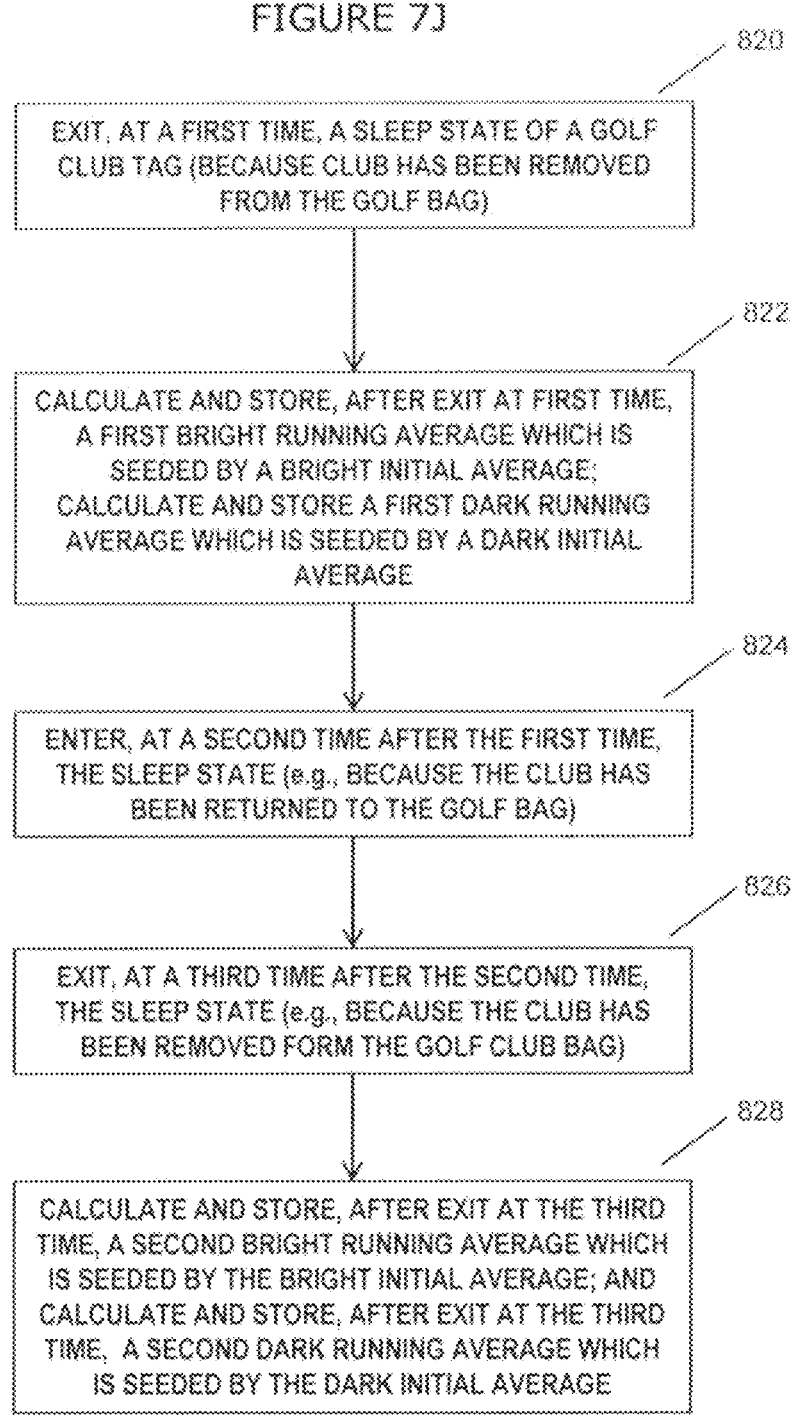

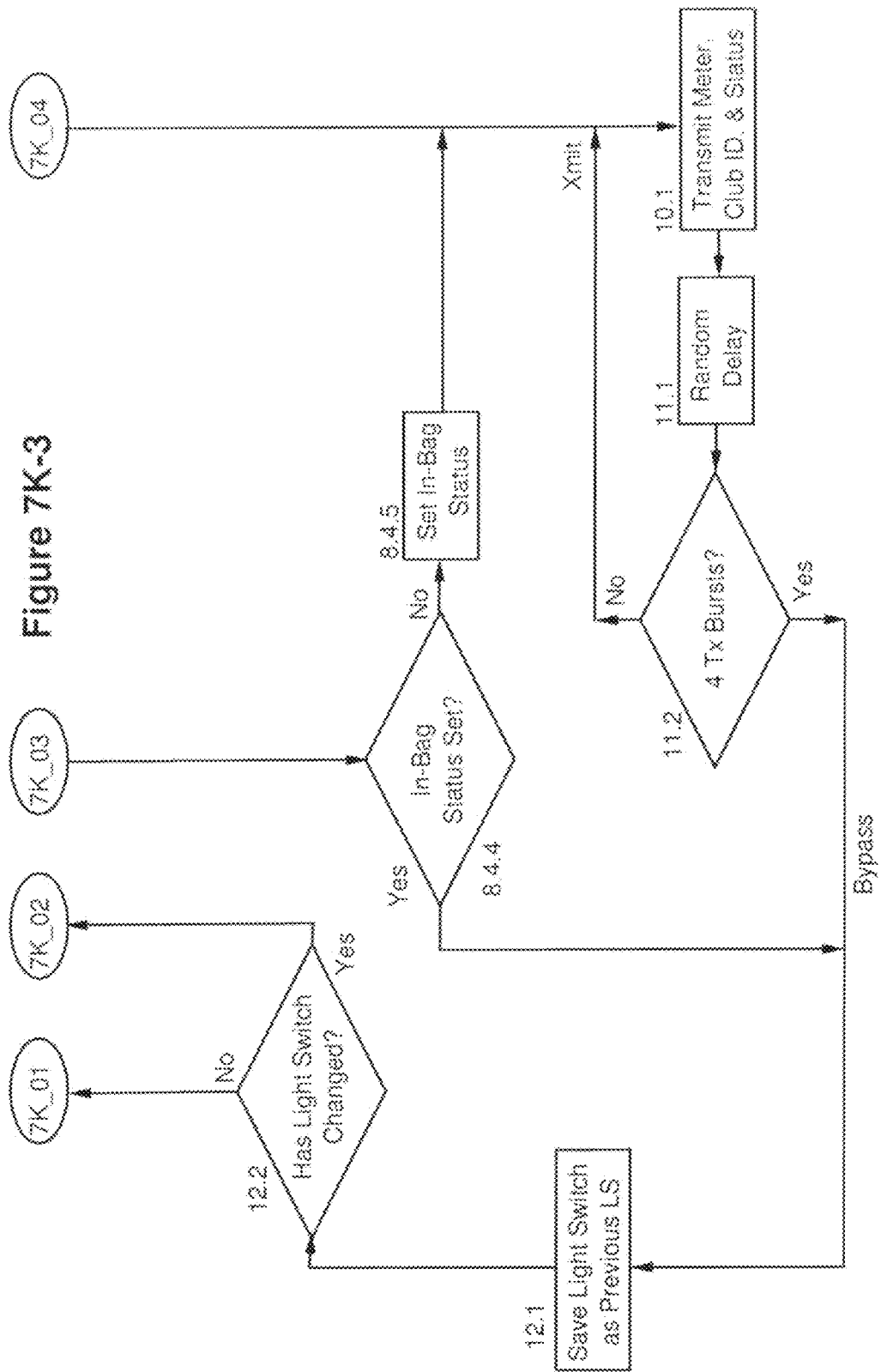

TOP VIEW

SIDE VIEW

TOP VIEW

SIDE VIEW

SECTION AA

TOP VIEW

SIDE VIEW

TOP VIEW

SIDE VIEW

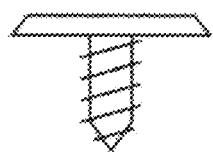 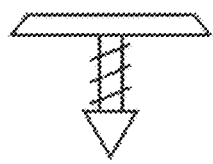 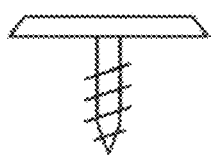
FIG. 15A     FIG. 15B     FIG. 15C
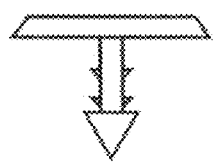 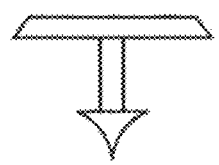
FIG. 15D     FIG. 15E
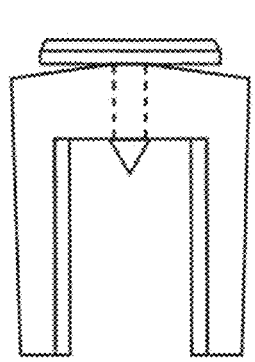 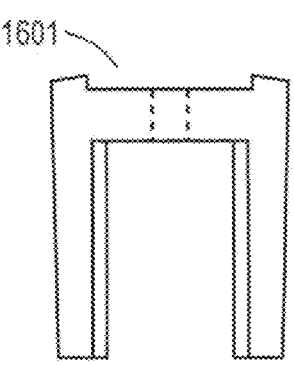 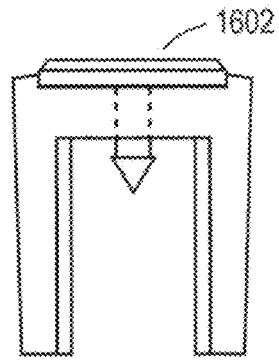
FIG. 16A     FIG. 16B     FIG. 16C

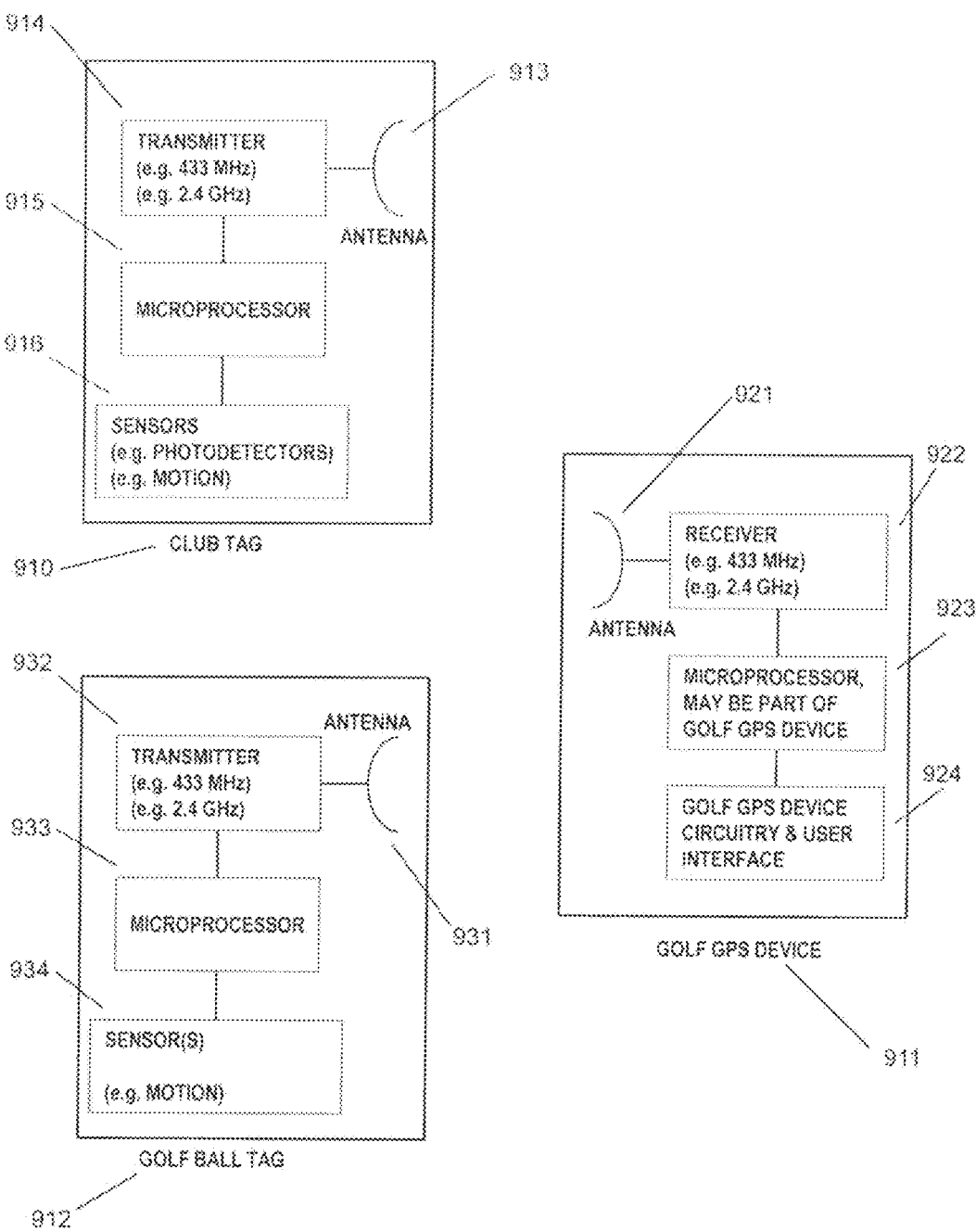

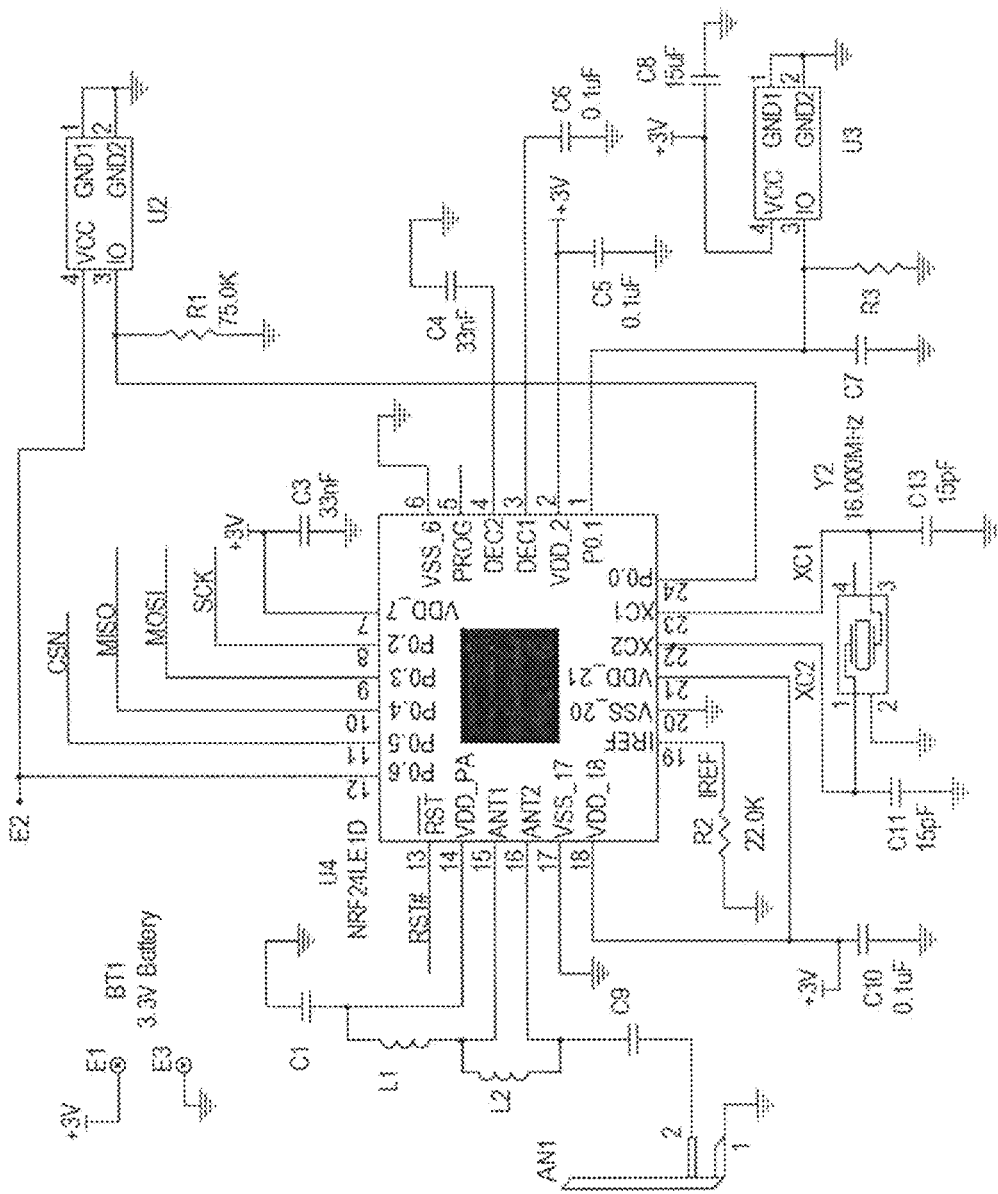

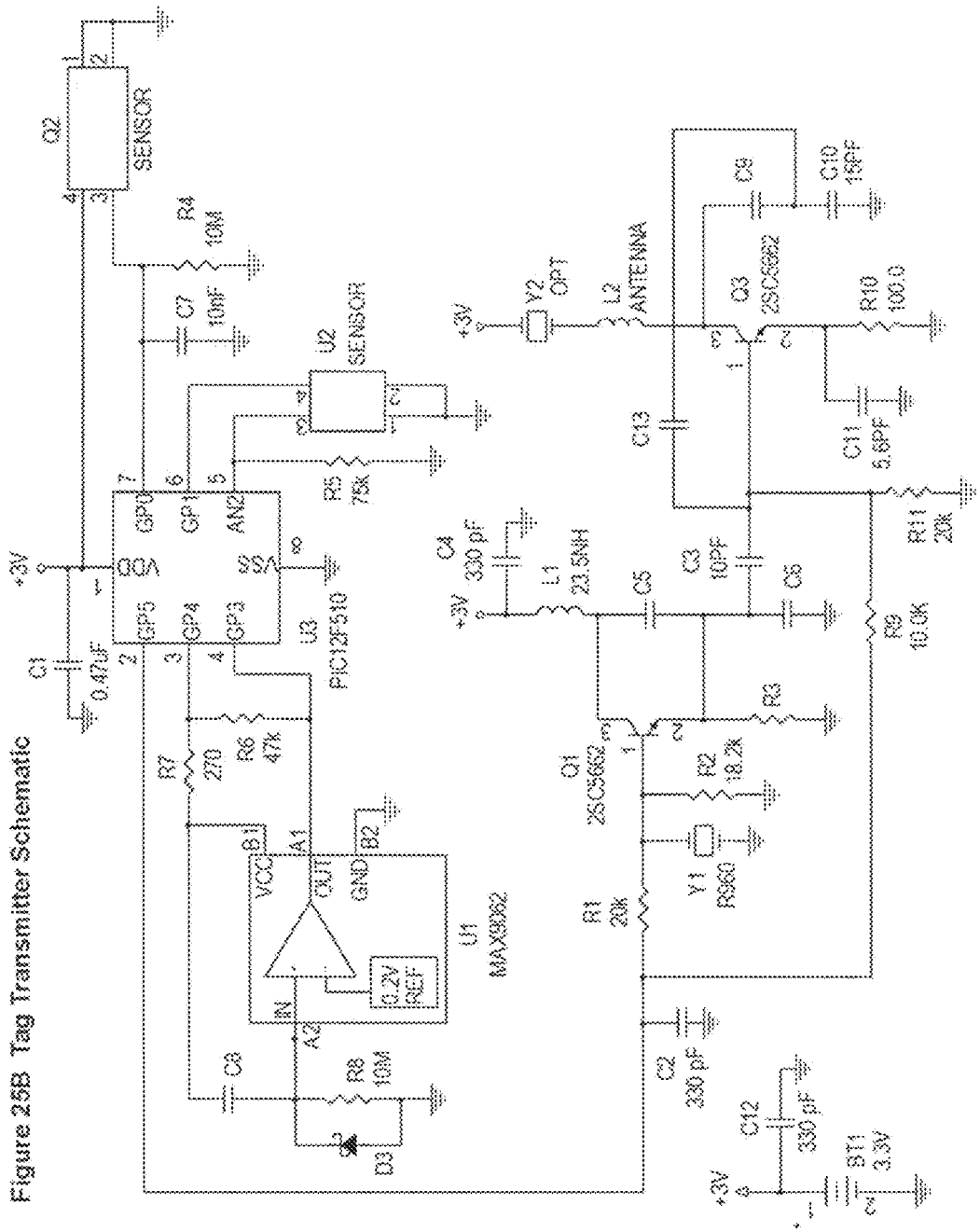

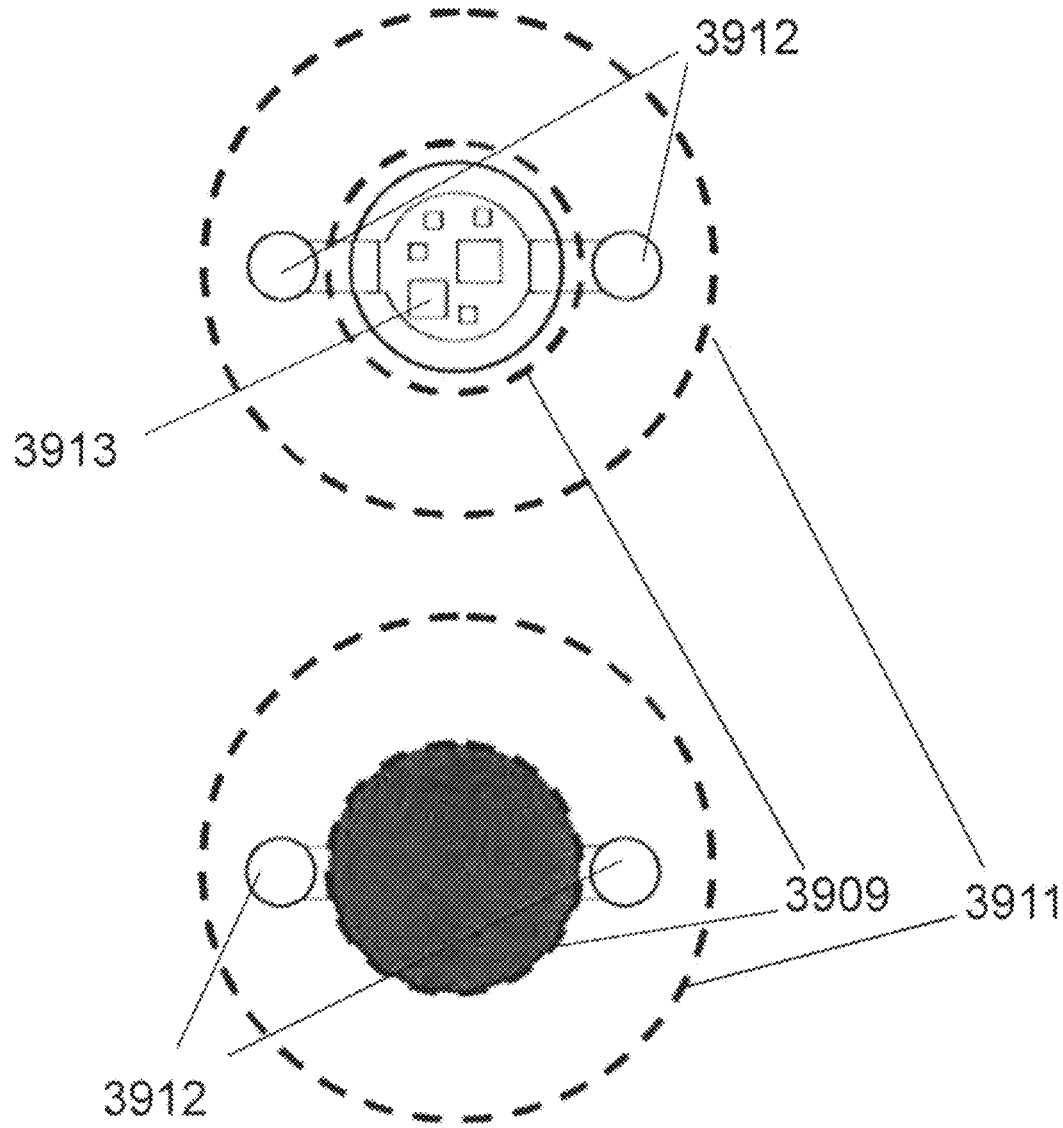

PASSIVE RFID TAG ON CLUB & ACTIVE OR PASSIVE RFID TAG IN BALL

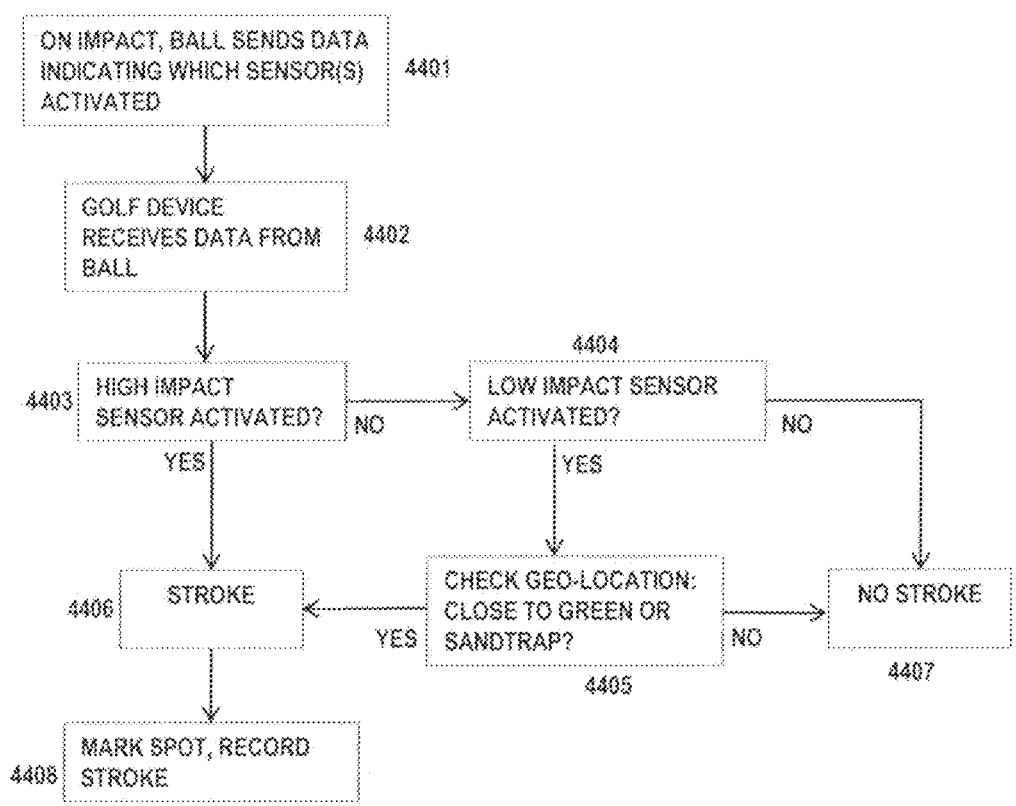

This graph includes the actual light meter readings received for the different tests

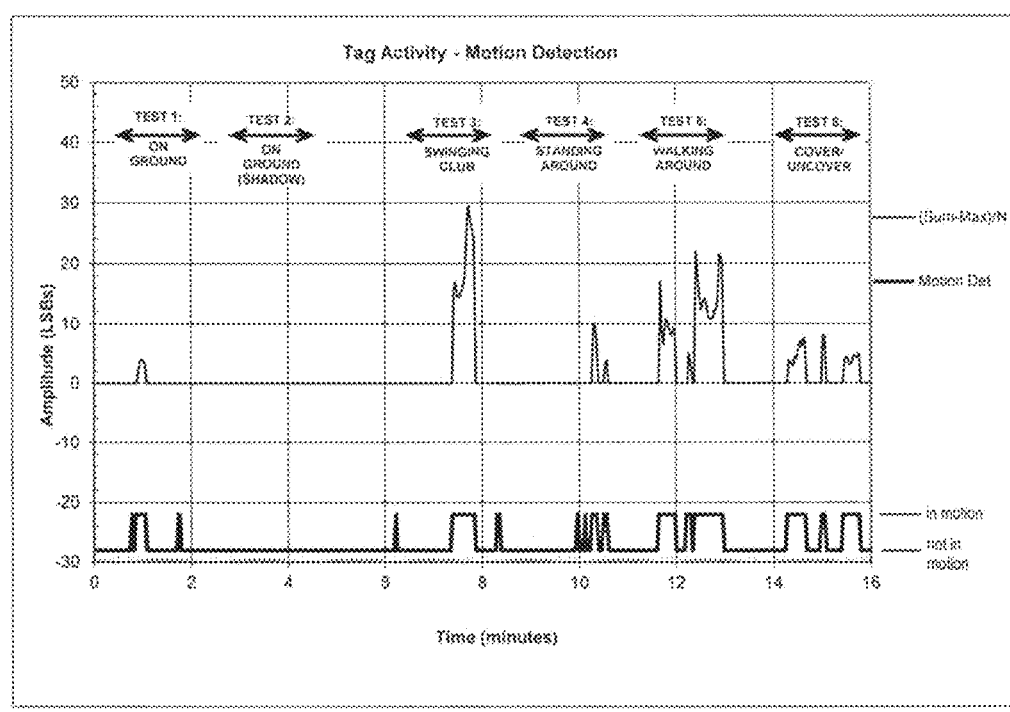

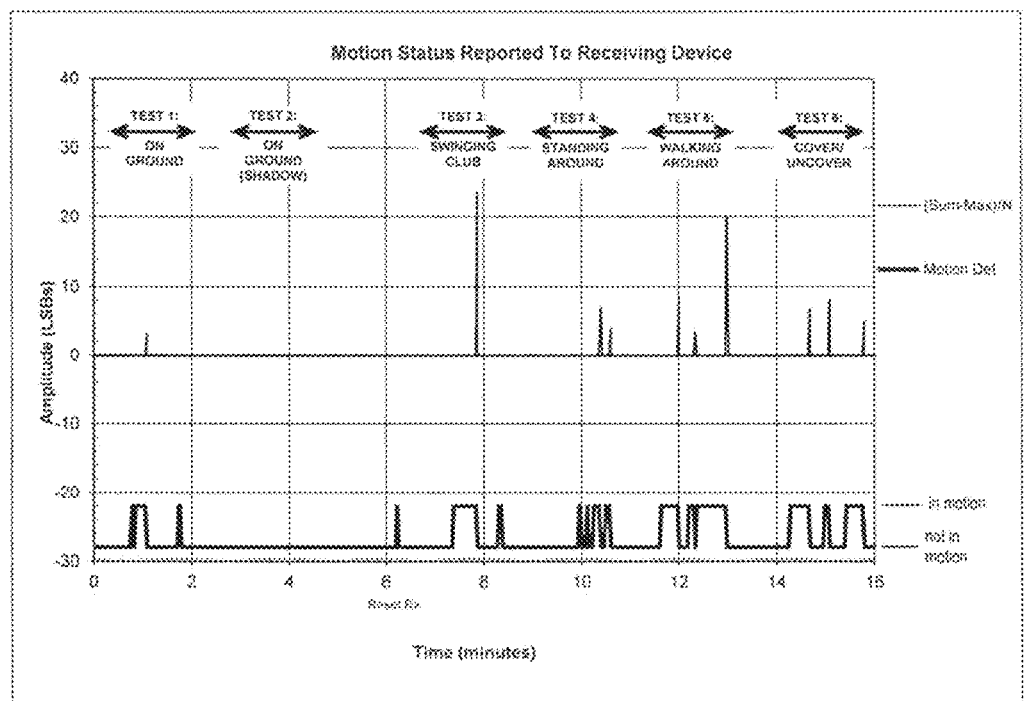

Figure 46
TEST DESCRIPTIONS

TEST 1: CLUB ON GROUND Remove club from bag, set club on ground (no shadowing) pick up club and replace into bag at end of 90 seconds.

TEST 2: CLUB ON GROUND (SHADOWED) Remove club from bag, set club on ground (shadow/unshadow club after approximately 45 seconds) let club stay on ground for another 20 seconds with no shadowing, pick up club and replace into bag at end of 90 seconds.

TEST 3: SWINGING CLUB Remove club from bag, "stand around" for 30 seconds, perform two practice swings and a real swing, "stand around" for 30 seconds, replace into bag at end of 90 seconds.

TEST 4: STANDING AROUND Remove club from bag, "stand around" with club still for first 30 seconds, then move club around while standing in same location, replace into bag at end of 90 seconds.

TEST 5: WALKING Remove club from bag, "walk around", replace into bag at end of 90 seconds.

TEST 6: COVER/UNCOVER Remove club from bag, "stand around" for 30 seconds, cover and uncover two times, "stand around" for 30 seconds, replace into bag at end of 90 seconds.

FIGURE 47

Option 1. Requires pressing a "Mark" button on the receiving device

| Scenario | Rule | Exception Case(s) | Comments |
|---|---|---|---|
| One club removed from golf bag for a shot. MARK button pressed at location of shot | After the Receiving device moves more than X distance away from the MARK location, the receiving device selects the last club reporting MOTION at the MARK location as the club used for the shot |  | The Receiving device can have automation preference settings such as "Next Club From Bag" which will automatically select the next club pulled from the bag after the MARK button is pressed.<br><br>Note: If the golfer has to hit the ball again from the same location (e.g. miss-hits) the golfer may have to use an Edit button to record more than one stroke from same location. |
| More than one club is removed from golf bag for a shot. MARK button pressed at location of shot | After the Receiving device moves more than X distance away from the MARK location, the Receiving device selects the last club reporting MOTION at the MARK location while at least one other club was STILL as the club used for the shot | If all clubs continuously report MOTION at the MARK location (e.g. the clubs not used are being shadowed or handled by someone – a rare case) the Receiving device chooses the last club reporting MOTION at the MARK location with the highest transmitted average DIFF value | Alternatively, in the rare case that the unused clubs do not stop reporting MOTION at the MARK location, the Receiving device could present golfer with a message after the golfer moves more than X distance away from the Mark location (e.g. "Confirm club used for last shot: 6, 7!, 8!") |

NOTE: When the receiving device is in motion (e.g. moving at a rate of more than X) the receiving device ignores reports of MOTION from the tags. The receiving device should start listening for reports of MOTION from tags after the receiving device is "still" for more than X amount of time.

FIGURE 48

Option 2. Does not require pressing a "Mark" button on the receiving device

| Scenario | Rule | Exception Case(s) | Comments |
|---|---|---|---|
| One club removed from golf bag for a shot; Mark button not pressed at location of shot | The "Shot Location" is the location where the receiving device is "STILL" for more than X amount of time while the club reports MOTION. After the golfer replaces the club in the bag, the receiving device chooses the Shot Location with the largest reported average DIFF value as the location of the shot. | Practice swings (either before or after the actual swing) in a location other than the actual shot location may be interpreted as actual swings. | After the club is returned to the golf bag, if the receiving device received more than one "shot location" with similar reported DIFF values, the receiving device could either select the last "shot location" or the shot location with the highest average DIFF value. |
| More than one club is removed from golf bag for a shot; Mark button not pressed at location of shot | After the receiving device moves more than X distance away from a "shot location" while a club reported MOTION when at least one other club reported STILL, the receiving device chooses the last club reporting MOTION at the "shot location" while at least one other club is STILL. | If all clubs continuously report MOTION at the "shot location" (e.g. the clubs not used are being shadowed or handled by someone – a rare case) the receiving device chooses the club in MOTION at the shot location with the highest transmitted average DIFF value. | If necessary (e.g. average DIFF values are too similar) the receiving device could present golfer with message. e.g. "Confirm club used for last shot: 6i, 7i, 8i". |

NOTE: When the receiving device is in motion (e.g. moving at a rate of more than X) the receiving device ignores reports of MOTION from the tags. The receiving device should start listening for reports of MOTION from tags after the receiving device is "still" for more than X amount of time.

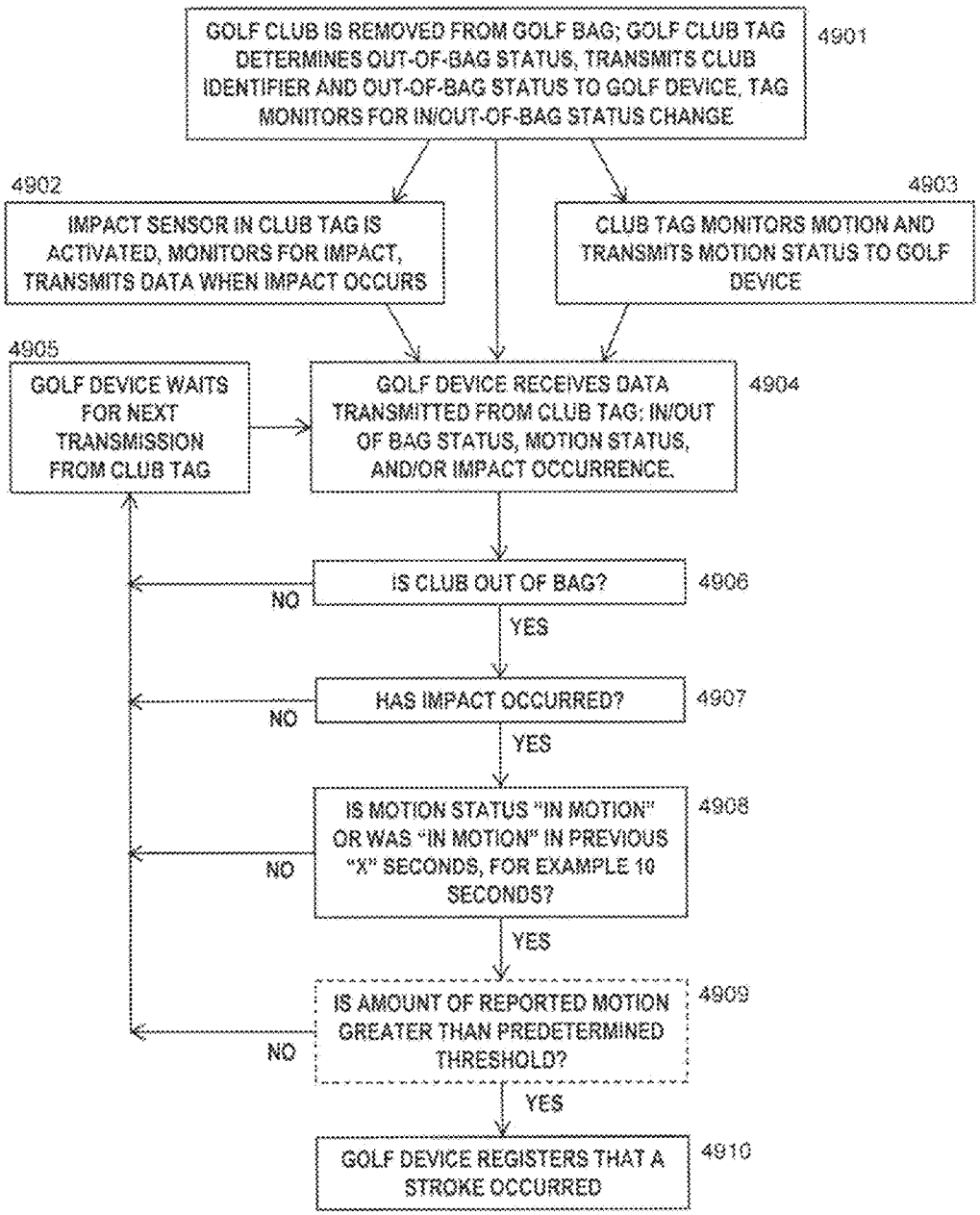

POWER SAVING TECHNIQUE IN GOLF CLUB TAG

GOLF CLUB APPARATUSES AND METHODS

This application is a divisional of U.S. patent application Ser. No. 13/633,835, filed on Oct. 2, 2012, which claims priority to U.S. Provisional Patent Application Nos. 61/652,831 filed May 29, 2012, and to 61/610,436, filed Mar. 13, 2012, and to 61/620,905, filed Apr. 5, 2012, and each of these three provisional patent applications are hereby incorporated herein by reference and U.S. patent application Ser. No. 13/633,835 is also a continuation-in-part of and incorporates herein by reference U.S. patent application Ser. No. 12/813,465, filed Jun. 10, 2010, which claims the benefit of U.S. Provisional Patent Application No. 61/186,771, filed Jun. 12, 2009, and U.S. patent application Ser. No. 13/633,835 is also a continuation-in-part of and incorporates herein by reference U.S. patent application Ser. No. 12/405,223, filed Mar. 16, 2009 entitled "Golf Data Recorder With Integrated Missing Club Reminder and Theft Prevention System," which claims the benefit of U.S. Provisional Patent Application No. 61/037,305, filed Mar. 17, 2008, which is hereby incorporated herein by reference.

FIELD OF THE INVENTION

The present invention relates to the game of golf or other games, and more particularly to an improved golf data collecting and recording system.

BACKGROUND OF THE INVENTION

Golf Data Recording Function

GPS rangefinders are popular in the game of golf. GPS rangefinders are used to inform the golfer of the golfer's location on a golf course relative to the location of other mapped areas of interest on the course (e.g. sand traps, greens, etc.) GPS rangefinders are typically available in either cart-mounted or handheld versions. GPS rangefinding functions are also available in cellular phones and personal computing devices. GPS rangefinders can be incorporated into devices that can be worn on the golfer, such as a watch or a device clipped to a belt, hat or other device either worn by the golfer or kept near the golfer during play.

A potentially valuable feature of handheld GPS rangefinders is the ability for the golfer to "mark the location" of the ball and other areas of interest. With existing handheld systems, or systems worn on the golfer, the golfer is able to press a button on the devices to mark the location of the ball. Similar technology could be implemented in cart-mounted GPS systems, but the handheld systems or systems worn on the golfer have the advantage of the golfer being able to walk to the actual location of the golf ball to mark the location. Often golf carts are restricted to "cart path only" access on a golf course and it is often not practical to drive a golf cart to the actual location of a golf ball due to the terrain.

Marking the location of the ball provides valuable information to the golfer. The current systems operate in approximately the following manner: When the golfer hits the first (tee) shot of a hole the golfer presses a button on the device instructing the device to "mark the spot" where the drive was hit. The device records the GPS coordinates of the first shot. The golfer may manually enter, through a manual input interface, other information on the device such as: type of club used (e.g. driver, 5 iron, etc.), type of contact made with the ball (e.g. hook, slice, straight), wind conditions, etc. The current method to enter such data consists of the golfer making selections on the device by pressing buttons, selecting items from drop down menus, etc.

After the golfer hits the first shot, records the location of the first shot and enters data about the first shot the golfer approaches the ball at rest for the next shot. If the golfer follows the same pattern as the first shot (i.e. hitting the ball, marking the spot of the shot on the device, entering other information) the GPS system can store and display the locations of the first and second shots and calculate the distance of the first shot. If this pattern is continued for every shot of the round the golfer would have very valuable data about the golf round including: distance of all shots, locations of all shots and, if entered, type of contact made on all shots, wind conditions for all shots, etc. The golfer would also know the number of strokes taken per hole which, if accurately recorded, would be the golfer's score for the round. However golfers seldom use the features because the process of manually entering data is too labor intensive on a golf course and will lengthen the duration of each golf shot, causing delays in the game. Further, if a data collection system requires action by the golfer it is likely the golfer may forget to take action on every stroke. If the golfer forgets to take action to record a stroke or multiple strokes the system provides the golfer inaccurate data. Further, if the golfer attempts to return to the approximate location where the golfer forgot to record the golf stroke this would result in further slowing down of play which is bad for the game of golf. Patents exist that describe GPS systems with methods for collecting and managing data. Both U.S. Pat. No. 6,582,328 (Golflogix) and U.S. Pat. No. 7,118,498 (Sky-Hawke) describe such systems that require the golfer to enter golf shot data.

The problem with existing systems is golfers do not want to manually record the data for golf strokes into a handheld device or device worn on the golfer. It is inconvenient for golfers to take the time to look at a device, press buttons, select from drop-down lists, etc. to record information about every golf shot. One could say it is impractical for golfers to do so. Further, if golfers took the time to enter data in such a manual manner it would result in slower play which is not good for the golfers or the golf courses. It is desirable to have a completely automatic system for collecting golf data. U.S. Patent Application No. 60/949,458 and U.S. patent application Ser. No. 12/170,413 describe such a system. The system described in this patent application includes automated means of detecting when a golf stroke has occurred and which golf club was used for the stroke.

The problem of requiring the golfer to enter data manually is known. U.S. Pat. No. 7,121,962 and U.S. Patent Application Nos. 2007/0135237 and 2007/0129178 (all by Reeves) teach solving the problem using telemetry equipped golf clubs. The solutions taught by Reeves are impractical and fail to address all the issues required to accurately collect and record golf data. Reeves teaches entering data on a handheld device to record golf data, which is not good for the game because it would slow down play. Reeves teaches golf clubs with unique holes in or near the club head that make unique whistling sounds during the golf swing to identify each club. This approach is not practical due to variations in swing speed, wind and other noise variations that would make the system unreliable. Reeves teaches the use of a microphone housed in the handheld device to hear the clicking sound when the club hits to the ball to record the location of the stroke. This does not take into account practice shots between holes and other clicking sounds when clubs hit objects and would be prone to errors.

U.S. Pat. No. 6,030,109 teaches a system for counting strokes automatically by detecting the distinctive sound made by a ball contacting the club face during a hit. The system disclosed seems to be problematic and potentially ineffective for several reasons. Similar to Reeves, this patent confirms a golf stroke by the sound made by the club striking the ball. Because golfers will often hit balls between holes for practice and hit other objects that might sound similar to hitting a ball the system will be prone to errors. A further potential problem relates to the insensitivity to a very gentle putt that generates no characteristic sound pattern. Finally, this system requires the golfer to wear an ankle strap with a microphone in it which golfers will likely not want to wear.

US Patent Application No. 2006/0270450 teaches a voice activated system for collecting and recording golf data. This system requires action (verbal instruction) by the golfer for each golf action to be recorded. Therefore the system does not automatically record golf data. Golfers may not like having to speak instructions for every action to be recorded. Further, golfers may forget to verbally instruct the recording of golf strokes which could result in attempts to return to locations where data was not recorded, slowing down play.

U.S. Pat. No. 7,143,639 and US Patent Application No. 2005/0272516 teach a golf launch monitor that uses RFID tags in golf balls and golf clubs to automatically identify the clubs and balls and to trigger a camera-based launch monitor system. U.S. patent application Ser. No. 10/672,365, filed Sep. 26, 2003 teaches passive RFID in golf balls and the identifying of such golf balls by a RFID reader.

Other examples of related prior art for golf data collection and management systems include: U.S. Pat. Nos. 6,705,942, 5,086,390, 4,910,677, 5,127,044, 5,283,733, 5,298,904, 6,908,404 and US Patent Applications 2002/0177490, 2002/0004723, 2001/0045904, 2002/0188359, 2005/0268704, 2005/0272516 and 2004/0147329.

Golf data collection systems will provide golfers with rich data about their golf game but existing systems and systems taught in the prior art above have shortcomings or challenges. The systems described above require either: 1) expensive and sophisticated electronics on the golf club, 2) the golfer remembering to take an action to record every golf stroke (without a reminder) and 3) the golfer wearing an ankle strap with a microphone in it which golfers will likely not want to wear. Some of the prior art systems have technical challenges, such as relying on sound made by the club striking the ball to record every stroke—which may not be technically feasible for all strokes, particularly putts. There is a need for a golf data collection system that requires little or no action by the golfer to enter data on a device.

Application Ser. No. 12/170,413, filed Jul. 9, 2008, entitled "Apparatuses, Methods and Systems Relating to Automatic Golf Data Collecting and Recording", incorporated herein by reference, describes an automatic golf data collection system. These and further techniques are described herein.

Golf Club Reminder Function

A golfer will commonly remove more than one club from their golf bag when considering how to make an upcoming shot. The golfer does this because they may be unsure of which club to use on the next shot. It is more convenient to have several clubs in hand when deciding which club to use vs. having to walk back to the golf cart for additional clubs. After choosing the correct club to use, the golfer may place the other clubs on the ground. After making the shot, the golfer may select the putter and walk towards the hole to putt the ball and not realize that he/she has left one or more clubs behind. It may then take the golfer a long time to realize that he/she has forgotten the misplaced club. Having to backtrack and reclaim the forgotten clubs slows down the game, is frustrating and may disturb those playing around the golfer.

There are several known approaches to solving the problem of mistakenly leaving golf clubs behind. Such systems are described in various U.S. Pat. No. 7,205,894 (Savage); U.S. Pat. No. 7,106,195 (Keays); U.S. Pat. No. 6,976,563 (Bormaster); U.S. Pat. No. 6,753,778 (Kruger); U.S. Pat. No. 6,411,211 (Boley et al); U.S. Pat. No. 6,366,205 (Sutphen); U.S. Pat. No. 6,118,376 (Regester); U.S. Pat. No. 6,057,762 (Dusza); U.S. Pat. No. 6,023,225 (Boley et al); U.S. Pat. No. 5,973,596 (French et al); U.S. Pat. No. 5,952,921 (Donnelly); U.S. Pat. No. 5,844,483 (Boley) and U.S. Pat. No. 5,565,845 (Hara) and U.S. Patent Application 2007/0191126 (Mandracken).

Some of these systems use distance between tagged clubs and readers to alert the golfer of a misplaced club; some use interrogating RFID transceivers mounted on the bag; some use loops around the opening of the golf bag that sense magnets passing through the loop and some use orientation sensors on the golf clubs. These systems may not be practical or effective for several reasons including: requirement of complex and expensive electronics in some cases; requirement of large amounts of power in some cases; potentially inadequate means of alerting the golfer in some cases. Therefore, there is need for a system that is inexpensive, does not require large amounts of power and effectively alerts the golfer when a club has been mistakenly left behind.

Theft Prevention Function

Golf equipment, specifically golf clubs and golf bags, can be very expensive. It is a known problem that golf equipment can be stolen. Often, when golfers finish playing a round of golf they will leave their golf equipment near the clubhouse, unattended, while they eat a meal, review their golf round with friends, etc. There is a need for a system that will notify a golfer when his or her golf equipment is moved without their authorization. Ideally, such system will help the golfer retrieve their golf equipment if stolen.

There are known approaches to solving the problem of alerting the golfer when their golf bag is moved without authorization. Such systems are described in U.S. Pat. No. 7,205,894 (Savage) and U.S. Pat. No. 5,041,815 (Newton). There is a need for a system with improved functionality over the known art.

SUMMARY OF THE DESCRIPTION

The following describes additions to U.S. Provisional Patent Application 61/620,905, and at least some of the embodiments described herein should be understood to be in the context of the prior application which is incorporated herein by reference. This application includes additions and potential modifications to the club tag and the system including, for example, the following: system automation techniques. This application also refers to techniques described in U.S. Pat. Nos. 7,691,009 and 7,766,766, and pending U.S. patent application Ser. Nos. 13/230,779, 12/405,223, 12/813,465, 13/305,722, 13/305,724, and Provisional Patent Application 61/610,436, each of which is hereby incorporated by reference. This application covers multiple techniques and configurations for a golf data collection and club reminding system comprised of one or more of golf club tags and receiving device(s).

A technique for automating golf data collection is described that includes a golf device configured, in one embodiment, as a watch to be worn by the golfer. The device may contain an impact sensing device (such as a piezoelectric device for example) that recognizes when a stroke has occurred by sensing the shock of the impact as it travels to the hand, wrist and arm of the golfer. The device may also contain a motion sensing device (such as an accelerometer for example) that recognizes when the watch is moving and/or when an impact occurs. It should be understood that one device, such as an accelerometer, could sense both motion (i.e. swing) and impact. Prior art techniques teach including an impact sensing and/or motion sensing device on the golf club tag that is configured to be attached to the golf club. Equipping the impact/motion sensing device in the golf watch device solves the problem of the high cost of electronics and size of the golf club tag. An impact/motion sensor in a golf watch can be used with a full set of golf clubs (typically 14 clubs per set). If the impact/motion sensing device is in the club tag (one tag per golf club in a set of clubs) that can be 14 times (or more) cost to the golfer. The cost can be higher because typically a golfer will own more than 14 clubs, but only allowed to carry a maximum of 14 at a time per the Rules of Golf.

Light Pipe Configurations

The club tag housing is designed to allow light to reach the light sensors. In one embodiment the top part of the housing serves as a light pipe that allows light to reach the light sensors. The light pipe can be configured to control the amount of light that reaches the light sensors. For example, the light pipe can be configured to only allow light in through the sides of the light pipe as shown in FIG. 2. The light pipe can be configured to diffuse or reflectively diffuse light received by the light pipe and direct the diffused light toward one or both of the light sensors. Alternatively, the light pipe can be configured to only allow light in through the top of the light pipe as shown in FIG. 4B. Another embodiment is a combination of light pipes that allow light in through the top and through the sides, directed toward one or more light sensors as shown in FIG. 4C.

Controlling the amount of light that enters the light sensors (light switch and light meter) limits the wide variations between bright light readings. Limiting the amount of direct sun exposure to the light sensors allows for less drastic changes in light which can simplify the algorithms used to determine in-bag or out-of-bag status. The light can be limited by diffusing it or reflectively diffusing it or by the use of a neutral density filter, etc. In an alternate embodiment, it is desirable to focus or direct the light to the light sensors. The algorithm is optimized to interpret the variations in light readings.

Light Sensing Algorithms

The club tags use algorithms, in one embodiment, to determine whether the tag is in or out of the golf bag. These algorithms use information from the light sensors. For example, in one embodiment a fixed threshold between dark and light is used by the light switch to determine in-bag or out-of-bag status in some situations. The light switch and light meter can also be used in combination to determine in-bag or out-of-bag status. The club tag can use variable thresholds calculated by using the light meter measurements and various averages of light meter measurements.

In one embodiment, an apparatus, which can be a golf club tag attached to a golf club, can perform an algorithm to determine the status of the golf club relative to, for example, a golf club bag or other container for the golf club. The status can be one of in-bag or out-of-bag, and status can be determined by a processing system, such as a microcontroller or other processing logic, in the golf club tag. The golf club tag can include a housing that is attached to or coupled to the golf club, and the processing system can be coupled to (e.g. located within) the housing and is coupled to at least one light sensor. The housing can include one or more light pipes as described herein. The golf club tag also includes a memory which is coupled to the processing system and which can be configured to store one or more of a bright average, running average, and a dark average. The golf club tag also includes an RF transmitter, or transceiver, which is coupled to the processing system and which is configured to transmit an identifier of the golf club and an indicator of the status of the golf club relative to the golf club bag.

In one embodiment, the apparatus can include only a single light sensor which is configured to wake up the system from a deep or dark sleep state and is also configured to provide a sequence of current light meter values over a period of time.

In one embodiment, the processing system is configured to require the bright average to be greater than the dark average and is configured to clip the dark average if it exceeds a preset value. Further, the processing system can be configured to cause the RF transmitter to transmit at least one of (a) the current light meter value and (b) the running average of light meter values, and these transmissions can be used by a golf range finder (e.g., a handheld GPS golf range finder that can also remind a golfer about a lost or misplaced golf club) to determine whether a status indicator (e.g. in-bag or out-of-bag) may be erroneous based on comparison of transmitted light meter values to light sensor information as measured by a light sensor internal to the golf range finder.

Club Tag Aesthetics and Housing Design

This application includes various potential club tag design configurations. Also included is the concept of a golf grip that is designed specifically to receive a club tag, thereby improving the aesthetics and creating a more finished-looking product when the club tag is installed on the golf club grip. The configurations included in this application are only typical embodiments of the invention and are not therefore to be considered to be limiting of its scope.

Club Tag Antenna Configurations

The club tag antenna can be modified to be in different locations on the tag. The location of the antenna may have an impact on antenna performance. Removing the antenna from the printed circuit board frees up space for electrical components and allows for a smaller printed circuit board. Other potential impacts of different club tag antenna locations are discussed herein.

System Automation Techniques

Ultimately a system, in one embodiment, used to collect golf data will be fully automated, requiring no out-of-the-ordinary action by the golfer. This application discusses system configurations that are semi-automated as well as fully automated.

Determining Club Motion

In one embodiment, a method of determining that a golf club is in use can include determining a motion of a golf club by collecting a set of measurements which are at least one of (a) a series of light sensor measurements taken over time by a light sensor in the golf club; or (b) a series of vibrations or tilt or motion measurements taken over time by a sensor in the golf club. The method can also include transmitting, from an RF transmitter in the golf club to a mobile device for use in the mobile device in determining that a golf club is in use, at least one of (a) a motion status of the golf club, the motion status determined from the set of measurements; or (b) the set of measurements. In one embodiment, the method can include transmitting an identifier of the golf club to the mobile device and transmitting an out-of-bag status to the mobile device. The motion status can include one of in-motion or still statuses, and the motion status can be determined from at least one of determining a variation in light sensor measurements or by comparing the set of measurements to a predetermined pattern of light sensor measurements. In one embodiment, the variation can be compared to a value and the variation can be a largest difference in light sensor measurements or some measure of a deviation or variation of the light sensor measurements, such as a degree or a standard deviation, etc. In one embodiment, the golf club tag can also include another light sensor which activates a logic circuit and the RF transmitter and the light sensor (used to take light measurements) in order to collect the set of measurements, and the out-of-bag status is determined from the light measurements by the light sensor. A golf club tag according to one embodiment can include a processing logic and at least one sensor for determining a motion of the golf club by collecting a set of measurements which can be at least one of (a) a series of light sensor measurements taken over time by a light sensor in the golf club tag or (b) a series of vibration or tilt or motion measurements taken over time by a sensor in the golf club tag. The at least one sensor can be coupled to the processing logic which is also coupled to an RF transmitter, the RF transmitter being configured to transmit, from the golf club tag to a mobile device for use in the mobile device in determining that a golf club is in use, at least one of (a) a motion status of the golf club, wherein the motion status is determined from the set of measurements or (b) the set of measurements.

A method according to this embodiment can also be performed by a mobile device, such as a golf GPS rangefinder, and this method can include: receiving, at an RF receiver of the mobile device, one or more out-of-bag status indicators with corresponding golf club identifiers from a corresponding one or more golf club tags on a golfer's set of golf clubs, each of the golf club identifiers identifying a particular golf club in the golfer's set of golf clubs; and receiving, at the RF receiver of the mobile device from each of the corresponding one or more golf club tags, at least one of (a) a motion status of the corresponding golf club or (b) a set of measurements from which the motion status is determined; and determining a golf club, in the set of golf clubs, that is in use from at least one of the received motion status and the set of measurements, and recording a stroke, wherein the recording indicates, using the golf club identifier for the golf club determined to be in use, that the stroke was made with the golf club determined to be in use. This method can also include determining a position information through a satellite positioning system in the mobile device, and the recording of the stroke includes recording the position information (such as a latitude and longitude on a golf course) and recording the club used to take the stroke.

Golf Club Tag Activates Reader of Passive Tags in Golf Balls

Another embodiment relates to a method for golf data collection through the use of a sensor in a golf club tag to activate an RFID reader which reads passive RFID tags in golf balls. In one embodiment, this method can include: sensing, by a sensor in the golf club tag, that a golf club has been removed from a golf club container, such as a golf bag, wherein the sensor includes at least one light sensor and optionally a vibration sensor, and the golf club tag includes an RF transmitter and processing logic that is coupled to the RF transmitter and the sensor; and the method can further include transmitting, by the transmitter in the golf club tag, an RF signal to cause an RFID reader in a mobile device to be activated to read a passive RFID tag in a golf ball; the transmitter transmits the RF signal in response to the sensor sensing that the golf club has been removed from the golf club container. The method can also include the use of a first light sensor which turns on a second light sensor that provides the measurements of light, and the measurements of light are used by the processing logic to determine that the golf club has been removed from the golf club container. In one embodiment, the method can include actions performed by the RFID reader including: receiving, by the RFID reader, the RF signal to cause the RFID reader to be activated to read the passive RFID tags in one or more golf balls. The method of the reader can also include transmitting, from the RFID reader, in response to the signal to cause the RFID reader to be activated, an RF query signal that requests a response from one or more passive RFID tags in one or more golf balls. The method can further include receiving, by the RFID reader, a response to the query signal, from a passive RFID tag in the golf ball, and determining that the golf ball has been hit by the golf club and then recording information indicating a stroke has been taken by the golf club and recording a GPS position information indicating a location of the stroke.

Golf Ball with Sensor to Detect Hit on Golf Ball

In one embodiment, a golf ball includes a battery within the golf ball, a sensor configured to detect a hit on the golf ball by a golf club, a processing logic coupled to the battery and to the sensor, and an RF transmitter coupled to an antenna and also coupled to the processing logic. The processing logic can be configured to cause the RF transmitter to transmit a first RF signal to a mobile device, such as a GPS golf rangefinder, in response to the sensor detecting a hit on the golf ball. In one embodiment, the processing logic can be further configured to maintain the golf ball in a low power sleep state until the sensor detects a hit and then the sensor causes the processing logic to exit the low power sleep state and to provide power to the RF transmitter, and the processing logic causes the golf ball to return to the low power sleep state after a period of time that is subsequent to a hit on the golf ball. In one embodiment, the sensor can be at least one of (a) a vibration sensor; (b) a piezoelectric sensor; (c) a shock sensor; (d) an acceleration sensor; or (e) a motion sensor. The golf ball can be configured to transmit the RF signal repeatedly and can include at least one of (a) an identifier of the golf ball or (b) a motion status of the golf ball as indicated by the one or more sensors in the golf ball. In one embodiment, the sensor can include a first sensor having a first sensitivity and a second sensor having a second sensitivity, wherein the second sensitivity of the second sensor detects impacts that are not detected by the first sensor, and wherein the first sensor causes the processing logic to exit the low power sleep state and wherein the golf ball transmits the first RF signal repeatedly at a first rate immediately after a hit is detected and then at a second rate, which is lower than the first rate, after transmitting at the first rate. In one embodiment, the first sensor can be an impact sensor and the second sensor can be a vibration sensor.

In one embodiment, a mobile golf rangefinder can operate with a golf ball having an impact sensor and can use geo-location information to determine whether a stroke should be recorded and the type of stroke, such as a driver stroke or a putt. For example, in one embodiment, a mobile golf rangefinder can include a satellite positioning system receiver for providing position information, such as latitude and longitude, and can also include one or more receivers for receiving RF signals from an RF transmitter in a golf ball and for receiving RF signals from RF transmitters in one or more golf club tags. The mobile golf rangefinder can also include data storage for storing map information about one or more golf courses and can also include processing logic coupled to the satellite positioning system receiver and also coupled to the one or more receivers and also coupled to the data storage. The processing logic can be configured to determine, from the RF signals from the RF transmitter in the golf ball, the type of impact and can be configured to determine from the position information and from the type of impact and from the map information, whether to record a stroke. In other words, using the map information and the position information, the mobile golf rangefinder can determine whether to accept the readings as a stoke and to thereby record the stroke. For example, subtle impacts are ignored when no golf club tags indicate an out-of-bag status. As another example, the mobile golf rangefinder can record a stroke from a light hit which occurs near a green on a golf course as determined by the GPS receiver.

Golf Ball Construction

In one embodiment, a golf ball can include a battery, an RF transmitter coupled to the battery, a logic circuit coupled to the battery and to the RF transmitter, at least one antenna contact pad coupled to the RF transmitter, a first core having an outer surface which surrounds the battery, the RF transmitter, the logic circuit, and at least one antenna contact pad, and an antenna coupled to the at least one antenna contact pad, the antenna extending out beyond the outer surface of the first core, and a second core which surrounds the first core, the antenna being disposed within the second core and placed between portions of core material, which is used to form the second core, before the second core is formed, and a shell which surrounds the second core. Optionally, there may be an antenna inside the first core. The golf ball can further include at least one sensor configured to detect a hit on the golf ball by a golf club, the sensor being coupled to the logic circuit and to the battery. The antenna can be formed from an elastic conductive material, and the first core can be formed from a hard material and the second core can be formed from an elastic material. The processing logic, in one embodiment, can be configured to cause the RF transmitter to transmit an RF signal to a mobile device in response to the at least one sensor detecting a hit on the golf ball, and the logic circuit can be configured to maintain the golf ball circuitry and a low power sleep state until at least one sensor detects a hit and then the at least one sensor causes the logic circuit to exit the low power state and causes the RF transmitter to enter a higher power state. In one embodiment, such a golf ball may be manufactured according to a method which includes: coupling a battery to an RF transmitter and to a logic circuit, the RF transmitter having at least one antenna pad; coupling an antenna to at least one antenna pad; forming a first core which encapsulates the RF transmitter and the logic circuit within the first core, the first core having an outer surface, and the antenna extending outwardly beyond the outer surface; placing the first core in a mold, the first core being placed between core material in the mold; and forming a second core from the core material in the mold, the second core encapsulating the first core and the antenna; and forming a shell around the second core.

Sensor in Active Ball Activates RFID Reader of Passive Club Tags

In one embodiment, a golf data collection system can include: a golf ball containing a battery and at least one sensor that is configured to detect a hit on the golf ball by a golf club, and an RF transmitter and a processing logic coupled to the battery and to the at least one sensor and to the RF transmitter; and a mobile device having a battery and having a first receiver configured to receive RF signals from the RF transmitter in the golf ball and having an RFID reader configured to transmit a query signal to one or more passive RFID golf club tags, and wherein the RFID reader is also configured to process a response to the query signal from the one or more passive RFID golf club tags. The golf data collection system can include an RFID receiver to receive the response to the query signal from the one or more passive RFID golf club tags. In one embodiment, the RFID reader transmits the query signal in response to receiving an RF signal from the golf ball, wherein the RF signal is transmitted in response to the at least one sensor detecting a hit on the golf ball. In other words, the sensor in the golf ball causes the activation of the RFID reader to transmit the query signals in one embodiment.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 4B shows a side view cross section of one embodiment of a club tag illustrating light entering from the top of the light pipe.

FIG. 4C shows a side view cross section of one embodiment of a club tag illustrating light entering from the top of the light pipe and from the sides of the light pipe.

FIG. 4D shows a side view cross section of one embodiment of a club tag illustrating two isolated light sensors and light entering from the top of the light pipe and from the sides of the light pipe.

FIG. 4E shows a flow chart of possible scenarios based on readings of each isolated light sensor, such as the light sensors in the embodiment shown in FIG. 4D.

FIG. 6A is a schematic diagram for one embodiment of the club tag (e.g., 433 MHz).

FIG. 6B is a schematic diagram for another embodiment of the club tag (e.g., 2.4 GHz).

FIG. 7A is in the form of multiple pages labeled as 7A-1, 7A-2, 7A-3, and 7A-4.

FIG. 7B is in the form of multiple pages labeled as 7B-1, 7B-2, 7B-3, and 7B-4. FIG. 7C is in the form of multiple pages labeled as 7C-1, 7C-2, 7C-3, 7C-4, 7C-5, and 7C-6.

FIG. 7D is in the form of multiple pages labeled as 7D-1, 7D-2, 7D-3, 7D-4, 7D-5, and 7D-6. FIG. 7E is in the form of multiple pages labeled as 7E-1, 7E-2, 7E-3, 7E-4, 7E-5, and 7E-6.

FIG. 7F is in the form of multiple pages labeled as 7F-1, 7F-2, 7F-3, 7F-4, 7F-5, and 7F-6. FIG. 7G is in the form of multiple pages labeled as 7G-1, 7G-2, 7G-3, 7G-4, 7G-5, and 7G-6.

FIG. 7H is in the form of multiple pages labeled as 7H-1, 7H-2, 7H-3, 7H-4, 7H-5, and 7H-6.

FIG. 7I is a flow chart showing a method for processing motion status from a group of golf clubs.

FIG. 7J is a flow chart showing a method of using reseeded running average(s) in one embodiment.

FIG. 7K is in the form of multiple pages labeled as 7K-1, 7K-2, and 7K-3.

FIG. 7L is in the form of multiple pages labeled as 7L-1, 7L-2, 7L-3, 7L-4, 7L-5, and 7L-6. In FIGS. 7A, 7B, 7C, 7D, 7E, 7F, 7G, 7H, 7K, and 7L, the same reference number used in two different figures represents the same or similar operation in each flow.

FIGS. 15A-15E show various configurations for the post on the club tag.

FIGS. 16A, 16B and 16C show three side view cross sections of a golf club shaft and golf club grip with the golf club grip molded with a recess designed to receive a club tag.

FIG. 24A is a block diagram for the club reminder and golf data collecting system.

FIG. 25A is a schematic diagram for one embodiment of the ball tag

FIG. 25B is a schematic diagram for another embodiment of the ball tag

FIG. 44 is a flow chart of a typical embodiment of a tag that contains two impact sensors in a golf ball.

FIGS. 45A, 45B, and 45C are graphs illustrating data and status decisions performed by algorithms that use light meter variation to determine motion status of a club.

FIG. 46 outlines tests performed to assess motion status of a club based on light meter variations.

FIGS. 47 and 48 outline methods of automation for golf round data collection.

FIG. 49 outlines a method of combining motion and impact data to automatically determine that a golf stroke has occurred.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

System Overview—Club Tag and Golf Device

Figures 2, 7A:
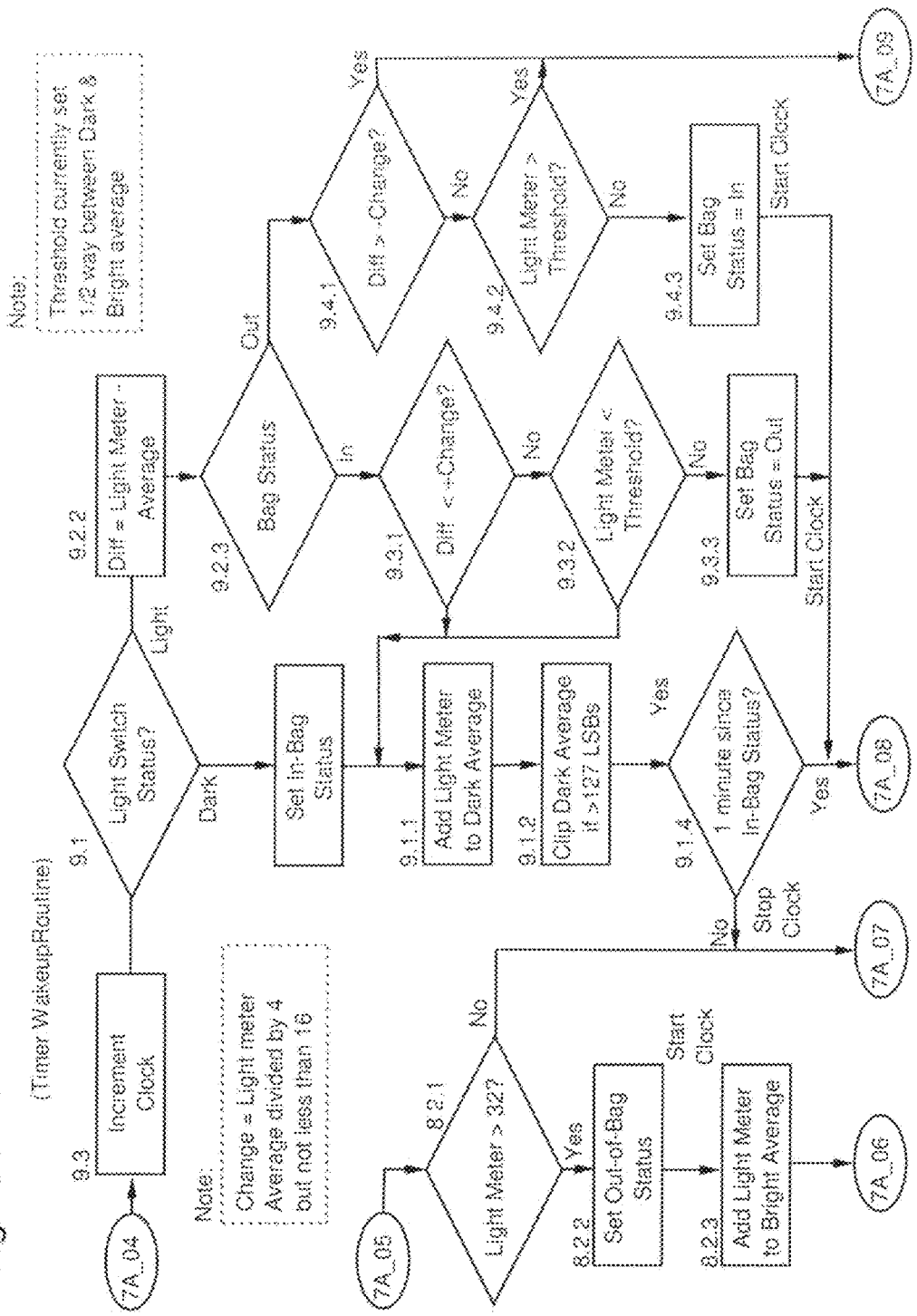
FIG. 7A is a software flow diagram for the microprocessor in one embodiment of the club tag.
Figures 3, 7A:
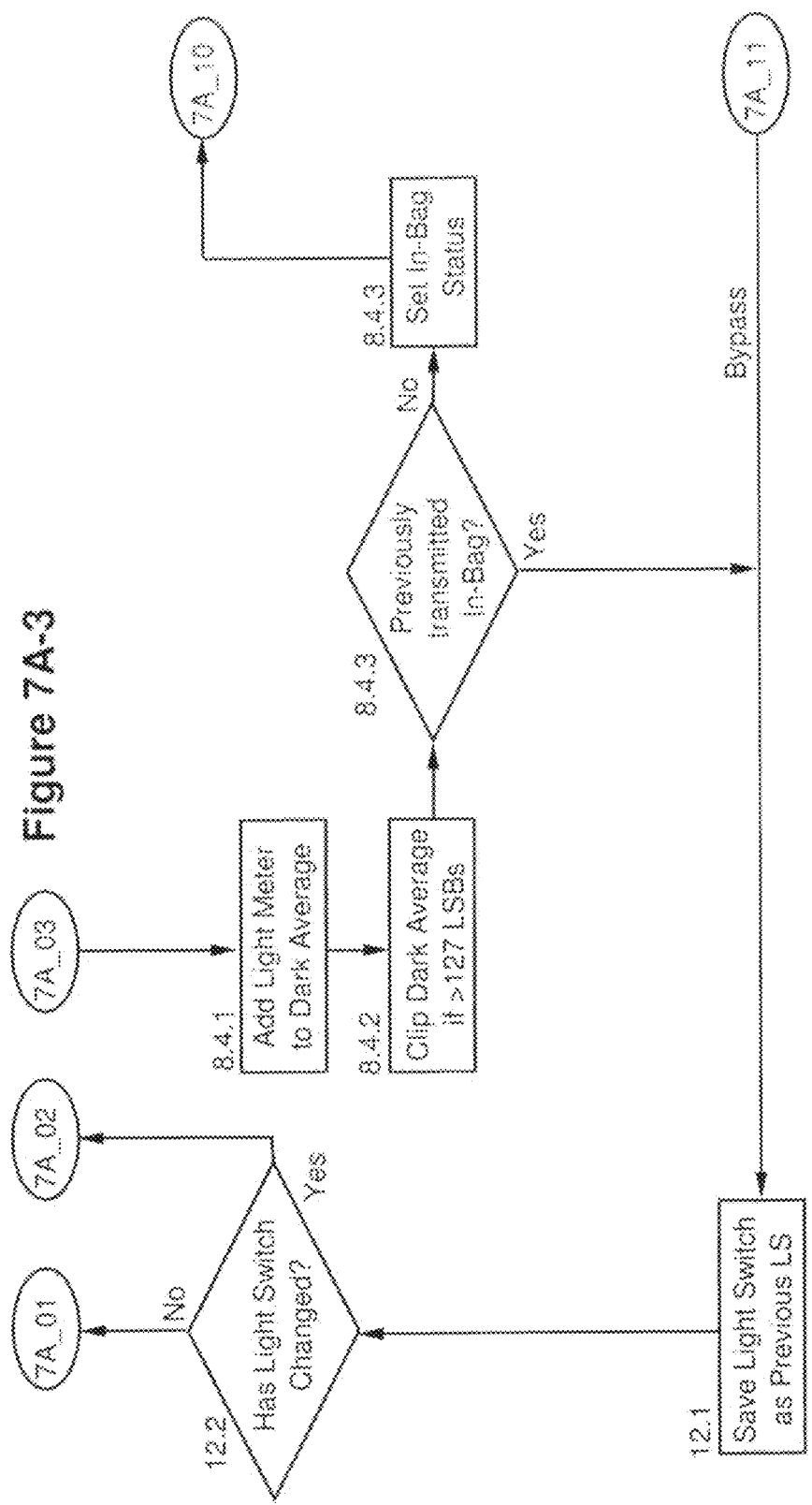
Figures 4, 7A:
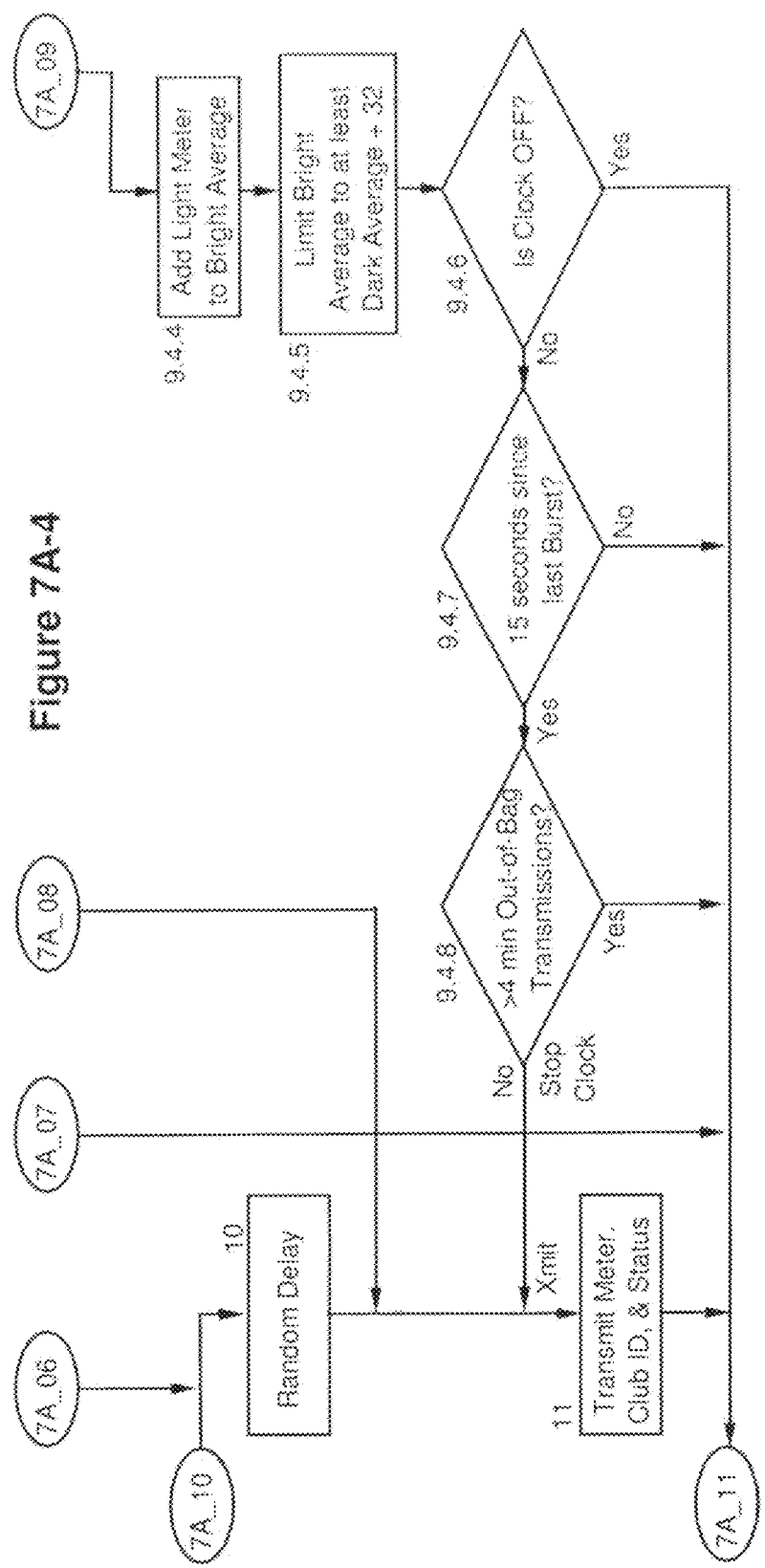
Figures 1, 7B:
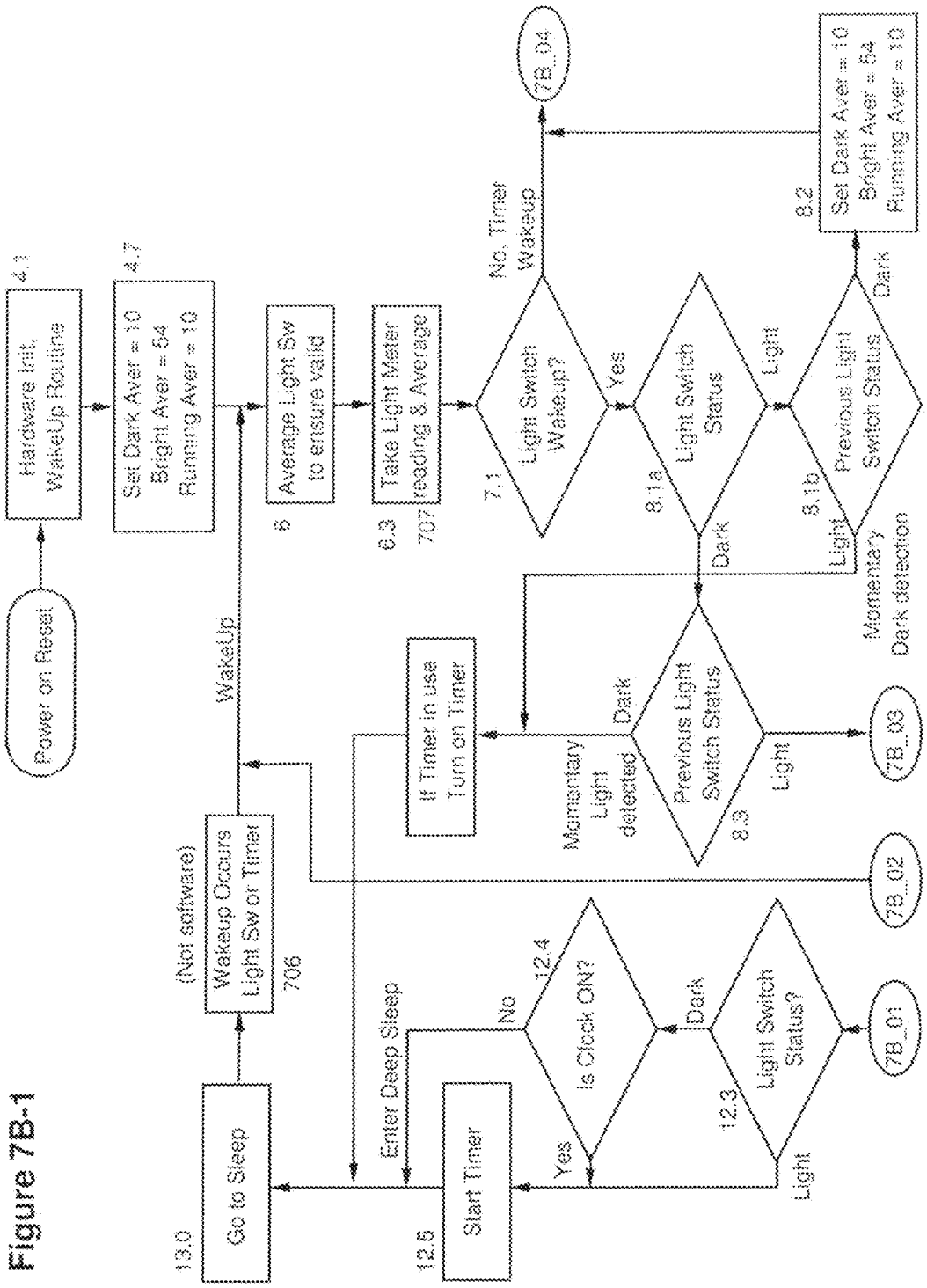
FIGS. 7B, 7C, 7D, and 7E are software flow diagrams for the microprocessor in another embodiment of the club tag.
Figures 3, 7B:
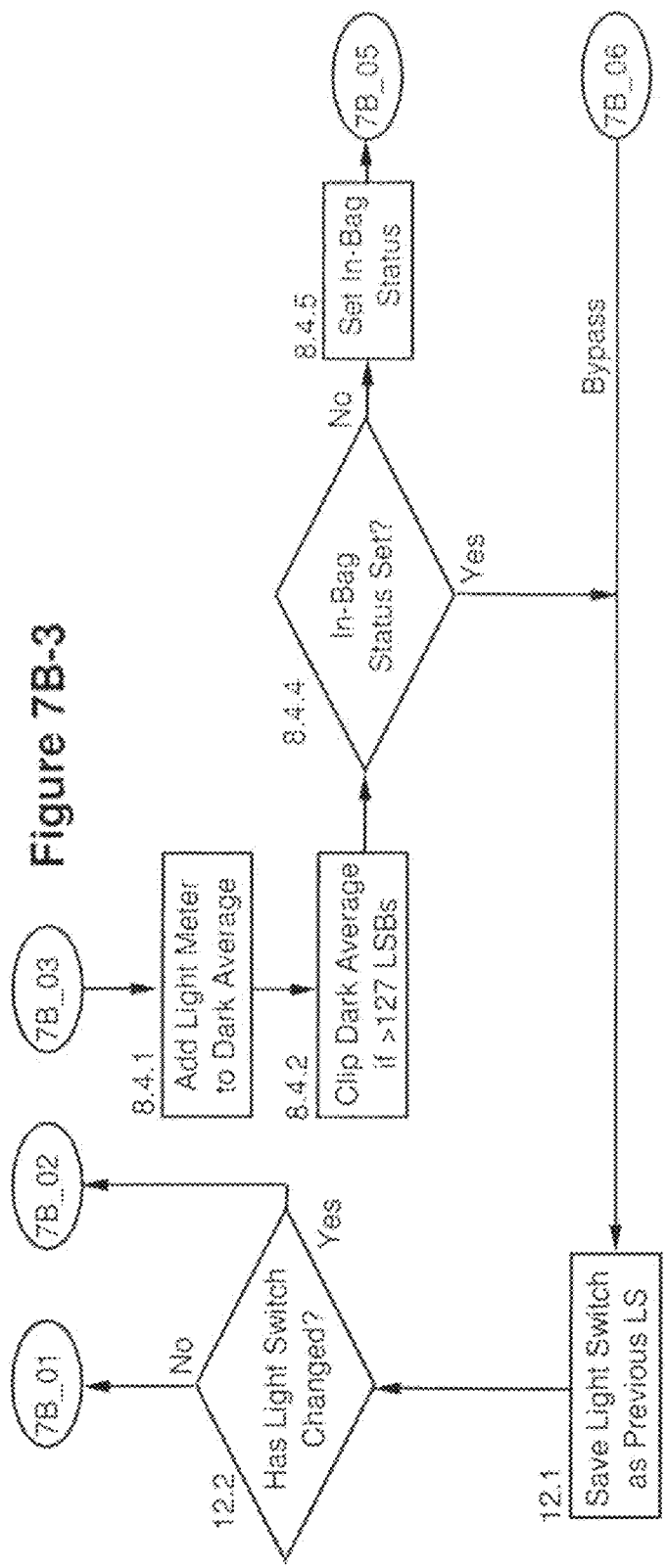
Figures 4, 7B:
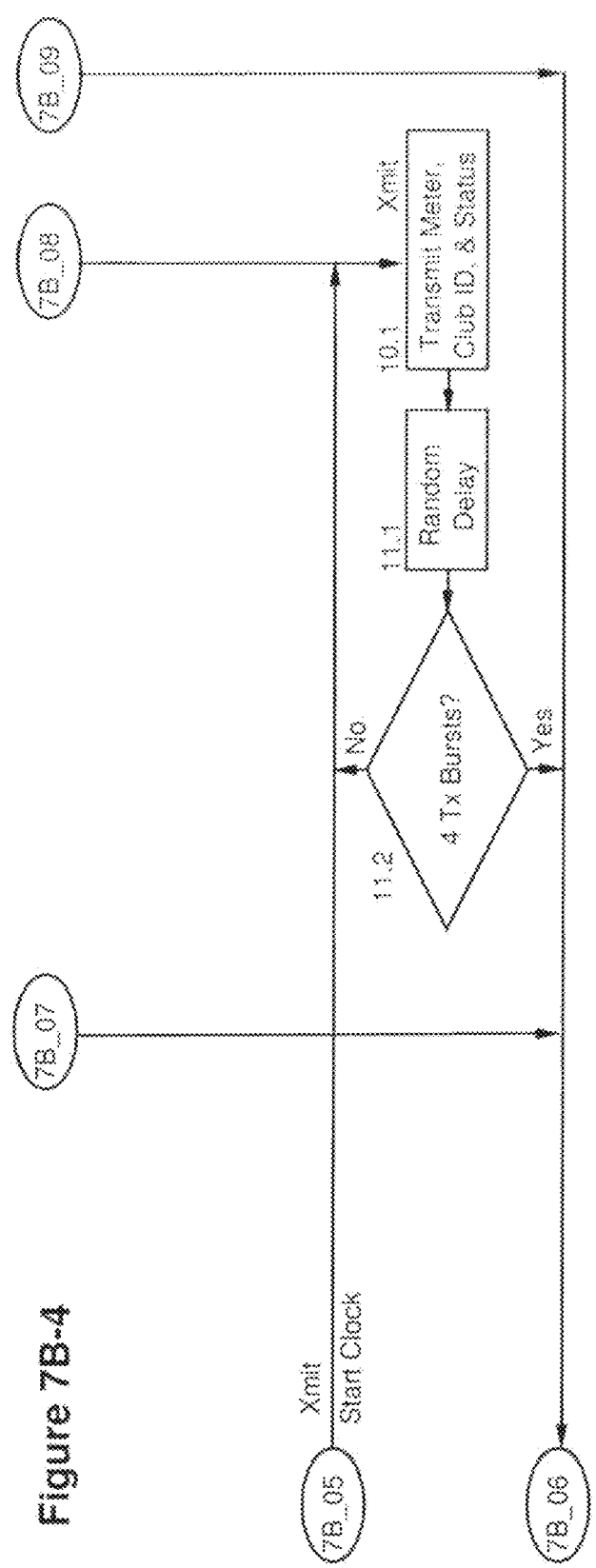
Figures 1, 7C:
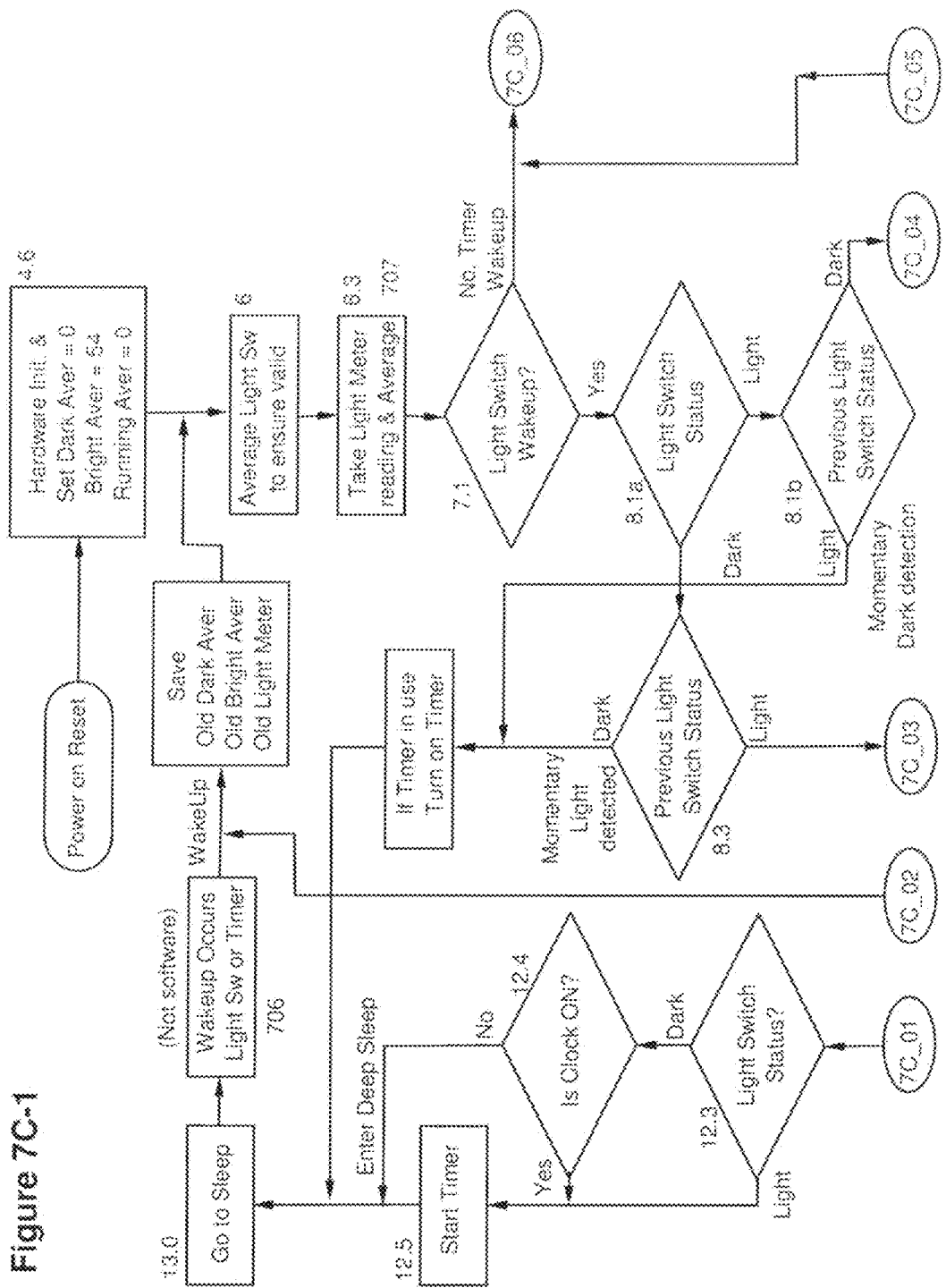
Figures 2, 7C:
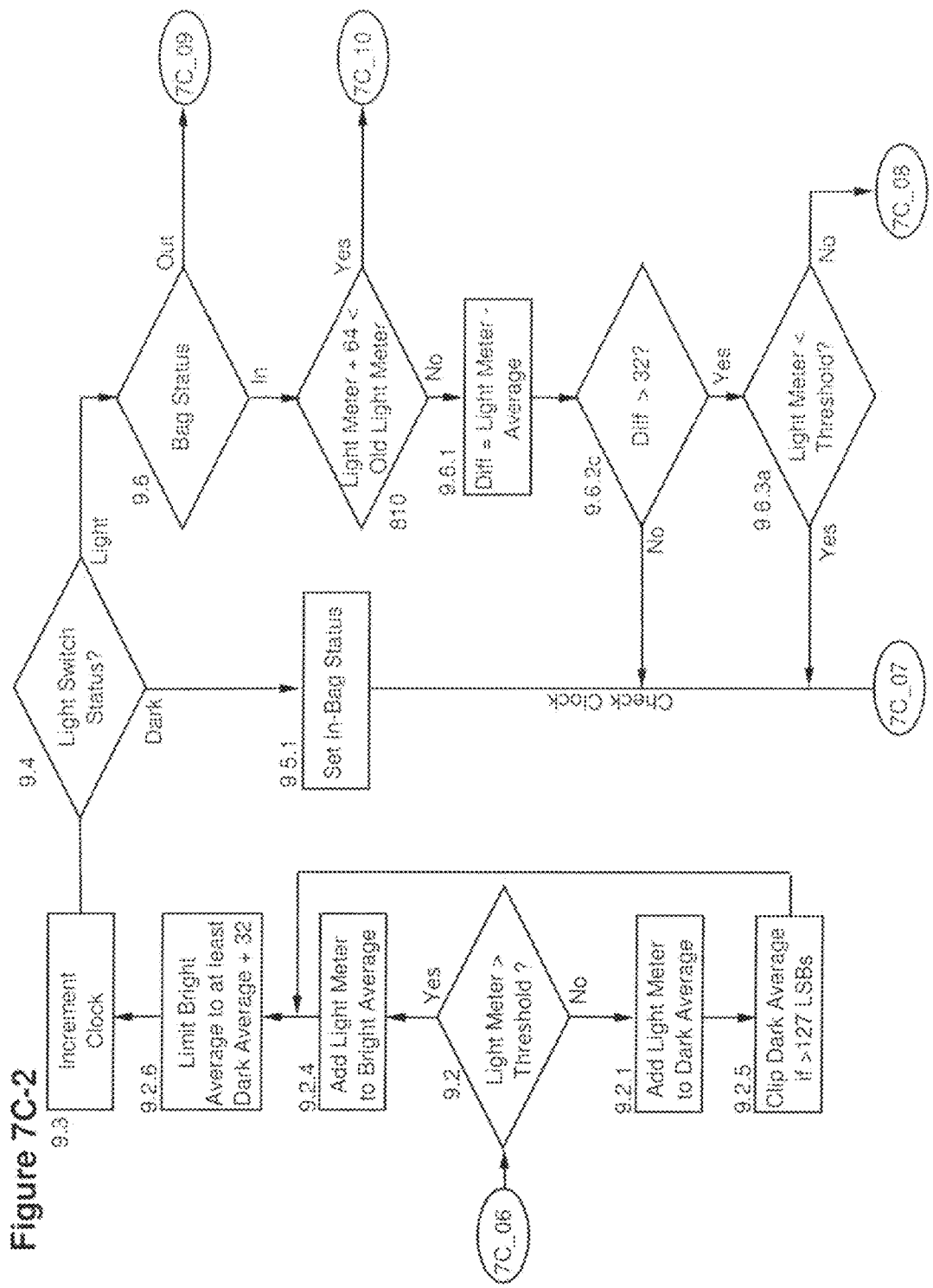
Figures 5, 7C:
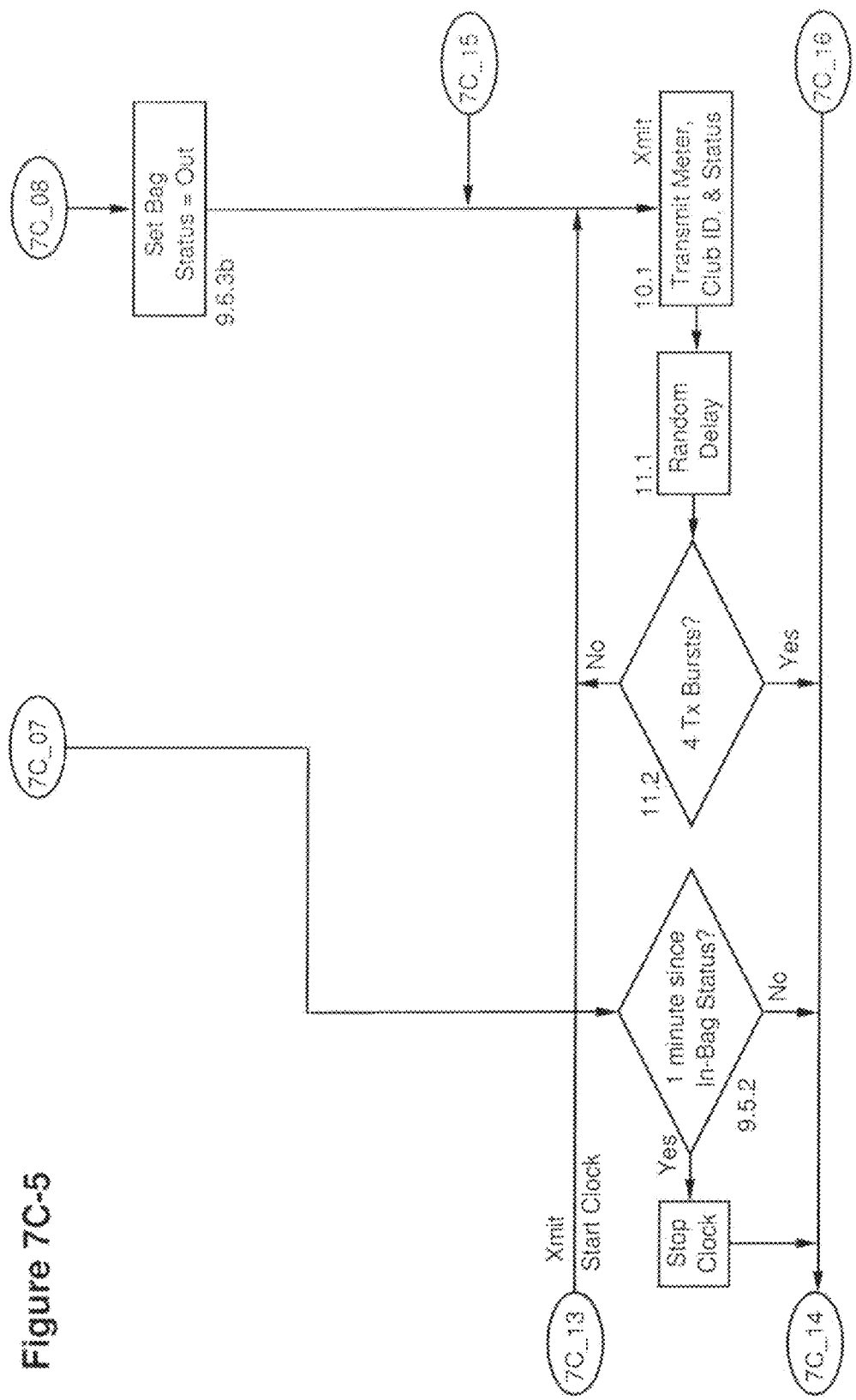
FIG. 5 is a block diagram for the club reminder and golf data collecting system.

As shown in FIG. 5, one embodiment of the club tag system consists of at least one club tag 510 and a receiving device, such as a golf GPS device 511. The club tag includes transmitter 502 operating at for example 433 MHz or 2.4 GHz, an antenna 501, a microprocessor 503, and at least one sensor 504, for example one or more light sensors. The golf GPS device includes at least one antenna 521, a receiver 522, a microprocessor 523, and golf GPS circuitry and user interface 524. The golf GPS circuitry, user interface and microprocessor (or other processing system) may include functions for both the club tag function and golf GPS functions. The club tag information is used to implement golf data collection or missing club reminder functionality or both. For the golf data collection function, the club tag provides information, such as identifying a club used for a golf stroke. For the missing club reminder, the club tag provides information about which clubs are out of the golf bag. The golf GPS functions use position information (e.g. latitude and longitude obtained from a GPS receiver) and golf course maps to provide distance and other information to a golfer. Other examples of a receiving unit which receives RF transmissions from a club tag include those units shown in FIGS. 15, 17A, 17B, and 29 of U.S. application Ser. No. 12/405,223.

Figures 6, 7C:
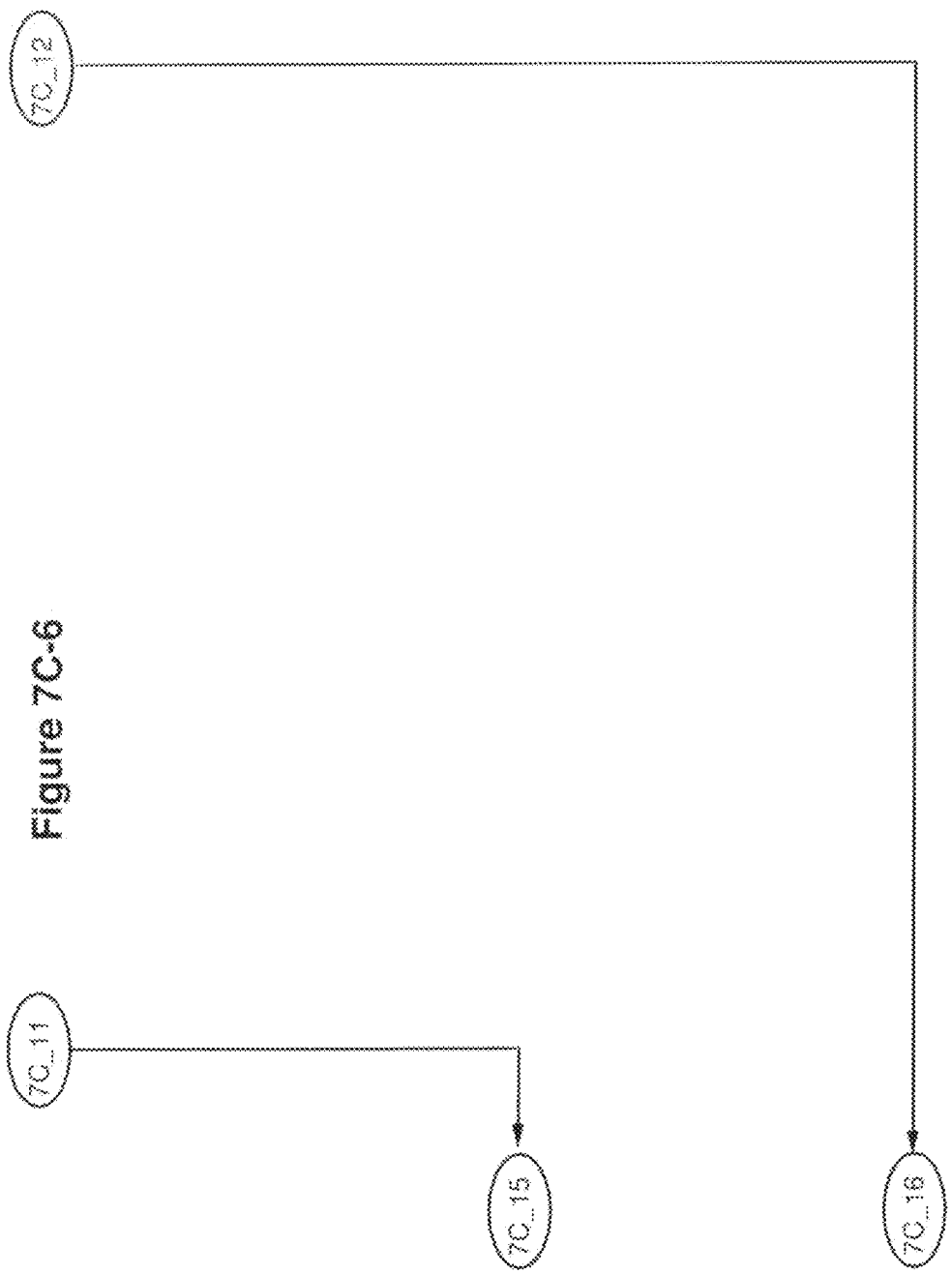

The embodiments shown in schematics in FIGS. 6A and 6B are some examples of a club tag; other examples of a tag are shown in FIGS. 16A-16C in U.S. application Ser. No. 12/405,223 and are described in conjunction with those figures. Referring to FIG. 6A in this application, the tag includes an antenna L1, two light sensors Q2 and U2, a microprocessor U3, a timing circuit including U1, and a battery BT1. A surface-acoustic wave (SAW) resonator Y1 provides, in this embodiment, the frequency source for the transmitter. The SAW resonator, the transistor Q1, and corresponding components make up an oscillator that operates at, for example, 433 MHz. This oscillator is, in this embodiment, turned on and off by microprocessor control (component U3), creating an on-off keyed (OOK) modulated signal. The antenna can be a trace on the printed circuit board. The inductance of this trace contributes to the tuning of the oscillator. Referring to FIG. 6B, the tag includes, in this embodiment, an antenna AN1, two light sensors Q1 and U2, a microprocessor and RF transmitter or transceiver U4, and a battery BT1. In this embodiment the transmitter operates at 2.4 GHz. The antenna may be a trace on the printed circuit board, alternatively the antenna may be a discrete part mounted on the printed circuit board.

It will be understood that the tag and/or the receiving unit can include processing logic or logic circuit or a processing system that can implement the functions and methods described herein, and it will be understood that the processing logic or logic circuit or processing system can be provided by any one or more of hardware, or a combination of hardware and software, in the form of an ASIC (Application Specific Integrated Circuit), a programmable logic device, a microcontroller, or a microprocessor or a combination of these elements.

It will also be understood that a club tag or tag can be manufactured and assembled with a golf club and sold to a retailer or other distributor with the tag already in place in the golf club before being sold or provided (e.g. rented) to an end user (golfer) or the tag can be added by a golfer after the golfer obtains a club that does not have a tag. It will also be understood that a golf rangefinder can be a cellular telephone or a PDA (Personal Digital Assistant) or a tablet computer or a smartphone or other consumer electronic devices, such as a watch or device worn on the golfer, that can provide at least one of the functions of a golf rangefinder (such as, a golf club reminder function or a golf data recording function or a GPS function, etc.). It will also be understood that GPS (Global Positioning System) is one of the available systems that can provide a location through satellites and that SPS (Satellite Positioning System) includes GPS, Glonass and other satellite systems and also non-satellite systems (such as cellular telephone tower triangulation or pseudolites arranged on a golf course, etc.).

Light Pipe Configurations

Radial Light Pipe

Figure 1:
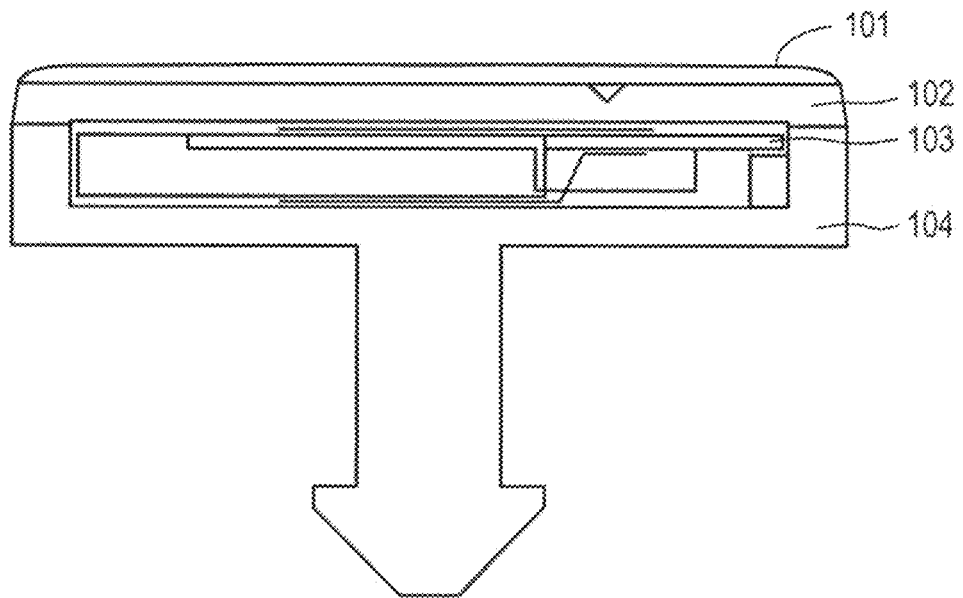
FIG. 1 shows a side view cross section of one embodiment of a club tag.
Figure 2:
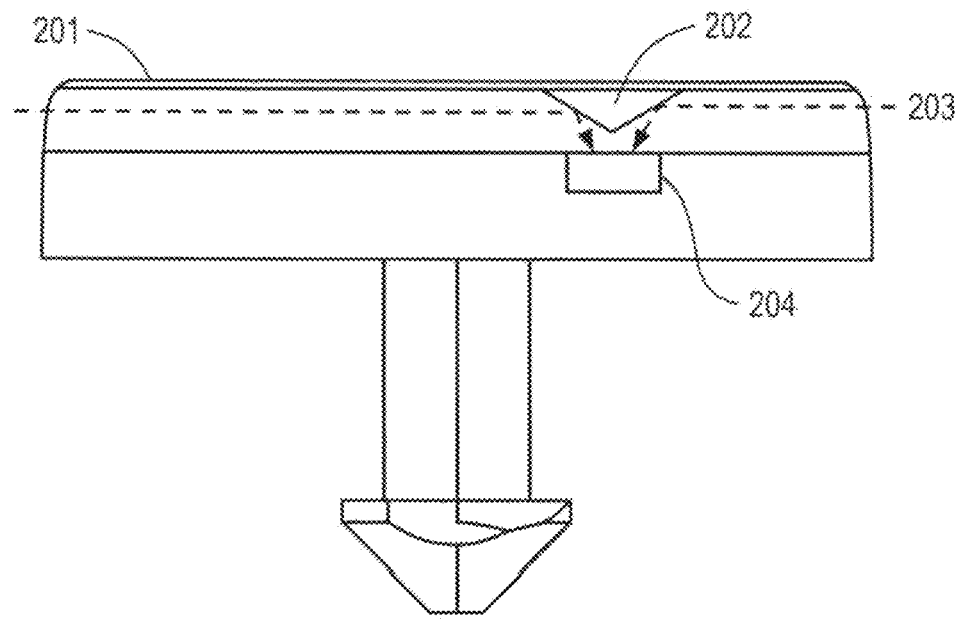
FIG. 2 shows a side view cross section of one embodiment of a club tag illustrating light entering from the sides of the light pipe and reflecting off a light concentrating feature into the light sensors.

FIGS. 1 and 2 show one typical embodiment of a club tag. The club tag electronics/printed circuit board assembly 103 are housed within a bottom housing part 104 and a top housing part. For the configuration shown in FIG. 1 the light pipe 102 and the cover 101 combine to be the top housing piece for the club tag electronics. FIG. 2 depicts how a light pipe can control the amount of light that reaches the light sensors 204. Controlling the amount of light that enters the light sensors (light switch and light meter) limits the wide variations between bright light readings. For example, the light level reading at full-sun midday could be approximately 100,000 Lux, and in the shade could be 10,000 Lux. Although this is a significant change in the light level readings, both readings are obviously outdoors and there is no need to differentiate between 100,000 Lux and 10,000 Lux. Limiting the amount of light that enters the tag reduces the dynamic range required to process that light meter data. An analog-to-digital converter is used to process light meter data. Limiting the dynamic range allows for use of an 8-bit analog-to-digital converter instead of, for example, a 10-bit analog-to-digital converter, offering less complex processing and reduced component cost. Light pipes that allow the light to enter from 360 degrees provide for light meter readings that are averaged, versus readings that are from direct line-of-sight light sources such as the sun. Additionally, light sensors use more current for brighter readings, and battery life is conserved by not making readings at very high light levels.

There are various techniques to limit the light that enters the tag, and there are also techniques for focusing or concentrating the light that does enter the tag. These techniques are examples of the present invention and other alternative embodiments can employ different techniques and configurations in a manner that is consistent with general techniques of the invention.

Light Enter Through Sides

One technique for selectively illuminating the light sensors is to allow the light 203 to enter at the sides of the club tag only; not through the top. This can be accomplished with a clear acrylic or plastic piece 102 with a solid-colored piece (101 and 201) on the top above the frame or housing 104 provided by a tag. The plastic piece 102 could be transparent or translucent. The underside of the solid colored piece could be white or metallic which offers improved reflection of the light that enters through the sides. In one embodiment, the underside of the solid colored piece has a white diffusively reflective surface which diffusely reflects (e.g. scatters) light. The top colored piece could be a dark color or opaque such that light is not allowed to pass through. The light enters along side of the entire circumference of the clear piece 102 and is reflected inside the thickness of the clear piece 102.

Focus Light

Figure 3:
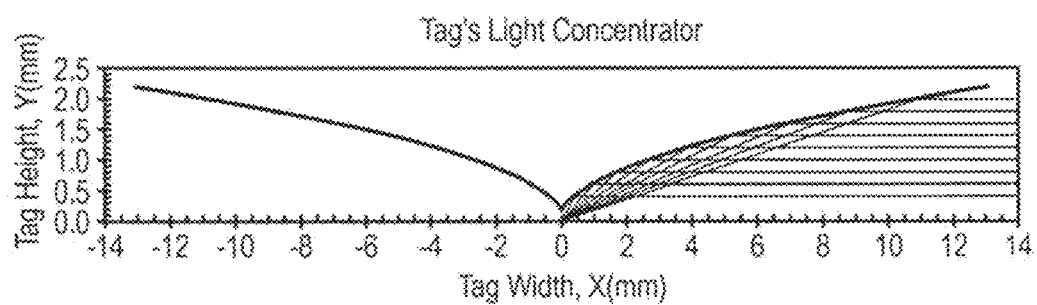
FIG. 3 shows one embodiment of a potential shape of a light concentrating feature for the light pipe.

Another technique for illuminating the light sensors is to focus the light that enters the tag onto the light sensors 204. This can be achieved by incorporating one or more light focusing or concentrating features 202. The light focusing feature could be in the form of a parabolic dimple, a hole or a countersink (as shown in FIG. 2) or other feature that directs light to the light sensors. Optionally, this feature could be filled with a material to direct the light. This material could be epoxy, silicone, or other material and may include reflective pieces such as glitter or metallic chips. Alternatively, metallic ink or paint may be used on the surface of the light focusing feature 202 or on the underside of the top cover 201. Another technique to focus the light onto the sensors is to use a parabolic shaped dimple that focuses incoming light onto a precise spot, as shown in FIG. 3.

Light Through Top with One or More Holes

Figure 4A:
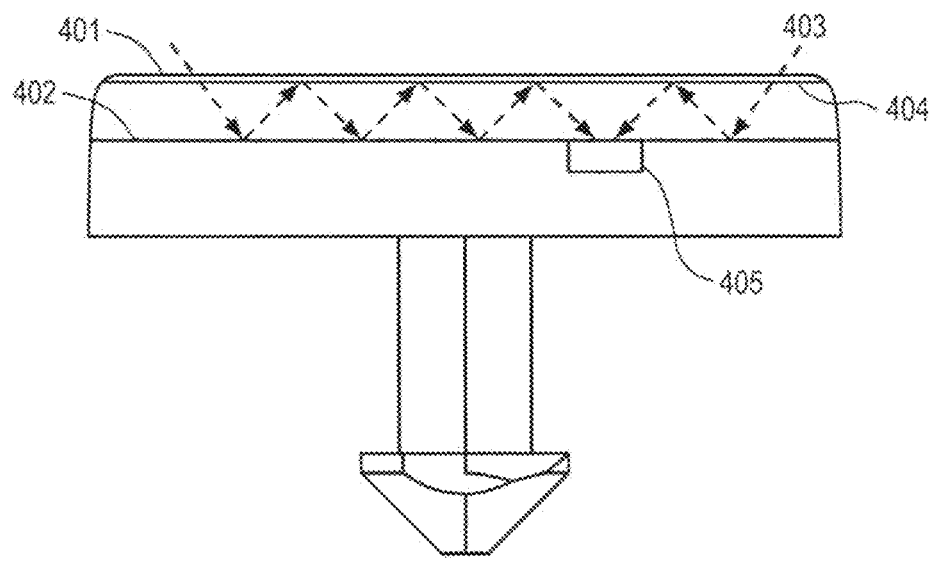
FIG. 4A shows a side view cross section of one embodiment of a club tag illustrating light entering from the top of the light pipe and reflecting off the inside walls of the light pipe into the light sensors.

Referring to FIG. 4A, there are other techniques for selectively illuminating the light sensors 405. One example is to include small areas in the top cover of the tag that allow light to pass through. The cover 401 is a substantially solid colored or opaque cover with one or more clear areas 403 (e.g. transparent pin holes in the cover 401) that allow light to enter and reach the lights sensors 405 in selective areas such that the light is not directly reaching the light sensors. The underside 404 of the cover 401 could have a reflective surface, such as white colored or metallic, allowing the light to reflect inside the clear plastic or acrylic cover 402. The reflective surface can be a diffusively reflective surface so that it scatters the light upon reflection.

Axial Light Pipe—Light Directly Through Top

Referring to FIG. 4B, another technique for illuminating the light sensors is as follows. A clear plastic piece 409 is attached to the top cover 407 directly over the light sensors 411, which allows light 405 to enter and reach the light sensors. In some configurations, the clear plastic piece 409 can be tinted or semi-translucent. The cover 407 is substantially solid colored or opaque, and the clear area 409 allows light to enter from the top only. The underside of the cover may have a reflective surface or it may not be reflective. The sides of the housing 408 are opaque and are adjacent to the opaque top cover 407. In this configuration, light does not enter from the sides of the housing.

Combination of Axial and Radial Light Pipes

Referring to FIGS. 4C and 4D, an alternate embodiment is shown, using a combination of techniques to illuminate the light sensors. As shown in FIG. 4C, a clear plastic piece 416 allows light 412 to enter from the sides of the tag, and another clear plastic piece 417 attached to the top cover 415 allows light 413 to enter through the top of the tag. The one or more light sensors are positioned such that each responds differently to light entering from each direction. For example, as shown in FIG. 4D, a light sensor B pointing toward the top responds to light 422 entering from the top with lesser or no sensitivity to light entering through the sides. Similarly, a light sensor effectively pointed towards the side would respond to light entering from the side 421 with lesser or no sensitivity to light entering through the top. In one embodiment, one or more light sensors can be isolated from each other, and each sensor can respond to light from different directions. As shown in FIG. 4D, a light pipe 423 is implemented such that light 422 (entering from the top) is directed onto sensor B and isolated from sensor A. Similarly the light pipe 423A directs light from the side onto sensor A and isolates light entering from the side 421 from reaching sensor B. Using the information from each sensor can determine particular scenarios, as illustrated in the chart in FIG. 4E. For example, if there is little to no light entering through the top of the tag and there is light entering through the side of the tag, the processing system may determine that the club is in a translucent bag that allows light in. The processing system can use this information to determine thresholds for decisions about whether the club is in or out of the bag. Another example is determining the difference between a club that is in the bag compared to a club that is out of the bag and on the ground in high grass. The processing system can use information from the one or more light sensors isolated from each other to determine the club's in/out status. In this example, when the club is in high grass, the light entering through the top may be less than is typically recorded when the club is out, but more than is recorded when the club is in the bag. By considering readings from other light sensors, such as the ones that record light entering from the sides of the tag, the processing system can determine that the club is in fact out of the bag.

Orientation of Light Sensors

The one or more light sensors can be mounted so that their sensor area points directly upwards toward the cover. The light sensors can be mounted on a single side of the printed circuit board with sensors pointing away from the printed circuit board. Alternatively, referring to FIG. 19D, the light sensors can be mounted on a single side of the printed circuit board with the light sensing elements of the light sensors protruding through an opening 1908 in the printed circuit board. Another option is to mount the light sensors so that their sensor areas point toward the sides of the tag.

Algorithms Optimized for Different Light Pipe Configurations

Different algorithms can be used to accurately determine the in-bag or out-of-bag status for a variety of tag and light pipe configurations. Some of these configurations include light entering from the sides of the tag only; other configurations include the light entering from the top of the tag only; other configurations include a combination of light entering from the sides and the top. Two or more light sensors, some configured to receive light directly from above, and some configured to receive light from the sides of the tag, combined with various algorithm embodiments, similar to those described herein, allow for optimization of in-bag and out-of-bag status accuracy. For example, when the light enters from the side of the tag, there is light reaching the sensor when the tag is inside a translucent bag. The processing system adjusts the threshold to this dark environment. Similarly, in low-light scenarios, such as dawn and dusk, the processing system adjusts its threshold to the environment. In this way, the in-bag and out-of-bag statuses are accurately determined. For the tag that allows light in through the top of the tag, there are more light variations, but when the club is in-bag, there is very little light reaching the sensor. This eliminates any ambiguity in determining if the club is in the bag, even for highly translucent bags.

Light Sensing Algorithms

Light Switch and Light Meter Operation

The club tags can use algorithms to determine whether the tag is in or out of the golf bag. These algorithms use information from the light sensors (such as, for example, one light switch and one light meter) in the club tags.

In one typical embodiment, initially the club tag is in a deep sleep mode, with its microcontroller in sleep mode and power to the light meter turned off. The light switch has a fixed threshold for light level readings that is very low, such as less than 10 Lux. A change to the light switch wakes up the microcontroller. The microcontroller turns on a timer, and uses pulses from the timer to periodically turn on the light meter circuit and take light level readings. The microcontroller processes these readings, making decisions about light/dark status of the tag and in/out of the bag status. If it is determined that a significant change in light occurred, the microcontroller enables the transmitter to send data and status. The timer controls the interval between the transmit bursts, and after a predetermined number of bursts or length of time, the transmitter is disabled. In one preferred embodiment, while the light switch senses light, the timer continues to prompt the microcontroller to take light meter readings and the microcontroller watches for significant changes in light readings. If the microcontroller determines that a significant change in light level has occurred, it uses the timing pulses from the timer to send out a series of transmissions.

When the light switch indicates "light", the light meter continually takes light level readings. A significant decrease in light, as determined by the algorithm within the microcontroller, will cause the microcontroller to issue a transmission indicating a transition to dark, even if the light switch indicates otherwise. The light switch is set to switch at a very low light reading, such as 10 Lux. It is possible for the light switch to not switch to dark when inside a golf bag if the bag is light colored or translucent. In these cases, the light switch reads light, and the light meter continually takes light level readings. The light meter readings are evaluated to determine if a significant change in light has occurred. Based on this information the microprocessor determines the in-bag or out-of-bag status.

When the light switch indicates "dark", the microcontroller enables the transmitter to send the "dark" data and status with multiple transmissions separated by intervals determined by the timer. In between multiple transmissions, the microcontroller continues to take light meter readings to confirm that the tag remains in the dark; if not it transmits a transition to light sequence. After the sequence of transmissions indicating a transition to dark, the tag circuit is returned to a deep sleep mode, in one embodiment. In another embodiment, the microcontroller continues to take light meter readings for a period of time, for example 1 minute, before the tag circuit is returned to a deep sleep mode.

Optionally, the club tag can be configured to transmit multiple in-bag transmissions, confirming that the club has been returned to the bag. Multiple in-bag confirmation transmissions may be helpful in some scenarios. For example, if a golf club is dropped into tall grass it could potentially be dark enough for the club tag to mistakenly report in-bag status. When the golfer leaves the area the golfer will eventually be out of range to receive the subsequent transmissions confirming in-bag status.

Algorithms in one embodiment evaluate light meter readings and store average light meter readings to better determine light/dark status of the particular tag in a particular type bag. This averaging of dark (in-bag) and light (out-of-bag) light meter readings allows the tag to gradually learn the characteristics of the environment within an individual golfer's golf bag as well as the ambient light conditions of each particular golf game.

If the light switch detects a change in light level over or under a predetermined threshold, such as 10 Lux, the light switch wakes up the microcontroller. If the light switch detects a light level greater than the predetermined threshold (indicating light), the microcontroller reports that status of the tag is out-of-bag in some situations. If the light switch detects a light level less than the predetermined threshold (indicating dark), the microcontroller reports that status of the tag is in-bag.

When the light switch indicates light or out-of-bag status, the light meter is activated. An internal timer wakes up the microcontroller at predetermined intervals. For example, these intervals can be at 7.5 seconds, 4 seconds, 1 second, etc. The microcontroller prompts the light meter to take light level readings at these predetermined intervals. Optionally the light level readings can occur at integer multiples of the predetermined timing intervals, not at every timer wake-up. The light meter continues to take light level readings at intervals until the light switch is returned to dark or in-bag status. When the light switch changes to dark or in-bag status, the light meter takes light level readings at predetermined intervals for a fixed amount of time set by a clock in the microprocessor, for example 1 minute. After this fixed amount of time has elapsed, the light meter ceases to take readings until the light switch indicates light or out-of-bag status. In an alternate embodiment, a single light meter performs the combined functions described for a light meter and light switch.

Algorithm Parameters

In some typical embodiments, the microcontroller algorithm uses some of the following parameters to determine in-bag versus out-of-bag status:

Meter: Current light meter reading, taken every time the microcontroller wakes up, either from its internal timer or a change in light switch reading (dark to light or light to dark); also referred to as "Light Meter" in FIGS. 7A, 7B, 7C, 7D and 7E.

Figures 1, 7D:
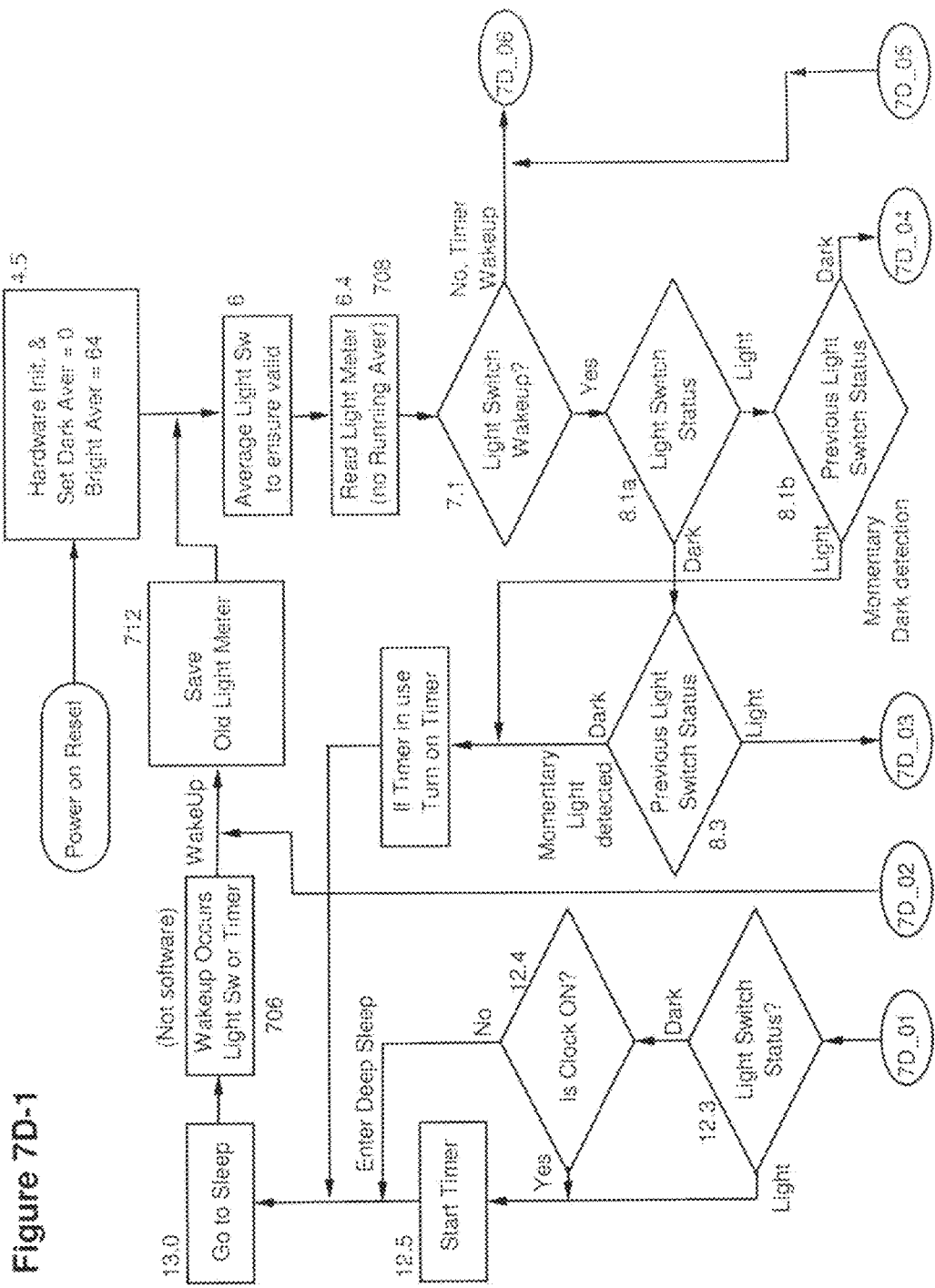
Figures 2, 7D:
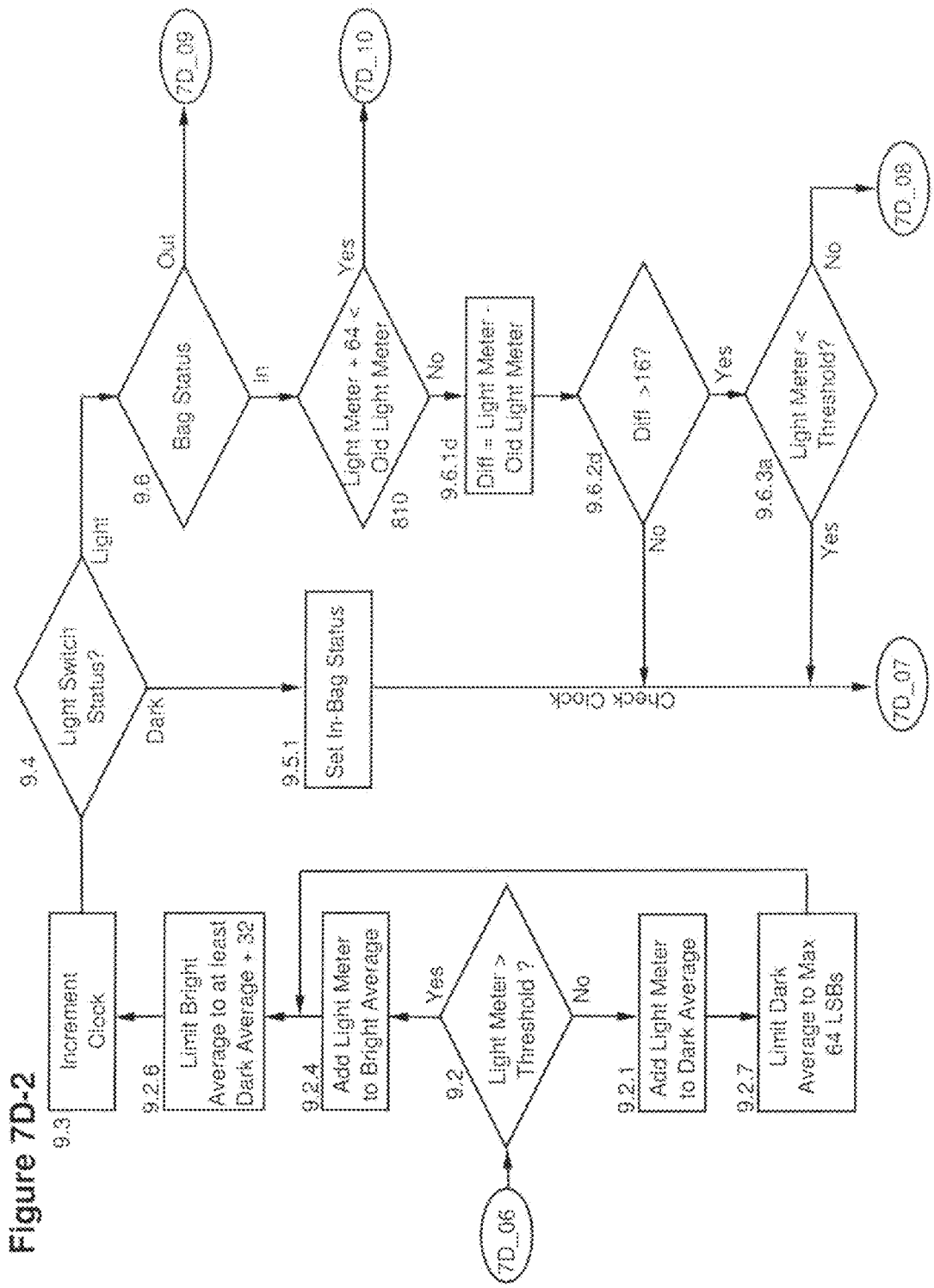
Figures 3, 7D:
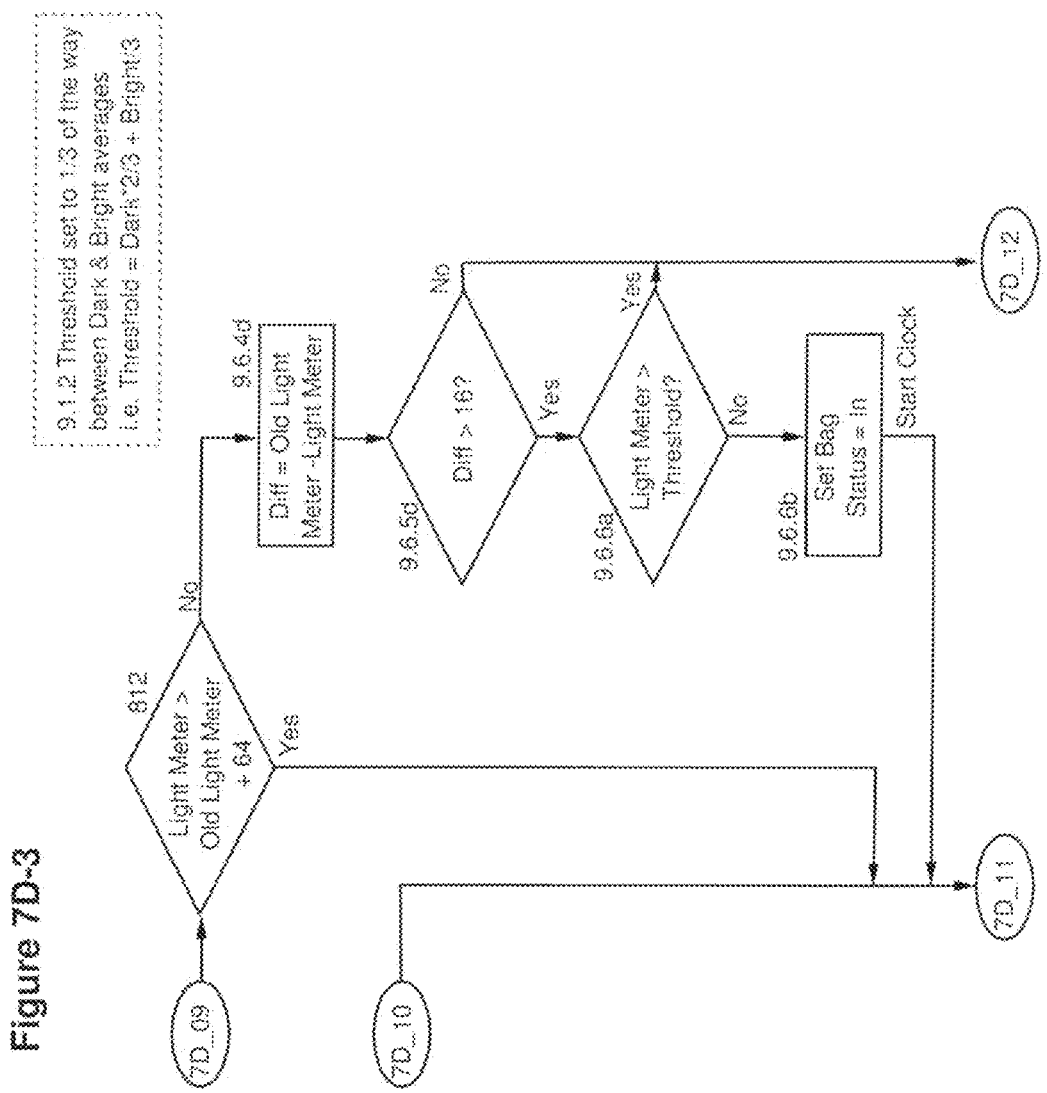
Figures 4, 7D:
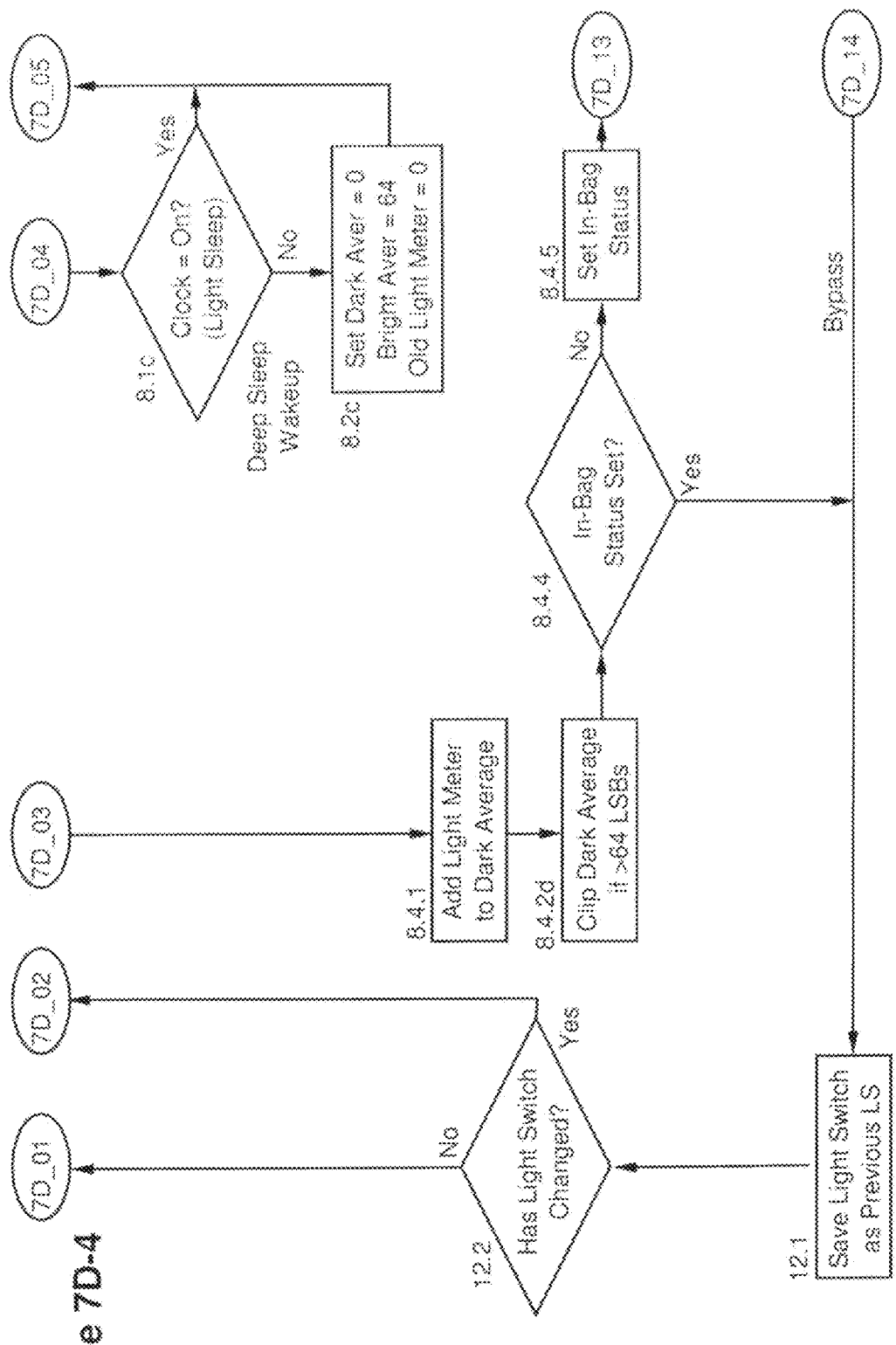
Figures 5, 7D:
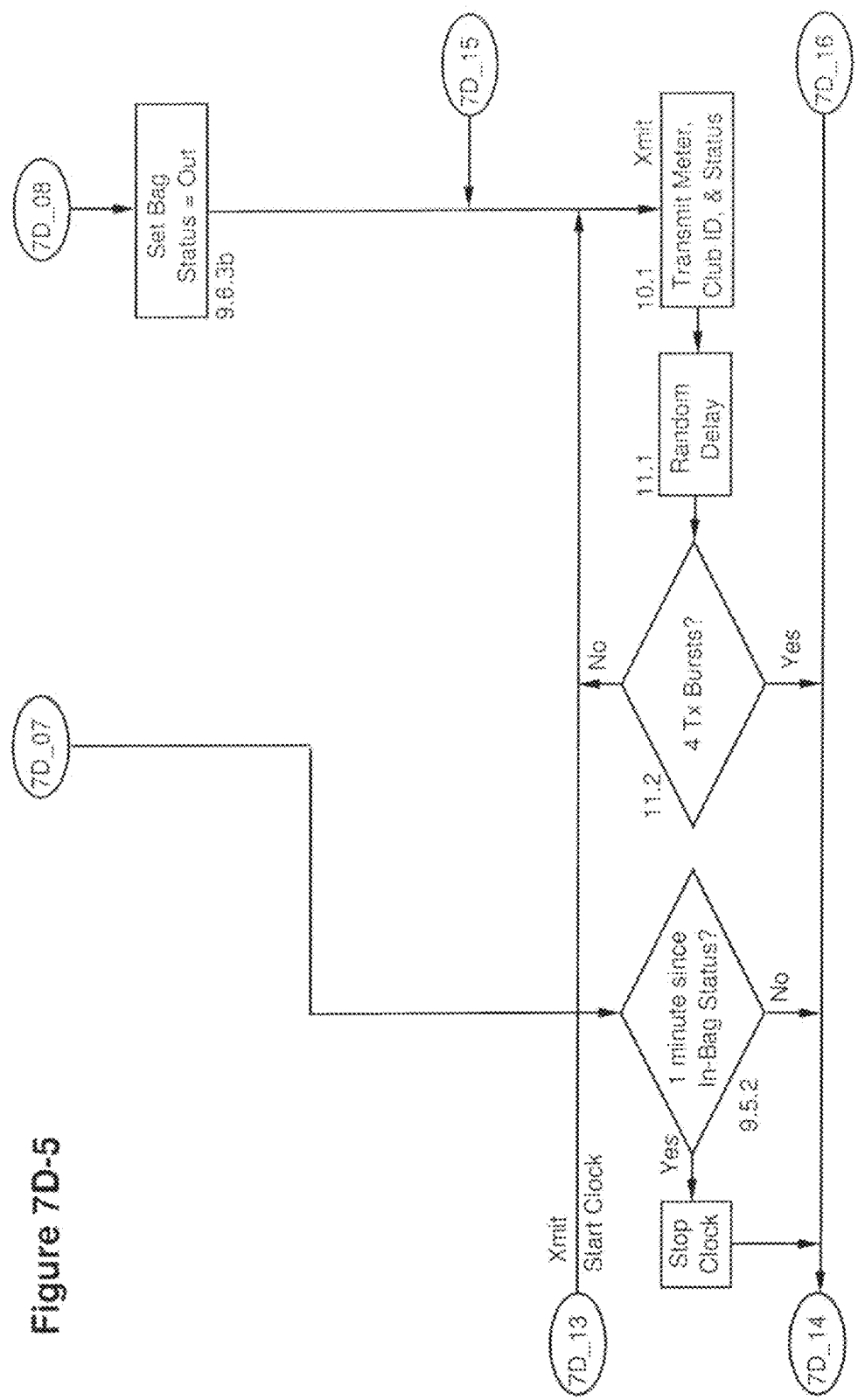
Figures 6, 7D:
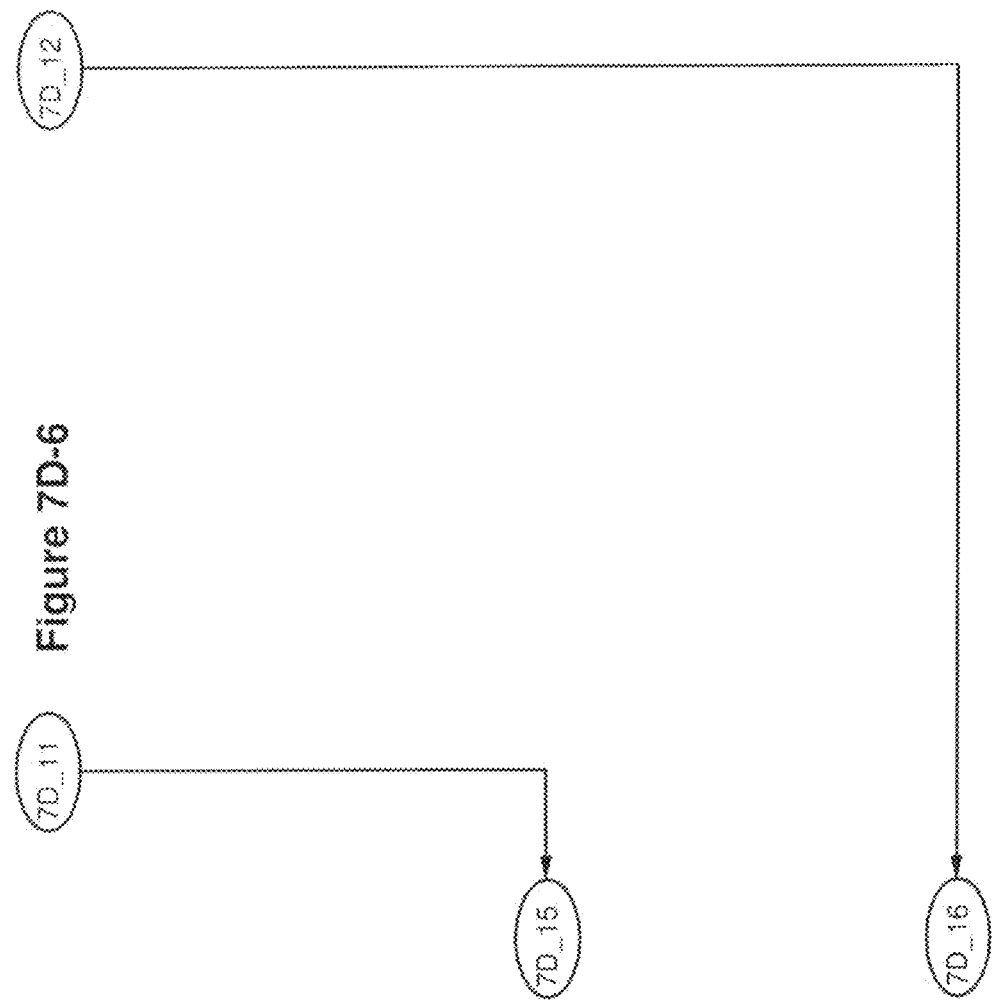
Figures 1, 7E:
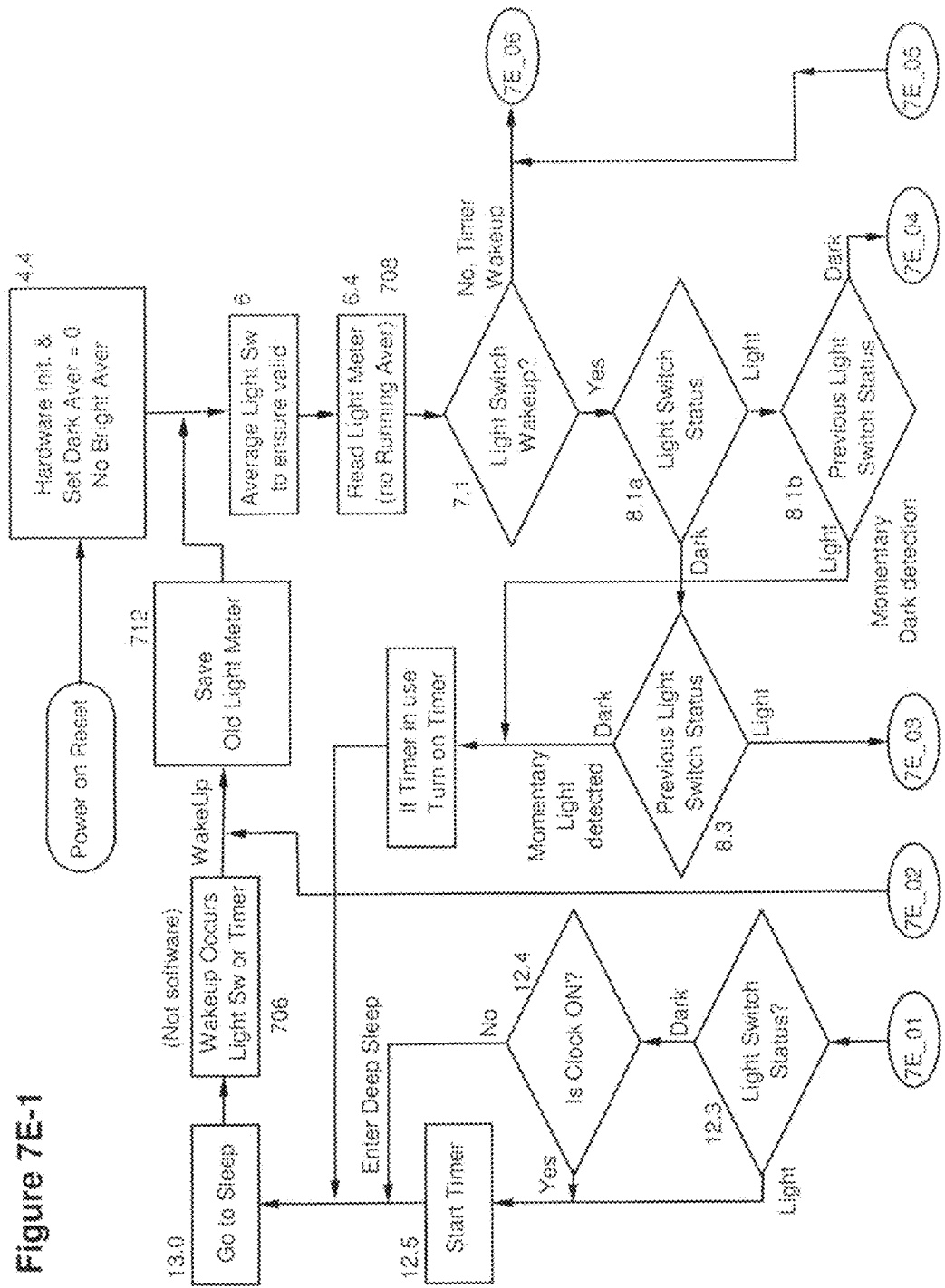
Figures 2, 7E:
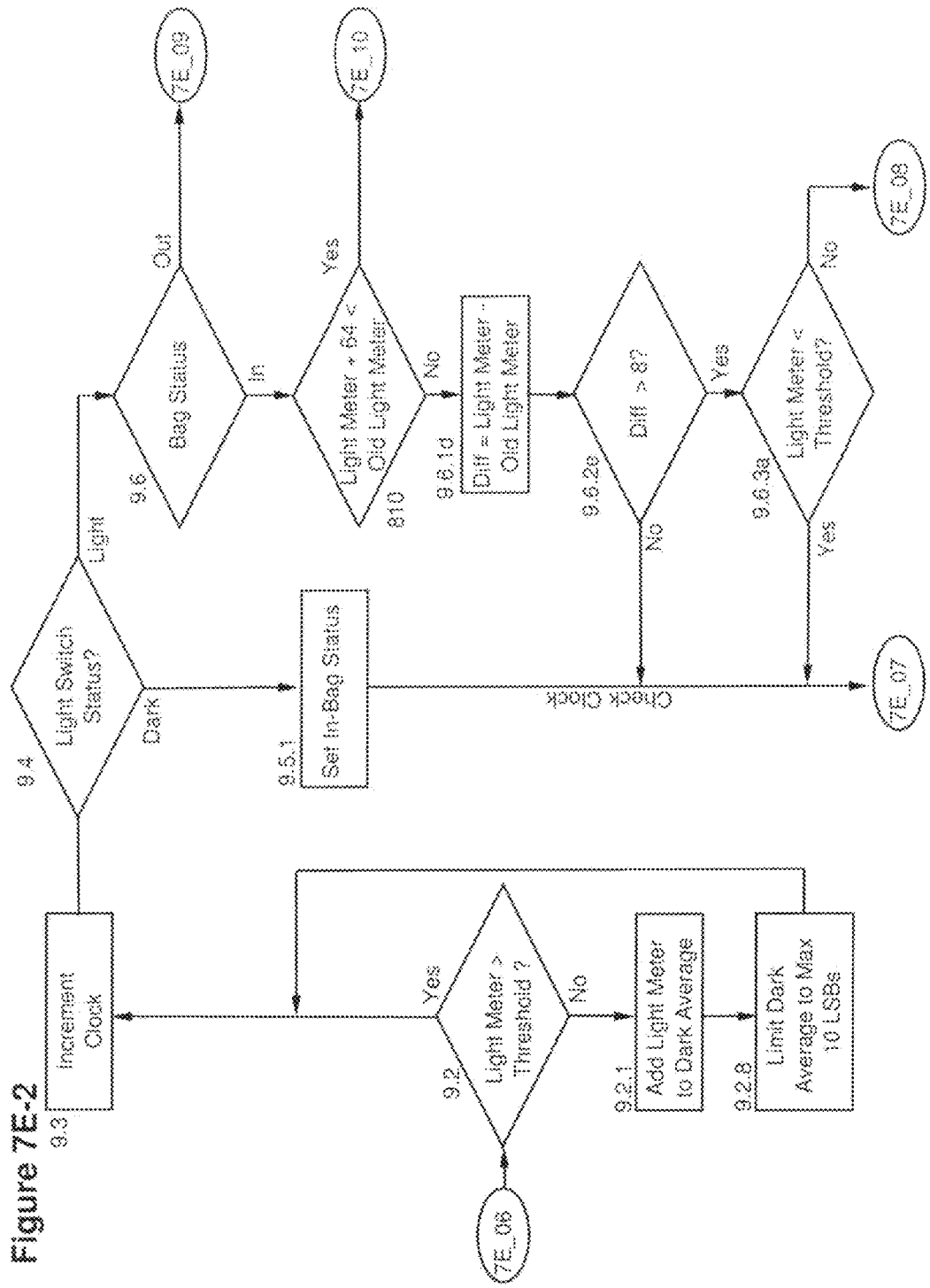
Figures 3, 7E:
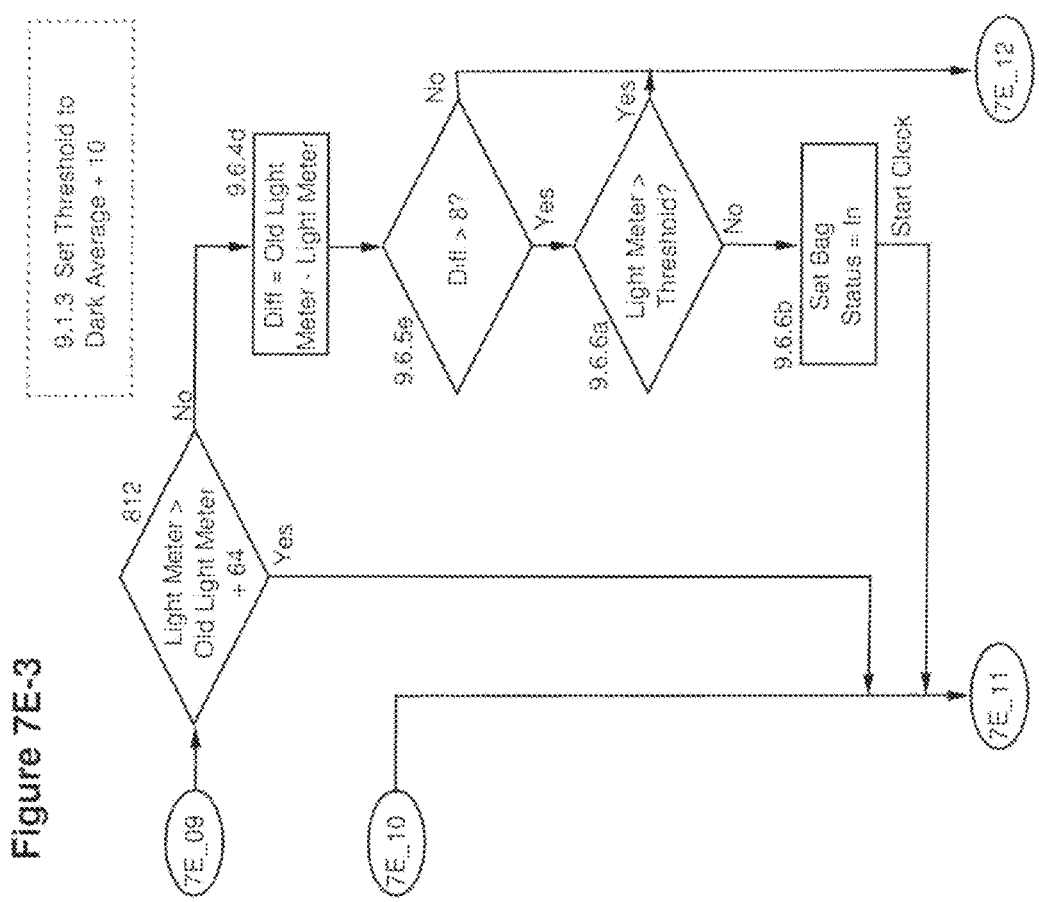
Figures 5, 7E:
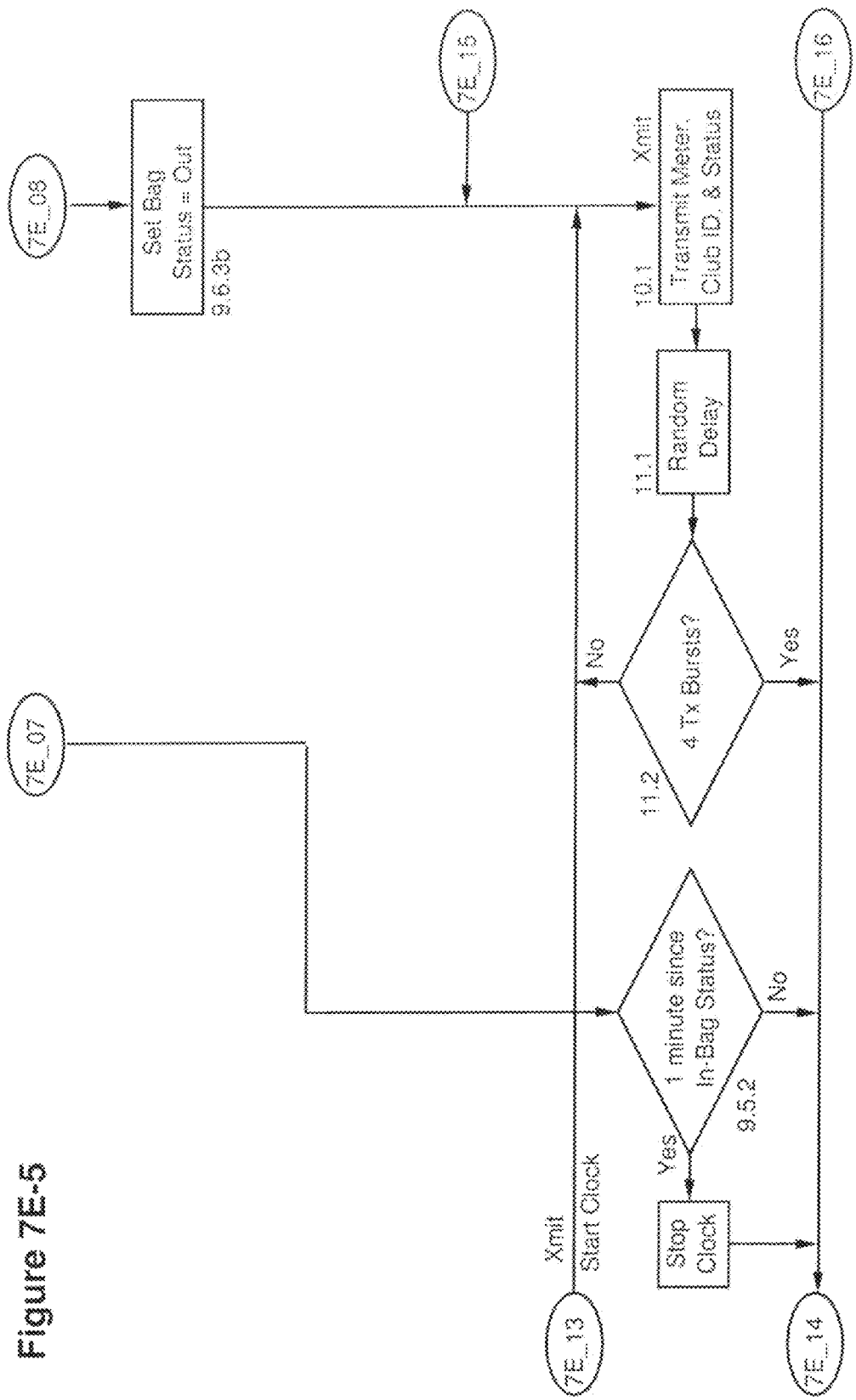
Figures 6, 7E:
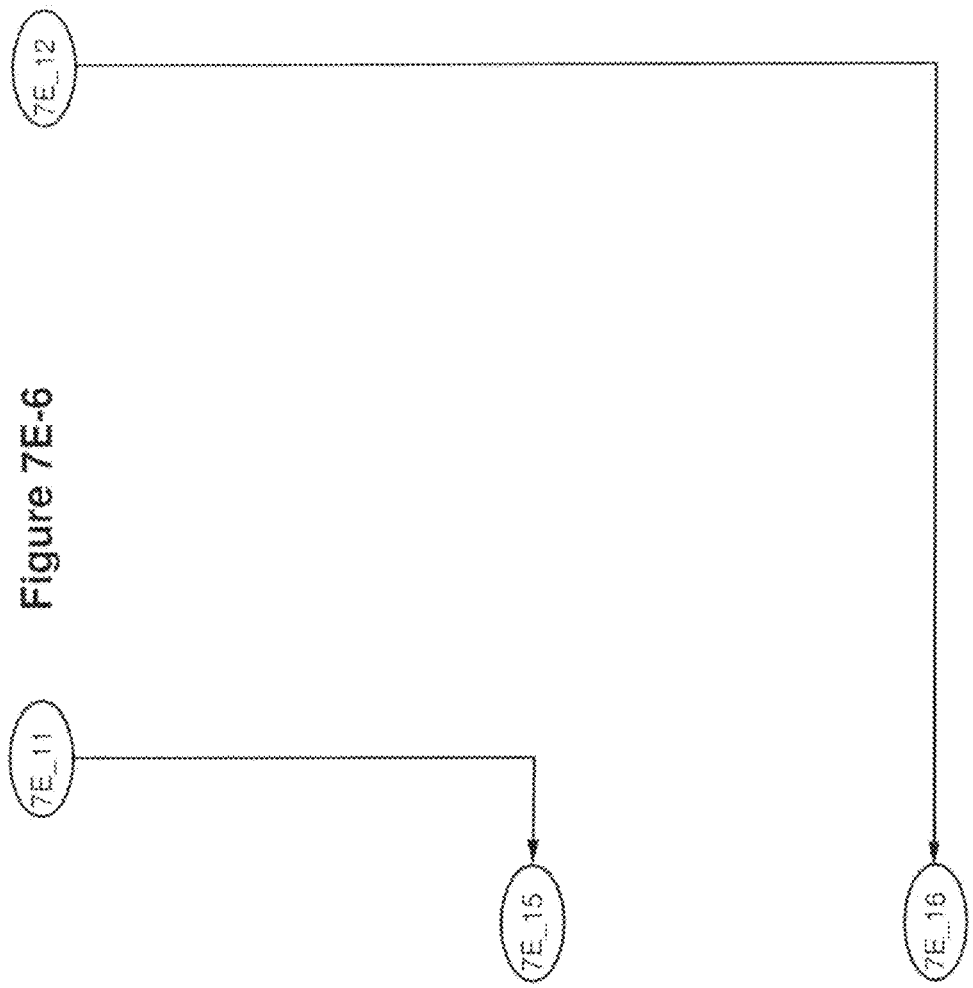

Old Light Meter: Previous "Meter" (or "Light Meter") reading, saved in memory, as shown in FIGS. 7C, 7D, and 7E.

Average: Exponential (weighted) average of all light meter readings. See, for example, block 6.3 of FIG. 7B. "Average" in the example of FIGS. 7A, 7B, and 7C is the running average of light meter values.

Bright Average: Exponential average of light meter readings taken when microcontroller determines tag is out-of-bag in one embodiment illustrated by FIG. 7A or when light meter reading is above the Threshold value in other embodiments illustrated in FIGS. 7B, 7C, 7D and 7E.

Old Bright Average: Previous "Bright Average" value, saved in memory, as shown in FIG. 7C.

Dark Average: Exponential average of light meter readings taken when microcontroller determines tag is in-bag in one embodiment illustrated in FIG. 7A or when the light meter reading is below the Threshold value in other embodiments illustrated in FIGS. 7B, 7C, 7D, and 7E.

Old Dark Average: Previous "Dark Average" value, saved in memory, as shown in FIG. 7C.

Difference: In some embodiments, as shown in FIGS. 7A, 7B, and 7C, the Difference value is the difference between the current light meter reading and the Average of the light meter readings. Difference=Absolute Value of (Meter−Average). In some embodiments, as shown in FIGS. 7D and 7E, the Difference value is the difference between the current light meter reading and the previous light meter reading. Difference=Absolute Value of (Meter−Old Light Meter). Difference value is always a positive number and is also referred to as "Diff" in FIGS. 7A, 7B, 7C, 7D, and 7E.

Change: In one embodiment illustrated in FIG. 7A, "Change" is equal to the Average light meter value divided by 4, but never less than a value of 16. Change=Average/4 but not less than 16. In other embodiments illustrated in FIGS. 7B, 7C, 7D, and 7E, Change is equal to a fixed value, e.g. 8 or 16 or 32, as shown in blocks 9.6.2 and 9.6.5, when the range for light values (and hence the range for the bright average and the dark average and the running average of light meter values) is between 0 and 255. The Difference value is compared to the Change value in blocks 9.6.2 and 9.6.5.

Threshold: A numerical value about half-way, in one embodiment, between the Bright Average and the Dark Average. (Bright Average+Dark Average)/2. The Threshold is set to be some position between these two averages and need not be at the half-way point; for example, it can be ⅔ or ⅓ of the sum of the two averages. Alternatively, the Threshold may be set a fixed value above the Dark Average.

Algorithm Flow Diagram, FIG. 7A

A specific embodiment will now be described, in conjunction with FIG. 7A, as an example of a method of the present invention, and other alternative embodiments can employ different operations and different parameters, in a different sequence, etc. in a manner that is consistent with a general method of the invention. Referring to the Flow Diagram in FIG. 7A, the tag is awakened from sleep 701 by either a change to the light switch or a prompt by the timer. The processing from the wakeup starts in block 4.0 and 5.0. The processor averages the light switch reading and directs the light meter to take a reading in block 6.2.

If the processor was awakened by a change in the light switch, the processor assesses light switch status (light or dark) in block 8.1, and previous light switch status in blocks 8.1 and 8.3. Based on that information, the processor determines if the status should change to out-of-bag or in-bag (blocks 8.4.3 and 8.2.2) and adds light meter reading to Bright Average (block 8.2.3) or Dark Average (block 8.4.1). The processor then transmits the tag data and status (block 11).

Using the light meter to determining IN or OUT of bag is, in one embodiment, a two-part process, consisting of:

Part 1: Light meter takes light level reading 703, and microcontroller evaluates the change in light level.

If the current tag state is in-bag—If the Difference is less than the Change value (indicating a small increase in light), then the microcontroller updates the Dark Average (block 9.1.1) and goes back to sleep. But if the Difference is greater than the Change value (indicating a significant increase in light), then the microcontroller proceeds to Part 2.

If the current tag state is out-of-bag—If the Difference is less than the Change value (indicating a small decrease in light), then the microcontroller updates the Bright Average (block 9.4.4) and goes back to sleep. But if the Difference is greater than the Change value (indicating a significant decrease in light), then the microcontroller proceeds to Part 2.

Part 2: The microcontroller then compares the current light meter reading with the Threshold (blocks 9.3.2 and 9.4.2).

If the current tag state is in-bag—If the light meter reading is above the Threshold, then the tag transmits out-of-bag status (block 9.3.3), else it returns to sleep mode.

If the current tag state is out-of-bag—If the light meter reading is below the Threshold, then the tag transmits in-bag status (block 9.4.3), else it returns to sleep mode.

If the processor was awakened by a prompt from the timer, the light switch status is checked (block 9.1). If the light switch indicates light, the processor calculates the Difference, which is the light meter reading minus the Average (block 9.2.2). This Difference value is used to determine if the change was large enough to change the status of the tag to out-of-bag or in-bag. On the Flow Chart in FIG. 7A, the paths through blocks 9.3.1-9.3.2-9.3.3 and 9.4.1-9.4.2-9.4.3 compare the Difference value to a Change value, which is the Average value divided by 4, for example, and compare the light meter reading to a Threshold, which is, for example, halfway between the Dark Average and Bright Average. The result is that the status is changed when the Difference is greater than, for example, a 25 percent change in the Average value, and also the light meter value crosses a Threshold set by both Bright and Dark Averages.

The Algorithm uses, in one embodiment, exponential averaging of light meter values to determine Bright and Dark Averages. The Average is a running average which is exponentially weighted to give more weight to more recent readings. These averages change based on the levels of light in and out of the golf bag. Because of their inherent changes, it is desirable, in one embodiment, to put maximum and minimum limits around these averages. In one typical embodiment, the Dark Average maximum is limited to 127 LSBs (least significant bits) in the analog-to-digital converter, as shown in blocks 8.4.2 and 9.1.2 in FIG. 7A. The Bright Average minimum is limited to the value of the Dark Average plus 32 LSBs, as shown in block 9.4.5 in FIG. 7A. In this way, the Dark Average is never greater than the Bright Average, and the threshold created from the two averages is in fact a value greater than the Dark Average and less than the Bright Average. These limitations on the values of Dark and Bright Averages guarantee valid threshold values and prevent error states in the microprocessor.

The Algorithm defines a minimum light meter value for a "light" reading or out-of-the-bag status as 32 LSBs in the analog-to-digital converter, as shown in block 8.2.1 in FIG. 7A. In the current embodiment, the value of 32 LSBs as a minimum value to determine out-of-the-bag status gives valid readings for a wide range of user scenarios, including golfing at twilight and using a light-colored or translucent golf bag. Alternatively other minimum values of light meter values may be used to optimize the system.

Algorithm Flow Diagrams, Light Sensing Algorithms

Some typical embodiments will now be described, in conjunction with FIGS. 7B, 7C, 7D, 7E, and 7K, as examples of methods of the present invention, and other alternative embodiments can employ different operations and different parameters, in a different sequence, etc. in a manner that is consistent with a general method of the invention. The various embodiments describe optimization of the algorithm for performance in different mechanical configurations of tag that represent different techniques of illuminating the one or more light sensors.

Algorithm Flow Diagram, Radial Light Pipe

One typical embodiment uses an algorithm, shown in the Flow Diagram in FIG. 7B, that is optimized for a tag with a radial light pipe, such that the light enters only from the sides of the tag and not from the top of the tag as shown in FIG. 2. The at least one light sensor can be configured to activate (e.g. wake up) the processing system from a sleep state (e.g. a dark sleep state in which the processing system is substantially off and not consuming power) and can be configured to provide a current light meter value. The current light meter value can represent a measurement of the currently received light by the at least one light sensor, and the light sensor can be configured (e.g., through commands from the processing system) to repeatedly measure the current light and provide current light meter values over time.

In a typical embodiment, the apparatus can include at least two light sensors: a first light sensor which acts as a light switch and wakes up the processing system from a deep or dark sleep state and a second light sensor which acts as a light meter and provides a sequence, over time, of current light meter values to the processing system when it is not in the deep or dark sleep state. Referring to the Flow Diagram in FIG. 7B, the tag is awakened from sleep 706 by either a change to a light switch or a prompt by a timer. The processor averages the light switch reading and directs the light meter to take a reading in blocks 6 and 6.3 in FIG. 7B. The current light meter reading is added to the running average of light meter values to create the value "Average."

If the processor was awakened by a change in the light switch, the processor assesses light switch status (light or dark) in block 8.1*a*, and previous light switch status in blocks 8.1*b* and 8.3 in FIG. 7B. Based on that information, the processor performs tests to determine if the status should change to in-bag or out-of-bag (blocks 8.4.5, 9.5.1, 9.6.3*b*, and 9.6.6*b* in FIG. 7B) or if the status should stay the same. The processor also adds light meter reading to Bright Average (block 9.2.4) when the light meter reading is above a threshold; or adds light meter reading to Dark Average (block 9.2.1) when the light meter reading is below a threshold; or adds the light meter reading to the Dark Average (block 8.4.1) if the light switch transition is from light to dark. The threshold in these methods may be a floating threshold. The processor prompts the transmitter to transmits the tag data and status (block 10.1) if the in-bag or out-of-bag status has changed.

The processing system can be configured to calculate a floating threshold as a value between the bright average and the dark average. This floating threshold is used, by the processing system, to determine, by comparing the current light meter value to the floating threshold, whether to add the current light meter value to the bright average or to the dark average. The processing system, in one embodiment, adds the current light meter value to the bright average when the current light meter value is greater than the floating threshold, as shown in block 9.2.4, and it adds the current light meter value to the dark average when the current light meter value is less than the floating threshold, as shown in block 9.2.1 in FIG. 7B. In one embodiment, the bright average and the dark average are each running averages that change over time by adding the current light meter value to one or the other average in the manner described herein based upon the comparison to the floating threshold. The floating threshold allows the processing system to adjust to changing light levels over time (e.g., dark clouds dissipate and the light level increases, etc.), and the use of the floating threshold to determine which average (the bright average or the dark average) to update allows the system to update the proper average and avoids situations in which an average becomes distorted over time due to situations in which a current light meter value that is generated from, for example, an in-bag (dark) status gets added to the bright average (or another situation in which a current light meter value, generated while the golf club is out of the bag, gets added to the dark average). These errors tend to distort one or both averages which can result in errors in determining the status of the golf club relative to the container (e.g. golf club bag) for the golf club. It will be understood that the phrase "golf club bag" is meant to include any container to hold the golf club, such as a compartment, in a golf cart, for holding golf clubs.

In one embodiment, the floating threshold can be set as a value which is about one-half way between the bright average and the dark average. For example, the floating threshold can be set to be 50% (exactly one-half way) or 55% or 65% or 45% or 35% between the bright average and the dark average; when the floating threshold is set at 55% or 65% (or other values above 50%) of the distance between the bright and dark averages, it is closer to the bright average than it is to the dark average, and when the floating threshold is set at 45% or 35% (or other values below 50%) of the distance between the bright and dark averages, it is closer to the dark average than it is to the light average.

Different sleep states can be implemented based on the light conditions and the golf club status (in-bag or out-of-bag). When the status is out-of-bag or in-bag, the apparatus can be in light sleep, entering and exiting light sleep to check the light meter value to determine if the club status has changed. When the status transitions to in-bag and the light switch is off, the apparatus can enter light sleep for a period of time, e.g. one minute, checking for a change of status. After the period of time, the apparatus can exit light sleep state and enter deep sleep state in which only a few components are consuming a minimal amount of power. If the apparatus status is in-bag, and the light switch is not off, the periodic measurement of the light meter determines if a significant change has occurred, and the algorithm determines if the status should be changed.

In one embodiment which uses a floating, or a fixed, threshold, the apparatus can have a sleep state that exists when the golf club tag is in a prolonged dark state (e.g., the status is in-bag), and this sleep state can be referred to as a dark sleep state or a deep sleep state. It is a dark sleep state because the status of the tag is in-bag (meaning that the tag should be in the dark or relative darkness); it is a deep sleep state because only a few components are actively consuming power (e.g. a light switch to wake up a portion of the processing system to determine whether to exit the dark sleep state). The apparatus can also have a light sleep state which exists when the golf club tag is entering and exiting the light sleep state to determine if the status of the golf club has changed. In the light sleep state a few components are actively consuming power (e.g. a timer to wake up a light sensor and a portion of the processing system). The tag consumes, in one embodiment, more power in the light sleep state than it consumes in the dark sleep state; this difference in power consumption can be a result of a timer being on (consuming power) in the light sleep state and being off (not consuming power) in the dark sleep state. Another difference between the light sleep state and the dark sleep state can be the memory which stores averages and other values; this memory can be on during the light sleep state and off during the dark sleep state. The light sleep state can occur during an in-bag state or during an out-of-bag state. A timer can be coupled to the processing system (for example, a timer can be part of the processing system), and this timer can be used to exit the light sleep state when the timer times out, thereby causing the tag to enter the deep sleep state. When the state is out-of-bag or in-bag, the apparatus can be in the light sleep state, entering and exiting light sleep to determine if the status of the golf club has changed. In one or both sleep states, the transmitter can be off (or otherwise be operating at reduced power consumption levels) and all or portions of the processing system can be off (or otherwise be operating at reduced power consumption levels).

In one embodiment, the processing system in the golf club tag can be configured to determine a difference between the current light meter value and a running average of light meter values from a light sensor (e.g. the second light sensor in those embodiments using 2 light sensors). The difference (which can be expressed as an absolute value) is then compared to a change value (e.g., see comparisons shown in 9.6.2*b* and 9.6.5*b* in FIG. 7B,) to determine whether there has been a significant enough change to warrant a change in status (of the golf club relative to the golf club bag) by then performing a comparison of the current light meter value to the floating threshold if there has been a significant enough change, as shown in blocks 9.6.3*a* and 9.6.6*a* in FIG. 7B. If the difference is not significant enough (e.g. the difference is smaller than the change value) then the status is not changed, in one embodiment, and the current light meter value is not compared to the floating threshold. In one embodiment, the change value is fixed (e.g. at 8, or another value, when the dark and bright averages can have values between 0 and 255, subject to other constraints described herein) and in another embodiment, the change value can vary by calculating the change value based on the running average of light meter values.

If the processor was awakened by a prompt from the timer or light switch transition, the light switch status is checked, as shown in block 9.4 in FIG. 7B. If the light switch indicates dark, the processor enters a light or deep sleep state. If the light switch indicates light, the processor calculates the Difference value, which is the absolute value of the light meter reading minus the Average (block 9.6.1 or 9.6.4), which is a positive number. This Difference value is used to determine if the change was large enough to change the status of the tag to out-of-bag or in-bag. On the Flow Chart in FIG. 7B, the paths through blocks 9.6.1-9.6.2*b*-9.6.3*a* and 9.6.4-9.6.5*b*-9.6.6*a* compare the Difference value to a Change value, which may be a fixed value of, for example, 8, in a typical embodiment, and compares the Light Meter reading to a Threshold, which is, for example, halfway between the Dark Average and Bright Average. The result is that the status is changed when the Difference is greater than, for example, a value of 8, and also the Light Meter value crosses a Threshold set by both Bright and Dark Averages.

Referring to FIG. 7B, using the light meter to determining IN or OUT of bag is, in a typical embodiment, a two-part process, consisting of:

Part 1: Light meter takes light level reading 707, and microcontroller (or other implementations of a processing system) evaluates the light level. The status of the light switch is evaluated to determine if the processor was awakened by a timer prompt or a change state of the light switch, as shown in block 7.1. If the wake up occurred because of a momentary flash of light or darkness, the processor re-enters a sleep state. If the wake up is not caused by a momentary flash of light or darkness, the Light Meter reading is compared to a Threshold, as shown in block 9.2 in FIG. 7B. In this embodiment, the Threshold is a floating threshold and is a value half way between the Dark and Bright Averages, as shown in block 9.1.1 in FIG. 7B. Based on a comparison of the Light Meter reading to the Threshold, the Light Meter reading is added to the Bright Average or to the Dark Average. If the Light Meter reading is greater than the Threshold, the reading is added to the Bright Average, as shown in block 9.2.4. If the Light Meter reading is less than the Threshold, the reading is added to the Dark Average, as shown in block 9.2.1. The Bright Average is constrained to a value of at least 32 greater than the value of the Dark Average, as shown in block 9.2.6. The Dark Average is constrained to be less than a value of 127 in this embodiment, as shown in block 9.2.5.

A Difference value is calculated, which is the absolute value of the difference between the current Light Meter reading and the Average in one embodiment, as shown in boxes 9.6.1 and 9.6.4 in FIG. 7B. The Difference is compared to a Change value, which can be a fixed value, such as 8 or 16, or a variable value, such as the Average divided by 4.

If the Difference value is less than the Change value (indicating a small increase or decrease in light), then the microcontroller goes back to sleep. But if the Difference is greater than the Change value (indicating a significant increase or decrease in light), then the microcontroller proceeds to Part 2.

Part 2: The microcontroller then compares the current Light Meter reading with the floating Threshold (blocks 9.6.3*a* and 9.6.6*a* in FIG. 7B).

If the current tag state is in-bag—If the Light Meter reading is above the Threshold, then the tag sets and transmits out-of-bag status (blocks 9.6.3*b* and 10.1), else it returns to sleep mode.

If the current tag state is out-of-bag—If the Light Meter reading is below the Threshold, then the tag sets and transmits in-bag status (blocks 9.6.6*b* and 10.1), else it returns to sleep mode.

When the tag transmits an in-bag or out-of bag status, the processor prompts the transmitter to transmit multiple bursts of the same data, for example 4 bursts in this embodiment, as shown in block 11.2. The data includes, in one embodiment, one or more of the unique identifier of the tag, the in-bag or out-of golf bag status, and the current Light Meter reading. Other embodiments may include transmitting additional data, such as one or more of values of averagers, difference value, and light switch status or less data.

Averagers

The Algorithm uses, in one embodiment, exponential averaging of Light Meter values to determine Bright and Dark Averages. The Average, in one embodiment, is a running average which is exponentially weighted to give more weight to more recent readings. The averages change based on the levels of light in and out of the golf bag. Because of their inherent changes, it is desirable, in a typical embodiment, to put maximum and minimum limits around these averages. In one embodiment, the Dark Average maximum is limited to a value of 127, or 127 LSBs (least significant bits) in the analog-to-digital converter, as shown in blocks 8.4.2 and 9.2.5 in FIG. 7B. The Bright Average minimum is limited to the value of the Dark Average plus 32 LSBs, as shown in block 9.2.6 in FIG. 7B. In this way, the Dark Average is never greater than the Bright Average, and the threshold created from the two averages is in fact a value greater than the Dark Average and less than the Bright Average. These limitations on the values of Dark and Bright Averages guarantee valid threshold values and prevent error states in the microprocessor.

Reseed Averagers on Wake-Up from Deep Sleep

In one embodiment, the processing system is configured to use at least one re-seeded running average after exiting from a sleep state which is typically the deep sleep state. In other words, rather than using the last running average value (e.g. the last value for the running average of light meter values), the processing system, after an exit from a sleep state, uses an initial (e.g. preset and predetermined) value as the running average of light meter values to begin the next running average value for that running average, as shown in FIG. 7B block 8.2*b*. The initial value for each running average can be considered a reset or initial value for the particular running average and acts as a seed for the running average. Hence, a reset value for the dark average can be used as the dark average value after an exit from the deep sleep state, and a reset value for the bright average can be used as the bright average value after an exit from the deep sleep state, and a reset value for the running average of light meter values can be used as the running average of light meter values after an exit from the deep sleep state. In one embodiment, the reset values are used as the initial value for each running average after each exit or awakening from a deep sleep state but they are not used after each exit or awakening from a light sleep state; the exit from the light sleep state may occur in response to a timer's timing out while the golf club tag is in an out-of-bag state or status, and in this case the running averages are not re-seeded. Another exit from the light sleep state typically occurs in response to a timer's timing out while the golf club tag is in an in-the-bag state or status, during which time the tag stays in a light sleep state for a period of time before entering a deep sleep state. In one embodiment, the golf club tag will remain in a light sleep state for one minute after entering the golf bag in order to learn its dark environment and to have updated averager information in the event that the club is removed from the bag before entering deep sleep. In this case the running averages are not re-seeded. The exit from the deep sleep state typically occurs when the first light sensor (which acts as a light switch) awakens the processing system while the golf club tag is in an in-bag state.

A method, according to an embodiment which uses re-seeded running averages, can include the following operations: exiting, at a first time, a sleep state (e.g. a deep sleep state) of a golf club tag; calculating and storing a first bright average, which is a running average, after exiting the sleep state at the first time, the first bright average being seeded by a bright initial value; calculating and storing a first dark average, which is also a running average, after exiting the sleep state at the first time, the first dark average being seeded by a dark initial value; calculating and storing a first running average of light meter values after exiting the sleep state at the first time, the first running average of light meter values being seeded by an initial running average value; entering the sleep state at a second time, which is after the first time, the sleep state being entered in response to determining that a golf club, which is coupled to the golf club tag, has been returned to a golf club bag; exiting, at a third time which is after the second time, the sleep state; calculating and storing a second bright average, which is a running average, after exiting the sleep state at the third time, the second bright average being re-seeded by the bright initial value; calculating and storing a second dark average, which is also a running average, after exiting the sleep state at the third time, the second dark average being re-seeded by the dark initial value; calculating and storing a second running average of light meter values after exiting the sleep state at the third time, the second running average of light meter values being re-seeded by the initial running average value; and determining a change of status of the golf club relative to the golf club bag based upon a current light meter value and transmitting, in response to determining the change of status, an identifier of the golf club and an indicator of the status which is one of (a) in-bag or (b) out-of-bag. The transmitting can be performed at least two times over a period of time before the golf club tag enters a light sleep state, and a timer can be configured to wake up the golf club tag from the light sleep state to determine if the status, of the golf club relative to the golf club bag, has changed and wherein the second bright average, the second dark average and the second running average of light meter values are not re-seeded after exiting the light sleep state. This method can also include receiving a current light meter value (e.g., from the second light sensor) and determining, by comparing the current light meter value to a floating threshold, whether to add the current light meter value to the second bright average (if the current light meter value is above the floating threshold) or to the second dark average (if the current light meter value is below the floating threshold) and adding the current light meter value to the second running average of light meter values and determining a difference between the current light meter value and the second running average of light meter values, and comparing the difference to a change value (e.g. a fixed value) to determine whether to change the status. This method can be used with a golf club tag which includes a full or partial circumferential window around the side of a portion of a golf club grip or cap for the grip; this window is the entry point for a light pipe which directs light to one or more light sensors in the golf club tag.

FIG. 7J shows a simplified flow chart according to one embodiment of the invention in which one or more running averages are reseeded with a predetermined initial value after the system awakes from a sleep state, such as a deep sleep state as described herein. In operation 820, a golf club tag exits, at a first time, a sleep state, such as a deep sleep state. This can occur as a result of a golf club being removed from a golf bag, thereby exposing one or more light sensors in the golf club tag to light as has been described herein. Then in operation 822, the system within the golf club tag calculates and stores, after exiting at the first time, a first bright running average which is seeded by a bright initial average, and the system also calculates and stores a first dark running average which is seeded by a dark initial average. These averages are used as described herein to determine whether or not the status of the golf club changes and to determine whether or not the golf club has been returned to the golf bag. When the golf club is determined to be returned to a golf bag then, in operation 824, the system within the golf club tag enters, at a second time which is after the first time, the sleep state again. The golf club remains in the sleep state until operation 826 in which it exits again, at a third time after the second time, the sleep state because the club has been removed again from the golf club bag. At this point, in operation 828, the system reseeds the running averages with the appropriate initial average. In particular, the golf club tag in operation 828 calculates and stores, after exiting at the third time, a second bright running average which can be different than the first bright running average and which is seeded by the bright initial average which is the same bright initial average used in operation 822. Similarly, the golf club tag in operation 828 calculates and stores, after exiting at the second time, a second dark running average which can be different than the first dark running average but which is seeded with the same dark initial average which was used in operation 822. In this manner, the running averages are reseeded after each exit from, in this embodiment, the deep sleep state; in one embodiment, the running averages are not reseeded upon exiting from the light sleep state as has been described herein.

Significant Change, Reseed Averagers, Re-Transmit—FIG. 7C

Another specific embodiment will now be described, in conjunction with FIG. 7C, as an example of a method of the present invention, and other alternative embodiments can employ different operations and different parameters, in a different sequence, etc. in a manner that is consistent with general methods of the invention. This specific embodiment includes techniques in the program to adjust for certain conditions, such as translucent bags in which the club tag is exposed to a moderate to significant amount of light while the tag is in the bag or changing conditions such as moving from bright sunlight to dark shade.

There are scenarios in which the in-bag or out-of-bag status may be reported incorrectly, such as when the club is inside a translucent golf bag that allows a moderate amount of light inside. In this case, when the club is in the bag and the bag is moved from a dark area to a bright area, the club tag may make the decision that the club status is out-of-bag, based on an increase in light, even though the club remains inside the golf bag. Another scenario is when the club is out of the bag, and the club is moved from bright sunlight into dark shade. In this case, when the club is moved into the shade, the club tag may make the decision that the club status is in-bag, based on a decrease in light, even though the club remains outside of the golf bag.

Significant Increase in Light

A method according to one embodiment to address these incorrect reporting events of in or out status is as follows. After each processing of Light Meter reading and determining in-bag or out-of-bag status, the processor stores the Light Meter (or Meter) reading and the values of Dark Average and Bright Average as Old Light Meter, Old Dark Average, and Old Bright Average respectively in one embodiment, as shown in block 711 in FIG. 7C. Alternate embodiments may store any one or more of these readings. If the current bag status is out-of-bag, and the club tag encounters a substantial increase in the light level as measured by the light meter, certain actions are taken. A substantial increase in light, checked in block 812 in FIG. 7C, may be defined as a difference between the current Light Meter value and the previous Light Meter value that is greater than a predetermined value, such as 64 on a scale of 0 to 255. If a substantial increase in light has occurred, the averagers are updated as shown in 822: the Dark Average is replaced with the value of the previous Bright Average, but the Dark Average is limited to a maximum value, such as 127 on a scale between 0 and 255. The Bright Average is replaced with the new Light Meter reading, but the Bright Average must be at least a predetermined value, such as 32, greater than the Dark Average. The Running Average is replaced with a value between the new Dark Average and the new Bright average. This value may be one-half way between the new Dark and Bright Averages or some other value between the two. Updating the averager values makes an adjustment that corrects for a previous incorrect decision of out-of-bag status. For a substantial increase in light, the club tag assumes that its previous out-of-bag status was incorrect, and the averagers are adjusted to values that correspond to the actual previous status. That is, when the previous status was out-of-bag, and the tag sees a substantial increase in light, it assumes that the previous state was actually in-bag. In this case, the Dark Average should have been updated during the in-bag status, but because the status was incorrect, the Bright Average was incorrectly updated. On realizing the error, the Dark, Bright and Running Averages are updated to correspond with the actual incorrect previous and current correct values. The club tag sends a new transmission, block 10.1, that indicates that the status is out-of-bag as previously set by block 9.6.3b in FIG. 7C. The golf device receiving this status would note that it is the same status as the previously transmitted status. The device would display this new status again which would confirm the out-of-bag status. In the event of a missed initial transmission, this new transmission would provide the correct status. This might occur if the club tag changed its status before the golf device was powered on, such as might happen before a round of golf.

Significant Decrease in Light

Similarly, if the current bag status is in-bag, and the club tag encounters a substantial decrease in the light level as measured by the light meter, certain actions are taken. A substantial decrease in light, checked in decision block 810 in FIG. 7C, may be defined as a difference between the previous Light Meter value and the current Light Meter value that is greater than a predetermined value, such as 64 on a scale of 0 to 255. If a substantial decrease in light has occurred, the averagers are updated as shown in block 820 in FIG. 7C: The Dark Average is replaced with the new Light Meter reading, but the Dark Average is limited to a minimum value, such as 10 on a scale of 0 to 255. The Bright Average is replaced with the value of the previous Dark Average, but the Bright Average must be a predetermined value, such as 32, greater than the Dark Average. The Running Average is replaced with a value between the new Dark Average and the new Bright average. This value may be one-half way between the new Dark and Bright Averages or some other value between the two. Updating the averager values makes an adjustment that corrects for an incorrect decision of in-bag status. For a substantial decrease in light, the club tag assumes that its previous in-bag status was incorrect, and the averagers are adjusted to values that correspond to the actual previous status. In one embodiment an averager can be processing logic (such as a microcontroller) programmed with software to cause the processing logic to calculate one or more averages. That is, when the previous status was in-bag, and the tag sees a substantial decrease in light, it assumes that the previous state was actually out-of-bag. In this case, the Bright Average should have been updated during the out-of-bag status, but because the status was incorrect, the Dark Average was incorrectly updated. On realizing the error, the Dark, Bright and Running Averages are updated to correspond with the actual incorrect previous and current correct values. The club tag sends a new transmission, block 10.1, that indicates that the status is in-bag, as previously set by block 9.6.6b, 9.5.1, or 8.4.5 in FIG. 7C. The golf device receiving this status would note that it is the same status as the previously transmitted status. The device would display this new status again which would confirm the in-bag status. In the event of a missed initial transmission, this new transmission would provide the correct status.

Solve Significant Change in Light—Initialize Golf Device at Start of Round

A technique may be used to avoid incorrect in-bag or out-of-bag status reported by the golf GPS device. Before the round of golf, there may be an initialization of the golf device. The golfer would be prompted by the device to start the round of golf, asking if all of the golfer's clubs are present and in the bag. Answering affirmatively would reset all the club statuses in the GPS device to in-bag and eliminate any errored out-of-bag statuses reported previously.

Significant Change in Light: Re-Transmit Status, No Reload of Averagers—FIG. 7D

In an alternate embodiment, on determining a significant change, as shown in blocks 810 and 812, the averagers are not reset with new values, as shown in FIG. 7D. In this embodiment, the processor causes the transmitter to transmit an additional burst, shown in block 10.1 with the current unchanged in-bag or out-of bag status. In the event of a missed initial transmission of status by the golf device, this additional transmission would provide the correct status.

Algorithm Flow Diagram, Algorithm Optimized for Axial Light Pipe—FIG. 7D

One particular embodiment of the club tag is shown in FIG. 4B. The tag has an opening in the top so that light enters through the top only and not through the sides of the tag. This configuration, in one embodiment, gives more variation in light meter readings under various conditions. The algorithm can take advantage of these variations. In this embodiment, when the tag is inside a golf bag the light meter readings are very low, because the light only enters through the top of the tag. When the tag is inverted and resting on the bottom of the golf bag, the light entering through the top is very limited.

The algorithm in FIG. 7D is one embodiment of an optimization for the tag that has light entering from the top only and not from the sides of the tag. The Difference value is a comparison of current Light Meter reading to the previous Light Meter reading (blocks 9.6.1d and 9.6.4d in FIG. 7D), instead of to the Average, so the Average is not implemented. In this embodiment, the Threshold is configured to be one third of the way between the Dark and Bright Averages, as shown in block 9.1.2. That is, the Threshold is closer to the Dark Average than to the Bright Average. In this way the threshold is weighted toward the Dark Average, enabling the algorithm to respond to the darker environment inside the golf bag and accurately assess changes to the in-bag or out-of-bag status.

The at least one light sensor can be configured to activate (e.g. wake up) the processing system from a sleep state (e.g. a dark sleep state in which the processing system is substantially off and not consuming power) and can be configured to provide a current light meter value. The current light meter value can represent a measurement of the currently received light by the at least one light sensor, and the light sensor can be configured (e.g., through commands from the processing system) to repeatedly measure the current light and provide current light meter values over time.

In a typical embodiment, the apparatus can include at least two light sensors: a first light sensor which acts as a light switch and wakes up the processing system from a deep or dark sleep state and a second light sensor which acts as a light meter and provides a sequence, over time, of current light meter values to the processing system when it is not in the deep or dark sleep state. Referring to the Flow Diagram in FIG. 7D, the tag is awakened from sleep 706 by either a change to a light switch or a prompt by a timer. The processor averages the light switch reading and directs the light meter to take a reading in blocks 6 and 6.4 in FIG. 7D.

If the processor was awakened by a change in the light switch, the processor assesses light switch status (light or dark) in block 8.1a, and previous light switch status in blocks 8.1b and 8.3 in FIG. 7D. Based on that information, the processor performs tests to determine if the status should change to in-bag or out-of-bag (blocks 8.4.5, 9.5.1, 9.6.3b, and 9.6.6b in FIG. 7D) or if the status should stay the same. The processor also adds the Light Meter reading to Bright Average (block 9.2.4) when the Light Meter reading is above a threshold; or adds the Light Meter reading to Dark Average (block 9.2.1) when the light meter reading is below a Threshold. The Threshold in these methods may be a floating threshold. The processor prompts the transmitter to transmits the tag data and status (block 10.1) if the in-bag or out-of-bag status has changed.

The processing system can be configured to calculate a floating threshold as a value between the bright average and the dark average. This floating threshold is used, by the processing system, to determine, by comparing the current light meter value to the floating threshold, whether to add the current light meter value to the bright average or to the dark average. The processing system, in one embodiment, adds the current light meter value to the bright average when the current light meter value is greater than the floating threshold, as shown in block 9.2.4, and it adds the current light meter value to the dark average when the current light meter value is less than the floating threshold, as shown in block 9.2.1. in FIG. 7D. In one embodiment, the bright average and the dark average are each running averages that change over time by adding the current light meter value to one or the other average in the manner described herein based upon the comparison to the floating threshold. The floating threshold allows the processing system to adjust to changing light levels over time (e.g., dark clouds dissipate and the light level increases, etc.), and the use of the floating threshold to determine which average (the bright average or the dark average) to update allows the system to update the proper average and avoids situations in which an average becomes distorted over time due to situations in which a current light meter value that is generated from, for example, an in-bag (dark) status gets added to the bright average (or another situation in which a current light meter value, generated while the golf club is out of the bag, gets added to the dark average). These errors tend to distort one or both averages which can result in errors in determining the status of the golf club relative to the container (e.g. golf club bag) for the golf club. It will be understood that the phrase "golf club bag" is meant to include any container to hold the golf club, such as a compartment, in a golf cart, for holding golf clubs.

In one embodiment, the floating threshold can be set as a value which is about one-third of the way between the dark average and the bright average. For example, the floating threshold can be set to be 33% (one-third of the way) above the dark average and 67% (one-third of the way) below the bright average. In this embodiment, the threshold is closer to the dark average than it is to the bright average.

Different sleep states can be implemented based on the light conditions and the golf club status (in-bag or out-of-bag). When the status is out-of-bag or in-bag, the apparatus can be in light sleep, entering and exiting light sleep to check the light meter value to determine if the club status has changed. When the status transitions to in-bag and the light switch is off, the apparatus can enter light sleep for a period of time, e.g. one minute, checking for a change of status. After the period of time, the apparatus can exit light sleep state and enter deep sleep state in which only a few components are consuming a minimal amount of power. If the apparatus status is in-bag, and the light switch is not off, the periodic measurement of the light meter determines if a significant change has occurred, and the algorithm determines if the status should be changed.

In one embodiment which uses a floating, or a fixed, threshold, the apparatus can have a sleep state that exists when the golf club tag is in a prolonged dark state (e.g., the status is in-bag), and this sleep state can be referred to as a dark sleep state or a deep sleep state. It is a dark sleep state because the status of the tag is in-bag (meaning that the tag should be in the dark or relative darkness); it is a deep sleep state because only a few components are actively consuming power (e.g. a light switch to wake up a portion of the processing system to determine whether to exit the dark sleep state). The apparatus can also have a light sleep state which exists when the golf club tag is entering and exiting the light sleep state to determine if the status of the golf club has changed. In the light sleep state a few components are actively consuming power (e.g. a timer to wake up a light sensor and a portion of the processing system). The light sleep state can occur during an in-bag state or during an out-of-bag state. A timer can be coupled to the processing system (for example, a timer can be part of the processing system), and this timer can be used to exit the light sleep state when the timer times out. When the state is out-of-bag or in-bag, the apparatus can be in the light sleep state, entering and exiting light sleep to determine if the status of the golf club has changed. In one or both sleep states, the transmitter can be off (or otherwise be operating at reduced power consumption levels) and all or portions of the processing system can be off (or otherwise be operating at reduced power consumption levels).

In one embodiment, the processing system in the golf club tag can be configured to determine a difference between the current light meter value and a previous light meter value from a light sensor (e.g. the second light sensor in those embodiments using 2 light sensors). The difference (which can be expressed as an absolute value) is then compared to a change value (e.g., see comparisons shown in 9.6.2d and 9.6.5d in FIG. 7D,) to determine whether there has been a significant enough change to warrant a change in status (of the golf club relative to the golf club bag) by then performing a comparison of the current light meter value to the floating threshold if there has been a significant enough change, as shown in blocks 9.6.3a and 9.6.6a in FIG. 7D. If the difference is not significant enough (e.g. the difference is smaller than the change value) then the status is not changed, in one embodiment, and the current light meter value is not compared to the floating threshold. In one embodiment, the change value is fixed (e.g. at 16, or another value, when the dark and bright averages can have values between 0 and 255, subject to other constraints described herein).

If the processor was awakened by a prompt from the timer or light switch transition, the light switch status is checked, as shown in block 9.4 in FIG. 7D. If the light switch indicates dark, the processor enters a light or deep sleep state. If the light switch indicates light, the processor calculates the Difference value, which is the absolute value of the light meter reading minus the Old, or previous, Light Meter reading (block 9.6.1d or 9.6.4d in FIG. 7D), which is a positive number. This Difference value is used to determine if the change was large enough to change the status of the tag to out-of-bag or in-bag. On the Flow Chart in FIG. 7D, the paths through blocks 9.6.1d-9.6.2d-9.6.3a and 9.6.4d-9.6.5d-9.6.6a compare the Difference value to a Change value, which may be a fixed value of, for example, 16, in a typical embodiment, and compares the Light Meter reading to a Threshold, which is, for example, one third of the way between the Dark Average and Bright Average, as shown in block 9.1.2 in FIG. 7D. The result is that the status is changed when the Difference is greater than, for example, a value of 16, and also the Light Meter value crosses a Threshold set by both Bright and Dark Averages.

Referring to FIG. 7D, using the light meter to determining IN or OUT of bag is, in a typical embodiment, a two-part process, consisting of:

Part 1: Light meter takes light level reading 708, and microcontroller (or other implementations of a processing system) evaluates the light level. The status of the light switch is evaluated to determine if the processor was awakened by a timer prompt or a change state of the light switch, as shown in block 7.1. If the wake up occurred because of a momentary flash of light or darkness, the processor re-enters a sleep state. If the wake up is not caused by a momentary flash of light or darkness, the Light Meter reading is compared to a Threshold, as shown in block 9.2 in FIG. 7D. In this embodiment, the Threshold is a floating threshold and is a value one third of the way between the Dark and Bright Averagers, as shown in block 9.1.2 in FIG. 7D. Based on a comparison of the Light Meter reading to the Threshold, the Light Meter reading is added to the Bright Average or to the Dark Average. If the Light Meter reading is greater than the Threshold, the reading is added to the Bright Average, as shown in block 9.2.4. If the Light Meter reading is less than the Threshold, the reading is added to the Dark Average, as shown in 9.2.1. The Bright Average is constrained to a value of at least 32 greater than the value of the Dark Average, as shown in block 9.2.6. The Dark Average is constrained to be less than a value of 64 in this embodiment, as shown in block 9.2.7.

A Difference value is calculated, which is the absolute value of the difference between the current Light Meter reading and the Old, or previous, Light Meter reading, as shown in boxes 9.6.1*d* and 9.6.4*d* in FIG. 7D. The Difference is compared to a Change value, which can be a fixed value, such as 8 or 16, or a variable value, such as the Average divided by 4.

If the Difference value is less than the Change value (indicating a small increase or decrease in light), then the microcontroller goes back to sleep. But if the Difference is greater than the Change value (indicating a significant increase or decrease in light), then the microcontroller proceeds to Part 2.

Part 2: The microcontroller then compares the current Light Meter reading with the floating Threshold (blocks 9.6.3*a* and 9.6.6*a* in FIG. 7D).

If the current tag state is in-bag—If the Light Meter reading is above the Threshold, then the tag sets and transmits out-of-bag status (blocks 9.6.3*b* and 10.1 in FIG. 7D), else it returns to sleep mode.

If the current tag state is out-of-bag—If the Light Meter reading is below the Threshold, then the tag sets and transmits in-bag status (blocks 9.6.6*b* and 10.1 in FIG. 7D), else it returns to sleep mode.

When the tag transmits an in-bag or out-of bag status, the processor prompts the transmitter to transmit multiple bursts of the same data, for example 4 bursts in this embodiment, as shown in block 11.2. The data includes one of more of the unique identifier of the tag, the in-bag or out-of golf bag status, and the current Light Meter reading. Other embodiments may include transmitting additional data, such as one or more of values of averagers, difference value, and light switch status.

Averagers

The Algorithm uses, in one embodiment, exponential averaging of Light Meter values to determine Bright and Dark Averages. The Average is a running average which is exponentially weighted to give more weight to more recent readings. The averages change based on the levels of light in and out of the golf bag. Because of their inherent changes, it is desirable, in a typical embodiment, to put maximum and minimum limits around these averages. In one embodiment, the Dark Average maximum is limited to a value of 64, or 64 LSBs (least significant bits) in the analog-to-digital converter as shown in blocks 8.4.2*d* and 9.2.7 in FIG. 7D. The Bright Average minimum is limited to the value of the Dark Average plus 32, as shown in block 9.2.4 in FIG. 7D. In this way, the Dark Average is never greater than the Bright Average, and the Threshold created from the two averages is in fact a value greater than the Dark Average and less than the Bright Average. These limitations on the values of Dark and Bright Averages guarantee valid threshold values and prevent error states in the microprocessor.

Reseed Averagers on Wake-Up from Deep Sleep

In one embodiment, the processing system is configured to use at least one re-seeded running average after exiting from a sleep state which is typically the deep sleep state. In other words, rather than using the last running average value (e.g. the last value for the running average of light meter values), the processing system, after an exit from a sleep state, uses an initial (e.g. preset and predetermined) value as the running average of light meter values to begin the next running average value for that running average, as shown in FIG. 7D block 8.2*c*. The initial value for each running average can be considered a reset or initial value for the particular running average. Hence, a reset value for the dark average can be used as the dark average value after an exit from the deep sleep state, and a reset value for the bright average can be used as the bright average value after an exit from the deep sleep state, and a reset value for the running average of light meter values can be used as the running average of light meter values after an exit from the deep sleep state. In one embodiment, the reset values are used as the initial value for each running average after each exit or awakening from a deep sleep state but they are not used after each exit or awakening from a light sleep state; the exit from the light sleep state may occur in response to a timer's timing out while the golf club tag is in an out-of-bag state or status, and in this case the running averages are not re-seeded. Another exit from the light sleep state typically occurs in response to a timer's timing out while the golf club tag is in an in-the-bag state or status, during which time the tag stays in a light sleep state for a period of time before entering a deep sleep state. In one embodiment, the golf club tag will remain in a light sleep state for one minute after entering the golf bag in order to learn its dark environment and to have updated averager information in the event that the club is removed from the bag before entering deep sleep. In this case the running averages are not re-seeded. The exit from the deep sleep state typically occurs when the first light sensor (which acts as a light switch) awakens the processing system while the golf club tag is in an in-bag state.

A method, according to an embodiment which uses re-seeded running averages, can include the following operations: exiting, at a first time, a sleep state (e.g. a deep sleep state) of a golf club tag; calculating and storing a first bright average, which is a running average, after exiting the sleep state at the first time, the first bright average being seeded by a bright initial value; calculating and storing a first dark average, which is also a running average, after exiting the sleep state at the first time, the first dark average being seeded by a dark initial value; calculating and storing a first running average of light meter values after exiting the sleep state at the first time, the first running average of light meter values being seeded by an initial running average value; entering the sleep state at a second time, which is after the first time, the sleep state being entered in response to determining that a golf club, which is coupled to the golf club tag, has been returned to a golf club bag; exiting, at a third time which is after the second time, the sleep state;

calculating and storing a second bright average, which is a running average, after exiting the sleep state at the third time, the second bright average being re-seeded by the bright initial value; calculating and storing a second dark average, which is also a running average, after exiting the sleep state at the third time, the second dark average being re-seeded by the dark initial value; calculating and storing a second running average of light meter values after exiting the sleep state at the third time, the second running average of light meter values being re-seeded by the initial running average value; and determining a change of status of the golf club relative to the golf club bag based upon a current light meter value and transmitting, in response to determining the change of status, an identifier of the golf club and an indicator of the status which is one of (a) in-bag or (b) out-of-bag. The transmitting can be performed at least two times over a period of time before the golf club tag enters a light sleep state, and a timer can be configured to wake up the golf club tag from the light sleep state to determine if the status, of the golf club relative to the golf club bag, has changed and wherein the second bright average, the second dark average and the second running average of light meter values are not re-seeded after exiting the light sleep state. This method can also include receiving a current light meter value (e.g., from the second light sensor) and determining, by comparing the current light meter value to a floating threshold, whether to add the current light meter value to the second bright average (if the current light meter value is above the floating threshold) or to the second dark average (if the current light meter value is below the floating threshold) and adding the current light meter value to the second running average of light meter values and determining a difference between the current light meter value and the previous light meter value, and comparing the difference to a change value (e.g. a fixed value) to determine whether to change the status. This method can be used with a golf club tag which includes a window at the top surface of the tag in the proximity of the one or more light sensors; this window is the entry point for a light pipe which directs light to one or more light sensors in the golf club tag.

Dark Floating Threshold and Fixed Threshold

Figures 1, 7F:
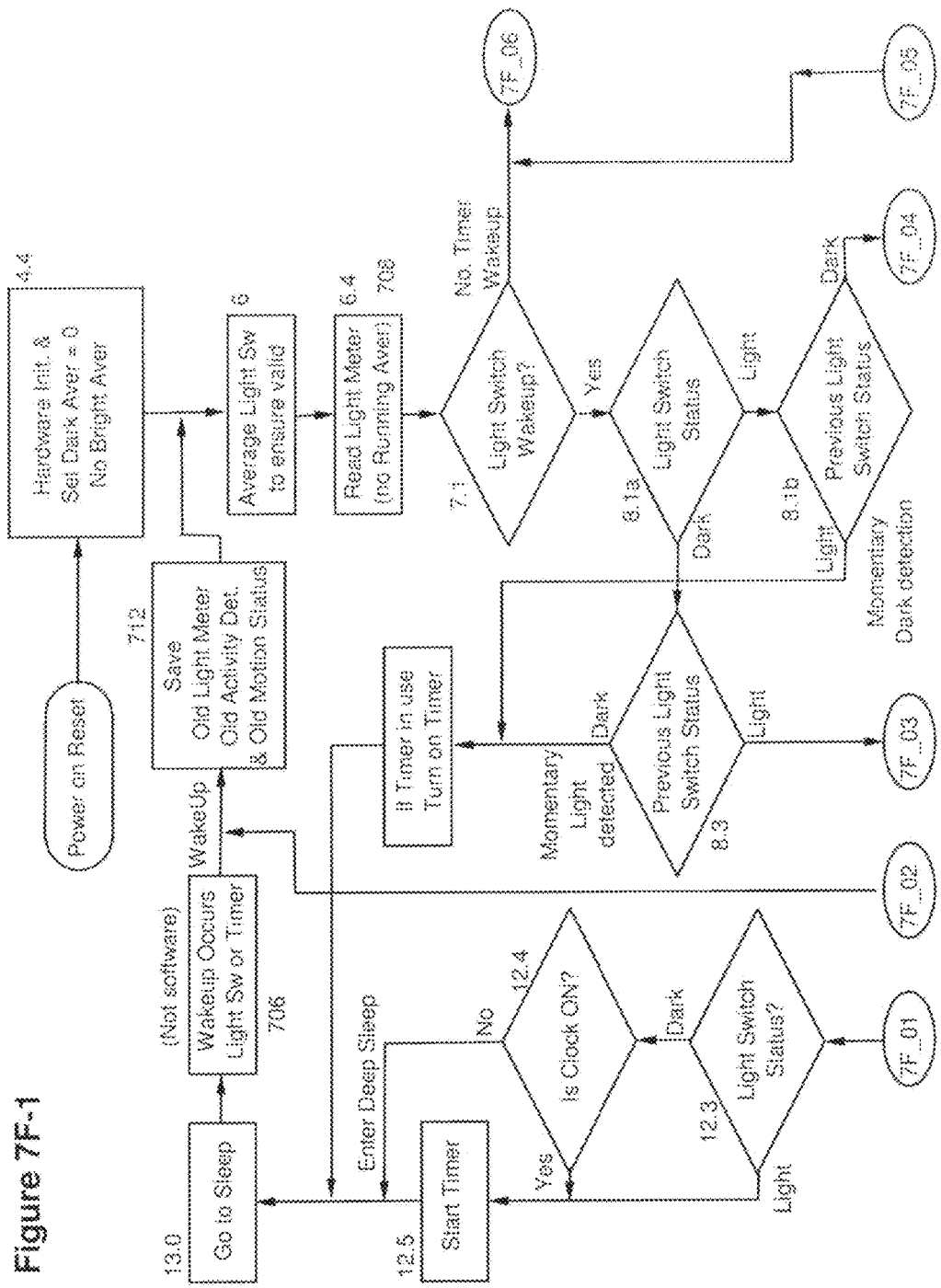
FIGS. 7F and 7G are software flow diagrams for the microprocessor in another embodiment of the club tag that incorporates light variations to determine motion in the club tag.
Figures 2, 7F:
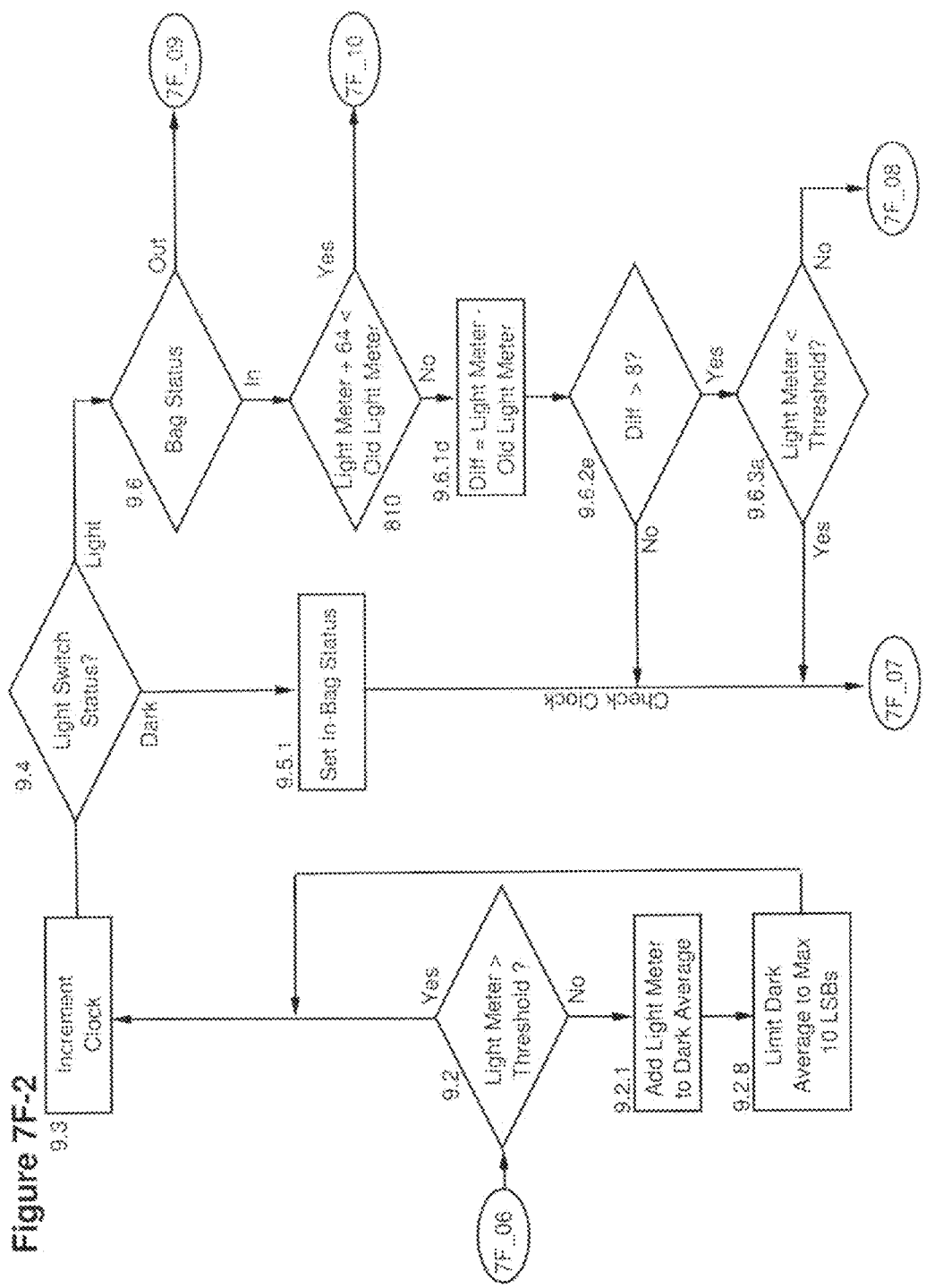
Figures 3, 7F:
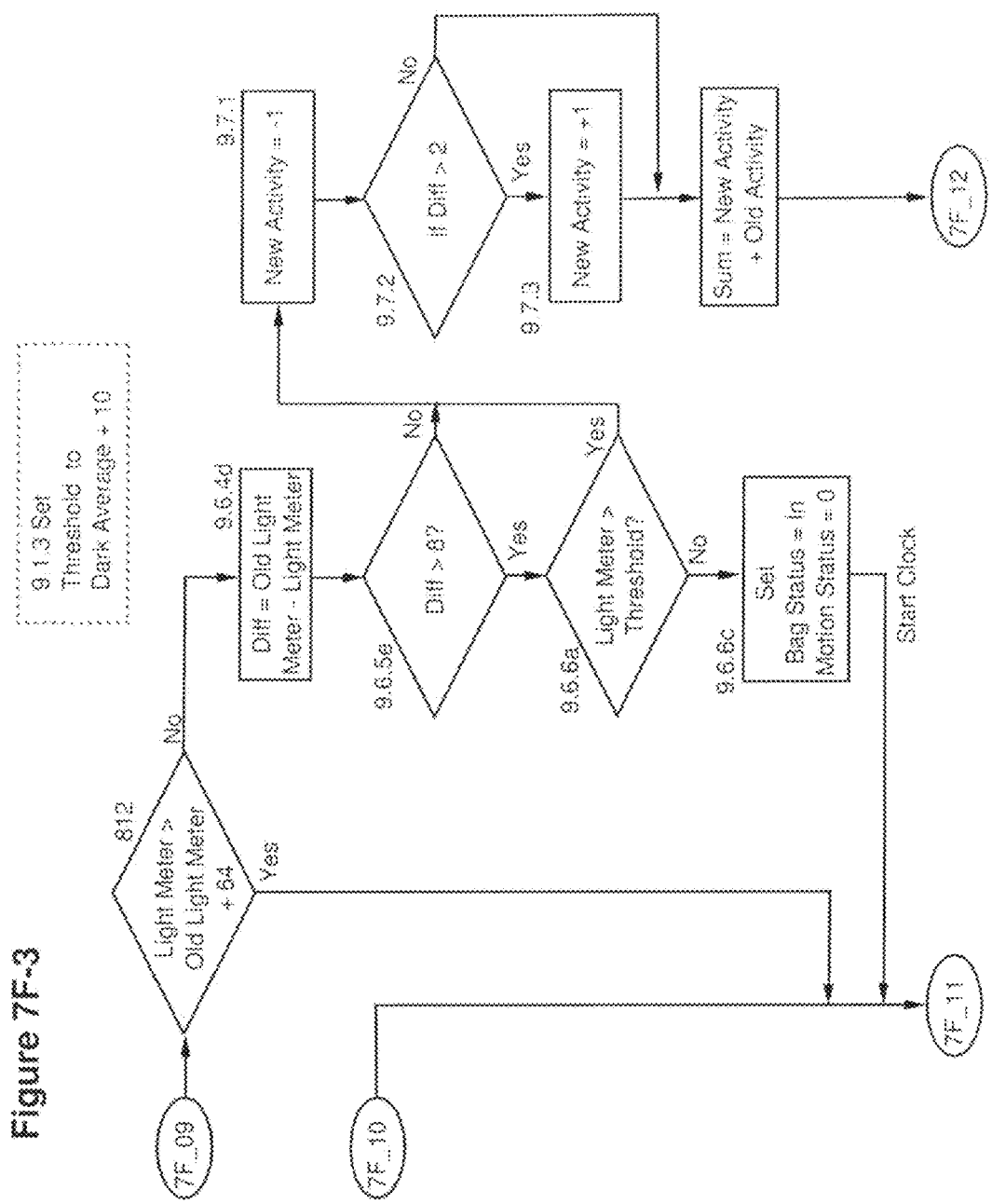
Figures 4, 7F:
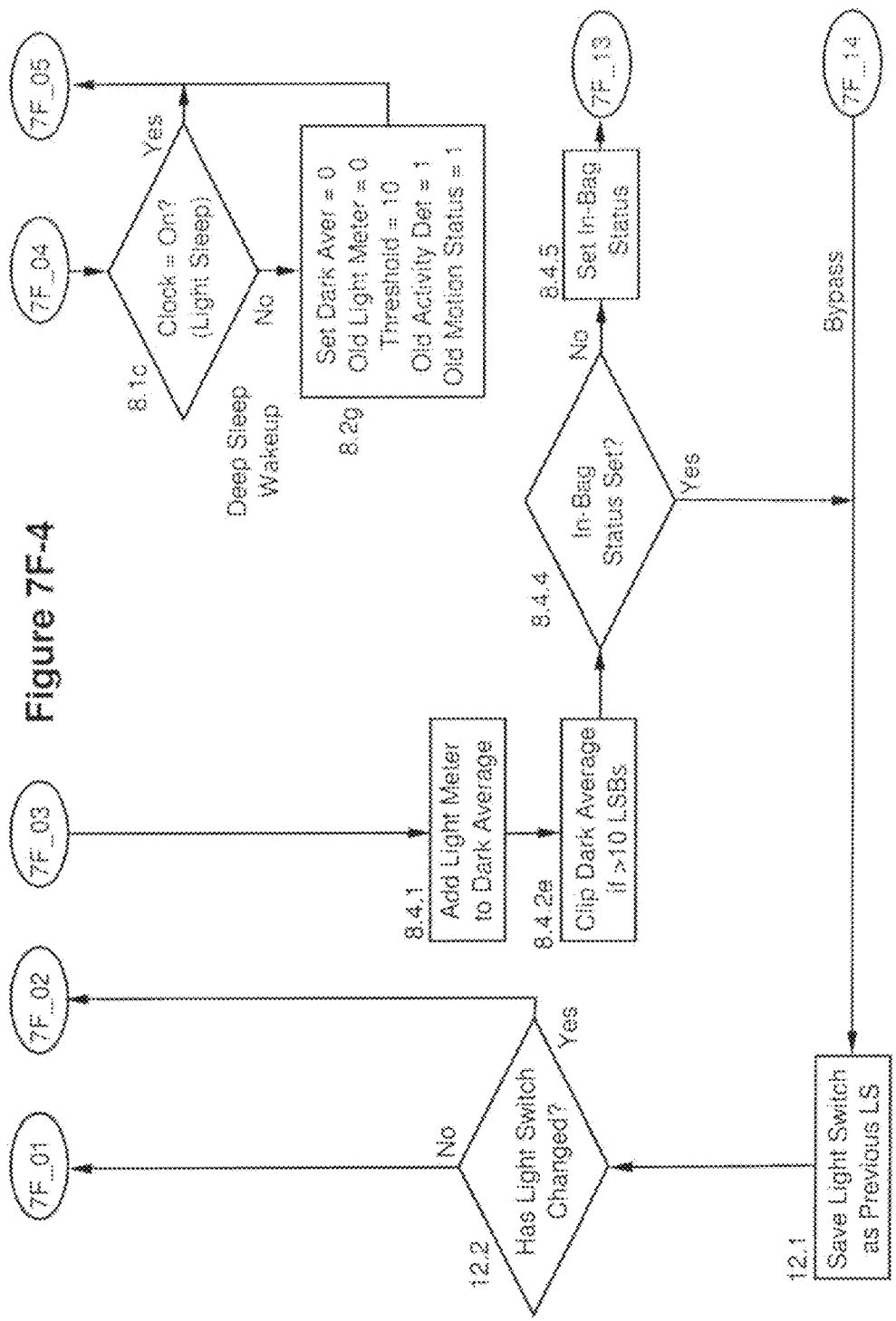
Figures 5, 7F:
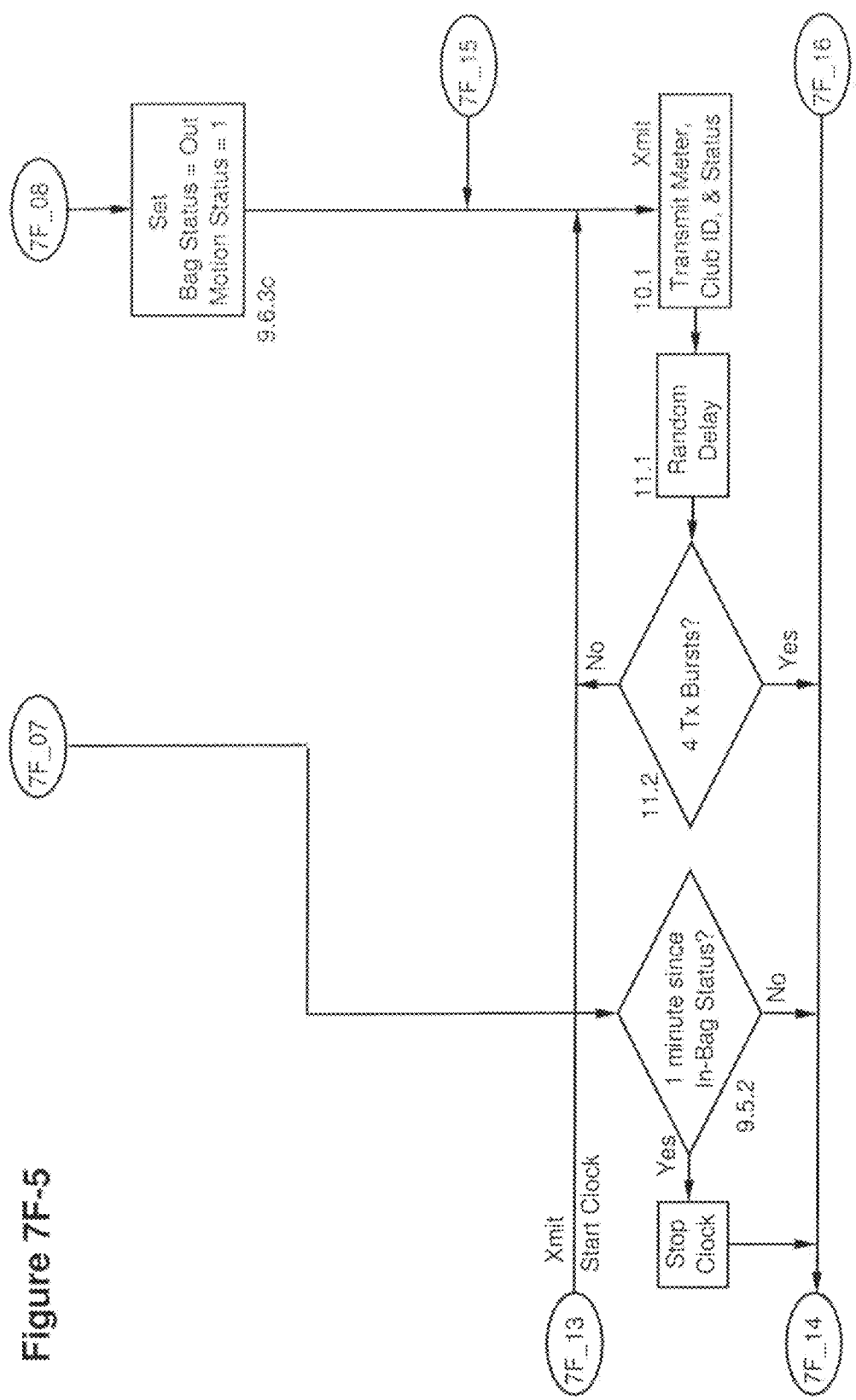
Figures 6, 7F:
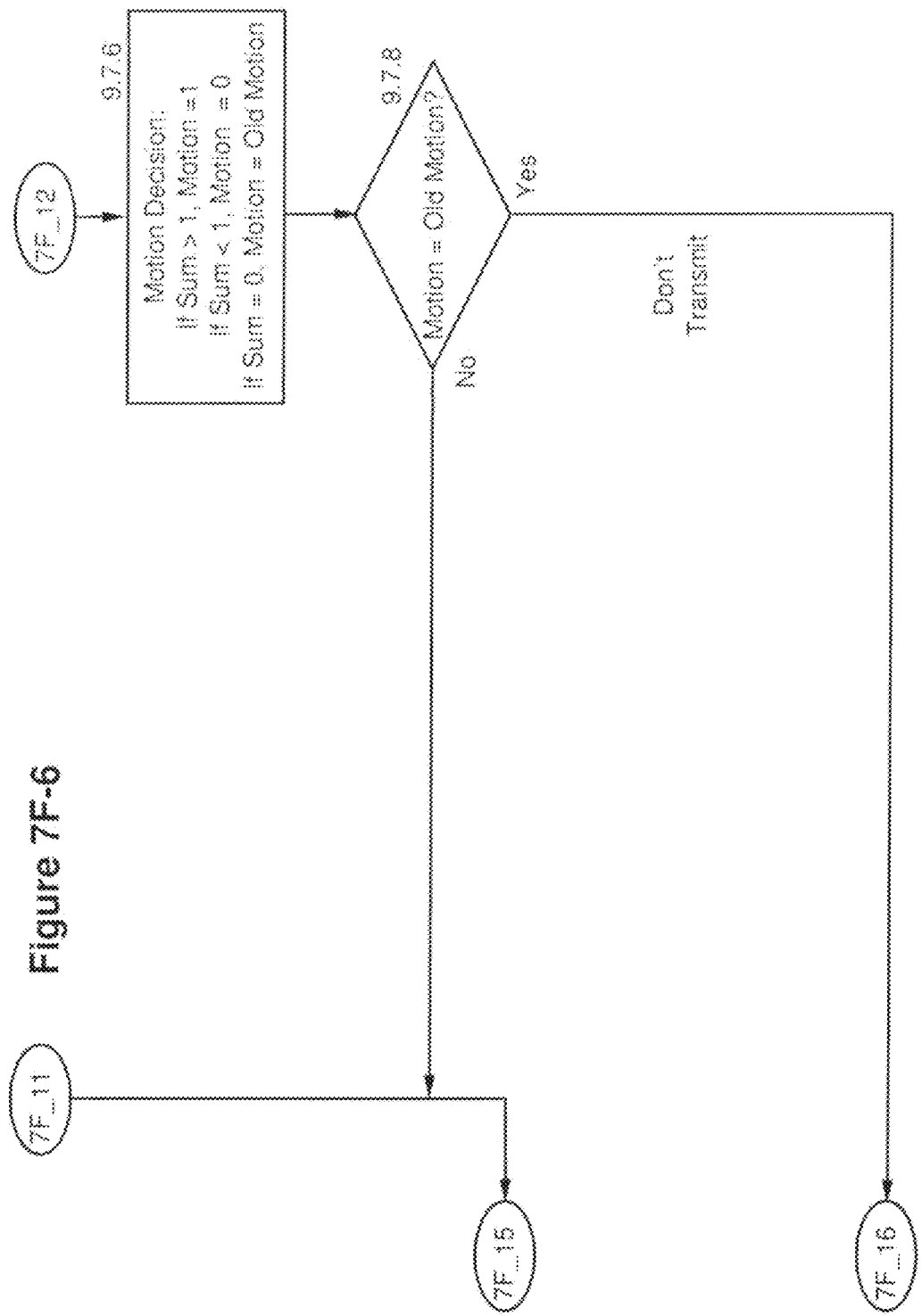
Figures 1, 7G:
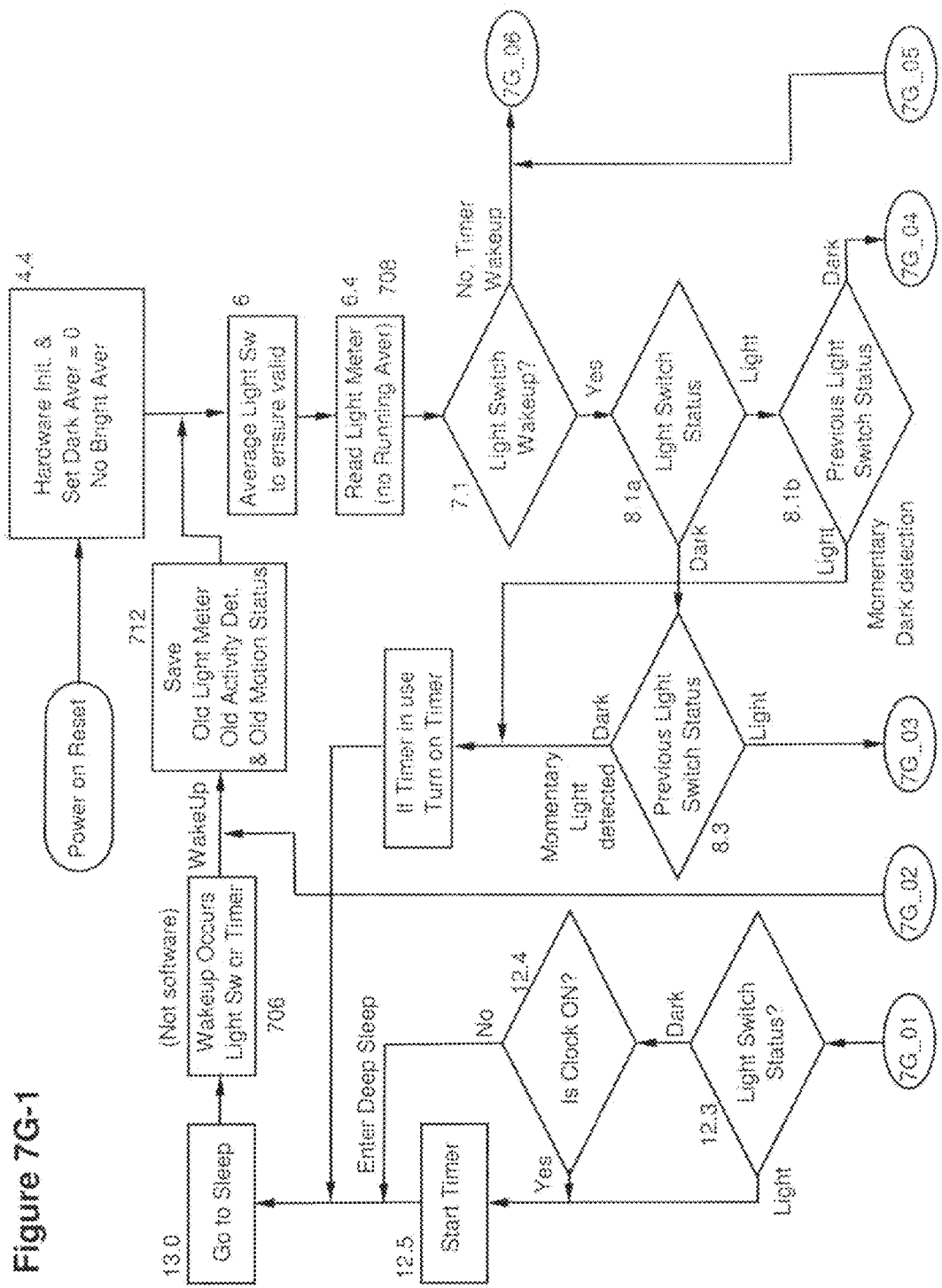
Figures 2, 7G:
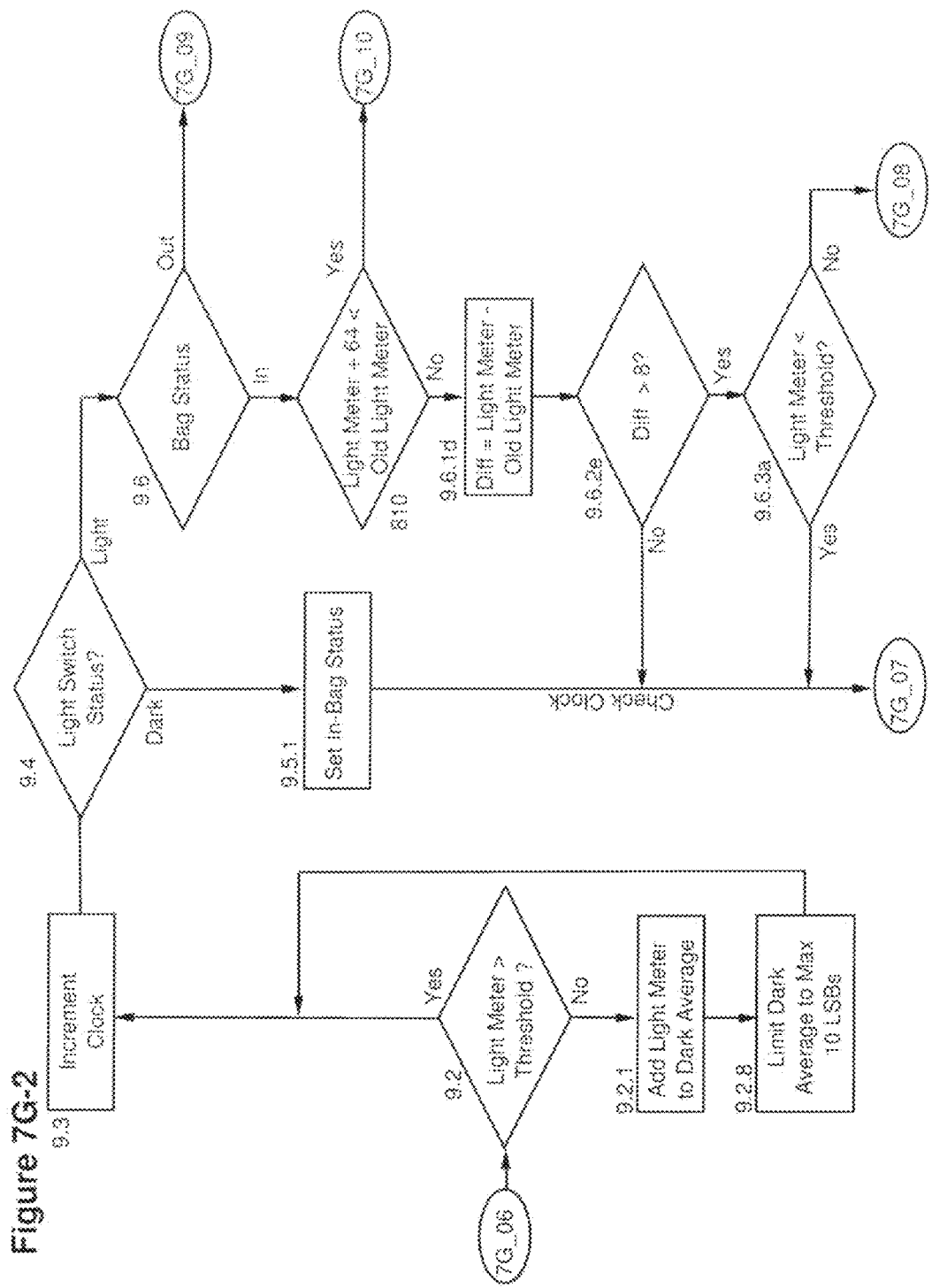
Figures 3, 7G:
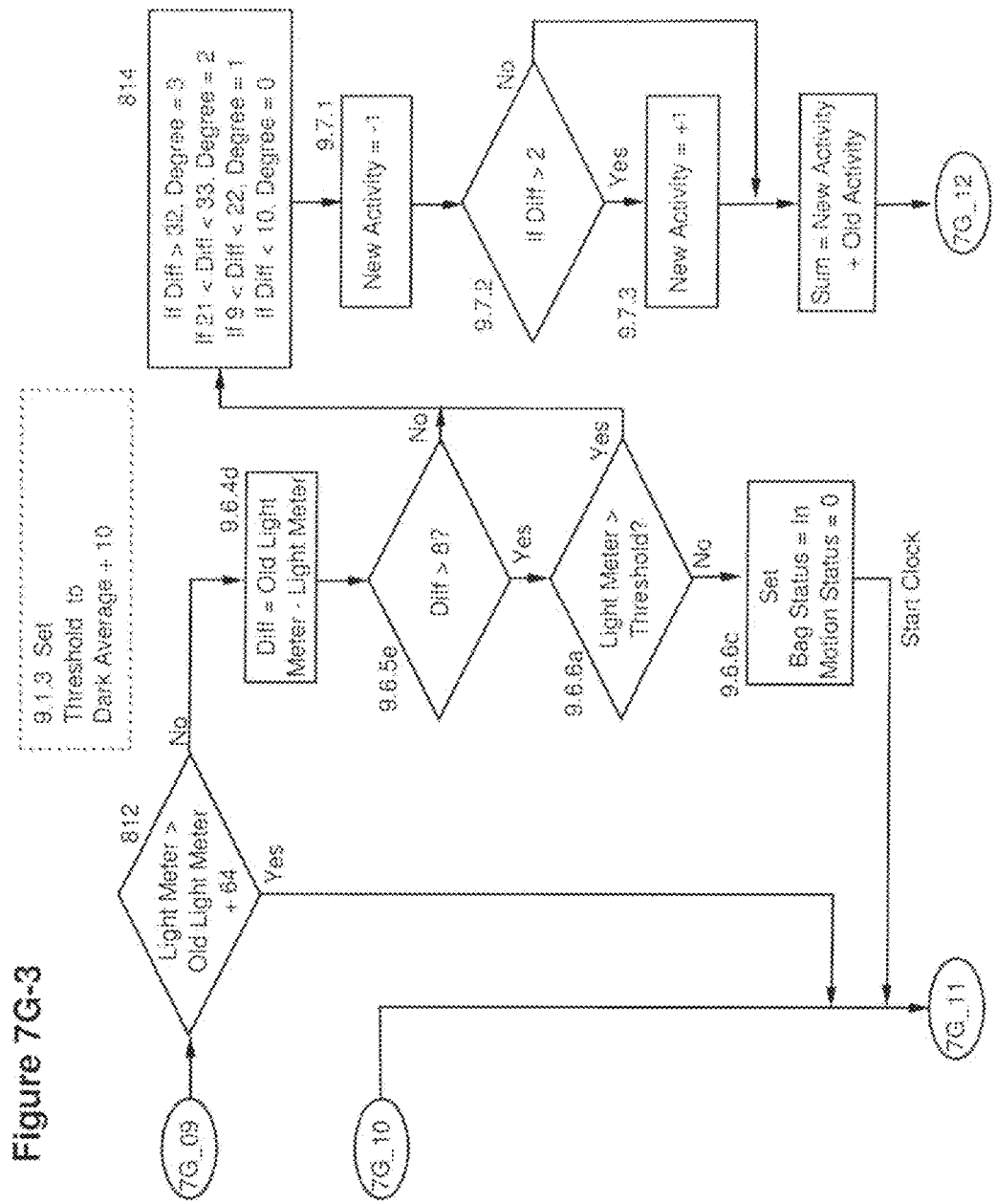
Figures 4, 7G:
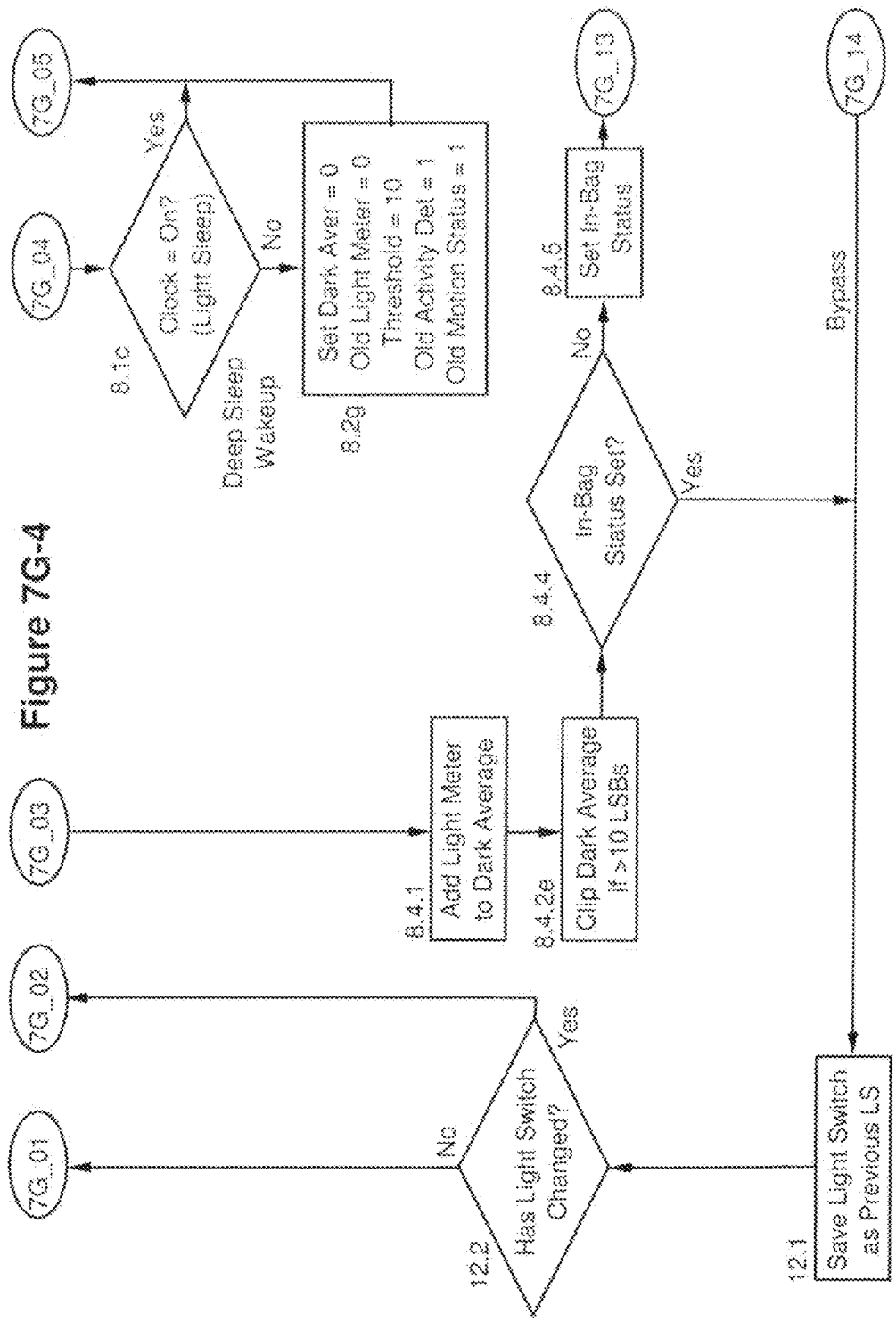
Figures 5, 7G:
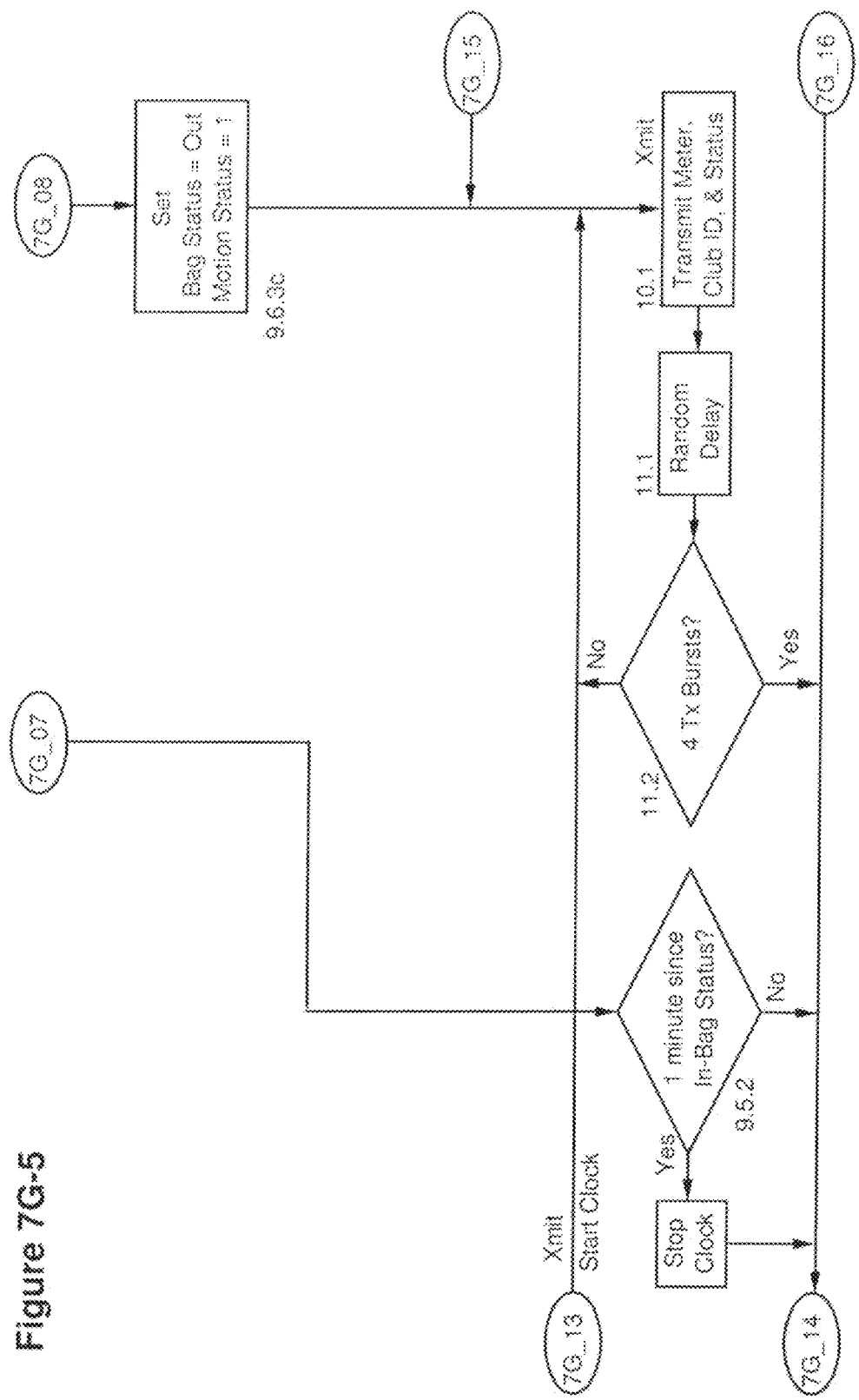
Figures 6, 7G:
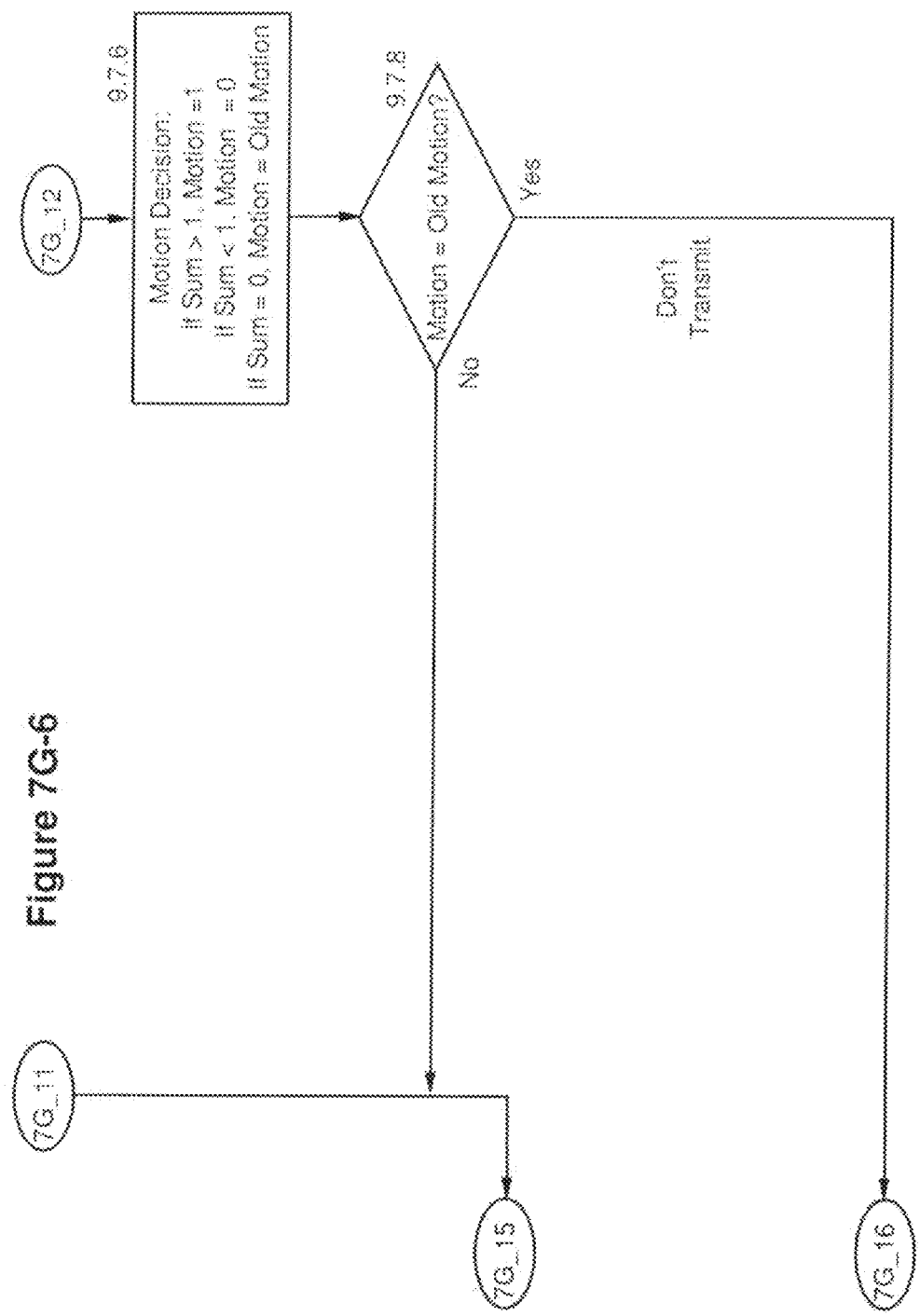
Figures 1, 7H:
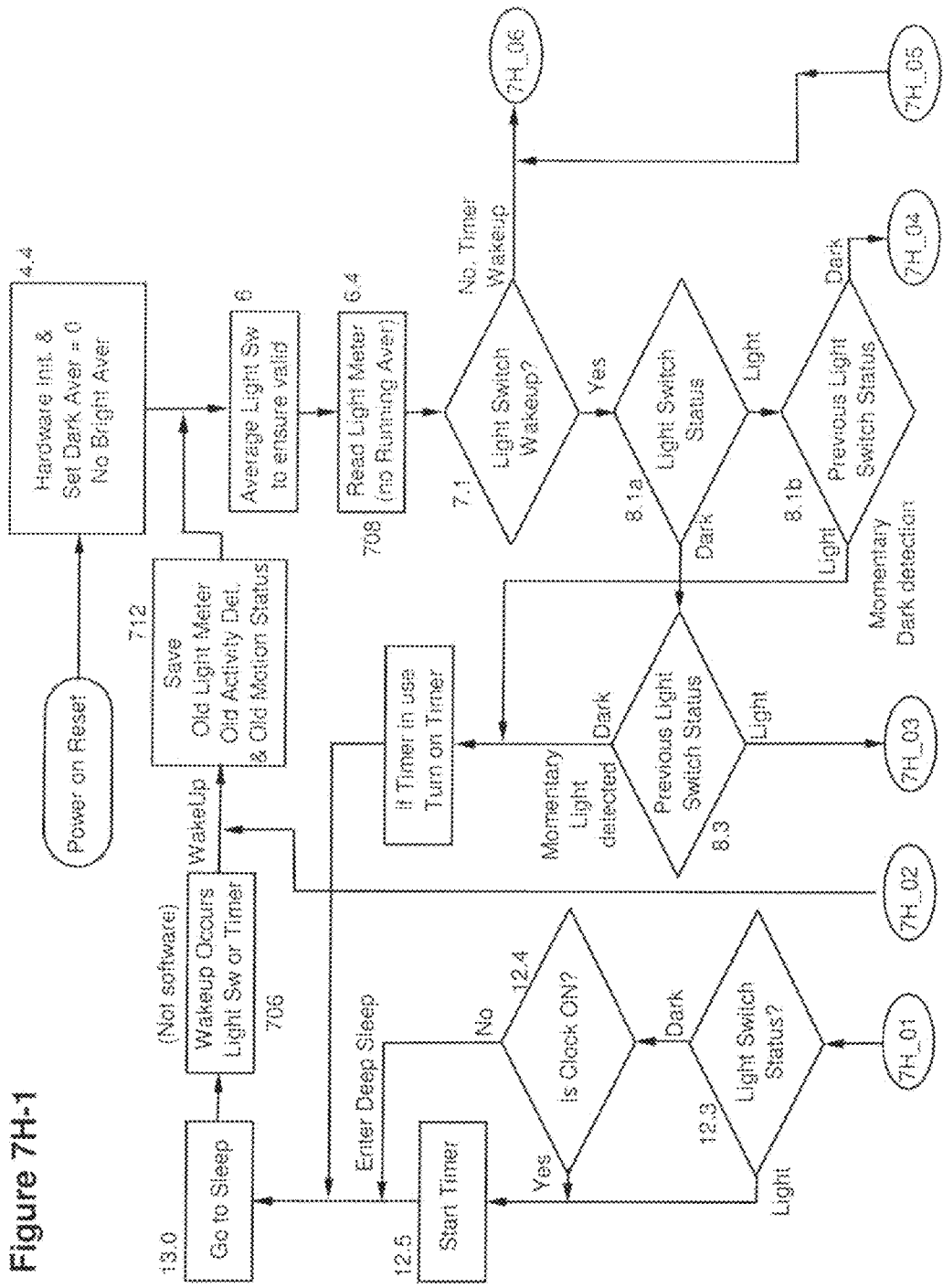
FIG. 7H is a software flow diagram for the microprocessor in another embodiment of the club tag that incorporates a sensor to determine motion.
Figures 2, 7H:
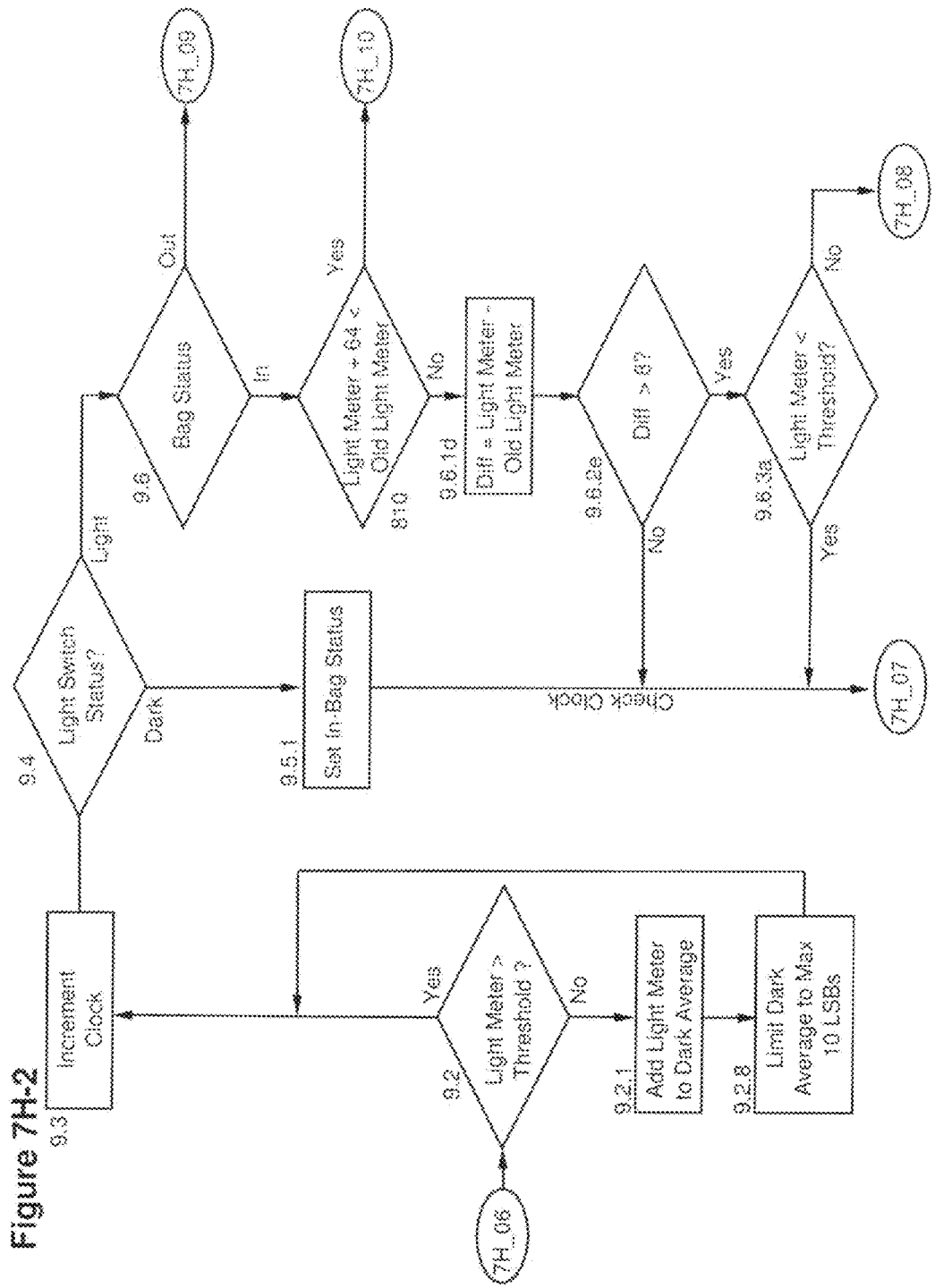
Figures 3, 7H:
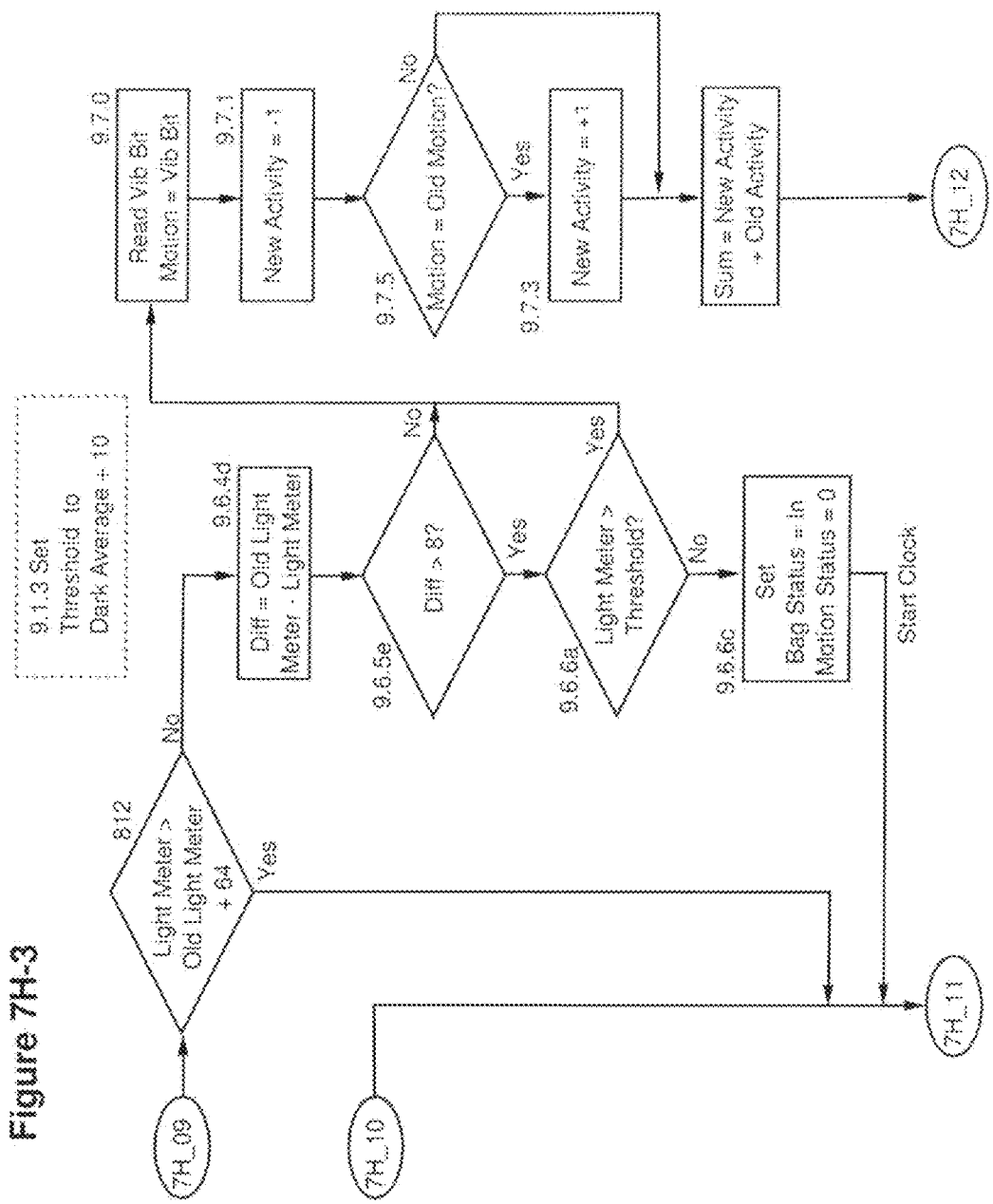
Figures 4, 7H:
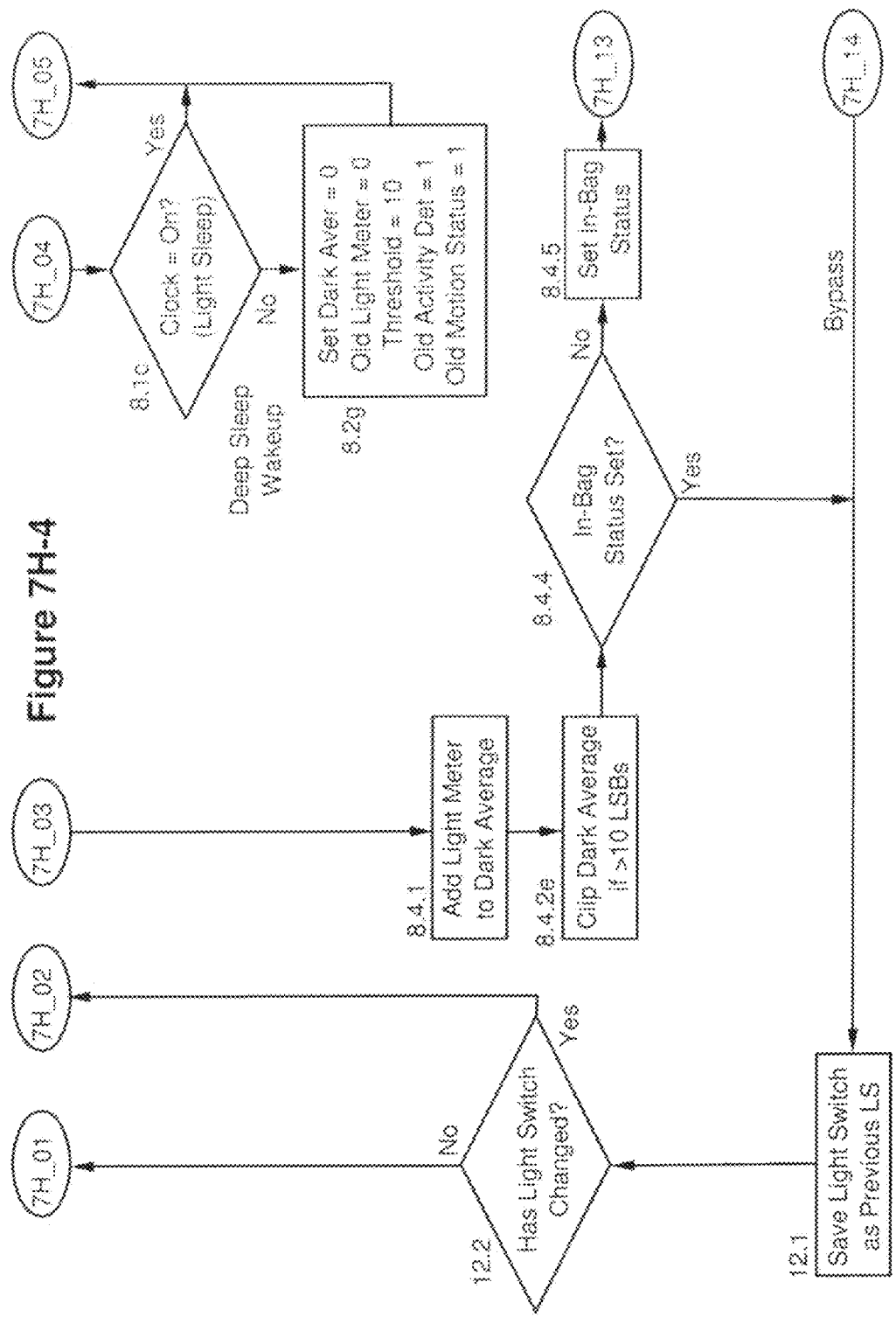
Figures 5, 7H:
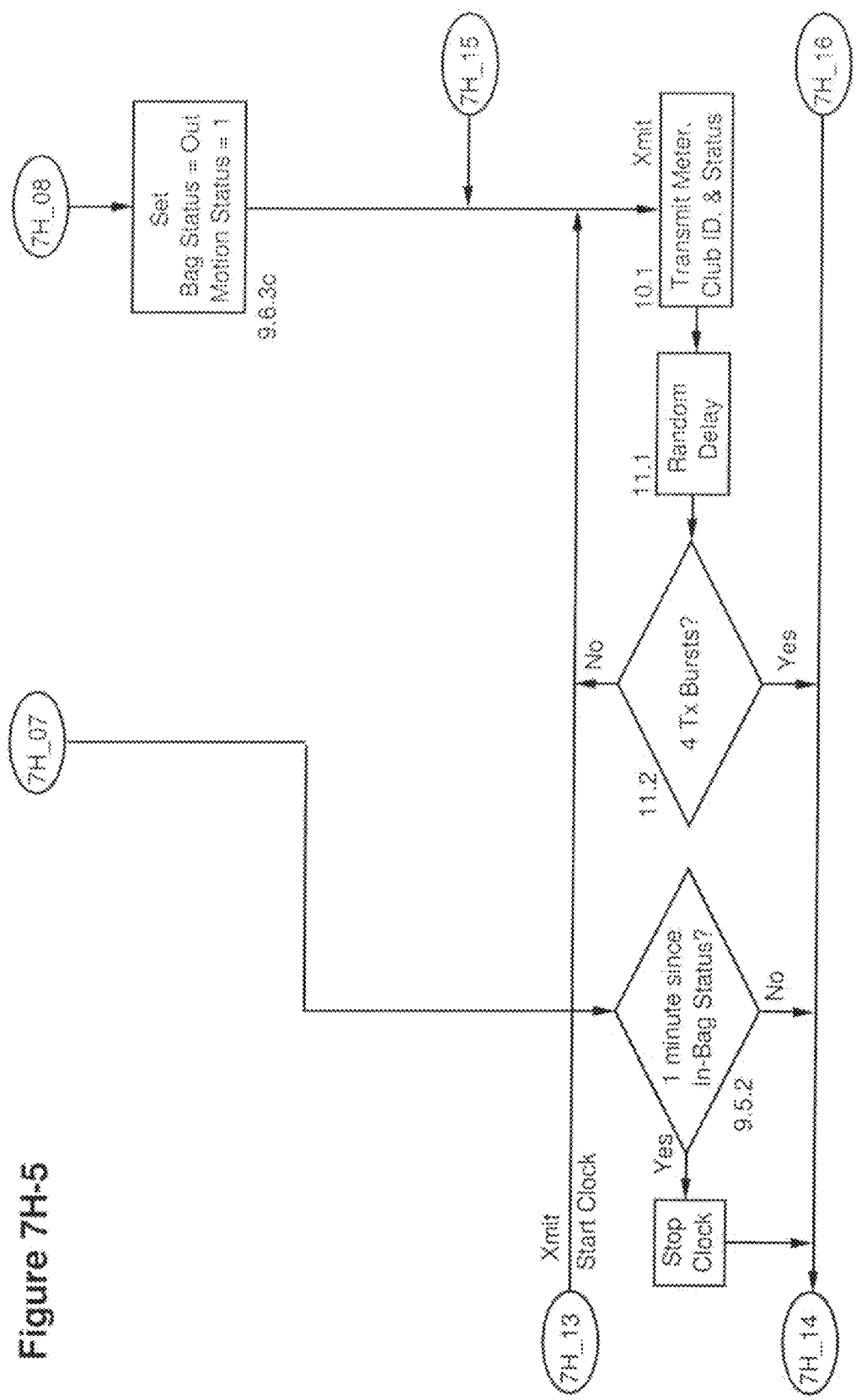
Figures 1, 7K:
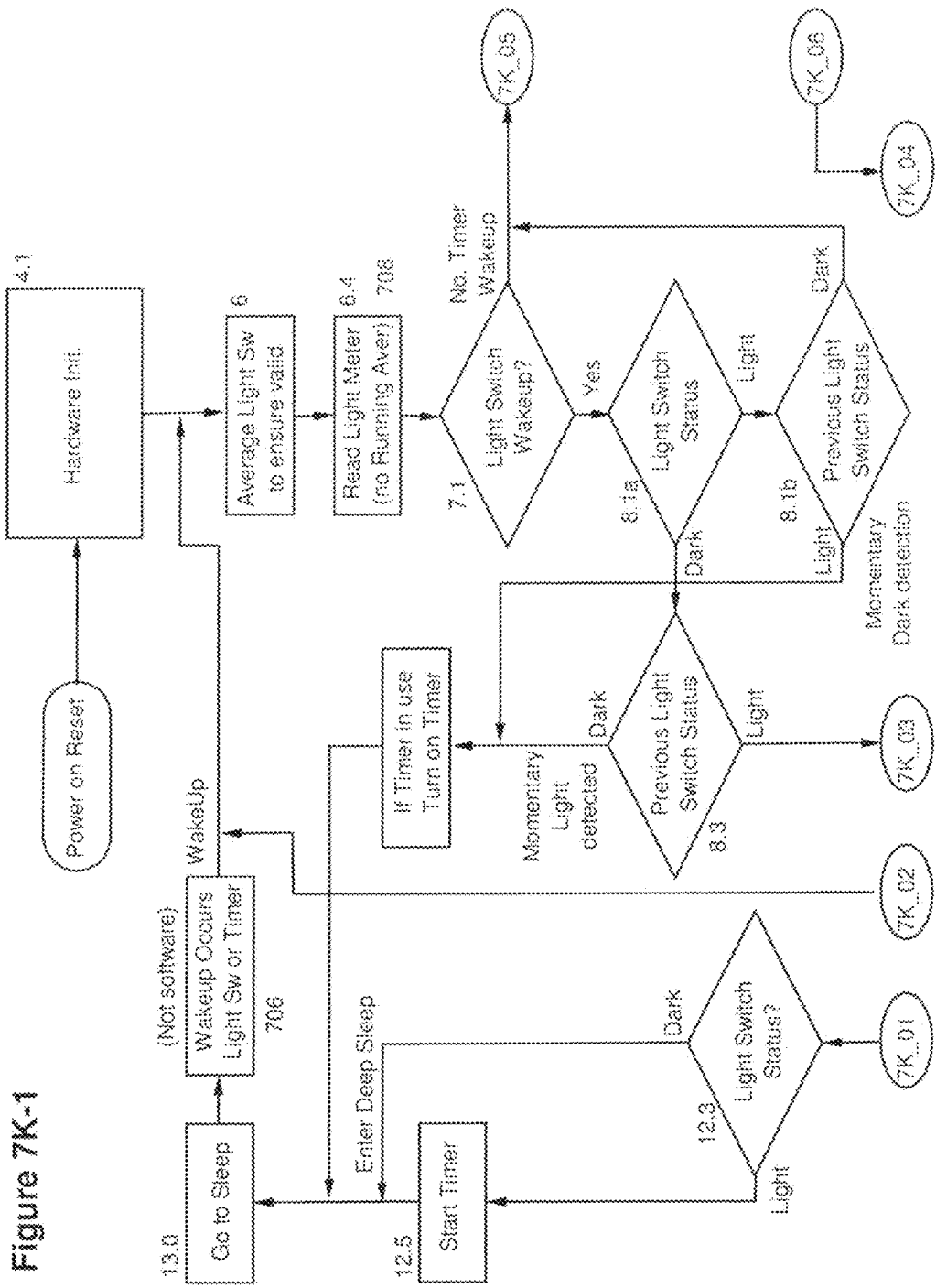
FIG. 7K is a software flow diagram for the microprocessor in another embodiment of the club tag.
Figures 2, 7K:
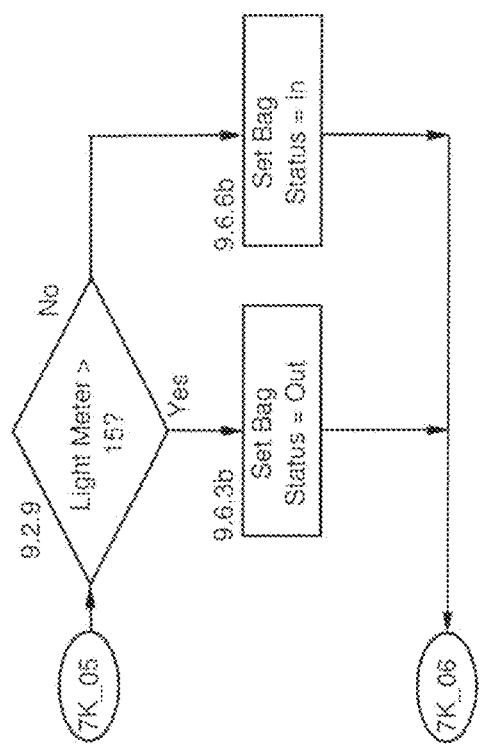

The flow charts shown in FIGS. 7E and 7K are other embodiments optimized for the configuration of tag shown in FIG. 4B; this tag has an opening in the top so that light enters through the top only and not through the sides of the tag.

The algorithm is adjusted so that the Dark Average is limited to a value of, for example 10, and the threshold is a fixed value, such as 10, greater than the Dark Average, as shown in FIG. 7E. In this embodiment, the threshold does vary as does the Dark Average, but the Threshold is constrained to be no more than 10 greater than the Dark Average, as shown in block 9.1.3 in FIG. 7E, and the Dark Average is constrained to be a maximum value of 10, as shown in blocks 9.2.8 and 8.4.2e in FIG. 7E. Alternatively, the threshold is a fixed value, such as 15, as shown in block 9.2.9 in FIG. 7K. In these embodiments, the Bright Average is not implemented, and it is not used in the calculation of the Threshold. In some embodiments, there may be a single light sensor.

Club Tag Transmissions

The tag circuit includes a timer in one embodiment (for example, a relaxation oscillator or timing circuit) that pulses every 2 seconds, for example. The timer can be external to the microprocessor and is controlled by the microprocessor. Alternatively, the timer can be internal to the microprocessor.

The microprocessor sets a clock to track the duration of repetitive transmissions. The clock counts the number of transmissions for the in-bag status and prompts the processor to cease transmissions after, for example, one minute of in-bag transmissions. The clock counts the number of transmissions for the out-of-bag status and prompts the processor to cease transmissions after, for example, four minutes of out-of-bag transmissions.

In-Bag: When the tag enters the bag, it transmits multiple times separated by intervals determined by the timer for a predetermined amount of time set by the clock. The multiple transmissions give a confirmation that the club is actually in the bag. After the last transmission, the microcontroller enters a deep sleep mode, unless the light switch still detects light. If the light switch still indicates light inside the bag, then the microcontroller goes into a light sleep mode, waking up at predetermined intervals, such as 2 seconds, to monitor light conditions and to keep updating the Dark Average and Average light meter readings.

Out-of-Bag: When the tag exits the bag, it transmits multiple times separated by intervals determined by the timer for a predetermined amount of time set by the clock. The intervals may be random delays. The multiple transmissions give continued confirmation that the club is out of the bag and guarantee that the message is received if the golfer is out of range and then walks into range. The first transmission can include a random delay between the light changing and the beginning of transmission for collision avoidance with other clubs with tags that are removed from the bag at the same time. After the last transmission, the microcontroller goes into a light sleep mode, waking up at predetermined intervals, such as 2 seconds, to monitor light conditions and to keep updating the Bright Average and Average light meter readings.

The advantage to having a variable threshold is that the system learns what is light and dark in the current environment, which may include varying light levels due to time of day, weather, color or translucency of golf bag. The Bright and Dark Averages are determined by exponential averagers, weighing the most recent readings more heavily than older readings. The variable threshold and the limits on the amount of change (Difference) prevent false in-bag status for significant changes, such as sunlight to shade. The variable threshold and averagers determine status based on outside light levels and operate for various light conditions, such as bright mid-day light and low-light twilight conditions, and for different mechanical configurations of the tag.

One of the functions of the timer is to prompt the processor to do repeated transmissions of the same status information. Another function of the timer is to continually take light meter readings when the light switch is turned on. This guarantees accurate readings when the environment is too light for the light switch to turn off when the tag is actually in the golf bag. Repeated readings that contribute to averager values allow the tag to learn its environment and to make adjustments according to its environment. For example, the inside of an opaque golf bag is darker than the inside of a translucent golf bag. The Dark Average would represent the dark in-bag state of the particular golf bag that is being used.

Club Tag Aesthetics and Housing Design

Figure 8A:
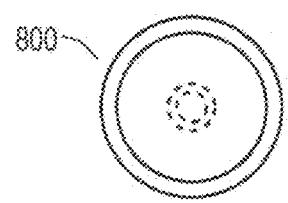
FIG. 8A shows a top view and FIG. 8B shows a side view of one embodiment of the club tag.
Figure 8B:
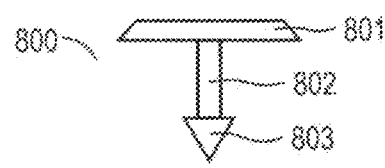

FIGS. 8A and 8B show a typical configuration of a club tag housing. A top portion 801 encases the electronics. A post 802 allows for the club tag to be attached to a golf club through a hole in the golf club grip. A securing feature 803 is included at the end of the post 802 to help prevent the club tag from being easily dislodged from the golf club grip.

Figure 9A:
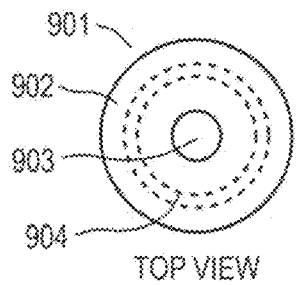
FIGS. 9A and 9B respectively show a top view and a side cross section view of a golf club shaft and grip.
Figure 9B:
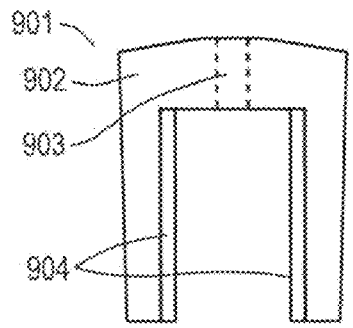

FIGS. 9A and 9B show the top portion of a typical golf club shaft and grip. The grip material 902 is commonly rubber but can be many different materials. The hole 903 at the end of the grip provides ventilation for installation of the grip onto a golf club shaft 904.

It is desirable to provide a system that integrates the golf club tag into the grip portion of the golf club in a way that the tag fits the grip in an optimum way. In one embodiment, inserts designed specifically to receive club tags are included in the golf club grips at the time of manufacture, as shown in FIGS. 12A, 12B, 15F and 15G. In other embodiments, golf club grips are manufactured with openings or voids designed to receive club tags, as shown in FIGS. 16A, 16B, 16C, 17A, 17B, 17C, and 18A-18D. In other embodiments club tags are embedded in the grip at the time of manufacture.

Figure 10A:
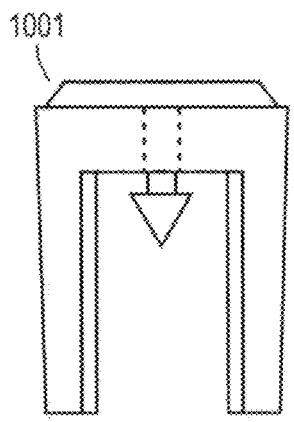
FIG. 10A shows a side view cross section of a golf club shaft and a golf club grip with a flat top with a club tag attached to the golf club grip.
Figure 10B:
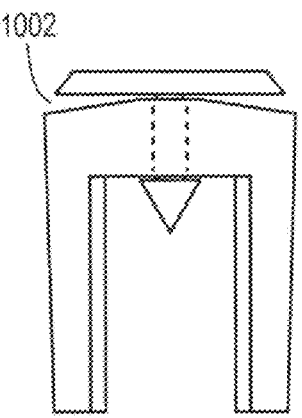
FIG. 10B is a side view cross section of a golf club shaft and a golf club grip with a dome-shaped top with a club tag attached to the golf club grip and FIG. 10C is a side view cross section of a golf club shaft and a golf club grip with a dome-shaped top and a club tag filler gasket with a club tag attached to the golf club grip.
Figure 10C:
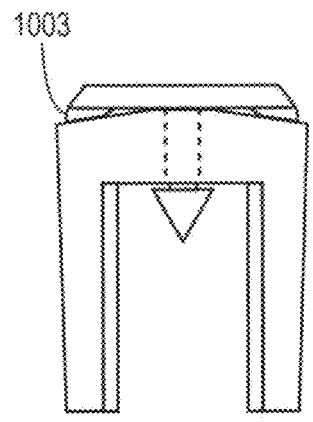
Figure 11A:
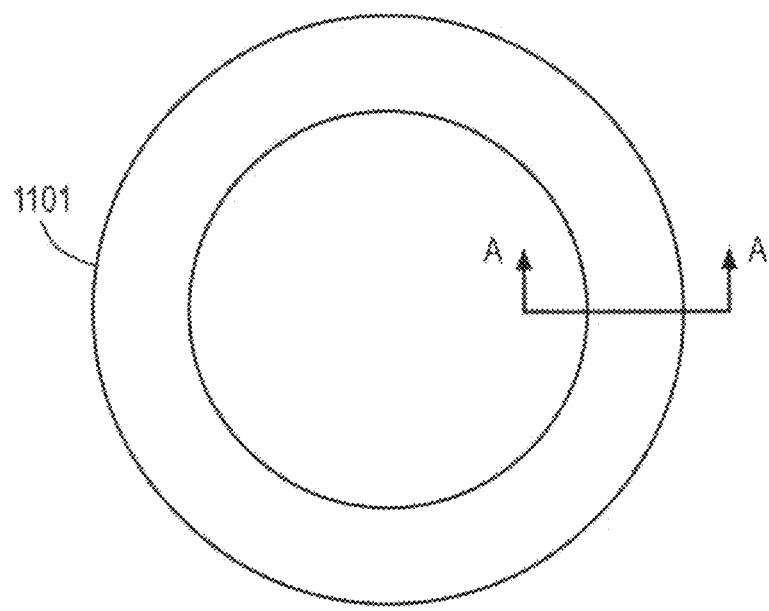
FIG. 11A shows a top view and FIG. 11C shows a cross-section view of one embodiment of a club tag filler gasket.
Figure 11C:
Figure 11B:
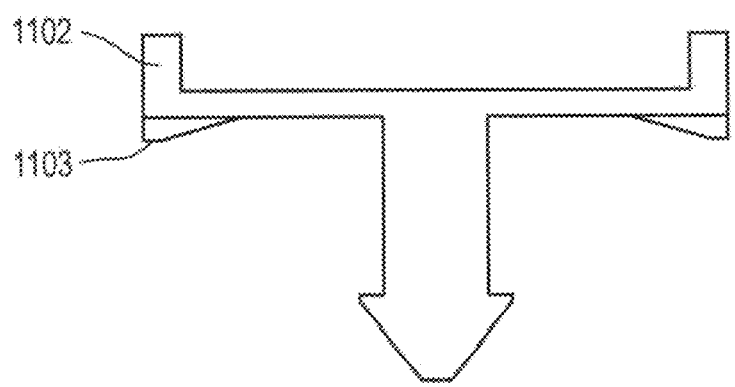
FIG. 11B shows a side view cross section of one embodiment of a club tag filler gasket attached to one embodiment of a club tag.

As shown in FIGS. 10A, 10B, and 10C, golf club grips come in many configurations. Some grips have flat tops 1001 and some have dome shaped tops 1002. In one preferred embodiment, the club tag has a flat underside that connects to the golf grip. For a golf grip with a flat top, the club tag would rest flat against the top of the grip 1001. For a golf club grip with a domed top, the club tag would rest against the top of the dome and there would be space between the outer edges of the club tag and the grip 1002. A club tag gasket 1003 can be inserted between the club tag and the grip to fill in the space. One embodiment of a club gasket is shown in FIGS. 11A, 11B, and 11C. FIG. 11A shows a top view and FIG. 11C shows a section view of a club tag gasket 1101. As shown is FIG. 11B, the gasket 1103 can be attached to the underside the club tag 1102 to fill the space created by a domed grip. This gasket 1103 would eliminate movement or vibration caused by the space and would also be more aesthetically pleasing. It could be attached using adhesive such as double sided pressure-sensitive adhesive or it could be held in place by the pressure between the club tag and golf club grip. One embodiment of the gasket is shown in FIG. 11C as a cross section taken at FIG. 11A, Section AA. The gasket is thicker at the outside edge to fill in the gap. Alternatively, the gasket could be made of compressible material of the same thickness, such that the gasket is compressed at the inner diameter and not compressed at the outer edge.

Figure 18A:
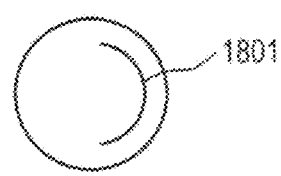
FIG. 18A is a top view of a golf club grip with a slit in it designed to receive a club tag.
Figure 18B:
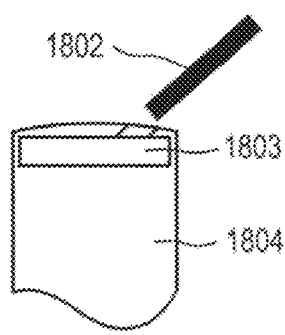
FIG. 18B is a side view cross section of a club tag and a golf grip designed to receive the club tag through an opening in the golf grip.
Figure 18C:
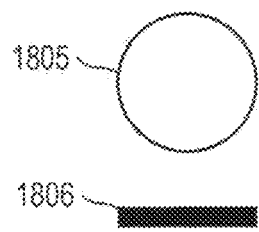
FIG. 18C shows a top view and side view of one embodiment of a club tag.
Figure 18D:
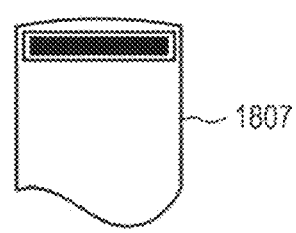
FIG. 18D is a side view cross section of a club tag inside a golf grip designed to receive the club tag through an opening in the golf grip.

Golf club grips can be manufactured with features designed specifically to receive club tags. A golf club grip 1701 can be manufactured to accept the club tag as shown in FIGS. 16A, 16B, 16C, 17A, 17B, and 17C. The grip could include an indentation 1601 in the top of the grip designed to hold the club tag 1602. In this example the club tag could be attached such that the top portion of the club tag could still allow light to enter the tag from the sides (if a side light pipe is used). Optionally, the grip could include a "plug" to fill the area intended to receive a club tag until such time the golfer removes the plug and attached the club tag. The plug could be designed to look substantially like a standard golf club grip. The plug could include logos, etc. Alternatively the grip could include a similar indentation 1702 to hold a club tag or club tag electronics 1703 configured with no plastic housing or partial plastic housing. A separate cover 1704 can be used to seal the club tag 1703 into place. In these embodiments translucent grip material can be used selectively to allow light to reach the light sensors on the club tag electronics. Another embodiment of a manufactured golf club grip is shown in FIG. 18A. The grip 1804 is manufactured with an internal slot 1803 accessed by an external cutout 1801. The club tag 1802 is provided as a self-contained disk 1805 and 1806 as shown in FIG. 18C. The disk 1802 slides into the grip as shown in FIG. 18B and is seated in the grip 1807 as shown in FIG. 18D. In this configuration clear grip material could also be used to allow light to reach the club tag electronics.

Figure 12A:
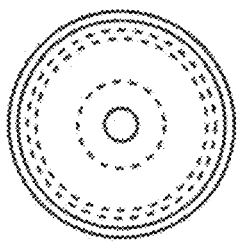
FIG. 12A shows a top view and FIG. 12B shows a side view of one embodiment of an insert designed to be attached to a golf club grip and designed to receive a club tag.
Figure 12B:
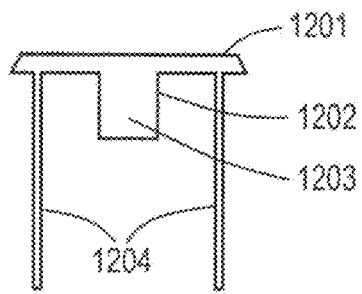

Golf club grips can be manufactured with inserts designed specifically to receive club tags as shown in FIGS. 12A, 12B, 13A, 13B, 14, and 15F and 15G. FIGS. 12A and 12B show an example of a golf club grip insert designed to receive a club tag. The insert can be designed to fit the shape of the club tag. For example, the grip, as shown in FIG. 12B, has a flat top part 1201 designed to receive a club tag with a flat bottom part. The shapes can vary—the idea is to have a custom fitting system where the club tag fits well with the golf club grip insert. The insert could have a feature 1202 with a hole 1203 designed to serve as both a vent to allow proper installation of golf club grips onto golf club shafts and as a means to attach the club tag to the grip insert. Club tags could be designed with features for mating to the golf club grip insert, as shown in FIGS. 15A through 15E. For example, the club tag post could have threads or other features designed to attach the club tag snugly to the grip insert. The club tag insert could have "legs" 1204 designed to be molded into the grip during the grip manufacturing process. The legs 1204 could have holes or teeth such that the grip rubber surrounds and attaches itself to the golf club grip insert securely.

Figure 13A:
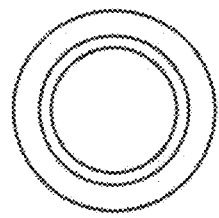
FIG. 13A shows a top view and FIG. 13B shows a side view cross section of a golf club shaft and golf club grip with the top removed.
Figure 13B:
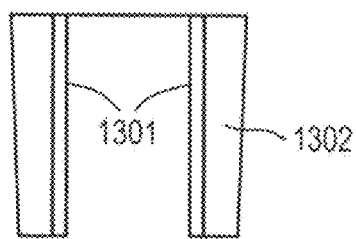
Figure 14:
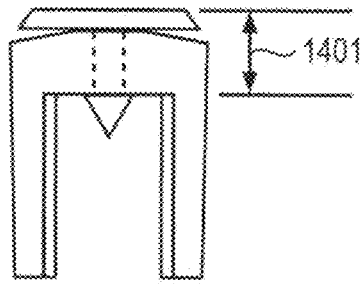
FIG. 14 shows a side view cross section of a golf club shaft and golf club grip with a club tag attached and highlights the increase in height to the top of the grip when a club tag is attached.
Figure 15F:
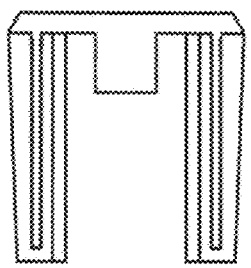
FIGS. 15F and 15G show two side views of a golf club shaft and a golf club grip with an insert designed to receive a club tag attached to the golf club grip.
Figure 15G:
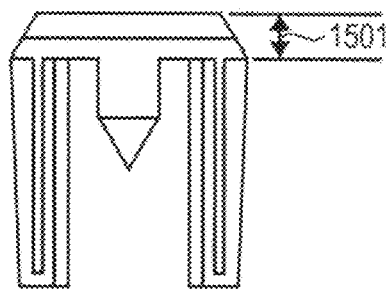
Figure 17A:
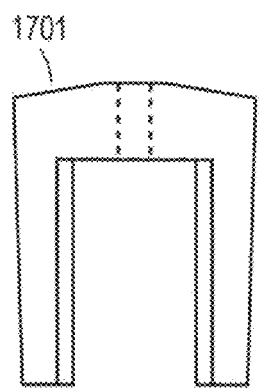
FIGS. 17A, 17B and 17C show three side view cross sections of a golf club shaft and golf club grip with the golf club grip molded with a recess designed to receive either a club tag printed circuit board assembly or a club tag and a cover piece designed to attach over the club tag.
Figure 17B:
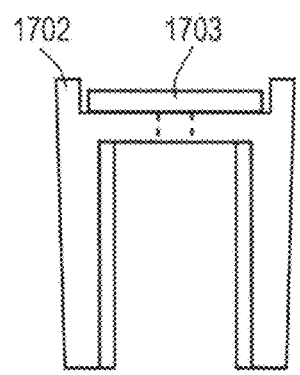
Figure 17C:
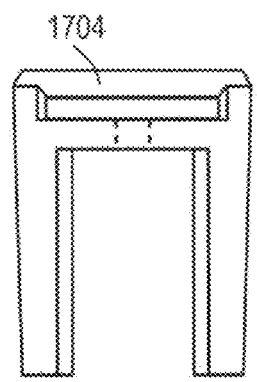

FIGS. 13A and 13B show the top portion of a golf club shaft 1301 and grip material 1302 with the top of the grip material only extending as high as the top of the golf club shaft (not how grips are made now). In one embodiment, the golf grip insert would become the top of the grip after being attached to the grip in the grip manufacturing process as shown in FIG. 15G. FIG. 14 highlights the profile 1401 of a standard dome-shaped grip with a club tag attached. The profile is tall compared to profile 1501 shown in FIG. 15G. Profile 1501 shows how a golf club grip insert with a club tag attached could have a lower profile, more aesthetically pleasing appearance.

Club Tag Antenna Configuration Options

Figure 19A:
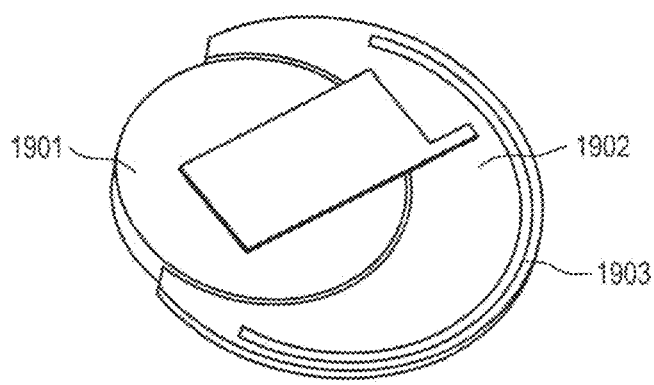
FIGS. 19A-19D show various views of a club tag printed circuit board assembly with various antenna designs.

There are several configurations for the antenna on the tag. One option is to print the antenna as a metal trace on the printed circuit board 1902 as shown in FIG. 19A. A battery 1901 can be disposed under the board 1902, and the battery 1901 can be coupled, through circuit traces on board 1902, to one or more ICs (integrated circuits) that form the circuitry of the tag (see, for example, the circuit of FIG. 6A). The ideal length for this trace, based on one-quarter the wavelength of the transmit frequency, may be considerably longer than the space available. The antenna trace is considered an inductor and a parallel capacitor is selected to resonate with the antenna inductance at the selected transmit frequency, such as 433 MHz. Other transmit frequencies such as 2.4 GHz would use an antenna closer in length to one-quarter the wavelength and would be tuned with discrete components. The antenna trace could be in the form of an arc 1903, as shown in FIG. 19A. It could also be in other forms, such as a rectangle or coil, to best fit in the configuration of the printed circuit board. Another option is to print the antenna as a metal trace on both sides of the printed circuit board with the two traces exactly opposite each other. The traces 1909 are then connected by vias 1907 through the printed circuit board as shown in FIG. 19D. An opening 1908 (shown in FIG. 19D) can provide light to a sensor (e.g. light sensor 1905) located under the board 1902.

Figure 19B:
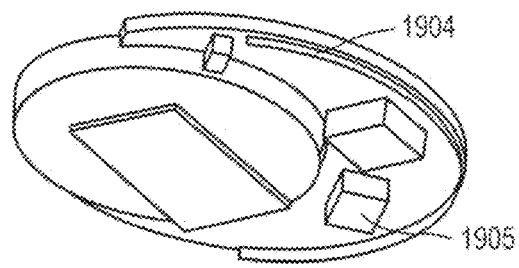

Another configuration for the antenna is to add a metal piece 1904 in the shape of the trace on top of the antenna trace on the printed circuit board as shown in FIG. 19B.

Figure 19C:
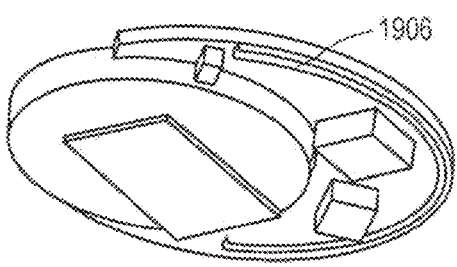
Figure 19D:
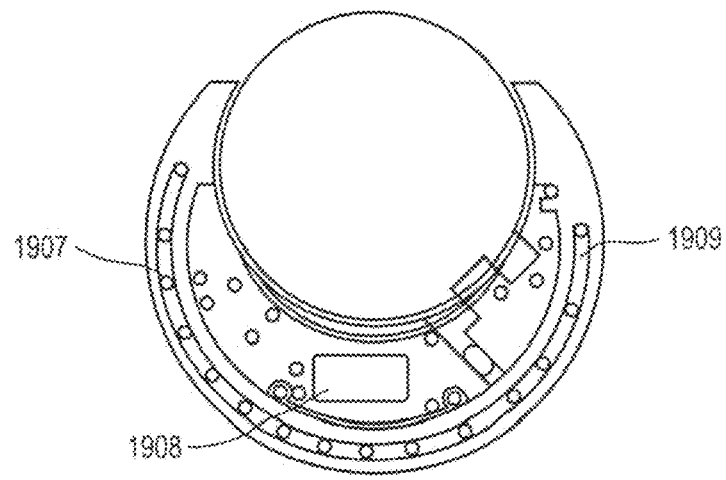

Alternatively, as shown in FIG. 19C, this metal piece 1906 may be spaced above the printed circuit board with or without an antenna trace on the printed circuit board. Spacing the antenna above the printed circuit board without a printed antenna trace offers more room for components to be installed under the antenna, possibly reducing the size of the printed circuit board and the overall size of the tag.

Figure 20:
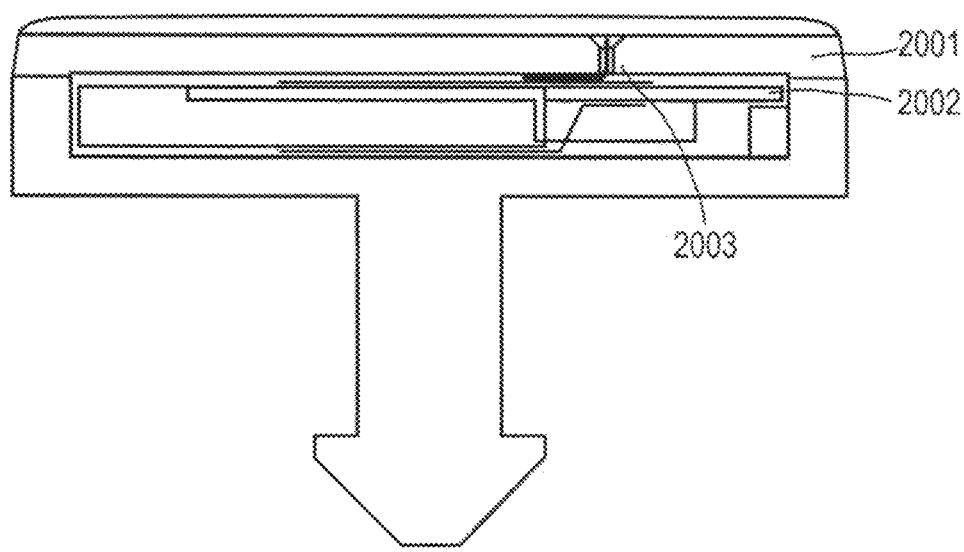
FIG. 20 is a side view cross section of a club tag designed with the antenna on top of the light pipe and connected to the printed circuit board with a conductive material.

Other antenna techniques include applying metallization to the cover of the tag to enhance antenna performance. The metallization could be applied to the entire surface of the tag or selectively applied. The metallic surface is connected to the printed circuit board 2002 with a wire extending through the feature, such as a countersink or hole 2003 as shown in FIG. 20, that focuses light that enters the tag. This wire attaches to the metallization and to the transmitter output on the printed circuit board. The metallization can be applied to the top surface of the clear light pipe part 2001 and serves as a reflector for the light that enters the tag. The metallization can be on the top surface of the light focusing feature as well. A light pipe with metalized surfaces could also provide improved durability of the tag.

Some of the options for selective metallization on the cover of the tag include creating various shapes of the metalized antenna in the cover. These shapes could include an arc, a circle, or a coil, for example.

Figure 21:
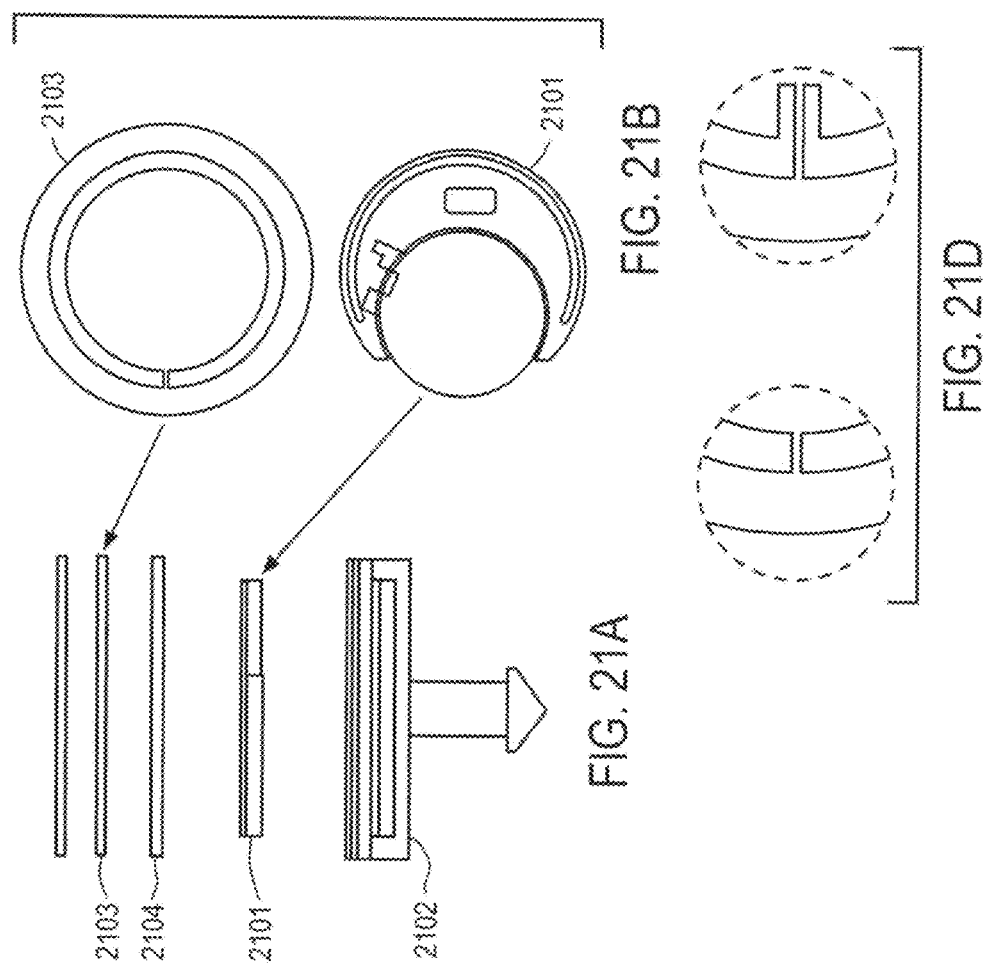
FIG. 21A is a side view cross section of a club tag, showing the printed circuit board and metallized antenna board.
FIG. 21B is a top view of a club tag printed circuit board and the metalized antenna board.
FIG. 21C is a top view of an alternate metalized antenna board.
FIG. 21D is a top view detail of the gap in the metalized antenna board.

Another antenna technique to enhance antenna performance is to apply metallization to the cover of the tag such that the metallization is not connected to the printed circuit board. The metallization can be the same shape as the printed trace on the printed circuit board, but it is positioned above the trace on the board. In this way the metallization acts to enhance the signal without a physical electrical connection. FIGS. 21A, 21B, and 21C show some embodiments of this technique. FIG. 21A shows a cross-section side and exploded view of the club tag with its various components. The main printed circuit board 2101 mounts in the housing 2102. The metalized antenna board 2103 mounts above and spaced away from the main printed circuit board. The light pipe 2104 is located between the main printed circuit board 2101 and the metallized antenna printed circuit board 2103. The light pipe creates consistent fixed spacing between the two printed circuit boards. The two antennas, the antenna on the main printed circuit board 2101 and the antenna on the metallized antenna printed circuit board 2103, are inductively coupled. The light pipe 2104 creates the fixed physical spacing between the two antennas.

In one embodiment in FIG. 21B, the metallization can be a full circle with a gap. This gap can act as a capacitor that tunes the circuit to the same frequency as the tag. The capacitance can depend on the spacing of the gap. Alternatively, as shown in FIG. 21C, the gap can be constructed such that there are two metallic stubs next to each other acting as the parallel plates of a capacitor. FIG. 21D shows the gap in detail. Alternatively, a small chip capacitor can be soldered to the metallization across the gap.

System Automation Options
Club Icon on Golf Device, Golfer Presses Button to Mark-the-Spot There are several embodiments of the data collection system. In one embodiment, the golfer removes a club from the golf bag for the golf stroke, the tag transmits that it is out of the bag (the transmission can include an identifier of the particular club), and the golf club number or description appears on the display of the golf GPS device. The golfer pushes a button on the golf GPS device to mark the spot and record which club is in use for the stroke. If a golfer removes several clubs from the bag before deciding which club to use, all of these clubs would appear on the display of the GPS device. When the golfer pushes a button to mark the spot, the golf GPS device prompts the golfer to select which club will be used out of the several that are reported out of the bag by their corresponding tags. One technique to select which club is in use is that the golf GPS device would highlight the "middle" club as a default. That is, if the golfer removes the 5, 6, and 7 irons from the bag, the golf GPS device would highlight the 6 iron as the default and the golfer can select that one or scroll up or down to select one of the other clubs.

Multiple Clubs Out, Golf Device Selects Closest Club (Signal Strength)

It is desirable to limit the amount of information the golfer has to enter into the golf GPS device. In the described embodiment, the golfer has to push a button to mark the spot at each stroke. If more than one club is out of the bag, the golfer has to select which club is in use. One technique for automatically selecting the club in use is to use receiver signal strength in the receiver in the golf GPS device. The golf GPS device is often worn on the golfer. When the golfer has a club in hand, that particular club is closest to the GPS device and will provide the strongest signal. By selecting the club with the strongest signal or a signal above a predetermined threshold, the GPS device can display that this is the club in use.

Sequence of Events at Same Geo-Location, Signal Strength

Additional techniques can be used to automate the system further. The golf GPS device could use intelligence, such as length of time at particular GPS location, to determine when to mark the spot automatically. A sequence of events could be required, such as: 1) removing the club(s) from the bag, 2) being in one spot for longer than a period of time, for example 2 minutes. If there are several clubs out and one is in use, the club in use will have the strongest received signal, or a signal strength above a predetermined threshold. If the sequence and conditions described above are met, the system would automatically record the current position and club in use. Similarly if only one club is out of the bag, and the golfer is in the spot for longer than a predetermined amount of time, the system would record position and club in response to expiration of the predetermined amount of time.

Using Motion to Determine if a Club is in Use

Another embodiment is described that uses techniques to determine if a club is in use by determining if the club is in motion. In some scenarios, a golfer removes several clubs from the golf bag, so that he or she can decide on which club to use at a later time. The golfer may have several clubs out for consecutive shots, for example, a pitching wedge is used for one stroke followed by a putter used for the subsequent stroke(s). The system would register that there are one or more clubs out of the bag. Determining which club is the actual club in use is valuable information and may be used to automate the golf data collection system. If several clubs are out, the system can use the detected motion of the club, combined with other information if necessary, to automatically select which club is in use for the shot. The following are techniques that determine if a club is in motion or not in motion.

Light Meter Variations to Determine Club in Motion, Pattern of Motion, Geo-Location One technique uses variations in light meter readings to determine when a golf club is in motion. In a typical embodiment, light meter readings are recorded every two seconds as previously described to determine if a club is in or out of a bag. While the club is still, a series of light meter readings, particularly over a short period of time, such as less than 10 or 20 seconds, do not change significantly; that is, the same or similar light meter readings are recorded repeatedly. Scenarios in which the club is still might include: the golfer or a caddie standing still with club in hand, or the club is on the ground. When the club is in motion, the light meter readings vary. Scenarios in which a club is moving might include: the golfer or a caddie walking with the club, moving the club while waiting to start a stroke, practice swings, and real swings. When the golfer is taking a swing, the light meter variations will be significant and follow a typical pattern. Typically during a swing, the club tag is in light; then it is shadowed as the club is just next to the golfer while setting up the swing; then it is exposed to increased light levels as the club is swung and is out of the shadow of the golfer. In one embodiment, this particular pattern of variations in light meter readings can be used to define a stroke. For a stroke, the golfer typically takes practice swings in advance of the actual stroke. In one embodiment, the golf device recognizes that there are a series of swings in the same geo-location, and selects the last of these swings as the actual stroke and records that club as the club in use.

Multiple Clubs Out, One Club in Motion

In an alternate embodiment, the golf device recognizes one or more clubs out of the bag. It also recognizes that one or more clubs are not in motion and that one club is in motion. The club in motion is selected as the club in use.

The method shown in FIG. 7I provides an example of how a mobile golf device, such as a golf GPS rangefinder, can use motion status information from a plurality of golf club tags to determine which of several golf clubs that have been pulled out of the bag is in use based upon the motion status information from a plurality of golf club tags. This can occur when a golfer removes several clubs at the same time from a golf bag; for example, a golfer can decide to pull out two or three golf clubs at once, laying down one or two of them while using the third. A golfer can decide to set the one club down and pick up another club off the ground. The method according to the flow chart shown in FIG. 7I allows a mobile golf device to receive the several out-of-bag status signals from the different golf clubs that have been removed from the golf bag and still determine which golf club out of that group of golf clubs is actually in use. The method can begin in operation 810 in which an RF receiver in a mobile golf device, such as a golf GPS rangefinder, receives the plurality of out-of-bag status indicators, with corresponding club identifiers, from a corresponding plurality of active golf club tags, such as the tags shown in FIG. 5. Then in operation 812, the RF receiver receives, for each of the golf clubs having an out-of-bag status, at least one of the club's motion status or measurements from which the motion status can be determined. These motion statuses and measurements have been described herein. Then in operation 813, the mobile golf device processes the motion statuses or the measurements from which the motion statuses can be determined, to determine which club is in use. When the system determines that a golf ball has been hit, then the mobile golf device can record a stroke in operation 815. The recording of the stroke can happen semi-automatically when a golfer presses a button on, for example, a golf club to record the stroke, or automatically in response to an active ball tag in a ball indicating a hit by a golf club has occurred to the golf ball to cause the stroke to be recorded. When the mobile device records the stroke it indicates the club used based upon the club which was determined to be used after processing the motion statuses in operation 813. Alternatively, the recording of the stroke may occur based on the motion of the last club used in conjunction with a geo-location. For example, the golfer may be at a particular geo-location for at least a predetermined amount of time, and several clubs are out of the bag. The golfer may take practice swings with one or more clubs, then decide on which club to use. The last club in motion at that particular geo-location (while at least one other club is not in motion) is selected as the club in use, and the golf device records the stroke.

Motion Status Determined by Light Meter Variations

A specific embodiment will now be described, in conjunction with FIG. 7G, as an example of a method of the present invention. Referring to the Flow Diagram in FIG. 7G, the processing of in-bag and out-of-bag status is implemented as previously described in other embodiments based on the one or more light sensors. Using the same data from these light sensors, an additional status, Motion Status, is implemented, which indicates if a club is in motion or not in motion (still). The Motion Status is determined by a series of light meter readings (such as, repeatedly taken light measurements every 2 or 3 seconds or some other short period of time) and the value of Difference, which is the difference between the current light meter reading and the previous light meter reading, as shown in blocks 9.6.4d and 9.6.1d. In this way, variations in light meter readings will be represented by the Difference value. Typically when the golf club is in motion during a golf swing, there is a large variation in light meter readings. The series of Difference values is evaluated to determine continued motion, that is continued variation in light meter readings; or to determine continued non-motion or stillness, that is continued non-variation in light meter readings. In this embodiment, two subsequent decisions that a club is in motion or not in motion are required. This eliminates errored motion decisions based on a momentary fluctuation in light level. When it is determined that a change in motion has occurred, from in-motion to not in-motion (still) or from not in-motion (still) to in-motion, the processor prompts the transmitter to transmit the new motion status. This transmission may include one or more of the unique identifier of the tag, the motion status, the in-bag or out-of golf bag status, the current light meter reading, the difference value and other data characterizing the motion of the club.

A typical embodiment of an algorithm that uses variations in light meter readings to determine motion of a club is illustrated in the flowchart in FIG. 7G. An embodiment of an algorithm previously described to determine the in- or out-of bag status is performed. In addition, the Difference value is used to determine motion status of the club. When the club is out of the bag, following the flow chart in FIG. 7G through blocks 9.6.4d, 9.6.5e and optionally 9.6.6a, the processor performs steps to determine Motion status. The Difference value represents a variation in light meter readings. When the Difference value is greater than 2, in this embodiment, it is determined that the club may be in motion. Following the flowchart through blocks 9.7.1, 9.7.2 and optionally 9.7.3, a value for New Activity is assigned as follows. The Difference value represents the variation in 2 light meter readings, or the difference between the current light meter reading and the previous light meter reading, as shown in block 9.6.4d. If the Difference value is greater than 2, the New Activity value is assigned +1; if the difference value is less than or equal to 2, the New Activity value is assigned −1. A New Activity value of +1 indicates that the club is in motion; a value of −1 indicates that a club is not in motion, as shown in blocks 9.7.1 and 9.7.3 in FIG. 7G. A test is performed in block 9.7.6 in FIG. 7G to determine if the Activity has occurred for a number of cycles, for example 2 in this embodiment, of checking light meter readings. The activity may represent motion or non-motion (still). If it is determined that motion has occurred for 2 cycles, the Motion Status is set to 1, or in motion. Similarly, if it is determined that no motion has occurred for 2 cycles, the Motion Status is set to 0, or not in motion. When the Motion Status is set to a value and that value is different than the previous Motion Status value, as shown in block 9.7.8 in FIG. 7G, a transmission of the new status occurs. In this way, a change in motion status, from motion to non-motion OR from non-motion to motion, prompts the processor to cause the transmitter to transmit the new Motion Status. When the club status is in-bag, the Motion Status is not monitored in one embodiment; that is, the Motion Status is only checked when the club is out of the bag in one embodiment. A club that is in the bag would not be a club used for a stroke, so monitoring the motion status is only relevant for a club that is out of the bag.

A specific embodiment will now be described, in conjunction with FIG. 7L, as an example of a method of the present invention. Referring to the Flow Diagram in FIG. 7L, the processing of in-bag and out-of-bag status is implemented as previously described in other embodiments based on the one or more light sensors. Using the same data from these light sensors, an additional status, Motion Status, is implemented, which indicates if a club is in motion or not in motion (still). The Motion Status is determined by a series of light meter readings (such as, repeatedly taken light measurements every 2 or 3 seconds or some other short period of time) and the value of Difference, which is the difference between the current light meter reading and the previous light meter reading, as shown in blocks 9.6.4d and 9.6.1d. In this way, variations in light meter readings will be represented by the Difference value. Typically when the golf club is in motion during a golf swing, there is a large variation in light meter readings. The series of Difference values is evaluated to determine continued motion, that is continued variation in light meter readings; or to determine continued non-motion or stillness, that is continued non-variation in light meter readings. In this embodiment, three subsequent determinations that a club is in motion or not in motion are required to make a decision that a club is in motion or not in motion. This eliminates errored motion decisions based on a momentary fluctuation in light level. When it is decided that a change in motion has occurred based on the three subsequent determinations, from in-motion to not in-motion (still) or from not in-motion (still) to in-motion, the processor prompts the transmitter to transmit the new motion status. This transmission may include one or more of the unique identifier of the tag, the motion status, the in-bag or out-of golf bag status, the current light meter reading, a calculation of the average of difference values and other data characterizing the motion of the club.

Figures 1, 7L:
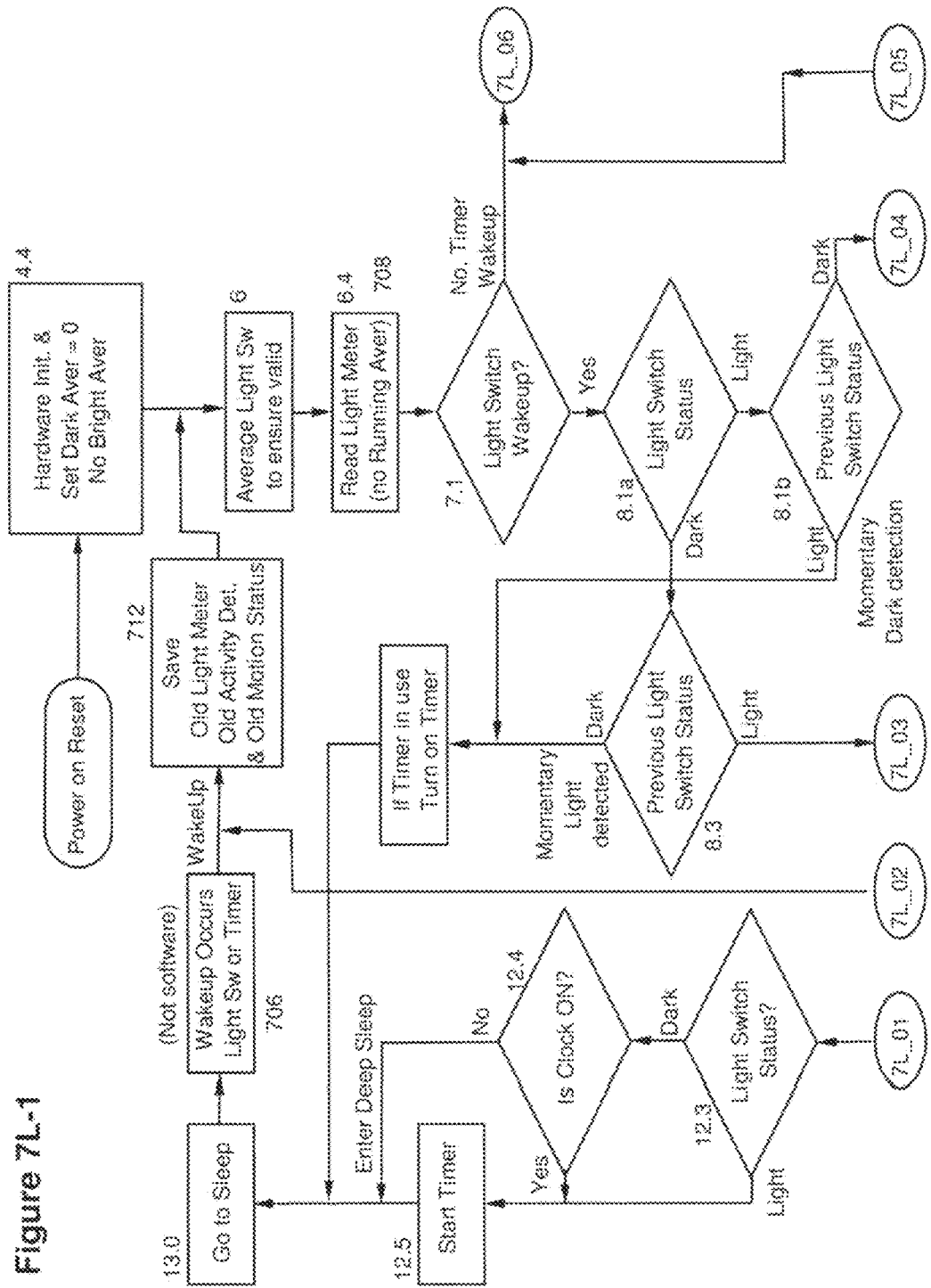
FIG. 7L is a flow diagram for the microprocessor or other processing logic in another embodiment of the club tag that incorporates light variations to determine motion in the club tag.
Figures 2, 7L:
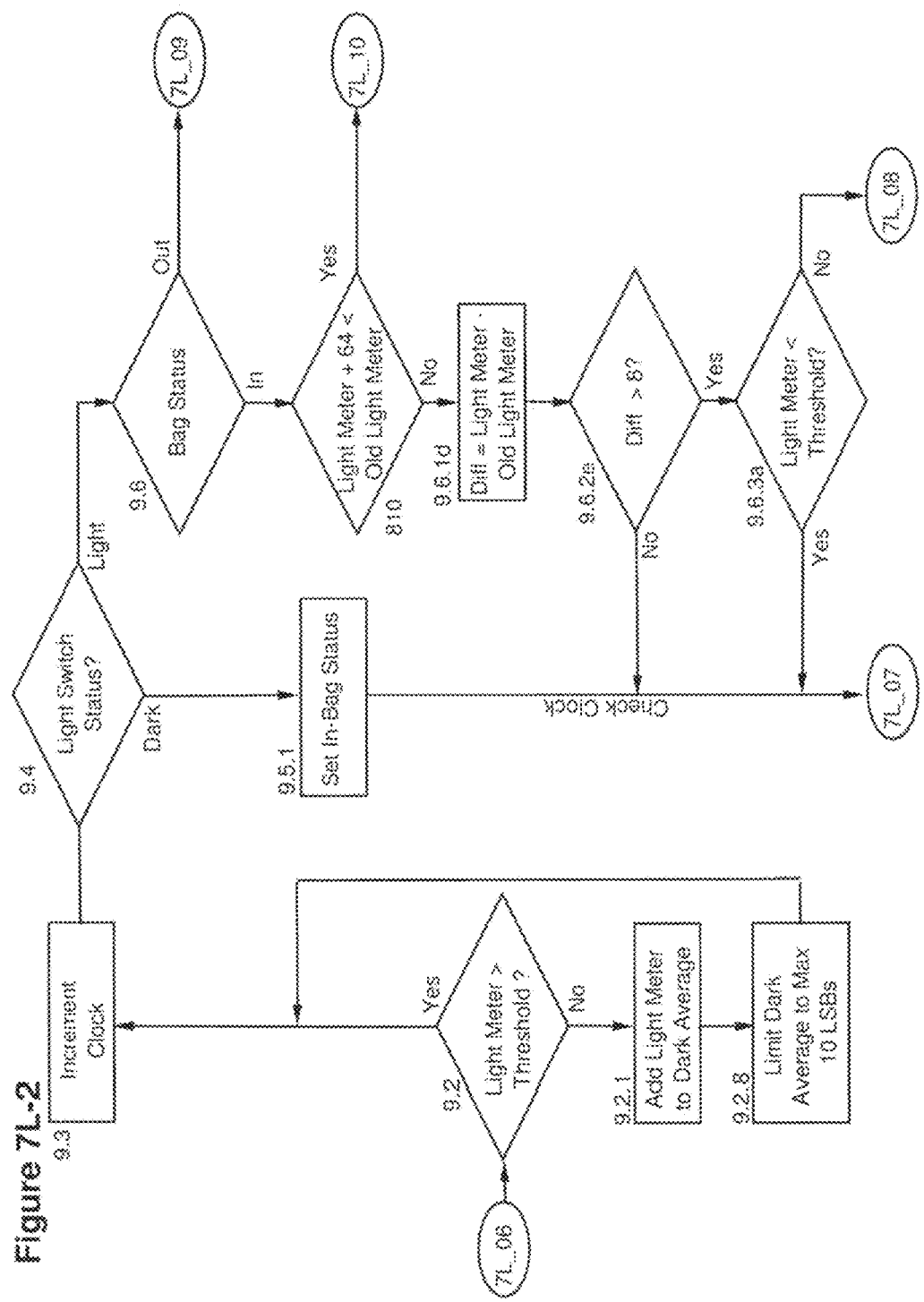
Figures 3, 7L:
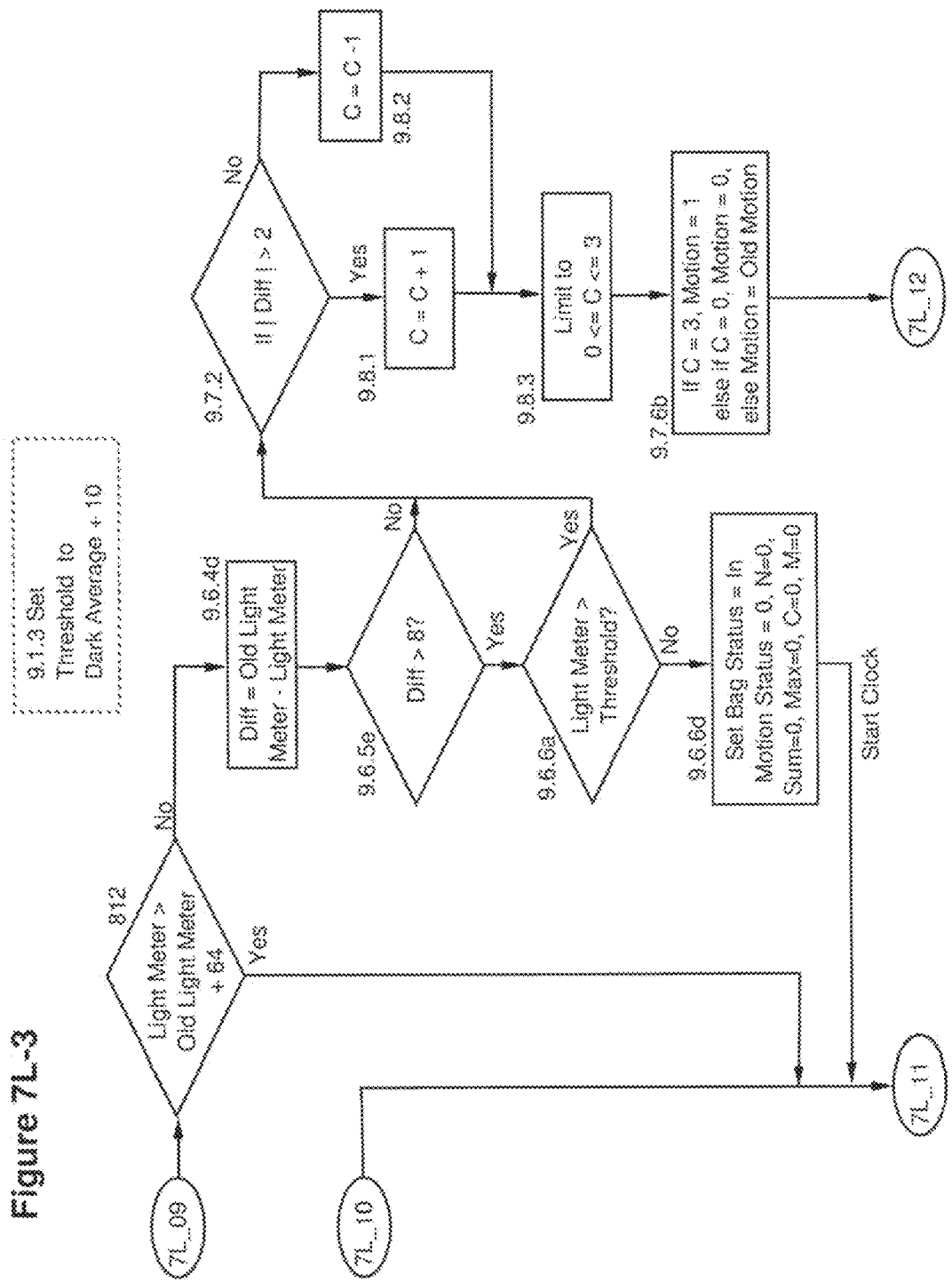
Figures 4, 7L:
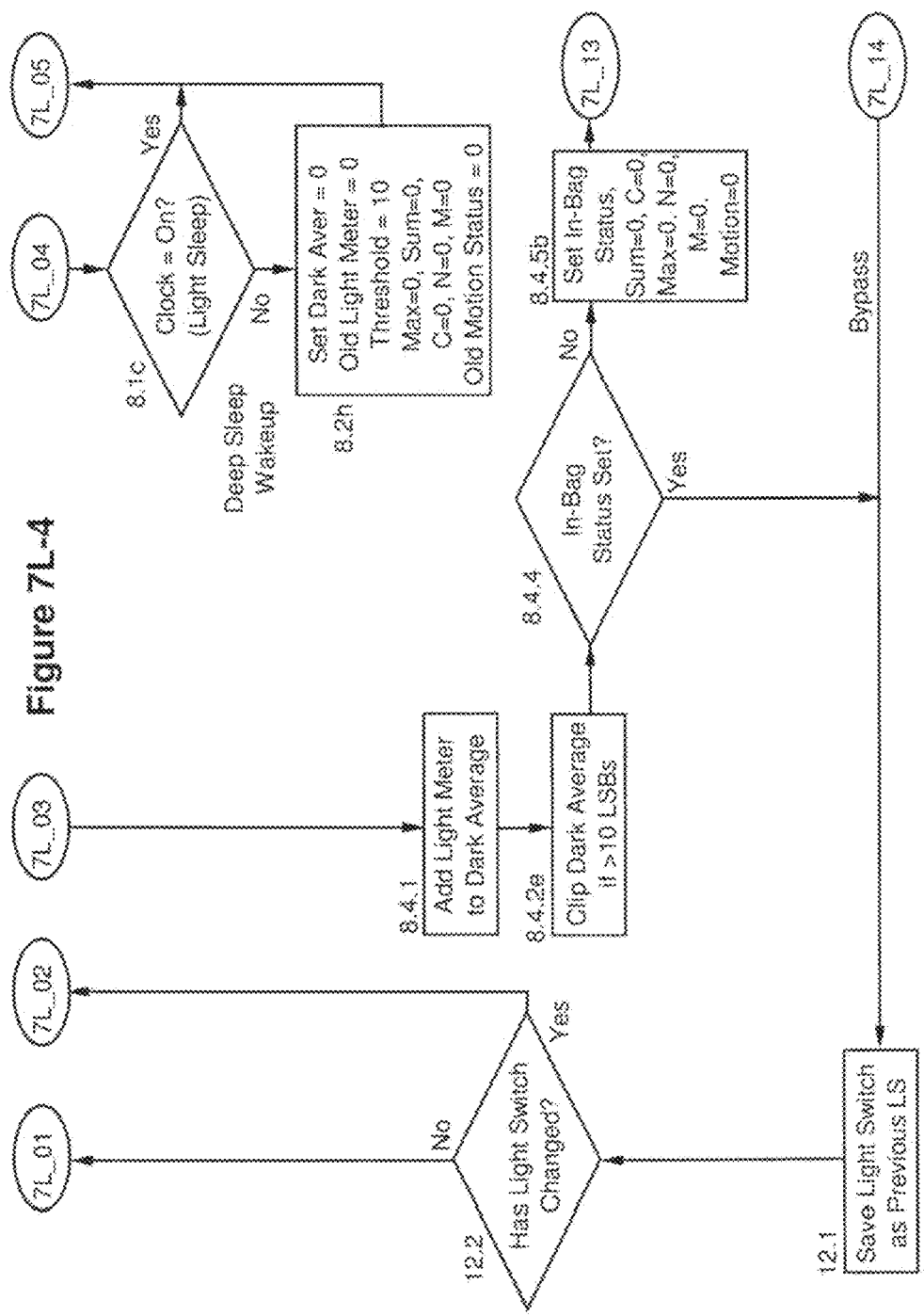
Figures 5, 7L:
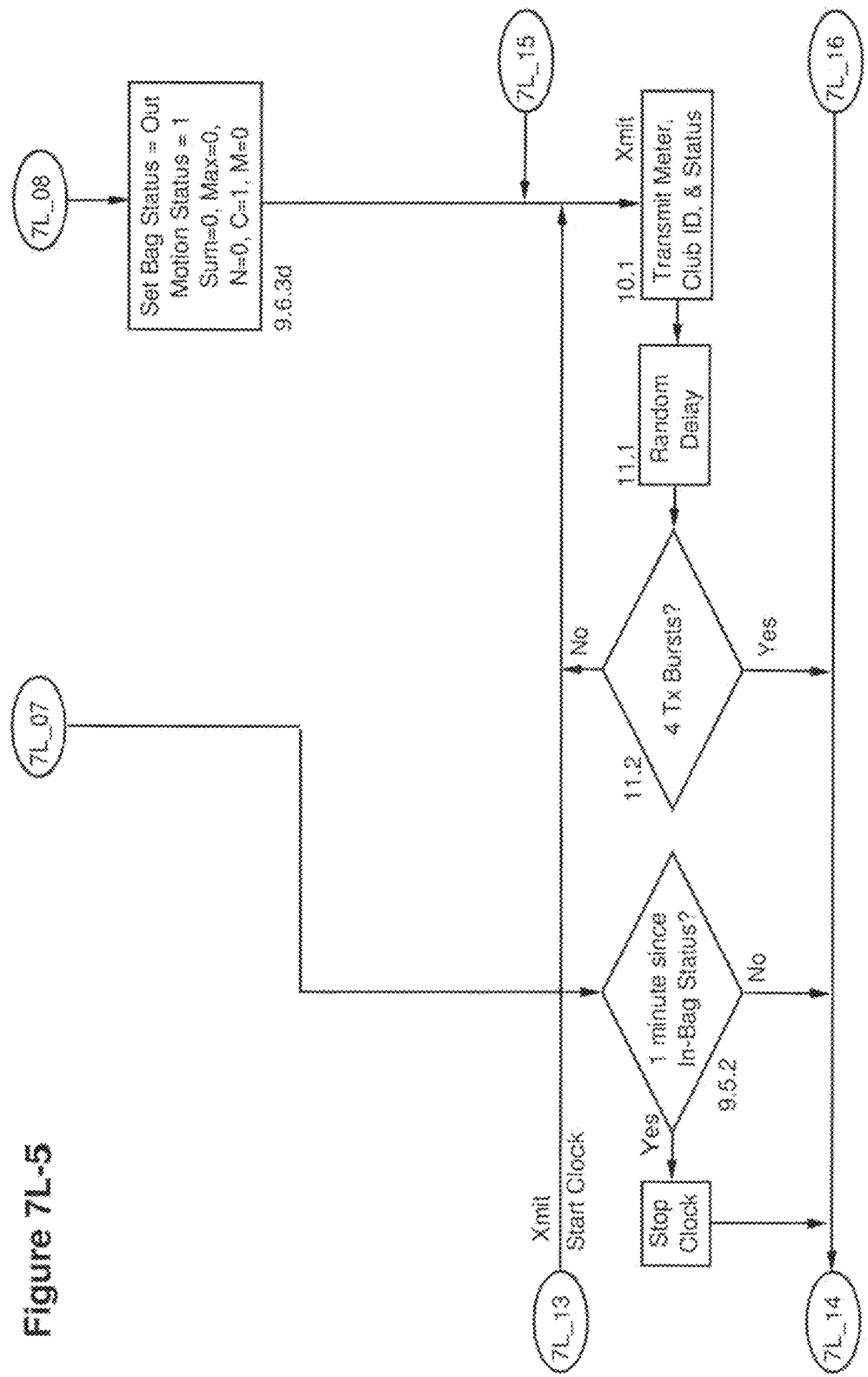
Figures 6, 7L:
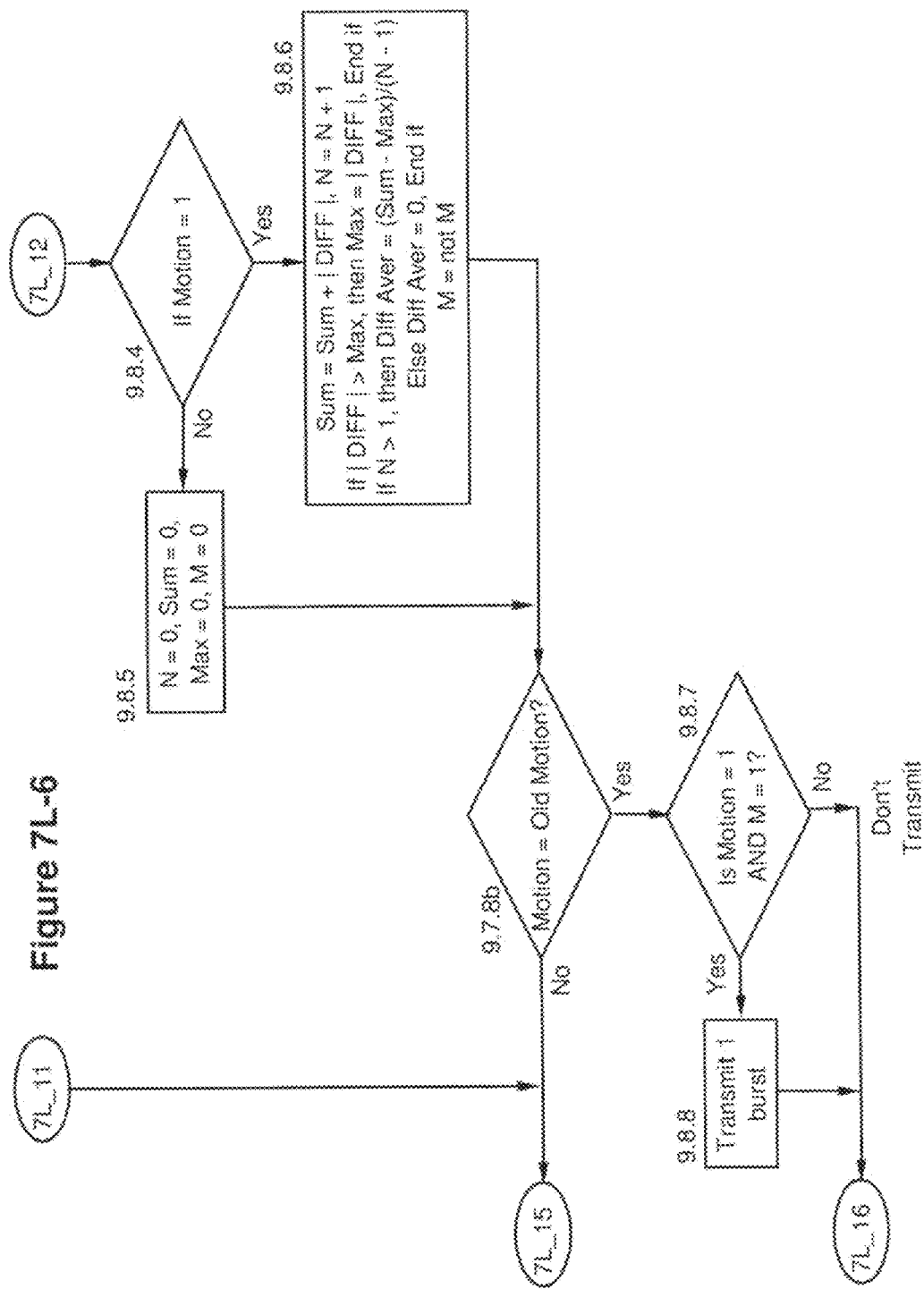

A typical embodiment of an algorithm that uses variations in light meter readings to determine motion of a club is illustrated in the flowchart in FIG. 7L. An embodiment of an algorithm previously described to determine the in- or out-of bag status is performed. In addition, the Difference value is used to determine motion status of the club. When the club is out of the bag, following the flow chart in FIG. 7L through blocks 9.6.4d, 9.6.5e and optionally 9.6.6a, the processor performs steps to determine Motion status. The Difference value represents a variation in light meter readings. When the absolute value of the Difference is greater than specified value, for example, 2 in this embodiment, it is determined that the club may be in motion. Following the flowchart through blocks 9.7.2, a value for activity C is assigned as follows. The absolute value of Difference represents the variation in 2 light meter readings, or the difference between the current light meter reading and the previous light meter reading, as shown in block 9.6.4d. If the absolute value of Difference is greater than 2 in this embodiment, the activity value C is increased by 1; if the difference value is less than or equal to 2, the activity value C is decreased by 1. Increasing the value of C by 1, as shown in block 9.8.1 in FIG. 7L, indicates that the club is in motion for this cycle of light meter reading; decreasing the value of C by 1, as shown in block 9.8.2, indicates that a club is not in motion for this cycle of light meter reading. The value of C is limited to be no greater than 3 and no less than 0, as shown in block 9.8.3. A test is performed in block 9.7.6b in FIG. 7L to determine if the activity has occurred for a number of cycles, for example 3 in this embodiment, of checking light meter readings. The activity may represent a single cycle of motion or non-motion (still). If it is determined that motion has occurred for 3 cycles, the Motion Status is set to 1, or in motion. Similarly, if it is determined that no motion has occurred for 3 cycles, the Motion Status is set to 0, or not in motion. When the Motion Status is set to a value and that value is different than the previous Motion Status value, as shown in block 9.7.8b in FIG. 7L, a transmission of the new status occurs. In this way, a change in motion status, from motion to non-motion OR from non-motion to motion, prompts the processor to cause the transmitter to transmit the new Motion Status. When the Motion Status of a club is 1 or in motion, the processor causes the transmitter to transmit its Motion Status and an updated average of Difference values every 4 seconds in this embodiment as shown in blocks 9.8.7 and 9.8.8. When the club status is in-bag, the Motion Status is not monitored in one embodiment; that is, the Motion Status is only checked when the club is out of the bag. A club that is in the bag would not be a club used for a stroke, so monitoring the motion status is only relevant for a club that is out of the bag.

Degrees of Motion Determined by Light Meter Variation

A further embodiment of a technique using light meter variation to determine if a club is in motion is described. If two or more clubs are out of the bag, it may be possible for more than one club to indicate it is in motion, for example while a club is on the ground in the shadow of a golfer who is taking a stroke or a club may be held by a caddie. The light meter variations will be different for the different scenarios. For example the club held by the golfer while taking a swing will be subject to wider variations in light meter readings, such as in full shadow when the club is adjacent to the body and full light as the club is swung away from the body. The club on the ground would be subject to less range in variations, being on the ground and not in full light. It is desirable to differentiate between these two ranges of light meter variations. This can be done by observing the differences between light meter readings, which is represented in the value Difference. Additionally, the degree of Difference can be represented by a series of values to differentiate between wide variations in light (e.g. high difference values) and lower variations in light (e.g. low difference values). One or more of these values of difference and degree can be included in the data that is transmitted by the tag and received in the golf device, and this data is processed in the golf device to determine which club is subject to a higher range of motion than the other clubs that are out of the bag.

The embodiment as shown in FIG. 7G, demonstrates a technique in which the value for Difference may be evaluated to determine the amount of change in light meter values, and this value may be included in the transmitted data for processing in the golf GPS device. A value Degree can be assigned that would represent the range of values for Difference that would represent the degree of change in the light meter readings, as shown in block 814 in FIG. 7G. For example, a range of Difference values could be assigned as follows: for a Difference of 9 or less, the Degree value would be 0; for a Difference of 10 through 21, a Degree value would be 1; for a Difference of 22 through 32, a Degree value would be 2; and for a Difference of greater than 32, a Degree value would be 3. So the ranges of motion are represented by various values of Degree, with the higher variation in light meter reading assigned a higher value of Degree. The Degree value is transmitted in one embodiment along with other statuses, such as one or more of motion and in- or out-of bag status, to the golf device. In this way, the golf device assesses the amount of motion transmitted by several clubs and determines that the club with the highest degree of motion is the club in use. Alternatively, the Difference value or another set of measurements is transmitted to the golf device, and the device does similar processing of this value. In scenarios in which more than one golf club indicates it is in motion, the golf device would select the club showing a highest degree of motion as the club in use. In one embodiment, the degree value can be a standard deviation or other measure of the amount of variation of the light meter readings over time.

An alternate embodiment of motion sensing is illustrated in FIG. 7F. This embodiment employs light sensing techniques to determine if a club is in the bag or out of the bag as previously described. FIG. 7F illustrates a technique that uses light meter variations to determine if a club is in motion that does not include assigning a Degree value for the range of Difference values of light meter readings. In this embodiment, the transmitter may transmit the value for Difference, and the golf device would process this information to determine which club is in motion when more than one club is out of the bag.

An alternate embodiment of motion sensing is illustrated in FIG. 7L. This embodiment employs light sensing techniques to determine if a club is in the bag or out of the bag as previously described. FIG. 7L illustrates a technique that uses light meter variations to determine if a club is in motion that includes calculating an average value of Difference readings while the club is in motion. As shown in block 9.8.6, the value "Sum" is calculated by summing all of the absolute values of Difference while the club is in motion. An average for Difference values may be calculated by taking the "Sum", then dividing the "Sum" by the number of readings N, which is the number of readings while the club was in motion. In this embodiment, an average for Difference values, "Diff Aver", may be discard the maximum Difference value while the club is in motion, so that the "Diff Aver" is the "Sum" minus the Maximum Difference value over all readings, then divide by the number of readings N minus 1. The transmitter may transmit this value for average of Difference, and the golf device would process this information to determine which club is in motion when more than one club is out of the bag. The processor may also prompt the transmitter to transmit this updated value of average of Difference every 4 seconds, for example, as long as the club continues to be in motion. These updated Difference average values provide information about which club is in motion at a particular time and the extent of the motion. Transmitted information from the club tag can be processed in the golf device to determine whether a golf club is: being swung, laying on the ground, being held in the hand, etc. For example, for a golf club that was swinging, the club tag will typically transmit higher average Difference values than the values transmitted from a club that was lying on the ground.

Figure 45A:
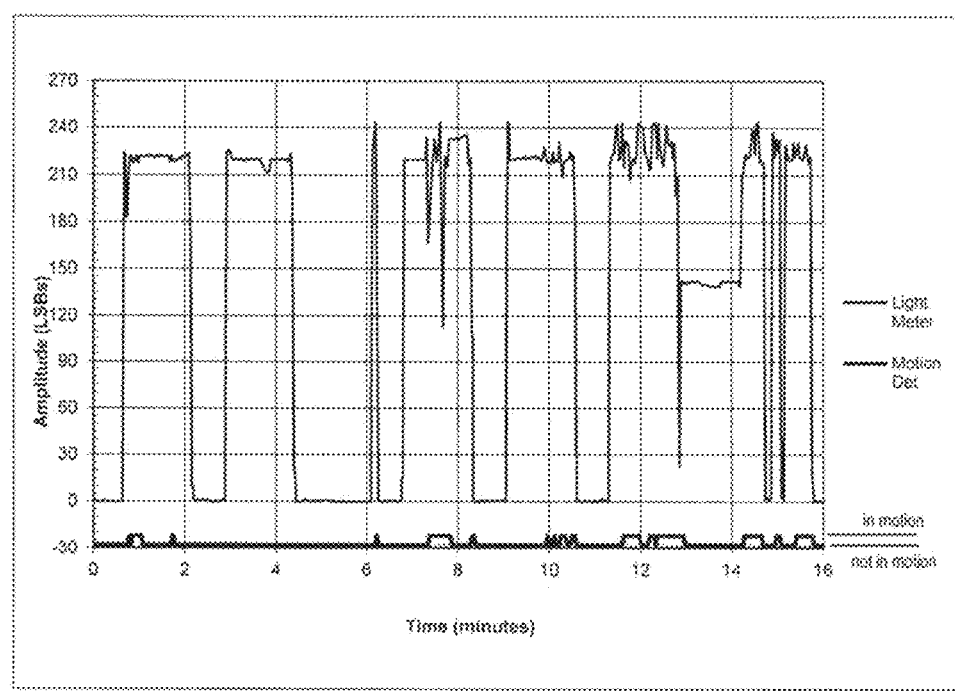

Referring to FIGS. 45A, 45B and 45C, the graphs illustrate the typical response of the algorithm described above and shown in FIG. 7L when a series of typical golf movements is performed as outlined in FIG. 46. The typical golf movements include laying the club on the ground, both in the open and with moving shadows, walking or standing with the club in hand, covering and uncovering the grip end as might happen when the golfer leans on a club, and setting up and swinging the club. While these tests are performed, the recorded readings, calculations and statuses are observed and plotted in FIGS. 45A, 45B, and 45C. FIG. 45A shows light meter readings recorded over time as the tests are performed. As previously described, these light meter readings are recorded every 2 seconds while the club is out of the bag or while the club is in the bag in light sleep. In FIG. 45B, the top line represents the calculated absolute value of the Difference, which is the difference between light meter readings. The bottom line represents the motion status as reported by the algorithm. The top line in FIG. 45C represents the values for the previously described calculated Average Difference that are reported to the golf device. It can be seen that the Average Difference value for the test in which the club is being swung is a higher value than the other test scenarios, such as walking and shadowing the club on the ground.

Filtering Club Tag Transmissions

In one embodiment, the receiving device can filter out club tag transmissions received by the receiving device, based on certain criteria. That is, the receiving device may interpret the received data based on its environment and utilize or not utilize the received data depending on the scenario, thereby filtering the received data. For example, the receiving device can be programmed to "ignore" certain types of received club tag transmissions (such as club status signals) while the receiving device is in "motion". Motion can be defined as "moving more than X miles per hour, etc." and can be calculated using the GPS, accelerometers, pedometer or other sensing devices on board or functionally coupled to the receiving device. In one embodiment, the filtering prevents the processing system from changing a saved club status such as in-bag or out-of-bag or in-motion or not-in-motion. In one embodiment, at least a set of received club status signals, such as in-motion signals, are filtered if they are received while the receiving device is determined to be in-motion (based on a predetermined threshold), and this filtering prevents the processing system, in the receiving device, from changing a previously saved club status (such as club number 5 is NOT in motion) even though the just received signal indicates that the club is in-motion. With this type of filtering, it is possible to add logic to the system. This enables the receiving device to ignore certain types of transmissions that may otherwise provide irrelevant data to the receiver, such as: 1) club tags that temporarily see light and transmit "out-of-bag" due to being jostled in the bag while in motion; and 2) club tags that calculate large differences in light variation over long periods of time and transmit club in-motion status signals—e.g. when being carried by the golfer when the golfer is walking. By concentrating in one embodiment on only the times when the receiving device is "still" the system can do a better job of determining when an actual golf swing occurred as golfers almost always make a golf shot while standing in one location for more than just a few seconds. In one embodiment, a pedometer or accelerometer in the receiving device can be configured to determine when a golfer is walking. A GPS device can determine when the golf cart is moving by determining that the speed of the device is greater than the speed of a walking golfer. This data would determine the difference between the golfer walking, the golfer in a moving cart, and the golfer standing still. The filtering in this embodiment would help determine when the golfer is standing still. It should be understood that the concept of the receiving device "ignoring" or filtering transmissions while the receiving device is "in motion" can be applied to receiving signals from all types of tags. For example, tags that transmit based on input from light sensors, or impact sensors, or tilt sensors, or accelerometers, or acoustic sensors, or any combination of sensors, etc. It will also be understood that the receiving device can be an RFID reader or an RFID reader combined with a GPS rangefinder or other devices that receive transmissions from club tags and provide club reminders or golf data collection functions.

When the receiving device determines that it is "still" for more than a predetermined time, it can start processing club status signals again for certain types of transmissions from tags. Also, when the receiving device starts moving again (more than a predetermined amount of movement) the receiving device can be programmed to interpret the data it received while it was "still" and make decisions based on this data. For example, the receiving device can be programmed to "decide" which club was used in the golf swing after the receiving device moves more than X feet away from the location of the shot. See FIGS. 47 and 48 for more detail. Similarly the receiving device can be configured to recognize that the golfer is walking away from the location of the golf swing based on movement detected by an accelerometer or pedometer; in this case the receiver can be programmed to "decide" which club was used in the golf swing after the receiving device determines that a golfer is walking away from the location of the shot.

Automated Golf Game Tracking with Motion Sensing

The features described in the club tag provide information to the golf device such that a golf game can be tracked automatically or nearly automatically, with very little interaction by the golfer. By processing the information from the club tag, such as in or out of the bag, in motion or not in motion, and the degree of motion, the golf device can automatically determine when the stroke was taken and which club was used for the stroke. FIGS. 47 and 48 describe implementation of automatic or nearly automatic golf game data collection. When one club is removed from the bag, it indicates 'out of the bag', in motion or not in motion, and the degree of motion. For a semi-automatic system, described in FIG. 47, after moving away from the location at which the golfer pressed a Mark-the-spot button on the device, the golf device would select the last club in motion at that location. If multiple clubs are out of the bag, the golf device would select that last club reporting Motion while the other clubs are reporting No-motion, If the multiple clubs are all reporting Motion at that location, the golf device would compare the Average Difference values transmitted by each club and select the club with the highest average Difference value as the club being used for the shot.

For a fully automatic system, described in FIG. 48, the golf device would monitor movement of the golf device and movement of the one or more clubs. The golf device would be still or not in motion while the club is in motion. If multiple clubs are out, the golf device would monitor all clubs and select the one that was in motion while at least one other club was still. If multiple clubs appear to be in motion, the club with the highest reported Average Difference is selected as the club in use. The motion of the golf device is monitored to determine the location of the shot. The golf device would be still for a period of time while a club is being used to take a stroke. When the golf device moves away from that spot or the club is returned to the bag, the processor in the golf device determines that a shot has occurred and determines the location of the shot. The processor uses rules, such as the last club in motion while the others are still, to select the club in motion. The charts in FIGS. 47 and 48 outline the detailed scenarios for determining the club in use for a golf shot.

Additional Filtering and Logic Techniques

With a system based on light sensing there may be certain situations where incorrect data gets transmitted and/or received and/or displayed on the receiving device. Using certain logic and filtering techniques can resolve many if not all of these situations. Below are some examples of potential challenges of a light based system along with potential solutions. It should be understood that the following examples can be applied to similar systems that are not based on light. For example, systems based on vibration or impact or other types of sensors or systems that use a combination of one or more light sensors and other sensors (e.g., impact sensors) could also use the following techniques to improve performance.

PROBLEM 1: Golfer uses a bag that allows a lot of light in, removes bag from dark place (e.g. trunk, indoors) and tag(s) falsely report "out".

SOLUTION 1: When a golfer first turns on the receiving device to play golf, when the receiving device receives its first tag reception, rather than display an "out of bag" club icon, the receiving device can display a message similar to: "Ready to start your round of golf? Make sure all clubs are in your bag and the bag is in an open area outdoors". This will allow the receiving device to "ignore" any initial incorrect transmissions it may receive.

PROBLEM 2: It is possible for several tags to falsely report "out" at about the same time. For example, if a golfer is using a highly translucent bag and lays the bag on the ground such that the clubs separate from the bottom of the bag.

SOLUTION 2: The receiving device can present a message when multiple clubs (e.g. 4 or more) are removed at about the same time. For example, "Did you remove multiple clubs?" If the answer is NO the receiving device ignores the false "OUT" transmissions. If yes the receiving device registers the removed clubs as "out" and continues.

PROBLEM 3: It is possible for clubs to be jostled such that light shines into the bag and a tag(s) falsely transmits "OUT".

SOLUTION 3: If tags transmit "OUT" while the receiving device is moving at more than the pace of a slow walk (i.e. while driving in a cart), the receiving device ignores transmissions.

SOLUTION 3A: It is possible to allow the user to select settings in the receiving device to include delays before displaying the received information. For example, if a golfer is using a golf bag that allows light in, the golfer could select a delay setting of 2 or 4 seconds. If, during the delay period, the receiving device receives a transmission of "IN" it would have never displayed the false "OUT".

Sensors (Vibration, Tilt, Motion, Etc.) Determine Club Motion

Another embodiment is described that incorporates a vibration, tilt, or motion sensor in the club tag to determine which club is in motion. This technique may be used in conjunction with the techniques using one or more light meters previously described. In a particular embodiment, the club tag is equipped with a vibration sensor. While the club is at rest, the vibration sensor has a particular output, such as a constant logic 1 or 0. When the club is in motion, the vibration sensor has a different output, such as voltage swings between logic 1 and 0. The processor determines whether a club is at rest or is moving based on the output of the vibration sensor, which is connected to the processor. In a typical embodiment the processor monitors the output of the vibration sensor for a period of time to determine the motion status of the club. In an alternate embodiment, the processor wakes up on a change in the output of the vibration sensor, which includes typical voltage swings when the club is in motion. Typically during a swing, the club tag is in motion, which would be indicated by the output of the motion sensor. For a golf stroke, the golfer typically takes practice swings in advance of the actual stroke, all of which would indicate a club in motion. In one embodiment, the golf device recognizes that there are a series of swings in the same geo-location, and selects the last of these swings as the actual stroke and records that club as the club in use. The golf clubs that are out of the bag and are not in use do not indicate that they are in motion, that is, the output of the vibration sensor on each club indicates that these clubs are still. If there are several clubs out of the bag, the golf device recognizes the club in motion as the actual club in use. The golf device recognizes all clubs out of the bag as previously described for missing club reminder, but for the golf data collection function, the golf device only records the club in use for the stroke.

Club Movement by Vibration, Tilt, Motion, Etc., Sensor

A specific embodiment will now be described that incorporates a motion, tilt, or vibration sensor, in conjunction with FIG. 7H, as an example of a method of the present invention, and other alternative embodiments can employ different operations and different parameters, in a different sequence, etc. in a manner that is consistent with a general method of the invention. Referring to the Flow Diagram in FIG. 7H, the processing of in-bag and out-of-bag status is implemented as previously described in other embodiments. An additional status, Motion Status, is implemented, which indicates if a club is in motion or not in motion (still), based on the output of, for example, a vibration, tilt or motion sensor. When the light switch is on and the bag status changes from in-bag to out-of-bag the Motion Status is set to In Motion. Subsequent vibration sensor readings are analyzed to determine if the club is In Motion or is Not In Motion (still). In one example or one embodiment, following the flow chart in FIG. 7H through blocks 9.6.4d, 9.6.5e and optionally 9.6.6a, the processor performs steps to determine Motion Status. The output of the vibration sensor, monitored by the processor, indicates that a club is in motion. The output of the vibration sensor is assigned as Motion Status 9.7.0, for example, a logic 0 for not in motion or still, and a logic 1 for in motion. A value is assigned to New Activity based on consecutive readings of the vibration sensor. A New Activity value of +1 indicates that the movement of the club has changed since the previous reading; and a value of −1 indicates that the movement of a club has not changed since the previous reading, as shown in blocks 9.7.1 and 9.7.3. A test is performed in block 9.7.7 to determine if the activity has occurred for a number of cycles, for example, 2 in this embodiment, of checking vibration sensor output. The activity represents In Motion or Not In Motion (still), and the test in block 9.7.7 determines if this activity has occurred for the required number of cycles of monitoring of the vibration sensor. If it is determined that activity (motion or non-motion) has occurred for 2 cycles, for example, the processor prompts the transmitter to transmit the status that includes Motion Status. Similarly, if it is determined that the activity (In Motion or Not-In-Motion) has not occurred for 2 cycles, there is no transmission of Motion Status. In another embodiment, additional sensors can be included in the club tag. These sensors could be, for example, piezo-electric devices, acceleration sensors, shock sensors, or vibration measuring devices. With these types of sensors, in addition to the techniques described above, the club tag could recognize the impact of the club hitting the ball. This could help determine the difference between practice swings and actual strokes. Note: in certain embodiments, certain types of motion sensors, for example vibration sensors and piezo devices, may require no power or very low power in order to sense motion, compared to other types of sensors such as impact/shock sensors and accelerometers.

Automated Golf Game Tracking with Motion and Impact Sensors

Techniques incorporating a combination of sensors may be implemented to provide a fully automated golf data collection system, in which a golf stroke is recorded at a particular location, using a particular club. As previously described, at least one of a light switch and light meter are used to determine if a club is in or out of the golf bag. At least one of a technique previously described determines which club is in motion. These techniques may include determining motion by the use of at least one of the following sensors: motion sensor, vibration sensor, accelerometer, and light meter. An additional sensor may be implemented to determine that an actual stroke has occurred by detecting the impact of the golf club on the golf ball. In one embodiment, this additional sensor may act as an impact sensor, such as a vibration sensor, accelerometer, shock/impact sensor or piezo-electric device.

An impact sensor in combination with motion sensing techniques determines when a stoke has occurred. In a particular embodiment, when the tag detects motion of the club due to variances in light it reports motion. Optionally, the tag also reports a value to indicate the amount of motion, as previously described. Alternatively, a motion sensing device, such as an accelerometer, tilt, or vibration sensor, may determine that a club is in motion. With the addition of an impact sensor, the tag reports motion followed immediately by, or in close association with, an impact, for example, the impact may be preceded and/or succeeded by sensed motion. It may be helpful in some situations to require a report of impact from the tag, after or during the reports of motion from the tag to confirm that a stroke occurred. The addition of other types of sensors such as tilt, vibration, accelerometers, etc. can also be added to the light sensor(s) or motion sensor for further refinement of the system.

One embodiment of an automated golf data collection system is shown in FIG. 49 and described herein. This figure shows an example for a single club. It is to be understood that this processing applies to all clubs in use and occurs concurrently for all clubs. A club is removed from the bag 4901, activating at least one of a light sensing device, indicating that the club is out of the bag. When the club is removed from the bag, an impact sensing device is also activated 4902. In one embodiment, a light meter takes a light intensity reading every two seconds as previously described. Based on variations in light meter readings, it is determined that a club is in motion 4903, also previously described. Alternatively, a motion sensing device, such as an accelerometer, tilt, or vibration sensor, may determine that a club is in motion 4903. The impact sensor is on and monitoring for impacts 4902. The data from all sensors is compiled in the microprocessor in the tag. The microprocessor prompts the RF transmitter to transmit this data to the golf device, for example a golf GPS device. The data provided to the golf device includes if the club is in or out of the bag, if a club is in motion or not in motion, optionally the amount of motion by a particular club, and data that a club has just had an impact 4904. The microprocessor in the golf device collects and processes this data. The combination of data from a club that reports in-motion 4908 and reports an impact 4907 determines that a stroke has occurred 4910. Optionally, the combination of data that a club reports recent motion 4908, such as in the previous 10 seconds, and reports an impact 4907 determines that a stroke has occurred 4910. In a further embodiment, the combination of data from a club that reports in-motion and an amount of motion greater than a predetermined threshold of motion 4909 and an impact determines that a stroke has occurred 4910. The combination of motion sensing and impact sensing in order to report a stroke is an improvement over using only impact sensing. For a system with an impact sensor only, there may be errors in reporting impacts, such as hitting the club against an object or the ground. By combining impact sensing with motion sensing, there are less errors in determining when an actual stroke has occurred and potential ways to conserve tag battery power.

Some impact sensing devices, such as tilt, vibration, and impact sensors, do not need to be in an active power state. The sensor may be configured to toggle a pin in the microprocessor or to provide an interrupt to the microprocessor when the state of the impact sensor changes. That is the output of the sensing device changes from a "0" (zero) to a "1" (one) or from a "1" to a "0". The microprocessor may be in a low-power or sleep state or it may be in an active "on" state before the pin toggles. In all of these states, the microprocessor recognizes a change on input pin that prompts the microprocessor to wake up or enter an "on" state. The change on this input pin of the microprocessor would indicate that an impact has occurred.

Some impact sensors, such as accelerometers, and certain types of shock/impact sensors must be in an active state in order to accurately capture the impact of the club on the ball. This active state may be a state in which a relatively significant amount of current is consumed. It is desirable to limit the amount of time the impact sensing device is in an active state in order to prolong battery life of the tag. Some power saving techniques are described herein. A typical power saving technique is to periodically turn on the device and take a reading. The time period between these readings may be less than one second, such as one-tenth of one second. In one typical embodiment, the microprocessor in the tag prompts the impact sensor to turn on and monitor for impact for a period of time. After this period of time the microprocessor prompts the impact sensor to turn off or to enter a low-power mode.

It would be possible to miss the impact if it occurred during the time when the device is off or in a low-power state, between the periods of turning on the device. For some sensors, it would be necessary to have the device on in order to sense the actual impact. A method to accomplish this is to power up the impact sensing device when it is anticipated that a stroke will occur. Monitoring the motion of a club using techniques previously described may be used to determine when a stroke is imminent. This motion information can be used to provide power to the impact sensing device such that it is fully powered in anticipation of the club stroke occurrence. As long as the club reports in motion, the impact sensor is powered continuously. When the club no longer reports in motion, the impact sensor is returned to a low-power or no-power state.

Figure 50:
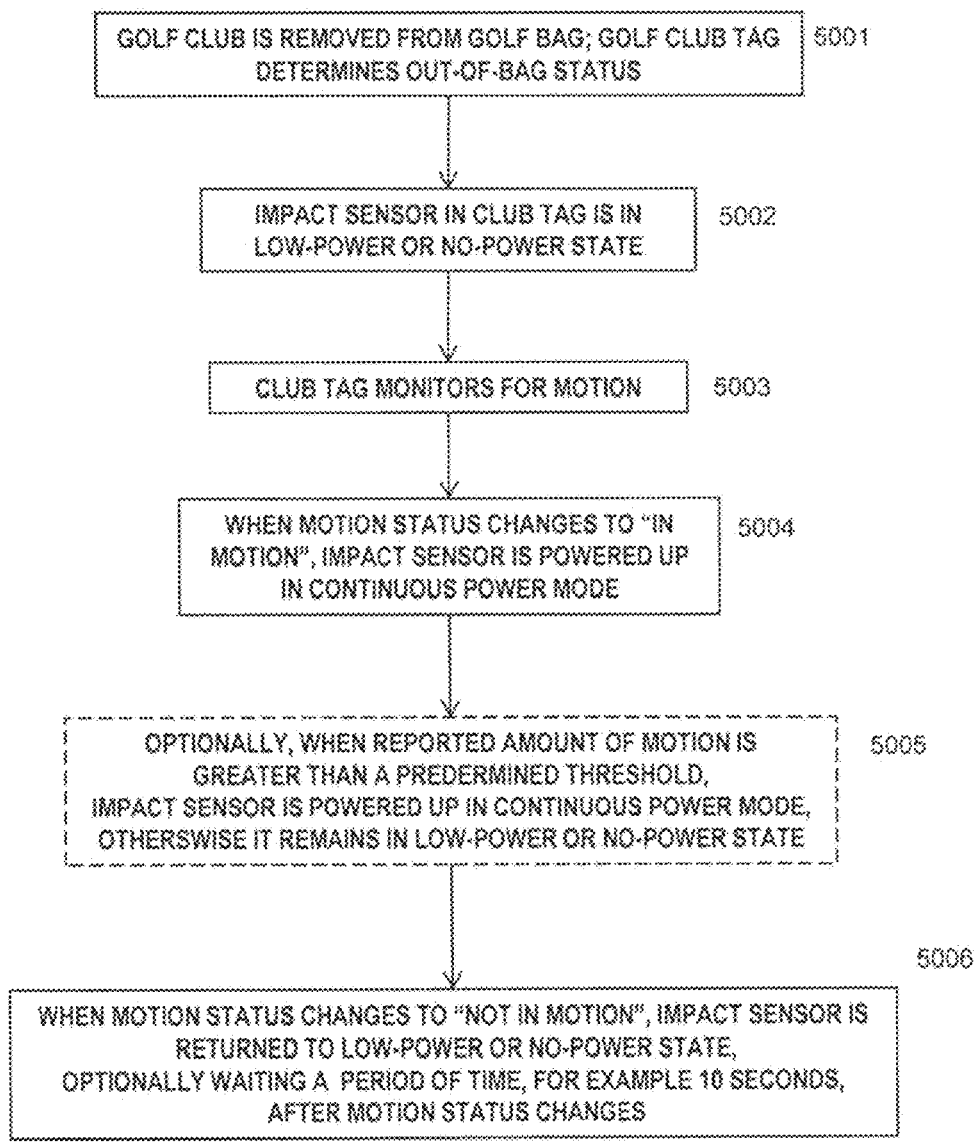
FIG. 50 outlines a power-saving technique in a golf club tag.

A method of providing power to an impact sensing device is shown in FIG. 50 and is described as follows. A club is removed from the bag, activating at least one of a light sensing device, indicating that the club is out of the bag 5001. The impact sensor is in a low-power or no-power state 5002. In one embodiment, a light meter takes a light reading every two seconds as previously described. Based on variations in light meter readings, it is determined that a club is in motion 5003, also previously described. Alternatively, a motion sensing device, such as an accelerometer, tilt, or vibration sensor, may determine that a club is in motion 5003. Using the motion status, the microprocessor may prompt the impact sensor to turn on in a continuously powered state and to monitor for an impact. While the motion sensing device is indicating that the club is in motion, the impact sensor is in a continuously "on" state 5004. When the club is no longer in motion, the microprocessor may prompt the impact sensing device to return to a low-power or no-power state 5006. Optionally the impact sensing device may remain in a continuously "on" state for a period of time, for example 10 seconds, after the motion sensor indicates no motion then return to a low-power or no-power state.

In a further embodiment, the motion sensing device reports a degree or amount of motion, for example, reporting a value that indicates average value in light meter variation or accumulated sum of light meter variation as previously described. This value indicating amount of motion may be used in conjunction with the above power-saving technique. Based on the value reported for the amount of motion, the microprocessor may prompt the impact sensing device to turn on in a continuously powered state and to monitor for an impact. The microprocessor would prompt the impact sensing device only when the value for the amount of motion is greater than a predetermined threshold 5005. A typical swing of the golf club produces values that represent amount of motion that are much higher than other actions indicating motions, such as holding the club in a hand or leaning on the club. By using a threshold for the amount of motion to fully power an impact sensing device, that device would only be powered on when a stroke is about to occur and not be powered up for other actions that may indicate a small amount of motion.

Sensing Putter Activity

In one particular embodiment, a putter would contain a tag with a piezo device with more sensitivity than tags in other clubs in order to pick up subtle impacts on the ball. The putter does not report the same amount of motion as other clubs, and the motions of a putter can be very small and subtle. The addition of a piezo or other sensitive impact sensing device would capture the potentially mild impact of a putt. In one embodiment, when an impact is detected by the piezo device, it is determined that a putt, or stroke, has occurred.

A putter in motion has a particular pattern of motion, in fact the club may not be in motion when the golfer is set up to make a putt. For these reasons, golf data collected from a putter may be processed differently. One particular embodiment for collecting golf data from putter is described herein. The putter is removed from the bag, activating at least one of a light sensing device, indicating that the club is out of the bag. A light meter takes a light reading every two seconds as previously described. Based on variations in light meter readings, it is determined that a club is in motion. Optionally in addition to determining that the club is in motion, a value representing the amount of motion is calculated by the microprocessor in the club tag. Alternatively a motion sensing device, such as an accelerometer, tilt, vibration, or other sensor determines that the club is in motion. The data from all the sensors is compiled in the microprocessor in the club tag and is transmitted to a golf device. The data provided includes if the club is in or out of the bag, if the club is in motion or not in motion, optionally the amount of motion by the club, and data that a club has just had an impact. For the putter in particular this data can be processed as follows. The club is removed from the bag, then club reports that it is in motion, then the club reports that it is not in motion, indicating that the golfer is setting up the putt. After that, the club reports an impact, which determines that a putt has occurred. Alternately, other sensing devices, such as microphones, could be included in the club tags to "listen" for subtle impacts of the putter. The golf device could use GPS information to only monitor for putter impacts when on the putting surface. In this way, if a random impact occurs on the putter, and the golfer is not located close to the putting green, the data that an impact occurred would not be implemented by the golf device.

Incorporating Motion and/or Impact Sensing into a Golf Watch Device

The golf device can be configured as a watch or wristband or glove to be worn by the golfer. The watch (or other type of article) may include all of the GPS and golf course mapping information included in typical golf GPS devices. In one embodiment, the watch (or other type of article) can be the golf accessory 5101 in FIG. 51 or one of the GPS watches 5205 or 5207 in FIG. 52. The watch (or other type of article) may also include one or more impact or motion sensing devices, such as a piezo-electric device, tilt sensor, accelerometer, or impact sensor. The impact and/or motion sensing device(s) can be configured to recognize that a golf stroke has occurred based on the characteristic of the motion and/or impact. In one embodiment, the watch (or other type of article) can also include a user activatable switch that, when activated by the golfer, indicates to a processing system in the watch that a stroke was taken (and to use the GPS receiver to determine and record the location of the stroke); this switch can be used independently of the impact and/or motion sensing devices so that the golfer can indicate a stroke was taken in cases in which the sensors do not detect a stroke (such as a light, short putt). In another embodiment, the switch can be used as an alternative to these sensors; for example, the sensors, if present, merely detect a possible stroke and cause the watch to present a user interface that requests the golfer to indicate whether a stroke occurred by telling the golfer to activate the switch to indicate the stroke. The switch can be an electromechanical switch or can be a displayed button on a touch screen of the golf device. When the golfer grips the golf club during a stroke, and the golf club hits the ball, the shock of the impact travels up the golf club and into the hand and arm of the golfer. An impact sensor worn on the wrist or hand would sense this shock on the wrist and forearm and register that an impact has occurred. The swinging motion made by the arms when the golfer swings the club would be sensed by the motion sensing device. Including the motion/impact sensing device(s) in the watch, rather than in each of the golf club tags does two things: 1) it captures similar information relative to the golf club swing and impact as the watch is worn on the wrist and is an extension of the golf club in many ways, 2) it saves on size and cost in the golf club tag electronics—which is important.

The golf device watch, such as the golf accessory 5101, is in communication with the golf club tags, either one-way communication in which the tag transmits data to the golf device, or two-way communication in which the tag and golf device each contain both a transmitter and a receiver. In one embodiment, the club tag communicates with the golf watch device by transmitting a coded signal indicating that the club is out of the golf bag. When it is determined that an impact has occurred, the golf device watch may select the club that is out as the club that has taken the stroke. If more than one golf club is out of the bag when the stroke occurs, the golf device watch may choose from the clubs that are out based on their proximity to the golf device. When the golfer is using a club, the position of the club tag is very close to the golf device watch worn on the wrist, so if it can be determined which club is closest to the golf device, this club is selected as the club in use for the current stroke. When the impact of the ball against the club is sensed, the golf device may then monitor for the closest tag in a few different ways. The club tag may be transmitting periodically as long as the tag is out of the bag or it may transmit for a period of time when prompted by the golf device (e.g., watch 5101). The golf device (e.g., watch 5101) receives a signal from the one or more tags and determines which tag is the closest. This may be accomplished by using a Bluetooth Low Energy proximity profile protocol. In one embodiment when Bluetooth is used, the watch includes a Bluetooth transceiver that communicates with Bluetooth transceivers in each club tag, and the Bluetooth transceivers in the club tags act as RFID systems and provide identifiers of each club to the Bluetooth transceiver in the watch (e.g., watch 5101), and in addition, these Bluetooth transceivers provide proximity profiles that correlate to signal strength (e.g., RSSI) which is used to determine the club that is closest to the watch. A processing system in the watch or other golf accessory can be configured (e.g. programmed with firmware and/or software) to cause the Bluetooth transceiver in the watch to determine the proximity profiles (which correlate to RSSIs) in response to either sensing of an impact by the impact sensor (e.g., 5109) or sensing of motion by a motion sensor or a combination of impact sensing and motion sensing. Hence, the determination of the club used (based on RSSI/proximity profiles) is performed in response to determining a club is in use through impact sensing or motion sensing or both. Other techniques may be used, such as using RSSI (Received Signal Strength Indicator) in the golf device receiver or a received signal threshold in the golf device receiver.

Automation Technique

Other techniques can be incorporated to determine that a stroke has occurred that make the system more reliable. Some impacts received by the golf device watch may not actually be the club hitting a ball. Such impacts might be: a practice swing that hits the ground, jostling the clubs in the golf bag, hitting a hard object with the club such as a rock. The system can be configured to use additional factors to determine that a stroke has occurred.

One technique is to monitor the GPS location of the device and if the device is in motion. When the golfer is riding in the cart, walking, or otherwise in motion, a stroke would not occur. If the golf device watch senses an impact while the device is in motion, this impact may be disregarded by the golf device. Furthermore, the golf device may only monitor for an impact while the golf device is not in motion as determined by the movement monitored by the GPS.

Another technique is to equip the golf device with an accelerometer. The golf device would monitor for motion determined by the accelerometer and characterize that motion. Typical motion monitored by the accelerometer could include riding in a cart or walking. It also may include motion associated with various types of swings of the golf club. These motions have different characteristics, and the motion associated with moving or walking may be different than the motion associated with swinging the club. If the golf device watch senses an impact and the golfer is in motion, e.g. walking, the impact may be disregarded by the golf device. The golf device may only monitor for an impact while he golf device is not in motion as determined by the movement monitored by the accelerometer. Furthermore, if the golf device is in motion that represents a swing of the golf club, it may be configured to expect an impact and register that a stroke has occurred once the impact occurs. The golf device may also use a combination of events and data to determine that a stroke has occurred, such as the golf device being in one particular location for a period of time and the motion representing the swing of the golf club. The golf device then prompts and/or listens for a signal from the closest club and records that one as the club used for the stroke. Similarly, as previously described, the golf device may select the last club used in the one location. In this embodiment, the impact sensor is not equipped in the golf device.

Automation Including an Active Tag in the Golf Ball

Further techniques for automating golf data collection are described. The golf ball may be equipped with circuitry that senses movement and communicates with a golf device. Receiving data from the golf ball in conjunction with receiving data from the golf club can provide a golf data collection system that is fully automatic without need for input from the golfer. An active tag in a golf ball can include, in one embodiment, a sensor configured to detect a hit of the golf ball and configured to activate/awake a processing logic in the ball and an RF transmitter in the ball in response to sensing the hit; the sensor can be powered by a battery and periodically turns on, in one embodiment, to sense a hit and turns off if no hit is sensed. Alternatively, the sensor is in a no-power or low-power state, and a hit activates the sensor to turn on, such as closing a contact in a switch. In this alternative embodiment, an impact sensor, such as an accelerometer or motion sensor, acts as a passive switch which is normally open (not conducting current) and when it is hit, the passive switch momentarily closes (thereby conducting current) as a result of the hit and then returns to the normally open state. For an impact sensor that is a normally closed switch, the sensor can be coupled in series with a high value resistor that limits current to a small amount while the sensor is in its normally closed switch state, and when it is opened (as a result of a detected impact), the switch opens momentarily, and this opening of the switch can be sensed by processing logic, such as a pin on a microcontroller. If a hit is sensed, it turns on the rest of the processing logic and the RF transmitter, and operates in one of the methods described herein.

System of Golf Ball Tag, Club Tag, Golf Device

As shown in FIG. 24A, one embodiment of the automated golf data collection system consists of at least one club tag 910, at least one golf ball tag 912, and a receiving device, such as a golf GPS device 911. The club tag includes a transmitter 914 operating at, for example 2.4 GHz, antenna 913, a microprocessor 915, a battery (not shown) and at least one sensor 916, for example one or more light sensors and/or vibration sensors. The golf ball tag includes a transmitter 932 operating at, for example 2.4 GHz, antenna 931, a microprocessor 933, a battery (not shown), and one or more sensors 934, for example, a vibration, tilt, piezo, shock, acceleration sensor, or motion sensor. The golf GPS device includes at least one antenna 921, at least one receiver 922, a microprocessor 923, and golf GPS circuitry and user interface 924. The golf GPS circuitry, user interface and microprocessor (or other processing system) may include functions for the one or more of the club tag, ball tag and golf GPS device. The club tag and golf ball tag information is used to implement one or more of golf data collection and missing club reminder functionality. For the golf data collection function, the club tag provides information, such as identifying a club used for a golf stroke, and optionally information about the motion of the club; the golf ball tag transmits information, such as identifying the ball and instantaneous data when the ball has been hit. The data transmitted may include status about whether the ball is in motion or is still or has been hit with a golf club. The golf GPS device can be configured to selectively use information from the club tag and the ball tag. For example, the device may ignore transmissions indicating movement of the ball if there are no clubs out of the bag to use in the golf stroke.

Schematic of Golf Ball Tag

Ball Circuit—2.4 GHz Transmitter/Transceiver with Microprocessor

Various embodiments of the club tag have already been described. As shown in FIG. 25A, the golf ball tag includes, in one embodiment, an antenna AN1, one or more motion or vibration sensors U2 and U3, a microprocessor and RF transmitter or transceiver U4, and a battery BT1. In this embodiment the transmitter operates at 2.4 GHz and may be Nordic 2.4 GHz transceiver. Other embodiments may include a microcontroller that is separate from the 2.4 GHz transceiver or transmitter. The antenna may be a trace on the printed circuit board, alternatively the antenna may be a discrete part mounted on the printed circuit board or a tuned element, such as a wire of specific length, for example one-quarter the wavelength of the transmit frequency, suspended away from the printed circuit board and embedded in the ball material. The antenna may also be made of elastic conductive material on an elastic substrate as taught in U.S. Pat. Nos. 7,691,009 and 7,766,766 and pending U.S. application Ser. No. 12/552,162.

Ball Circuit—Tripler to 2.4 GHz

Referring to the schematic in FIG. 25B, one embodiment of the ball circuit is described. This circuit is an injection locked oscillator operating at triple the frequency of the SAW resonator. The SAW resonator Y1 operates at, for example, 809 MHz. The 809 MHz is amplified by transistor Q1 and the 3rd harmonic 2427 MHz is selected from this signal by filtering. This signal is further amplified Q3, to provide a transmit signal of approximately 1 milliwatt or 0 dBm. The transmit signal is On-Off Keyed (OOK), implemented by the microcontroller U3. The antenna may optionally include a ceramic resonator Y2 in the shape of a sphere. This ceramic resonator may be incorporated as the microcore that encapsulates the electrical components. In this embodiment, metallization may be applied to the outside surface of the ceramic resonator to provide a printed antenna and antenna connections to the internal circuitry. This metallization optionally acts as a tuning element for the antenna such that the ceramic resonator in conjunction with the antenna is tuned at the transmit frequency, such as 2427 MHz.

Ball Activation Techniques

The golf ball contains active circuitry, in one embodiment, and it is desirable to have this circuitry off while the ball is not in use. Different techniques are discussed to activate or turn on the ball for all or part of a round of golf.

Hall-Effect Sensor Activation

In one embodiment, one sensor on the ball may be a Hall-effect sensor that responds to a magnetic field. The ball is placed near a magnet that may be incorporated in the golf device or other golf accessory such as a glove, shoe, etc. The Hall-effect sensor in the ball activates the circuit for a predetermined period of time, for example, 6 hours or enough time to complete a round of golf.

Motion or Impact Sensing

In another typical embodiment, a sensor in the golf ball may be a motion or impact sensor that responds to movement or impact of the golf ball, such as a hit by the golf club. In response to a change of motion of the ball, indicated by the sensor, the processor causes the transmitter to transmit data including information that the ball is in motion and has been hit. The change of motion may be determined by a sensor such as piezo, vibration, shock, motion sensor, acceleration sensor, etc. The motion or impact sensor in the ball activates the circuit for a predetermined period of time, for example, 6 hours or enough time to complete a round of golf. Alternatively, the motion or impact sensor activates the circuit for a shorter period of time, for example, less than one second, just long enough to transmit that the ball has been hit.

Techniques of Automatic Data Collection Using Ball & Club Tags

Ball Transmits Information when Hit

Figure 26A:
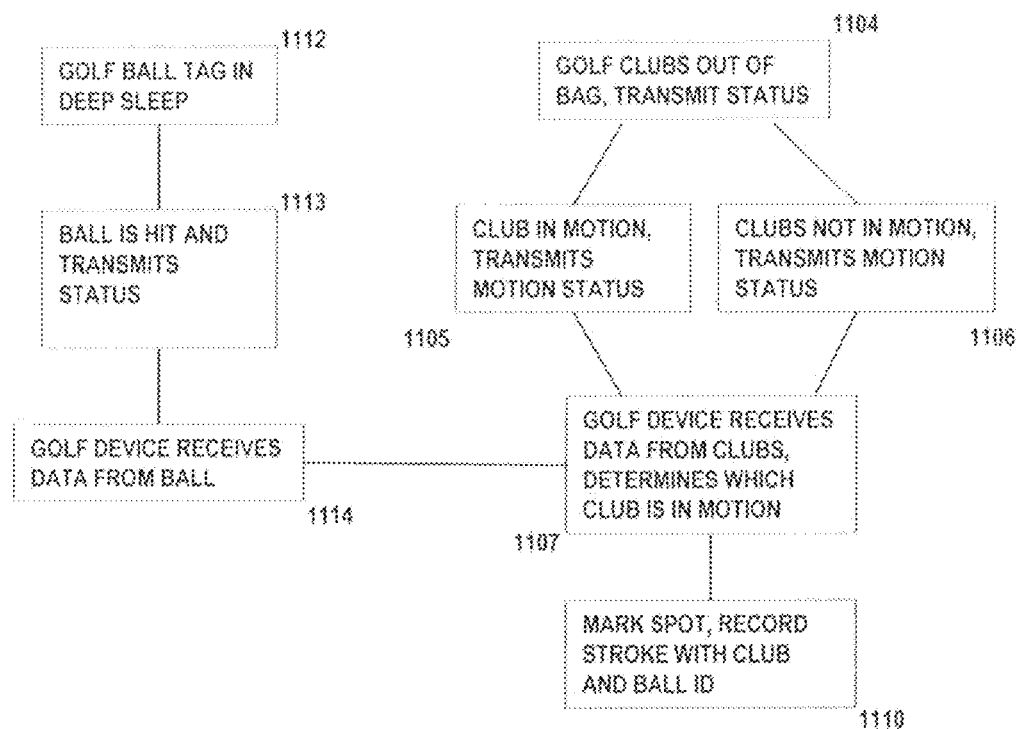
FIG. 26A is a flow chart that shows an example of a method for a system that automatically collects golf data.

The combination of data from the club tag and from the golf ball tag provides a technique of automatically collecting golf data without interaction by the golfer. The tag on the club communicates with the golf device, and the device determines which club is in use, based on motion sensing of the club by vibration or motion sensor or light meter variations, as previously described. The tag in the golf ball communicates with the golf device, and the device determines that a particular ball is being hit. In one embodiment of a method as shown in FIG. 26A, the golf ball is in a deep sleep state 1112 (with the motion or impact sensor periodically checking for a hit and then sleeping (in a low power state) and repeating this process) until it is hit. Alternatively, the sensor is in a no-power or low-power state, and a hit activates the sensor to turn on, such as closing a contact in a switch. In this alternative embodiment, an impact sensor, such as an accelerometer or motion sensor, acts as a passive switch which is normally open (not conducting current) and when it is hit, the passive switch momentarily closes (thereby conducting current) as a result of the hit and then returns to the normally open state. For an impact sensor that is a normally closed switch, the sensor can be coupled in series with a high value resistor that limits current to a small amount while the sensor is in its normally closed switch state, and when it is opened (as a result of a detected impact), the switch opens momentarily, and this opening of the switch can be sensed by processing logic, such as a pin on a microcontroller. The motion or impact sensor detects the hit and then causes the rest of the golf ball tag to turn on. The golf ball tag wakes up when hit and starts transmitting on a predetermined cycle 1113, for example, every 2 seconds for a duration of 20 minutes, then it returns to a deep sleep state. The transmission may include data that indicates if the golf ball is in motion or at rest. While in motion, the golf ball tag may initially transmit more frequently than while at rest. For example, when in motion the golf ball tag may transmit 4 times in one second for a period of 10 seconds, then return to a less frequent transmission, such as every 2 seconds. Alternately, the golf ball tag may transmit only when hit, and may cease to transmit when no longer in motion. The data transmitted may include a status bit that indicates if it is in motion or not in motion. When the ball is hit using a driver, the initial velocity of the ball may be 150 miles per hour or more. The data that the ball has been hit must be transmitted quickly while the ball is in proximity to the golf device, for example during the first one second of flight. The first in-motion transmissions occur more frequently to be successfully received while in proximity to the golf device. On receiving the information that the golf ball has been hit 1114, the golf device determines which club in use 1107, as indicated by its motion 1105, and marks the spot (for example, by recording a current latitude and longitude from a GPS receiver in the golf device) and records that a stroke has occurred 1110.

Putts by Motion/Impact Sensor

When a ball is putted, the motion or impact sensor indicates that the ball has been hit, and the putt is positively identified. This overcomes deficiencies in other systems that monitor that a ball has moved based on the presence of the ball then the absence of the ball. The transmitted motion information of the ball determines definitively when the putt occurs. For each stroke, when the golf device receives the information from the ball that a hit has occurred, the golf device looks for the last received information from a club in use based on its motion, and the stroke is recorded with the particular club. Each golf ball tag can include a quasi-unique identifier that is transmitted as data when the ball is hit or at rest. If a ball identifier is recorded during the round of golf that is different than a previously recorded ball identifier, indicating that the golfer is using a different ball than originally played, the device may assess a penalty stroke for a lost ball.

Vibration & Impact Sensors

In one embodiment the golf ball tag may contain one or more sensors to characterize motion, such as, for example, a vibration sensor, shock sensor, acceleration sensor, motion sensor, or piezo electric device. One embodiment of multiple sensors is shown in the schematics in FIGS. 25A and 25B. In FIG. 25A, the components U2 and U3 represent sensors; in FIG. 25B, the components U2 and Q2 represent sensors. The response of the sensor to the motion may indicate the type of motion that has occurred. The combination of two sensors could be used to record even subtle strokes. For example, an impact sensor could turn the ball "on" at the beginning of the round (e.g. the first stroke using a club, such as a driver). The ball circuit could be configured to stay on for a predetermined amount of time, such as six hours after the impact sensor turned the ball on. A vibration sensor could be used to report motion of the ball, which would capture any movement of the ball including putts, sand shots, or any low impact strokes.

Multiple Shock Sensors, Various Sensitivities and Geo-Location

In another embodiment, multiple sensors with various sensitivities can be used to characterize motion in the golf ball tag. For example, an impact sensor could be used to record high impact shots, such as drives, and a more sensitive impact sensor (e.g. piezo) could be used to record low impact strokes, such as putts. A sensitive impact sensor could have the advantage of being able to distinguish between a putt and the golfer picking up the ball on the green. Geo-locations (such as a latitude and a longitude from a GPS receiver which is then compared to a stored map of the golf course) in addition to type of motion information may be used to add intelligence to the system. For example, when the golfer is near the green or a sand trap, the expected type of hit would be a less forceful hit than, for example, a ball hit from the tee. That is, putts on or close to the green and pitches from a sand trap register less shock or acceleration in, for example, a motion, tilt, piezo, vibration, shock, or acceleration sensor. The golf GPS device can use current location in relation to features of the golf course to determine what kind of hit is expected to occur, for example, a putt when on or close to the putting green. When the golfer is not located near the putting green or is not located in or near a sand trap, the golf GPS device can be configured to ignore strokes or other impacts of less shock and acceleration. That is, the device can ignore low-acceleration or low-impact shots or motions when not putting or pitching, based on the response of the one or more motion or other sensors. A typical scenario that illustrates this technique is when the golfer is located in the tee box, the golf GPS device expects a high-impact shot and ignores less-forceful hits or other impacts such as might occur when the golfer is taking small practice hits with the ball while waiting to tee off.

A typical method of this embodiment is shown in FIG. 44. The two sensors in the golf ball tag are of different sensitivities, for example a High Impact sensor and a Low Impact sensor. Data from the two sensors is transmitted to the golf device when there is an impact 4401. The processor in the golf device analyzes the received impact data. If the High Impact sensor was activated 4403, a stroke is recorded 4406 and 4408. This would represent a typical stroke taken with a driver. If the High Impact sensor was not activated, the processor analyzes the Low Impact sensor data. A stroke that registers a low impact but not a high impact might include a putt or pitch out of a sand trap. If the Low Impact Sensor was not activated 4404, no stroke is recorded 4407. If the Low Impact sensor was activated 4404, the processor does an analysis of the location determined by the GPS function in the golf device 4405. If the location is close to a green or sand trap, the stroke is recorded 4406 and 4408. If the location is not close to a green or sand trap, the stroke is not recorded 4407. An activation of the Low Impact sensor that is not near a green or a sand trap is probably a practice tap of the ball and would not be considered a stroke.

Pattern of Motion with Active Ball

Figure 26B:
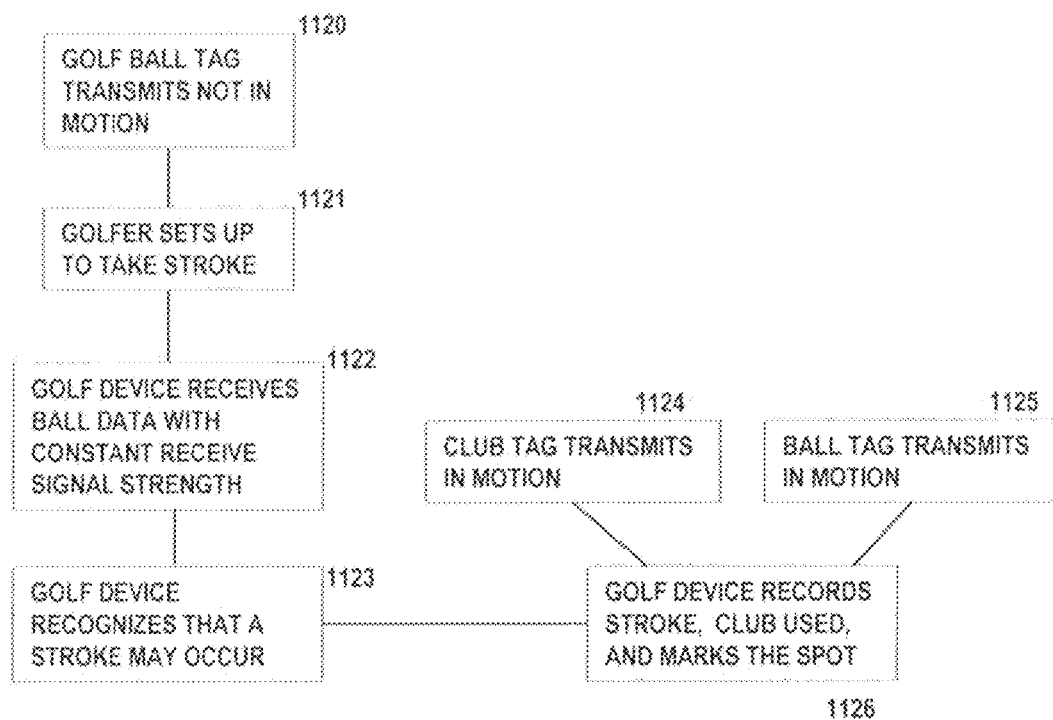
FIG. 26B is a flow chart that shows another example of a method for a system that automatically collects golf data.

A series of motions may be used to automatically determine that a stroke has occurred. In one embodiment, as shown in FIG. 26B, when the golfer is setting up to take a stroke, he is next to the ball for a period of time. As previously described, the ball may be transmitting its motion status, and in this scenario, the ball is transmitting that it is not in motion or at rest 1120. When the golf device records a series of readings that the ball is at rest at a particular location a fixed distance from the golfer, that is the golfer is not moving 1122, the system recognizes that this action signifies that a stroke may occur 1123. The system may determine that the golfer is in a fixed position based on the received signal strength from the golf ball tag. The subsequent actions of the club tag indicating movement 1124, followed by the golf ball tag indicating movement 1125 would all determine that a ball has been hit and identify the club used for the hit. The processing system would record the club used, mark the spot and record a stroke 1126.

Golf Ball Circuitry Implementation

The following is a discussion of techniques for incorporating a circuit in a golf ball. A typical golf ball is comprised of a center core and an outside layer, and optionally an additional layer between the center core and outside layer. The center core usually has a spherical shape. Various techniques for incorporating circuitry in a golf ball are described in U.S. Pat. No. 8,002,645, granted Aug. 23, 2011, U.S. Pat. No. 7,691,009, granted. Apr. 6, 2010, U.S. Pat. No. 7,766,766, granted Aug. 3, 2010, and patent application Ser. No. 13/230,779, filed Sep. 12, 2011, Ser. No. 12/552,162, filed Sep. 1, 2009, and Ser. No. 12/848,962, filed Aug. 2, 1010, all of which are hereby incorporated by reference. These techniques include applying electronic components on the outside of the core in preformed voids. Antennas are applied to the core material with elastic conductive ink and electrical connections are also implemented using this ink. Other techniques described include inserting the electrical components and circuitry into the golf ball core before the core is formed. The antenna and electrical connections are applied using one or more of elastic conductive ink, a thin elastic substrate containing circuitry and, in some embodiments, voids in the elastic substrate that allow the ball core material to flow through and connect the two halves of the ball core in the molding process.

Encapsulate Components—Micro-Core

Figure 27:
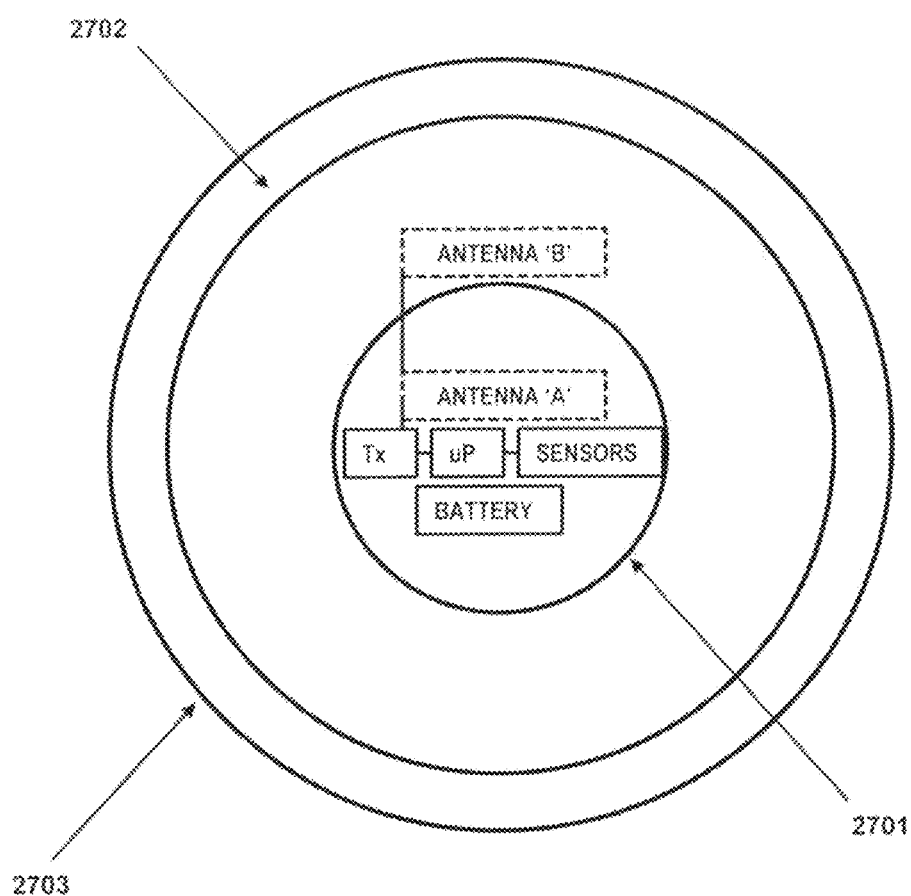
FIG. 27 is a side view cross section of a golf ball that contains electronic circuitry embedded in a micro-core embedded in the ball.

As shown in FIG. 27, a further technique to apply components to the ball is to encapsulate the components in a micro-core 2701, which is then inserted into the center of the ball core 2702, which is then covered with a golf ball cover 2703. Another embodiment is to encapsulate the components inside a tubular core, which is then inserted into a hole in the micro-core.

Embed Components in Micro-Core or in Voids on Surface of Ball Core

In a typical embodiment, as shown in FIG. 27, the electronics inside the micro-core 2701 include: a battery, a transmitter, a microprocessor including memory and code, and optionally one or more sensors, such as a vibration sensor, shock sensor, or piezo-electric device. An antenna 'A' may be contained inside the micro-core, alternatively an antenna 'B' may be comprised of circuitry on flexible or elastic substrate that extends outward from the micro-core. In one embodiment, the tag can include two antennas, one inside the micro-core and another extending outwardly from the micro-core and the antennas may be on different planes for optimal performance. In another embodiment, electronics may include a ceramic resonator, a SAW resonator, an amplifier consisting of one or more discrete transistors, a microcontroller, and optionally one or more sensors as previously described. In an alternate embodiment, the 2.4 GHz RF transmitter or transceiver might incorporate a microcontroller, such as a Nordic Semiconductor part number 24LE1, and crystal in place of the discrete microcontroller, resonator, and amplifier. In each implementation, the microprocessor can contain memory with computer program code and performs algorithms and provides data, for example, an identifier and status information such as in motion or not in motion. The memory can be any known form of a machine readable non-transitory storage medium, such as a semiconductor memory. In one typical embodiment, components are embedded in voids on the surface of the ball core, with electrical connections provided by conductive elastic ink or circuitry contained on thin flexible or elastic substrate. Techniques to incorporate circuitry on the surface of the ball core are described in U.S. Pat. Nos. 6,691,009 and 7,766,766 and co-pending U.S. patent application Ser. No. 12/552,162.

Micro-Core with Components, Embed in Center of Ball

Figure 28:
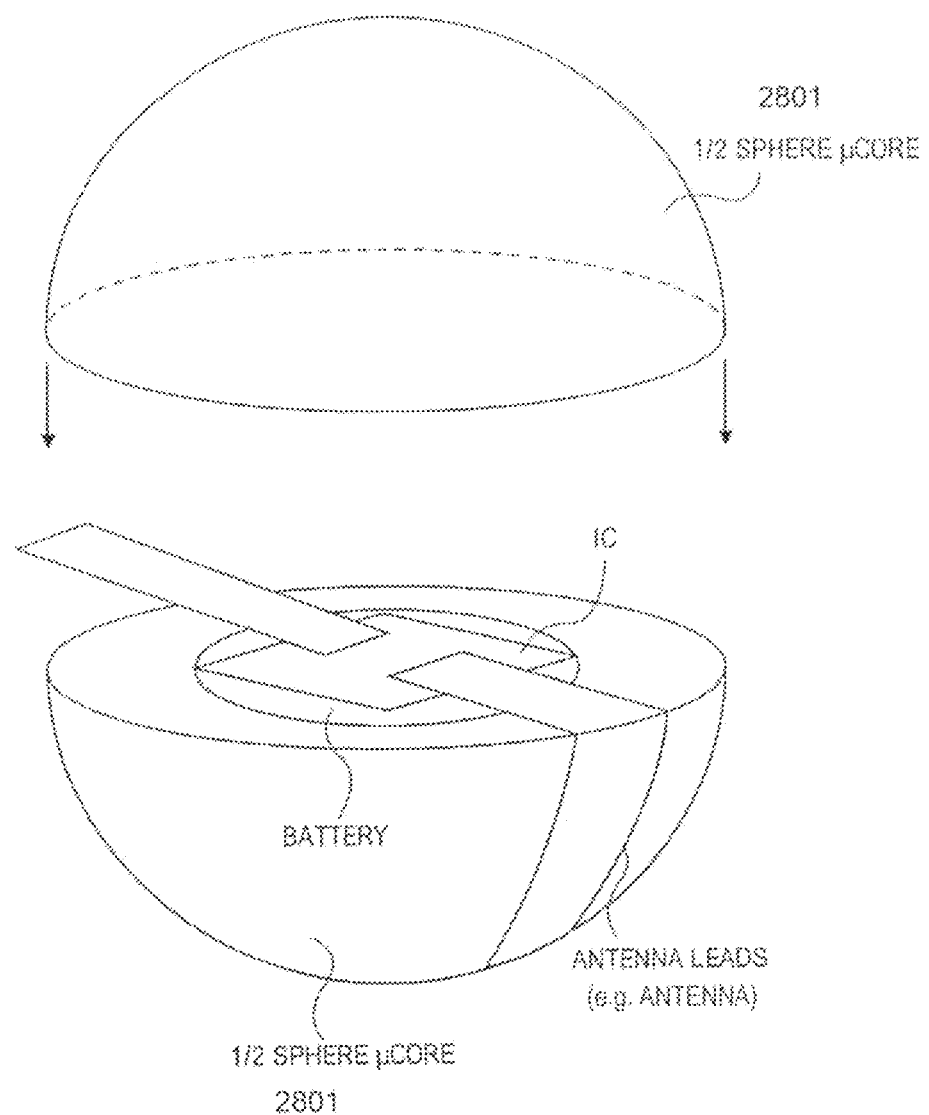
FIGS. 28 and 29 are perspective views of a micro-core that contains electrical circuitry.

Referring to FIGS. 27 and 28, a technique for embedding electronic circuitry in a golf ball is described. The electronic components are housed inside a micro-core 2701 in FIGS. 27 and 2801 in FIG. 28. The micro-core is intended to encapsulate the electronics, protecting the circuitry from the heat and pressure of the manufacturing process and protecting the circuitry from damage during use. In some embodiments the micro-core material can be material that cures in a low heat environment or by chemical reaction, such as two-part epoxy or polyurethane. The micro-core is sealed around the electronic circuitry, and the electronic circuitry may be fully contained within the micro-core. Alternatively, some component of the electronic circuitry, such as the antenna, may be contained outside of the micro-core and electrically connected to circuitry inside the micro-core.

Micro-Core with External Electrical Connections with Elastic Ink

Figure 29:
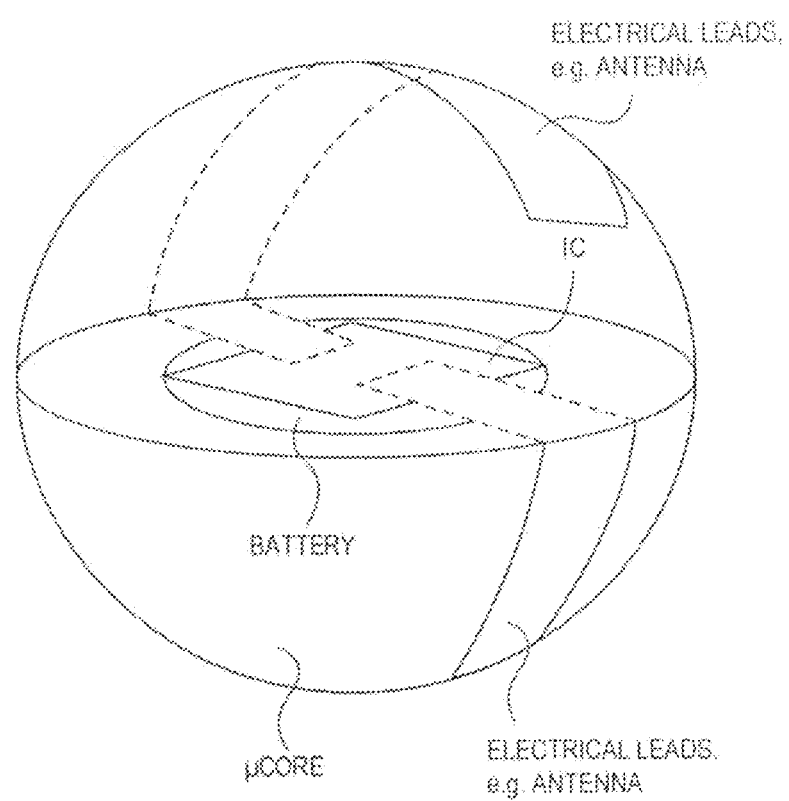
Figure 30:
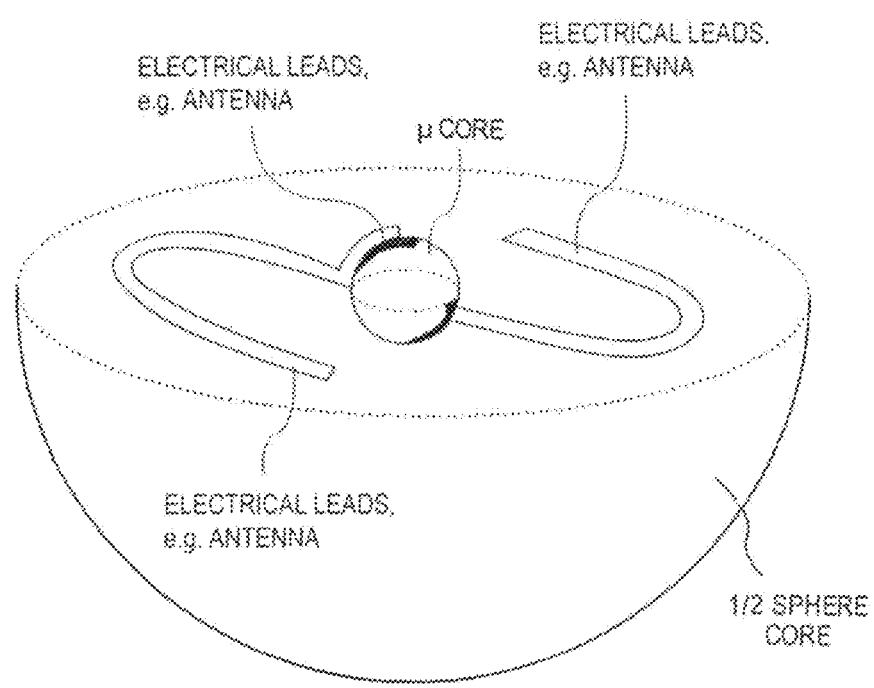
FIG. 30 is a perspective view of a micro-core embedded in one-half of a golf ball core with electrical leads extending from the micro-core.
Figure 31:
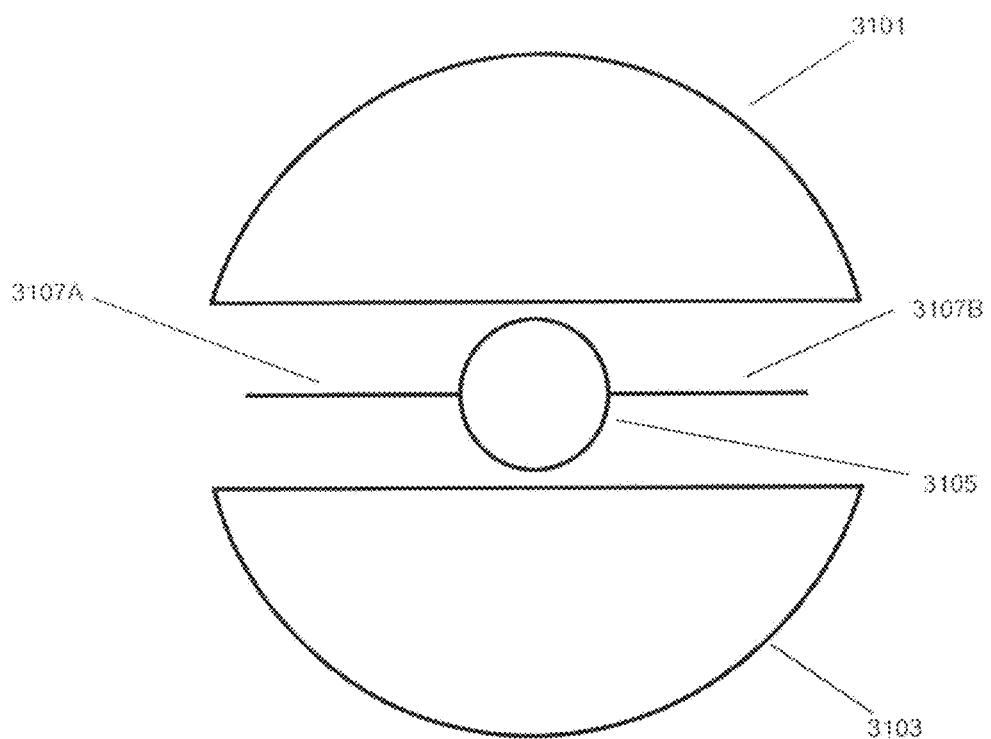
FIG. 31 is a side view of a micro-core, with an antenna extending outwardly beyond the surface of the micro-core, being positioned between two halves of a golf ball core during an assembly method of one embodiment.
Figure 32:
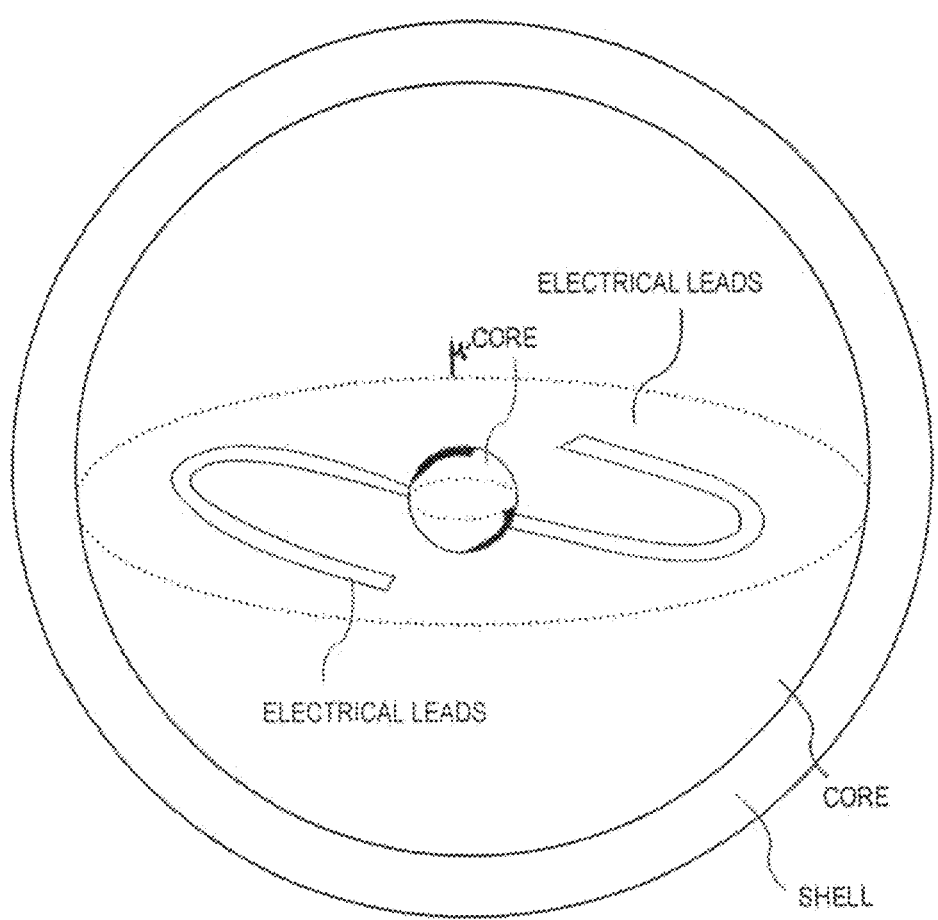
FIG. 32 is a perspective view of a micro-core embedded in a golf ball.

In one embodiment, the micro-core contains electronic circuitry with electrical leads protruding from the micro-core. These electrical leads may be one or more of the antenna and other electrical circuitry, such as circuits containing sensors that characterize or measure motion or impacts. These electrical leads may be composed of electrically conductive elastic ink on a thin flexible substrate, such as Kapton, or on a thin elastic substrate, such as HDPE. The leads may wrap partially around the micro-core as shown in FIG. 29, or the leads may protrude outward away from the micro-core as shown in FIG. 30. In some embodiments, the elastic conductive protrusion out of the micro-core may form the antenna and allow core material to flow from one half of the pre-molded core to the other half during the core molding process. The ball core is comprised of two halves. Semi-spherical voids (e.g., a hemispherical void) or voids having other 3-dimensional shapes may be disposed on center of the flat surface in each half of the ball core and a battery, an RF transmitter and processing logic can be disposed in the void. In one embodiment, one or more of electrical circuitry and antenna patterns made up of conductive elastic ink may be applied to one or both surfaces of the flat half of the ball core as shown in FIG. 30. The elastic conductive ink may optionally be applied to the voids. The elastic ink is cured, by air or by heat. The micro-core is inserted into the void in the first flat half of the ball core as shown in FIG. 30. Optionally, additional elastic conductive ink may be applied to the flat surfaces of the core and to the outside of the micro-core to make the electrical connections between the circuitry in the micro-core and the circuitry applied to the flat surface of the ball core half. The second half of the ball core is assembled over the first half of the ball core, enclosing the micro-core in the voids in the center. As shown in FIG. 31, the two halves of the ball core, half 3101 and half 3103, are assembled around micro-core 3105 as shown in FIG. 31, which is a side view of the assembly of the two halves and the micro-core. The antenna includes two elements which protrude outwardly from the micro-core, shown as antenna elements 3107A and 3107B. As shown in this side view, the micro-core is placed between the two halves and then is placed in a mold to form the outer core from the halves 3101 and 3103 to form the final structure such as that shown in FIG. 32. The half-cores are sealed together, using heating techniques typically used in the manufacture of golf ball cores. The application of heat also cures the recently applied conductive ink and completes the electrical connections between micro-core and ball core. As shown in FIG. 32, the shell or cover of the golf ball is applied over the core using typical manufacturing techniques. Portions of the circuit that protrude outside of the micro-core could be designed to act as a heat sink to protect the internal components from heat during the manufacturing process.

Micro-Core with External Electrical Connections on Substrate

In another embodiment, one or more of the antenna and electrical circuitry is printed onto a flexible substrate, such as Kapton or an elastic substrate, such as HDPE. This substrate is electrically connected to the substrate containing the electronic components inside the micro-core, and may optionally be the same substrate. The flexible substrate with the antenna is positioned onto the first half core of the golf ball, as shown in FIG. 30, and the second half core is positioned onto the first half core. The two half cores are sealed together with the micro-core and antenna and electrical circuitry on substrate in between them, as shown in FIG. 32, using heating techniques typically used in the manufacture of golf ball cores. Voids or perforations in the substrate allow the core material to flow in between the electric circuitry connecting the two halves of the core in the molding process.

Method of Manufacturing Golf Ball with Micro-Core

Figure 35:
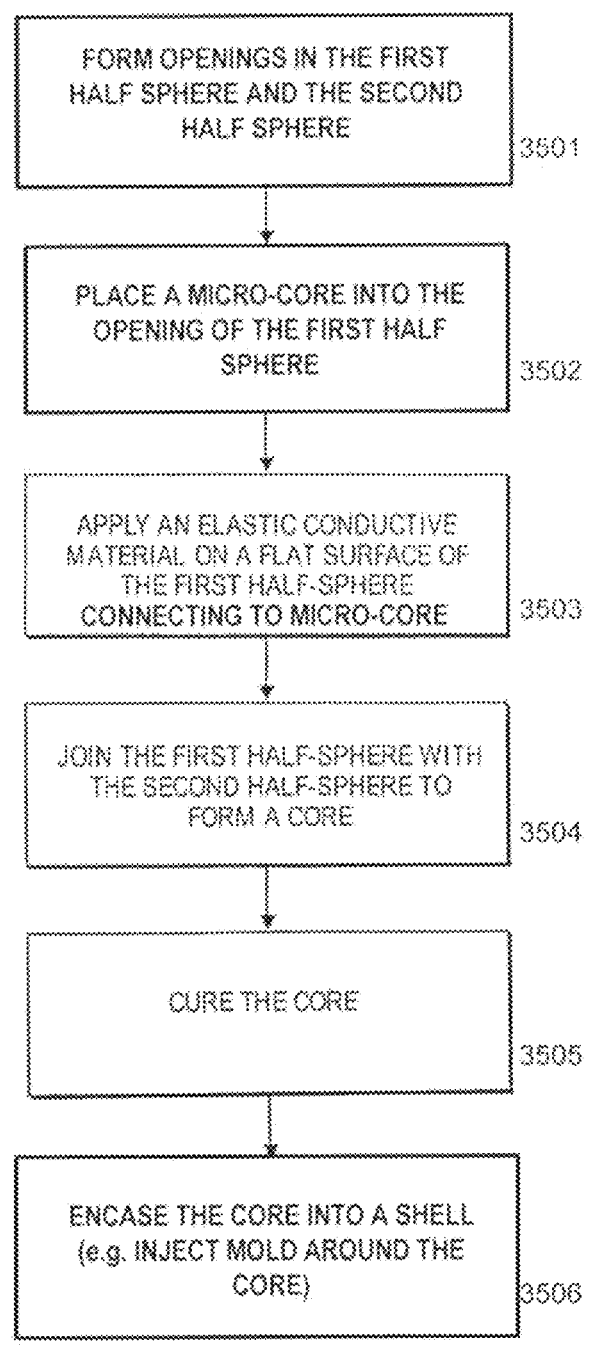
FIG. 35 is a flow chart of a method for manufacture of a golf ball containing a micro-core that contains electrical circuitry.

One embodiment of a method of manufacturing the golf ball with micro-core is described in FIG. 35 and illustrated in FIGS. 28, 29, 30, and 32. In FIG. 35, a void or opening is created in one half-sphere of the golf ball core 3501. The micro-core containing one of more of internal electronic circuitry, external antenna leads and external electrical circuitry is inserted into the opening 3502. Elastic conductive material is applied to the flat surface of the half-sphere 3503. The first half sphere is joined with the second half sphere 3504. Using typical golf ball manufacturing techniques, the two half cores are cured 3505 and a shell is attached to the core 3506.

Alternate Method of Manufacturing Golf Ball with Micro-Core

Figures 39A, 39B:
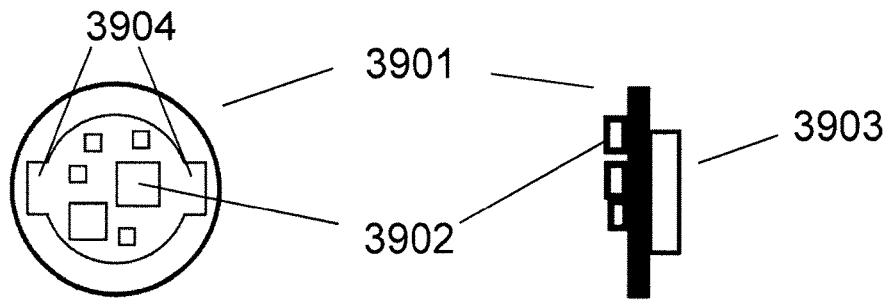
FIGS. 39A, B, C, D, E, and F show an embodiment of a method of manufacturing a golf ball containing a micro-core and electronic circuitry.
Figures 39C, 39D:
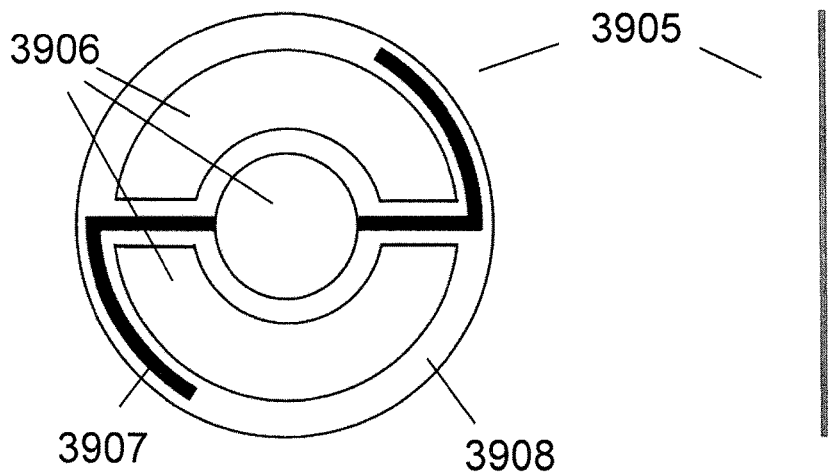
FIGS. 39G and 39H show an embodiment of a method of manufacturing a golf ball containing a micro-core and electronic circuitry that includes multiple sensors.
Figures 39E, 39F:
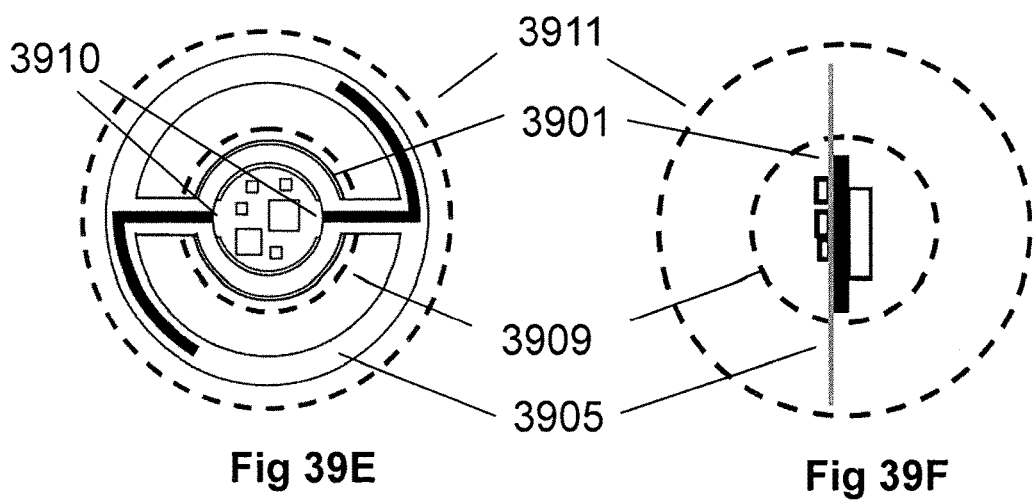
Figure 40:
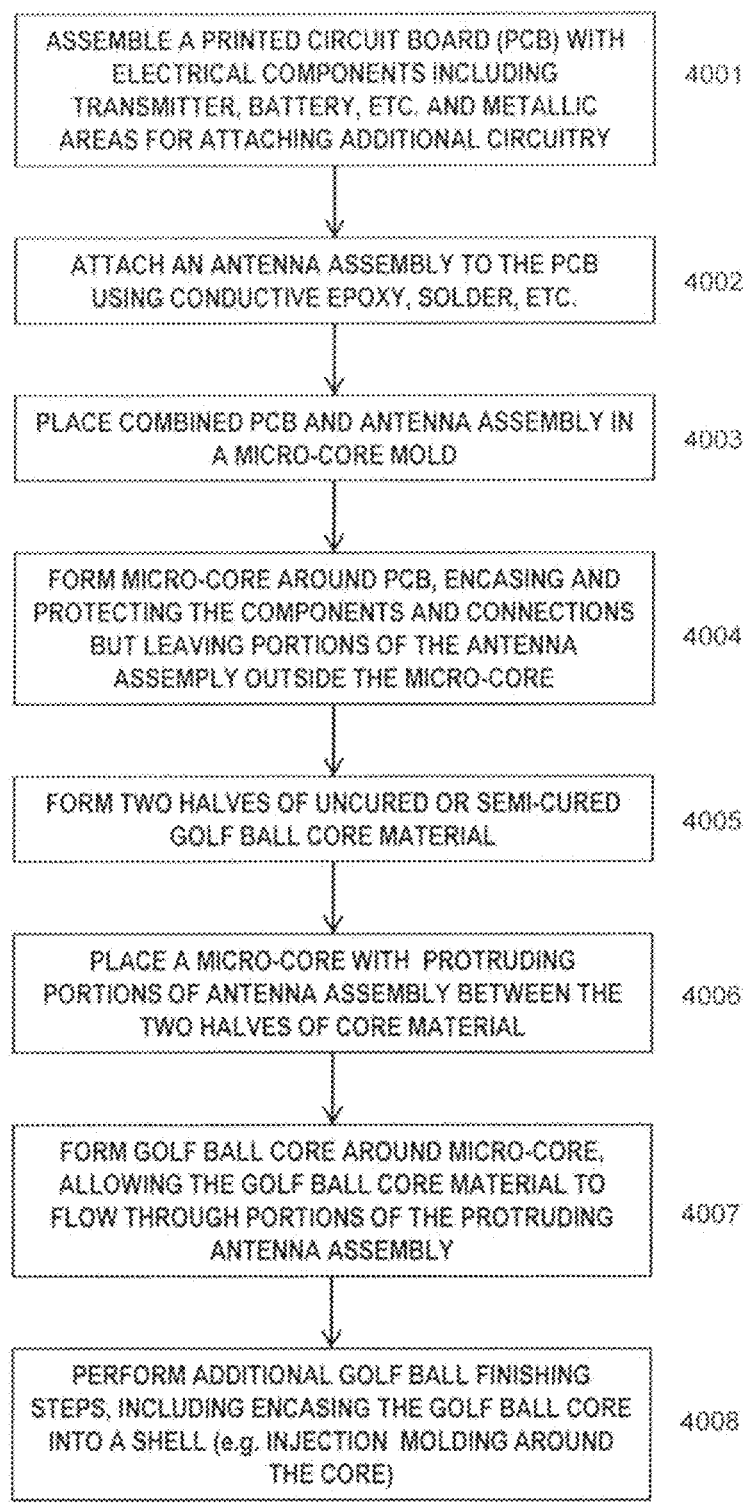
FIG. 40 is a flow chart that describes a process of manufacturing a golf ball containing a micro-core and electronic circuitry.

Another embodiment of a method of manufacturing the golf ball with micro-core is illustrated in FIGS. 39A-F and described in FIG. 40. FIGS. 39A and 39B show a printed circuit board (PCB) assembly 3901 with electrical components 3902 and battery 3903. FIG. 39A shows a front view and FIG. 39B shows a side view. The battery 3903 may be a primary lithium coin cell battery, for example. The PCB includes metalized pad areas 3904 for attaching additional circuitry, such as an antenna assembly, using conductive epoxy, solder, etc. FIG. 39C shows a front view of an antenna assembly. FIG. 39D shows the antenna assembly from a side view. In one embodiment, an elastic material 3908 serves as a substrate for additional circuitry and is cut into a shape with openings 3906. The openings 3906 allow golf ball core material to flow together from opposite sides of the antenna assembly as described in FIG. 40. The elastic substrate 3908 may be made of HDPE or other elastic material. Elastic conductive ink 3907 can be printed on the substrate 3908 to form additional circuitry, such as antenna elements.

As shown in FIG. 39E, the antenna assembly 3905 is attached to the PCB assembly 3901. The antenna assembly 3905 can be attached to the metallic pad areas 3904 of the PCB assembly using conductive epoxy, solder or another material that creates a conductive bonding of the two pieces. The attaching of antenna assembly 3905 to PCB assembly 3901 can occur at locations 3910. Once the PCB and antenna assemblies are attached, a portion of the combined assembly is encased in a spherical material 3909, also referred to as a micro-core, as shown in FIG. 39E (front) and FIG. 39F (side). The micro-core encases the electronics, providing protection from the heat and pressure of the golf ball manufacturing process steps that will follow while the antenna 3907 and a portion of the substrate 3908 extends outwardly beyond the micro-core. It should be understood that the circuitry can be designed such that the conductive material that is outside of micro-core (and exposed to high heat) conducts the heat through the circuit in such a way to isolate or protect the heat sensitive components from any heat transfer.

The micro-core 3909 can be made of a material that hardens such as polyurethane or a two-part epoxy that cures from a chemical reaction. The micro-core 3909 encases the PCB assembly, including the electrical components and the areas 3910 where the antenna assembly is attached to the PCB assembly. The encasing protects the parts and the attachments from the shock the golf ball will be subjected to in use. The micro-core can be created in a mold that allows the micro-core material to form a sphere around a portion of the combined PCB and antenna assemblies. When removed from the mold, the PCB assembly is encased in the micro-core and portions of the antenna assembly are outside of the micro-core. It should be understood that the portion of the circuitry that extends outside the micro-core could include additional electronics, such as piezo devices or other devices.

The combined PCB assembly 3909 and antenna assembly 3905 are then placed between two halves of golf ball core material in a mold to form the golf ball core 3911. Golf ball cores can be made of many materials but are typically a rubber compound which is cured or vulcanized in high pressure, high heat molds. The two halves of golf ball core material are situated around the combined PCB and antenna assemblies such that the center of gravity of the combined assembly is at the center of the golf ball core and the halves, with the combined PCB and antenna assemblies are placed in a mold and are molded using conventional heating and pressure methods to form the spherical golf ball core 3911. The golf ball core material can flow through the openings 3906 of the antenna assembly 3905 during the molding process and forms a spherical golf ball core 3911. The golf ball core then is further processed into a finished golf ball.

FIG. 40 illustrates the steps of manufacturing the golf ball with micro-core described above. First, in step 4001 the PCB is assembled then attached to the antenna assembly 4002. The combined assemblies are placed in a mold 4003 and molded 4004. The molding process of the micro-core leaves portions of the antenna circuit outside of the micro-core. A slug of golf ball core material is divided into two halves 4005. These halves may or may not have preformed voids to receive the micro-core. The micro-core is placed between two halves of golf ball core material 4006 and molded 4007. Per 4008, additional processing steps are performed to produce a finished golf ball.

Method of Manufacturing a Ball with Multiple Sensors

A method of manufacturing a golf ball with multiple sensors is now described and illustrated in FIGS. 39G-39H. In one embodiment one type of sensor 3913, for example a shock sensor, is embedded inside the micro-core 3909 of the ball. An additional sensor or sensors 3912, for example piezo devices, are electrically connected to the PCB and can be on a flexible and/or elastic substrate. When the micro-core is formed the sensors 3912 are outside of the micro-core as shown in FIG. 39G and FIG. 39H. FIG. 39G shows a cross-sectional view of the micro-core of the ball and FIG. 39H shows a side view of the micro-core of the ball with the core that encapsulates the micro-core shown with dashed lines. The sensors 3912 may require a force to activate and being located outside of the hard micro-core but inside the elastic golf ball core will allow the sensors 3912 to sense the changes in force and report movement to the circuit. The sensors 3912 can include adhesive to be attached to the outside of the micro-core. It should be understood that the configuration shown in FIGS. 39 G-H is just one example of a possible configuration with sensors outside the micro-core and inside the core. There could be one sensor or several sensors outside the micro-core and they could be attached to the outside of the micro-core as shown in FIG. 39H or not attached to the outside of the micro-core as shown in FIG. 39H. The sensors could be configured where one or more is attached to the outside of the micro-core and one or more is not. It might be advantageous to arrange the sensors 3912 such that they could sense forces from all directions.

Tubular Core

Figure 33:
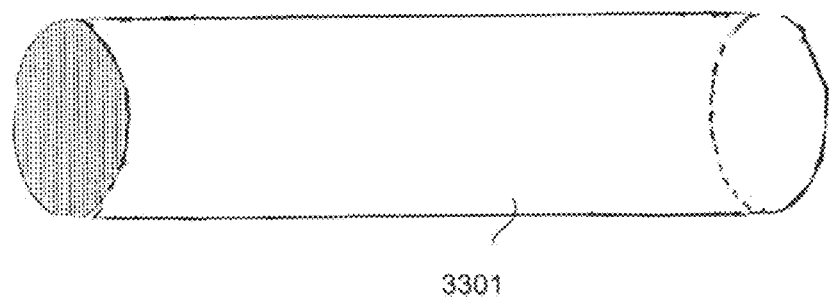
FIG. 33 is a view of a tubular core that contains electrical circuitry.
Figure 34:
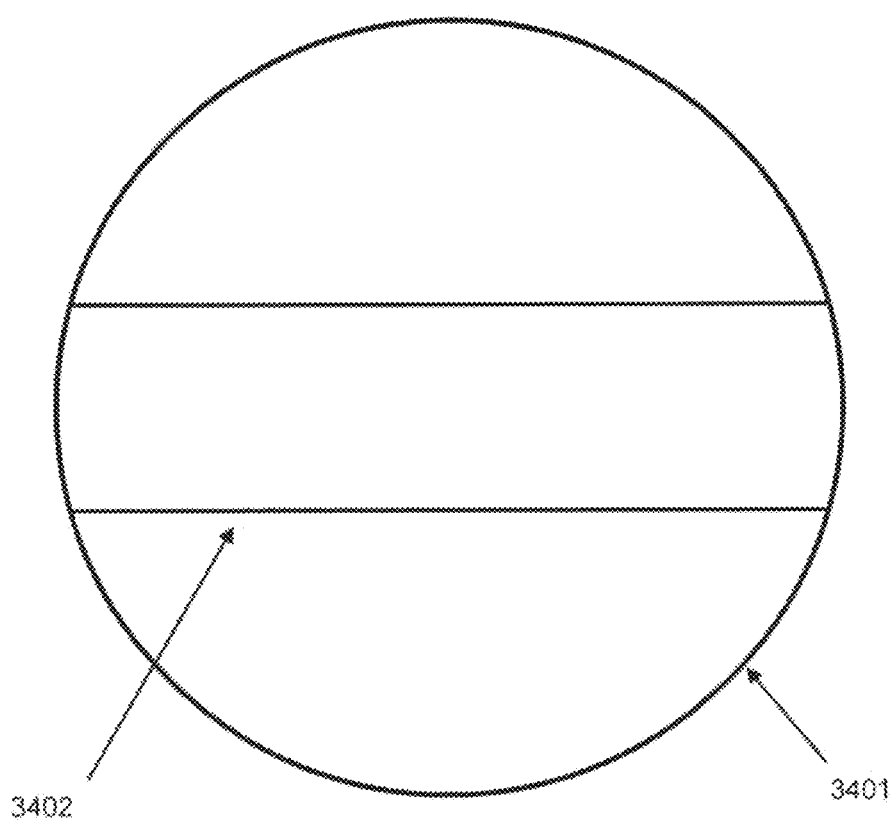
FIG. 34 is a side view cross-section of a tubular core containing electrical circuitry embedded in a spherical micro-core.

Referring to FIGS. 33 and 34, another technique for embedding electronic circuitry in a golf ball is described. The electronic components are housed inside a tubular core, with electrical leads to act as antenna connections or electrical connections protruding from the core. These leads may be composed of electrically conductive elastic ink on a thin flexible substrate, such as Kapton or on a thin elastic substrate, such as HDPE. The leads may wrap partially around the tubular core. The tubular core 3301 is inserted into a hole 3402 in the micro-core, with the electrical leads extending out to the outside surface of the micro-core. The micro-core is inserted into the golf ball core and external electrical connections are implemented as previously described.

Ball Finder

The transmitter in the golf ball tag may also act as a beacon in order to locate a ball that is lost. The golf device may process the received signal from the lost golf ball and give indications to the user on the proximity and direction of the lost ball. The transmitter can be activated by a sensor in the golf ball that detects a hit of the ball by a golf club.

Passive Tags

Passive Tags in Golf Balls

Figure 41:
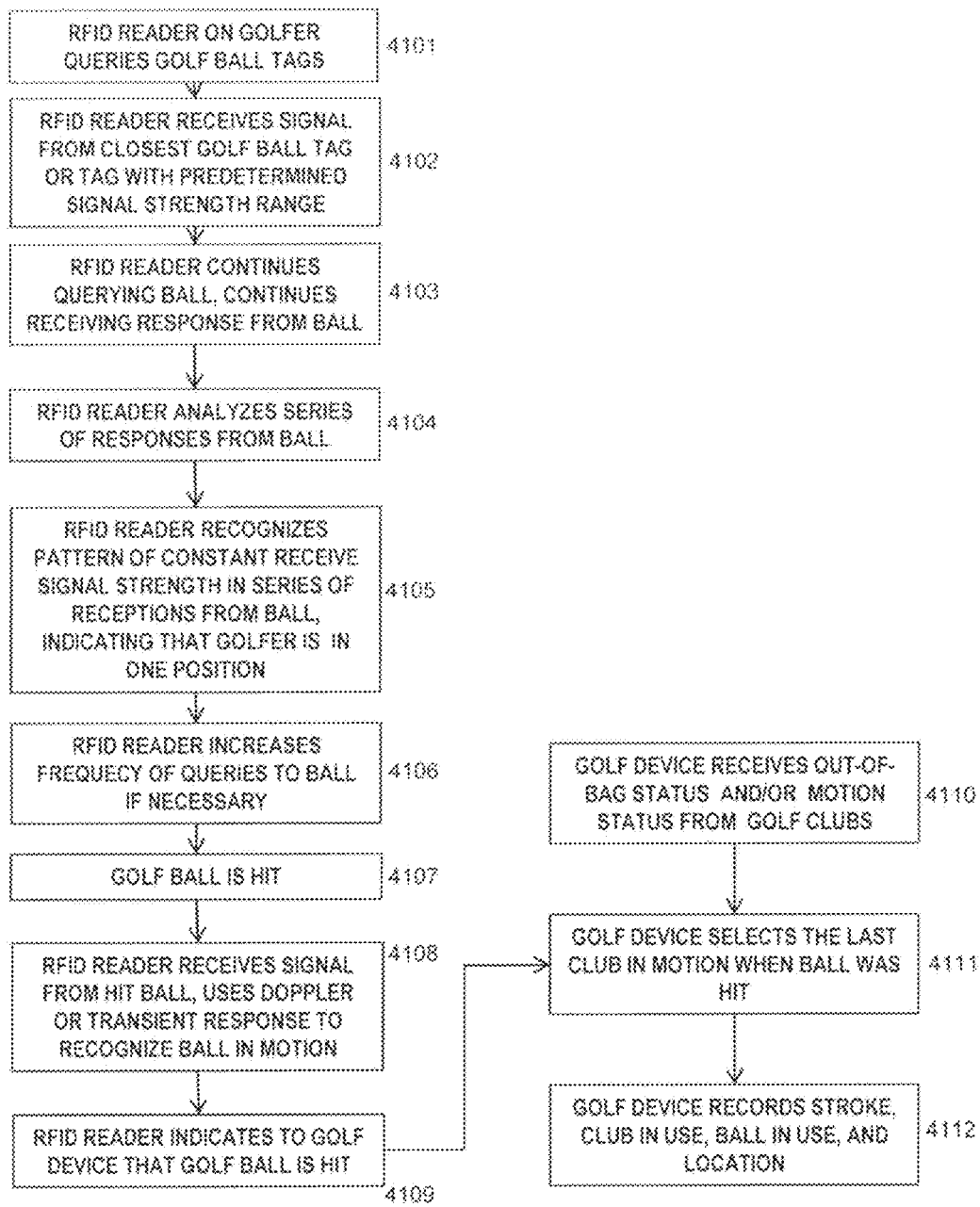
FIGS. 41, 42, and 43 are flow charts of various embodiments describing methods of implementing a reader and tags on golf clubs and in golf balls.

Other techniques of automatically collecting golf data are described. In one embodiment, a golf ball tag may be a passive RFID tag, such as those produced by Alien Technology. The RFID tag is applied to the core of the ball as described in U.S. Pat. Nos. 7,691,009, 7,766,766, and 8,002,645 and pending patent application Ser. Nos. 12/552,162 and 13/230,779. In an alternate embodiment, a similar technique uses a golf ball tag implementing harmonic radar, as described in U.S. Pat. No. 8,002,645 with coded identifier. The RFID or tag reader is attached to or near the golfer, for example the reader can be embedded or attached to a golf shoe, hat or other golf accessory. The reader module contains circuitry to query or activate the tag and to receive data from the tag and to communicate this data to the golf device. The reader may be a separate device, built into a golf accessory worn by or nearby the golfer during play. The reader may be incorporated into the golf device, such as a GPS golf rangefinder (e.g. a SkyCaddie rangefinder from SkyGolf), or it may be incorporated into a cell phone or personal computing device. One embodiment of a method of the present invention is shown in FIG. 41. The RFID reader queries 4101 and receives a signal 4102 from the golf ball (having, for example, a passive RFID in the golf ball) while the golf ball is in range. When the golfer is setting up to take a swing, he is next to the ball at the same location for a period of time. In one embodiment, the system records that the ball is at the same location for a period of time based on the received signal strength, operations 4103, 4104, and 4105, and therefore assumes that the golfer is setting up to take a stroke. In one particular embodiment, the system then prompts the reader to read the tag more frequently 4106. In this way the reader can more accurately capture the moment when the ball has been hit, and continue to receive transmissions as the ball is moving away from the immediate area. When the ball is hit, the reader module continues to receive a signal from the ball as long as the ball is in range. When the ball is hit 4107, the reader continues to query and receive a signal from the ball during the first part of its flight (such as in operation 4108). The received signal is processed in the reader using Doppler techniques or transient signal analysis to recognize that the ball is in motion 4108. In operation 4109, the RFID reader indicates to the golf device that the golf ball has been hit. On receiving information that the ball is in motion and therefore has been hit, the golf device records a stroke at that location 4112 with the club in use 4111 as previously described (from operation 4110). Optionally, the sudden absence of the golf ball code received by the RFID reader, combined with other information received by the golf data collection system, can prompt the recording of a stroke.

RFID Reader in Golf Accessory

Figure 37:
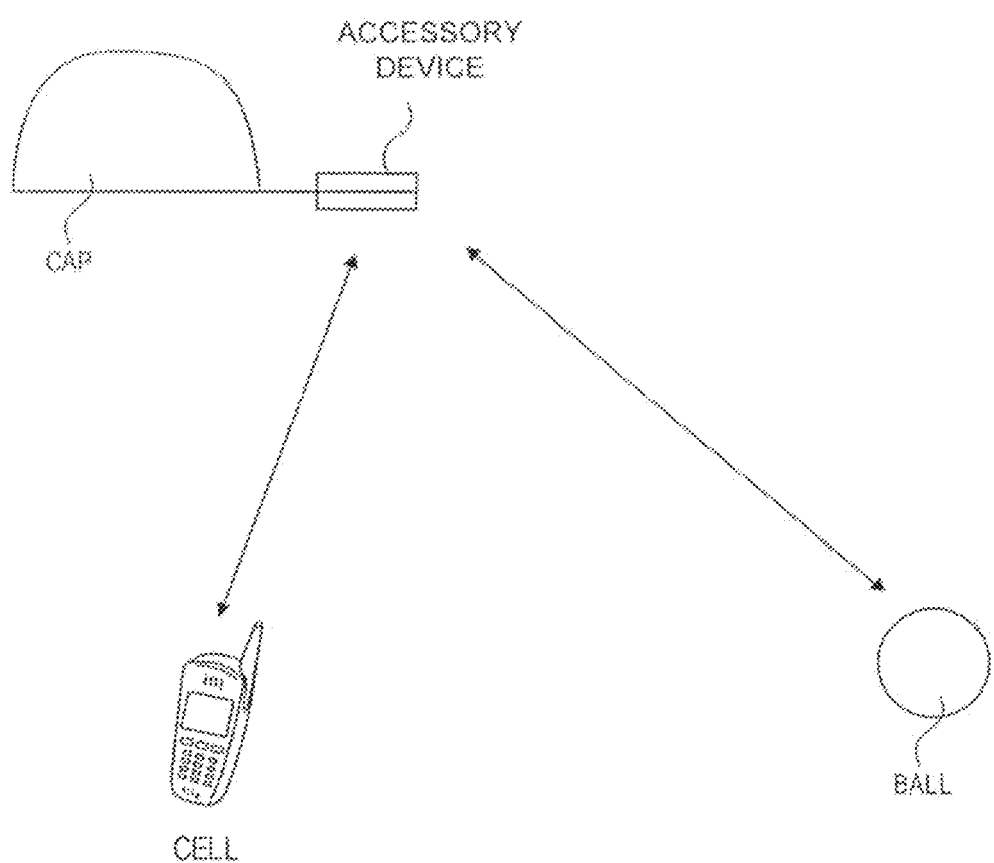
FIGS. 37 and 38 are examples of a golf accessory device that is worn on the golfer.
Figure 38:
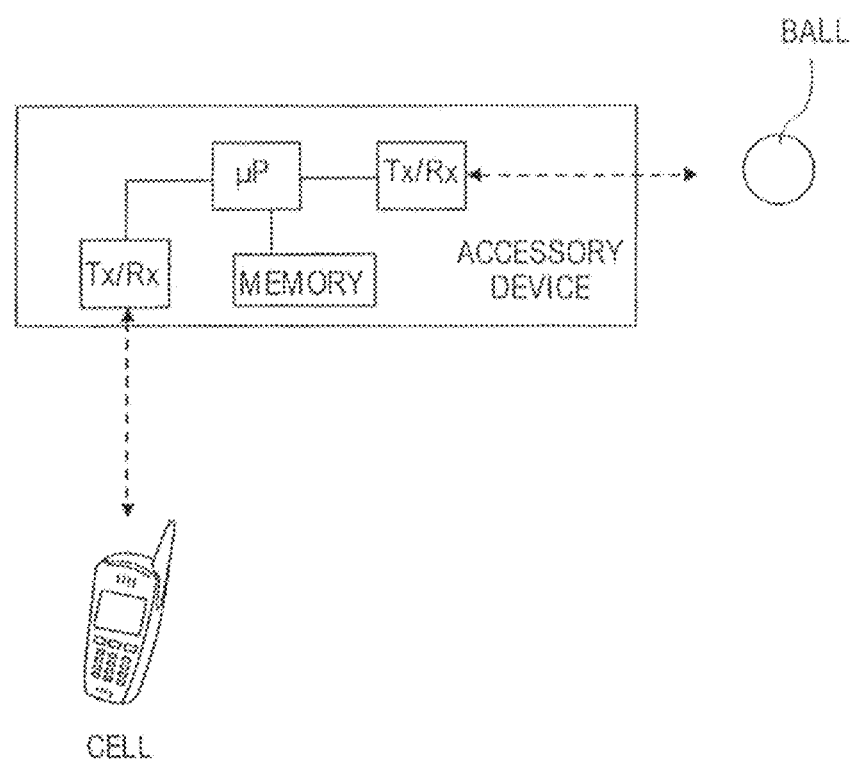

A technique for implementing a RFID reader in an accessory worn by the golfer, such as embedded or attached to a shoe or hat is shown in FIGS. 37 and 38. A directional antenna is employed to provide coverage of a predetermined area in which the ball would be located prior to a stroke.

Prior to the golf stroke, the RFID reader queries and receives data from the RFID tag in the golf ball. The electronics for the RFID reader are contained in a small enclosure such that it could be worn on a person. In one embodiment, the RFID reader is worn on a shoe, for example, with a directional antenna providing coverage of the area immediately in front of the shoe. In another embodiment, the RFID reader is worn on a hat, for example a hat with a visor, such as a baseball cap. The directional antenna is incorporated into or attached to the bill of the cap. When the golfer is set up to take a stroke, the bill of the hat is pointed at the golf ball on the ground, such that the ball is in range of the RHD reader on the hat. In another embodiment, the RFID reader can be part of a mobile golf GPS rangefinder (e.g., a SkyCaddie from SkyGolf) which can be worn on a golfer's belt or in a pocket of the golfer.

When setting up to take a golf stroke, the golfer is in a typical stance, and the RFID reader can be optimized to take advantage of that stance. Just before a stroke, the golfer's feet are fixed and pointing forward toward the ball. The directional antenna in the RFID reader that is attached to the shoe is pointed straight ahead toward the ball, while the golfer is in this stance. When the golfer takes a swing, typically the foot toward the front stays fixed in place during the swing. That is, for a right-handed golfer, the left foot stays fixed during the swing; similarly for a left-handed golfer, the right foot stays fixed during the swing. The reader can be attached to the foot that stays fixed during the swing. Other characteristics of the golfer's stance during a swing include the position of the head. During the swing the head is down with the face pointing toward the ball on the ground. During the swing, the head stays down until the follow through at the end of the swing. A RFID reader in a hat would contain a directional antenna that is mounted on the visor of the hat that is pointed at the ball on the ground during the swing. For these scenarios, the golfer and RFID reader are in a fixed position relative to the ball before and during a swing.

RFID Receiver and GPS Receiver as Golf Accessory

In certain embodiments the RFID receiver (configured to receive signals from the RFID club tags and ball tags described herein) and the GPS receiver are housed in an accessory. The accessory can be worn on the golfer, for recording the location of the golfer when golf strokes occur. The accessory can come in many forms, including a watch, a golf glove, a wrist or arm band, a hat clip, belt clip, shoe clip, etc. or the accessory components can be built directly into items such as a watch, a hat, belt, shoe, etc. The accessory can be further equipped with a transceiver/radio, such as Bluetooth, Wi-Fi or other, for storing received RFID data and transferring stored data to other devices (e.g. devices with displays or screens, such as mobile phones, tablet computers, golf-cart mounted displays, etc.). The accessory can transfer the data either immediately upon receipt or when the accessory and the other device(s) are a certain distance apart or by a prompt from the user.

Golf Accessory Equipped with Stroke Sensing Means

In another embodiment, a golf accessory worn by the golfer as described above can also be equipped with a means of sensing the golf stroke. Including the means of sensing the golf stroke in the golf accessory (rather than in each of the golf club tags) saves on cost, size, etc. of including the stroke sensing elements in the golf club component/tag.

Stroke Sensing by Impact

For example, a golf watch equipped with GPS, RFID receiver/transceiver for receiving signals from golf equipment tags, and radio such as Bluetooth or Wi-Fi for communicating with a display device, can also be equipped with impact sensing element(s) (such as a piezo device, shock sensor, accelerometer, vibration sensor, tilt sensor, etc.) which can sense the impact of the golf club on the golf ball. Because the watch is worn on the wrist and the wrist is in close proximity to the hands gripping the golf club, the impact of the club on the golf ball will send shock waves through the club and into the hands and wrist which can be sensed by the impact sensing element(s). When the golf accessory senses the impact the golf accessory transmits a signal indicating that there was an impact. Alternatively, the golf accessory stores the location and time of the impact and the club used in order to transmit this information at a later time. As described herein, the combination of a signal indicating impact can be combined with other signals (such as signals from golf club tags indicating motion of the golf clubs) to determine which club is being used and when actual golf club strokes occur. A user activatable switch can also be included to allow a golfer to confirm a stroke or swing was taken either independently of the sensors or as a response to a prompt (e.g. a displayed user interface that asks the golfer to confirm a sensor detected stroke) caused by one or more sensors detecting a possible stroke. A golf accessory equipped with impact or motion sensing element(s), such as the watch described herein, can take other forms. It can potentially be incorporated into anything that can be worn on the golfer's hands or arms. For example, an arm band device, a wrist band, a golf glove, a ring, etc. In one embodiment, an impact sensing device in a golf GPS watch, or other golf accessory, can be used in combination with golf club RFID tags, described herein, that use measurements of light variations to determine the golf club in use (due to its "in-motion" status).

Stroke Sensing by Sound

Stroke sensing elements in a golf accessory can be something other than sensing the impact of the golf club on the golf ball. For example, the stroke sensing element can be a microphone, for example, configured to "hear" the sound of the golf club striking the golf club. With a "listening" type of stroke sensing means the listening elements would not have to be included in something worn on the golfer's hands or arms. The listening components could be included in a mobile device, a golf GPS device or a golf accessory device as described herein.

Stroke Sensing by Sight

Stroke sensing elements in a golf accessory could also be components, such as a camera, configured to capture/recognize the image of a golf ball and/or the image of a golf club striking a golf ball. Object recognition software can be used to capture when a golf ball is present or not present and/or video can capture when an actual swing occurs. Additional information, such as the spin rate of the golf ball, the initial velocity of the golf ball and the launch angle of the golf ball could potentially be captured during an actual round of golf with such a device. A golf accessory equipped with a camera would be situated to have the camera pointing toward the area where the golf ball is during impact. For example, a golf accessory equipped with a camera could be clipped onto the bill of a golfer's hat as the golfer is always looking in the direction of the golf ball during a golf swing. A golf accessory with a camera for capturing a golf stroke could be attached to other items, such as golf shoes, belt, ankle strap etc.—any part of the golfer that would allow for the camera to be aimed at the location of the golf ball during impact.

Filtering/Correlation

The stroke sensing accessory configurations described herein can each be further enhanced using other information available to the system, such as GPS location, motion and magnitude of motion of golf clubs, etc. as described herein.

For the impact sensing approach, different impacts could be "learned" by the system and correlations can be made to filter out impacts that would not be likely to be accurate. For example, using the system described herein (i.e. an impact sensing golf accessory, golf club tags, and a display device) the golfer could "learn" or program the different impacts of different types of swings and different types of clubs. This could be performed by the gofer or by the manufacturer of the system. For example, a Driver striking a golf ball with a full swing will have a much different impact than a Driver striking a golf ball with a gentle/partial swing. And a full swing Driver will have a much different impact from a full swing Pitching Wedge. As an example of the system in use, if the golfer is on the tee box (known by the GPS information) with a Driver in hand (known by the light sensing club tags) and the golf accessory senses an impact that correlates with that of a partial swing Pitching Wedge, the system can "ignore" or filter out that impact as something erroneous and incorrect. Optionally, the system may store the impact information for each club over many rounds of golf to create a profile for that particular golfer. In this way, the system "learns" over time the impact information for the golfer.

Similarly, a stroke sensing system based on sound can be enhanced. The sound of the golf club striking the golf ball is something that can be "learned" by the sound receiving means by recording the sounds of various clubs for various types of golf swings striking a golf ball. For example, the sound of a full swing of a Pitching Wedge striking a golf ball will be different than the sound of a partial swing of a Pitching Wedge striking a golf ball. And the sound of a full swing Pitching Wedge striking a golf ball will be very different from the sound of a full swing Driver striking a golf ball. Other sounds, that do not match or closely correlate to the expected sound(s) of a particular type of club and/or swing type, can be filtered out.

Stroke Sensing by Impact Sensing or Button

Figure 51:
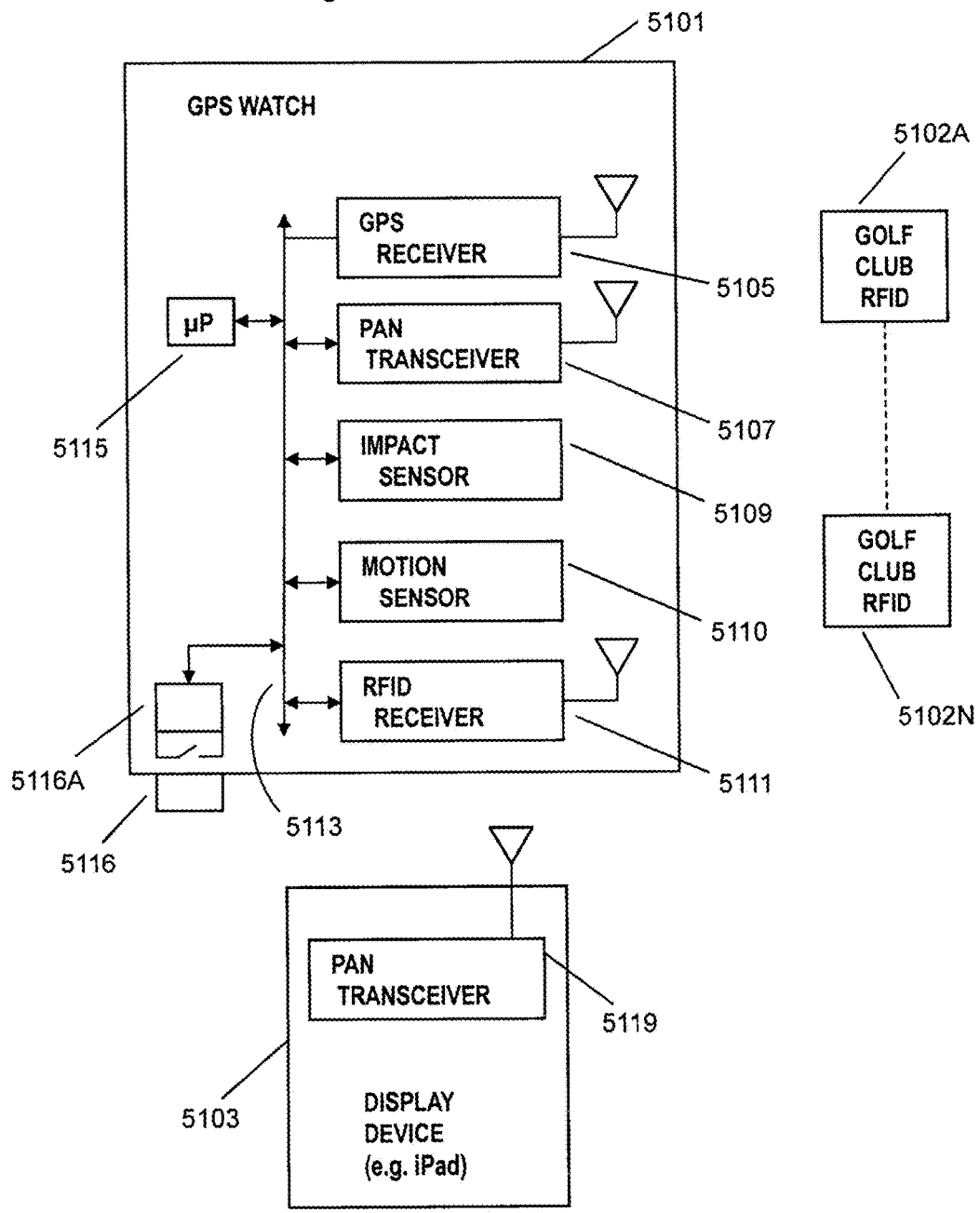
FIG. 51 shows a system, in block diagram form, that includes a golf accessory and a set of golf club RFID tags and a display device.

FIG. 51 shows an example of a system that includes a golf accessory 5101 that can wirelessly interact with a set of golf club RFID tags 5102A through 5102N and wirelessly communicate with a display device 5103 which can be a tablet computer (e.g., an iPad) or a smartphone (e.g., an iPhone). This system can, in one embodiment, monitor the in/out status of golf clubs and remind the golfer if a club is left behind (in the manners described herein) and can also record that a stroke was taken at a particular location that is determined by the GPS receiver 5105. The reminder about a club (being left behind) can be displayed on a display of the golf accessory 5101 or on the display device 5103 or on both, and the record of a stroke (and the location of the stroke and the club used to make the stroke as specified by a club identifier from a golf club RFID tag) can be transmitted through a wireless PAN (Personal Area Network) to the display device 5103, which includes a PAN transceiver 5119, such as a Bluetooth transceiver or a WiFi transceiver or a ZigBee transceiver or an IrDA transceiver, or other PAN transceivers that are known in the art. A PAN is a form of a short range wireless network, typically having a range of less than 50 or 100 feet, and in some cases less than 25 feet. In one embodiment, the Bluetooth transceiver 5107 can act as an RFID receiver and receive club tag identifiers from Bluetooth transceivers in each of the golf club tags. In this case, the Bluetooth transceivers in the club tags are acting as RFID devices. The display device 5103 can include a display and memory, both coupled to a processing system; the memory can store one or more maps of golf courses and the display device 5103 can show the positions, on the maps, of the strokes taken (with which golf clubs). Further, by accumulating the information (about strokes) received from the golf accessory 5101, the display device 5103 can display scores of one or more golfers, each using a separate golf accessory such as golf accessory 5101.

The golf club RFID tags in the system, such as RFID tags 5102A through 5102N, can be the same as any one of the RFID tags described herein (e.g. the tag shown in FIG. 6A) and can include one or more light sensors that are used to determine the in/out status of a golf club relative to a golf bag (in order to remind the golfer if the club is left behind and also to be used to record the club used to make a stroke). Moreover, the one or more light sensors can be used to determine motion status (determined from light variations) as described herein in order to determine (1) which club in a set of clubs having an "out" status is being used to swing at a ball and (2) when or whether a swing is being taken. The RFID transmitters, which can be part of a Bluetooth transceiver, in each of the golf club RFID tags can transmit their respective club identifiers and in/out status and motion status to the RFID receiver 5111 (which can be part of a Bluetooth transceiver in the golf accessory 5101) in golf accessory 5101 which can then, in turn, transmit a recorded stroke (including the club identifier and GPS position of the stroke) to the display device 5103 once the golf accessory 5101 determines a stroke was taken.

The golf accessory 5101 can include a GPS receiver 5105 that determines the position (e.g., in GPS latitude and longitude coordinates) of the accessory 5101 which can be a GPS watch or arm band or be part of a golf glove, for example. The GPS receiver 5105 can be coupled to a processing system, such as microprocessor 5115, through a bus 5113. The PAN transceiver 5107 in the golf accessory communicates with PAN transceiver 5119 in the display device and provides, through this communication which can be under the control of microprocessor 5115, club identifiers and recorded stroke information (e.g., which club was used to take a stroke at a specified GPS location) to the display device 5103. The golf accessory 5101 can also include an impact sensor 5109 that senses the impact of the club, held by the golfer's hand and arm, on the ball. The impact sensor 5109 can be coupled to microprocessor 5115 through a bus 5113 in one embodiment. The golf accessory 5101 can also include a motion sensor 5110 (e.g. an accelerometer) to detect motion. The golf accessory 5101 can also include signal strength circuitry that can be used to determine the closest golf club that is in use (when a stroke is taken). This circuitry can be independent of PAN 5107 or part of PAN 5107. The golf accessory 5101 can also optionally include a button 5116 that, when pressed or otherwise activated, causes a user activatable switch 5116A to sense the user input which can be used to manually indicate a stroke was or will be taken with the currently sensed (through the methods described herein) club or to confirm that a sensor detected stroke is in fact an actual stroke taken by the golfer. This confirmation can occur when the golfer activates the switch in response to a prompt on a user interface of the golf accessory. The prompt can be caused by the one or more sensors detecting a potential stroke or swing. The switch can be an actual electromechanical switch on the golf accessory or a switch that is implemented as a user selectable button or other GUI (graphical user interface) displayed on a touch screen of the golf accessory. The accessory 5101 can determine the club in use as described herein (e.g., through the in/out status and the motion status as indicated by one or more light sensors) and when the golfer presses or otherwise activates button 5116, the accessory 5101 can then record that a stroke was taken with the identified club.

Figure 52:
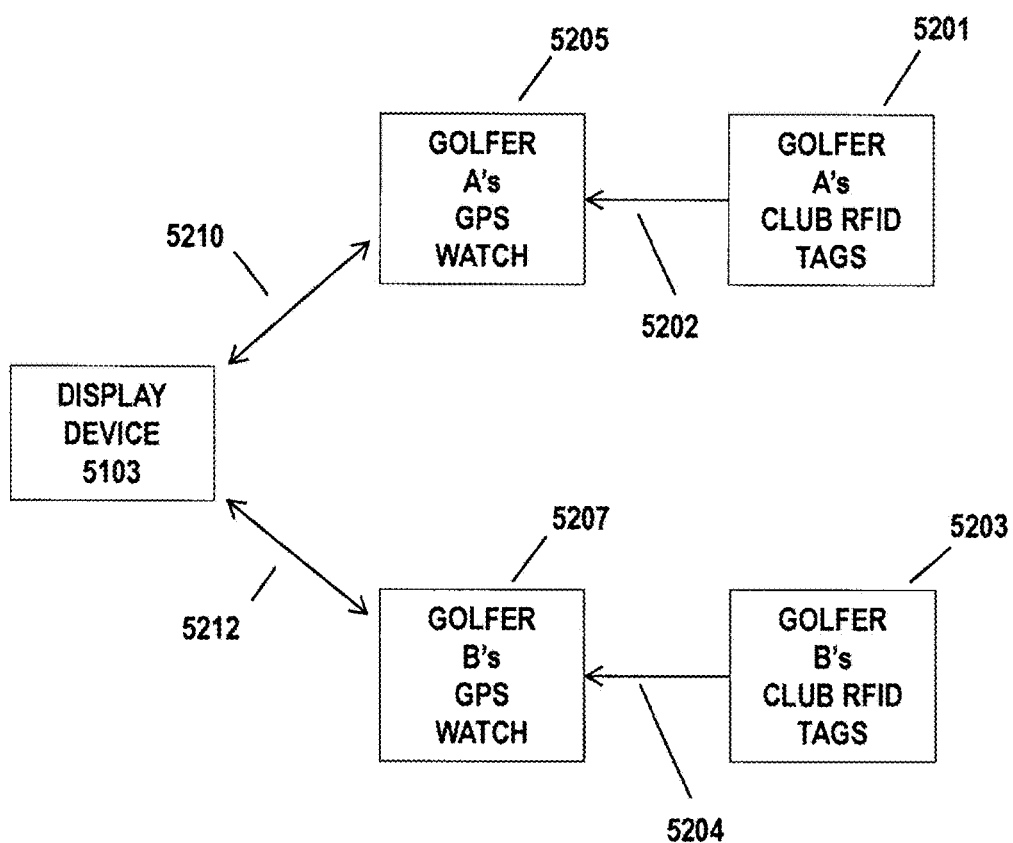
FIG. 52 shows a system in which a plurality (two or more) golf accessories can share a single display device.

FIG. 52 shows an embodiment in which a single display device, such as display device 5103, is shared by two or more golfers, each having a set of one or more golf club RFID tags and each having a golf accessory, such as GPS watches 5205 and 5207. The display device 5103 in FIG. 52 can be the same as display device 5103 in FIG. 51. The display device 5103 can be programmed, paired, or otherwise configured to operate with one or more golf accessories such as GPS watches 5205 and 5207. The communications between these GPS watches 5205 and 5207 and display device 5103 can be through Bluetooth transceivers that allow each GPS watch to communicate with the display device 5103 to provide stroke information for each golfer. Each GPS watch can be paired with display device 5103 so that its communications with the display device 5103 are authenticated and identify each golfer by name, thereby allowing display device 5103 to keep score for each golfer by accumulating the recorded strokes that are reported in transmissions, such as communications 5210 and 5212, from each GPS watch, such as GPS watches 5205 and 5207.

Two (or more) different golfers, such as golfers A and B, can wear their respective GPS watches 5205 and 5207 on their arms and use those watches to manually or automatically record golf strokes (and also to trigger reminders if a golf club is left behind). Each GPS watch 5205 and 5207 can be the same as golf accessory 5101 in FIG. 51, and each GPS watch 5205 and 5207 can interact with its respective set of golf club tags. In particular, golfer A's set of golf club tags 5201 can be learned by GPS watch 5205 so that GPS watch 5205 recognizes and records and processes transmissions from the one or more golf club RFID tags 5201 but does not recognize and record and process transmissions from the one or more golf club RFID tags 5203. Similarly, golfer B's set of golf club tags 5203 can be learned by GPS watch 5207 so that GPS watch 5207 recognizes and records and processes transmissions from the one or more golf club RFID tags 5203 but does not recognize and record and process transmissions from the one or more golf club RFID tags 5201. When the system shown in FIG. 52 is set up in this manner, each golfer can wear their respective GPS watch and use it to record their game of golf and to keep their score on the same display device without interference with the other golfer's clubs or watches.

Active Club Tag Triggers Ball RFID Reader

Figure 42:
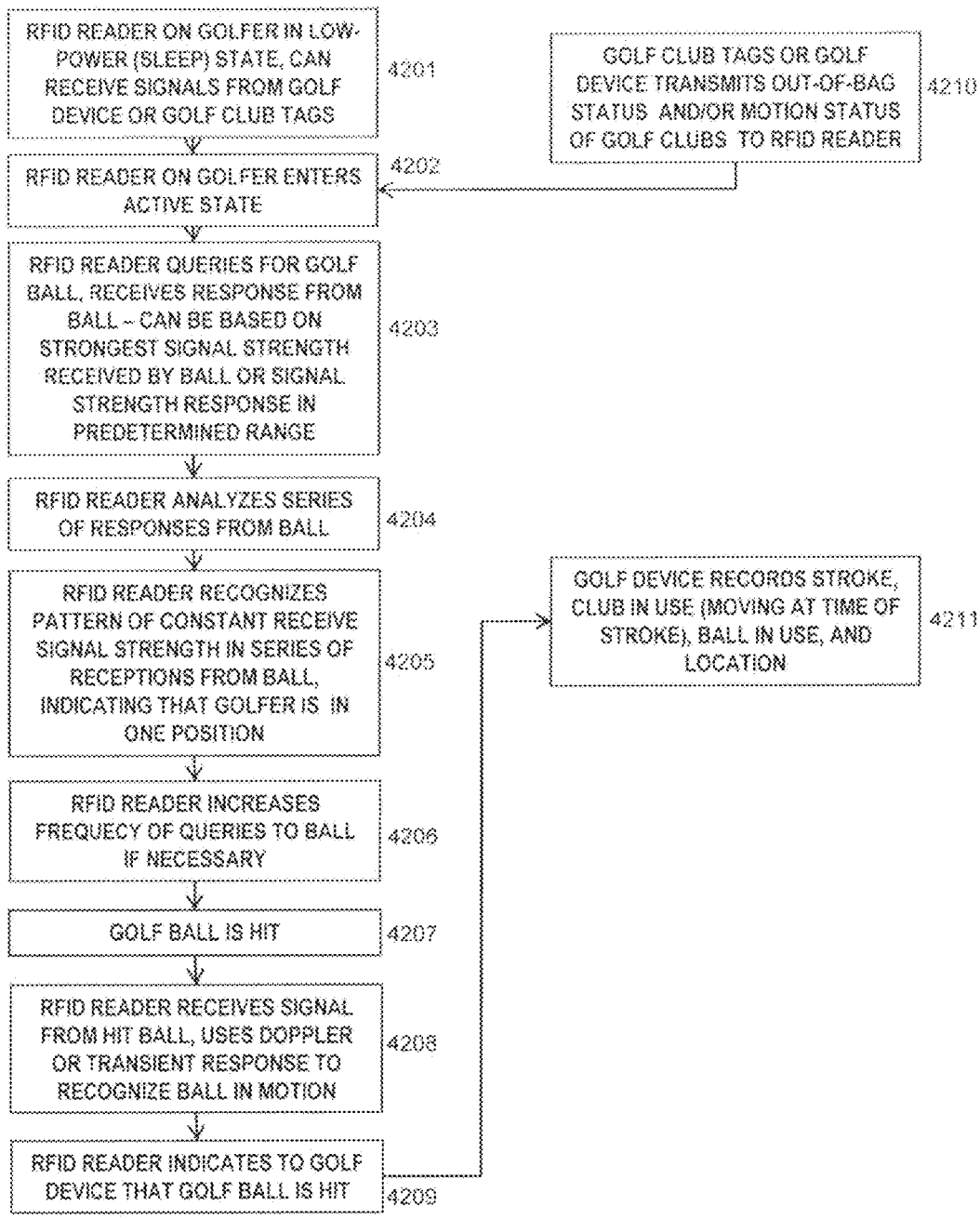

A system that includes a passive tag in the ball and an active tag on the golf club is now described. The active tag on the club has been described, including techniques to determine that a club is in use, based on its motion (see, e.g., methods shown in FIGS. 7F, 7G and 7H). The passive tag in the ball has been described, using a RFID or tag reader to query and receive information from the ball. In another typical embodiment of a method shown in FIG. 42, as a means of saving power in the RFID tag reader, the reader can change modes of operation based on receiving information from the golf club tags or other elements of the golf data collection system. For example, the RFID reader can be in a low power state 4201 until it receives a message from the golf device or golf club tags that a club or clubs are out-of-the-bag, in motion, etc. 4210. When the RFID reader receives these messages or other information from the golf data collection system (for example, signal strength information received by the GPS device by golf club tags) the RFID reader wakes up from the low-power state and enters an active state 4202. The reader can begin transmitting and receiving signals 4203 and analyzing received signals in operations 4203, 4204, 4205, and 4206. Using techniques previously described, the reader recognizes when the ball is hit 4207 and 4208 and gives data to the golf device 4209, and the golf device records the stroke 4211.

Figure 36A:
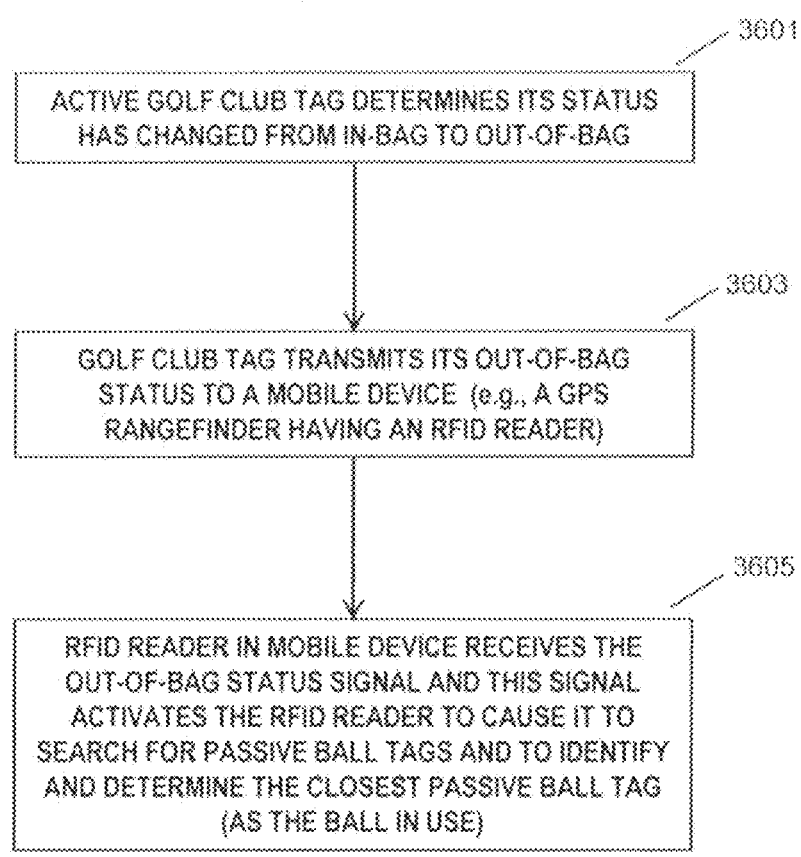
FIG. 36A is a flow chart which shows a method for using an active golf club tag and a passive golf ball tag.

FIG. 36A shows an example of a method which can use an active golf club tag to trigger an RFID reader to search for and identify at least one passive golf ball tag in order to determine the presence of a golf ball and to determine if a stroke was taken. In operation 3601, an active golf club tag determines its status has changed from in-bag to out-of-bag; this can be performed as described herein through the use of one or more light sensors or other sensors. In response to the change of status from operation 3601, the golf club tag transmits its out-of-bag status to a mobile device such as a GPS rangefinder having an RFID reader. In another embodiment, the mobile device does not include a GPS receiver but is a golf accessory which includes the RFID reader. Then in operation 3605, the RFID reader in the mobile device receives the out-of-bag status signal and this causes it to activate the RFID reader to cause it to search for passive golf ball tags and to identify and determine the closest passive golf ball tag. This will indicate the golf ball in use and the RFID reader can continue to send signals, such as query signals, to the passive RFID tag in the golf ball to determine the presence of the ball. The RFID reader can use signal strength to determine which ball tag is the closest tag which can be assumed to be the ball in use, and when the signal from the passive tag disappears, then it can be assumed that the ball has been hit away and a stroke can be recorded as described herein.

In a similar embodiment, when the golf GPS device determines that a golfer is set up for a stroke and a club is in motion, using techniques previously described, the device then activates a RFID or tag reader to determine the ball in use. In other embodiments, the RFID reader can receive other messages from sensors in golf equipment worn on the golfer to change modes of operation.

Detecting Movement of the Golf Ball

As described in patent application Ser. No. 12/170,413, filed Jul. 9, 2008, entitled "Apparatuses, Methods and Systems Relating to Automatic Golf Data Collecting and Recording", incorporated by reference, a RFID transceiver uses Doppler radar or transient response of the club tag signal amplitude and/or phase response to detect the velocity of the club followed by the velocity of the ball. The same technique is applied to detect motion of the ball in the current embodiment, when passive tags are in the golf ball. The receiver or transceiver in the RFID or tag reader receives the signal from the tag in the ball. The receiver can use Doppler techniques or transient response of the ball tag signal amplitude and/or phase response to detect that the ball is in motion. When the passive ball tag is in motion, the transient response of amplitude and/or phase in the received signal is different than the response in the received signal when the tag is not in motion. Similarly when the tag is in motion, there is a Doppler response presented by a shift in frequency. In an alternate embodiment previously described, a receiver in the golf device receives a signal transmitted by a golf ball with an active RFID tag. The motion of the ball with active tag can be determined using techniques previously described, such as motion sensor in the ball.

Passive RFID Club Tags

Figure 43:
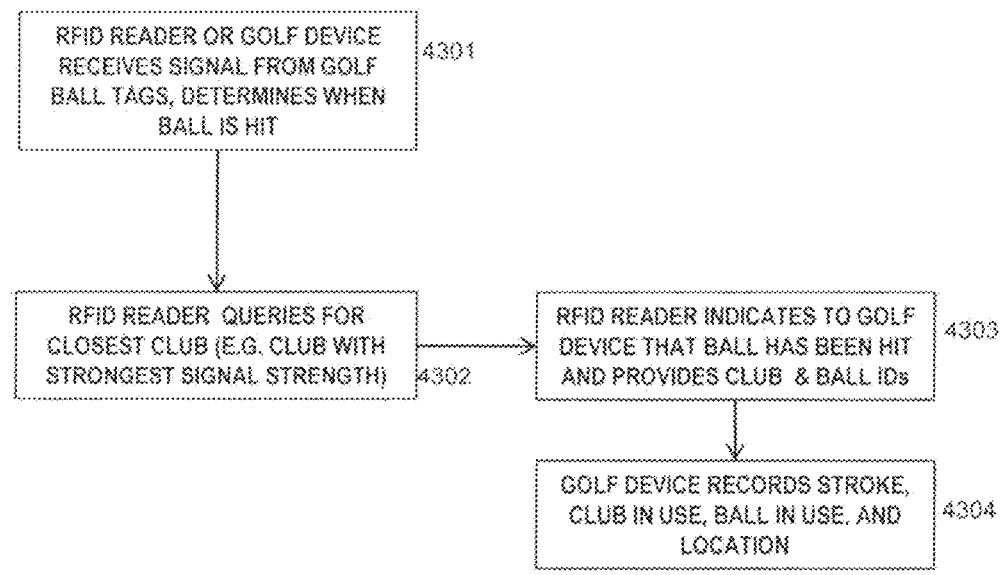

An alternate embodiment is described for the club tag. The tag attached to the golf club may be a passive RFID tag, such as those produced by Alien Technology. The RFID reader may be incorporated into the golf device (such as a GPS rangefinder) or golf accessory worn by the golfer. The RFID reader contains circuitry to query or activate the tag in a golf club and to receive data from the tag and to communicate this data to the golf device. The golf ball may contain active circuitry or it may contain a RFID tag. An embodiment of a technique is illustrated in FIG. 43. When the golf device or RFID reader determines that a ball has been hit 4301, using techniques previously described, the RFID reader then takes readings from nearby golf club tags 4302. In one embodiment, the club tag closest to the reader is recorded as the club used for the stroke 4303. This data is sent to the golf device and a stroke is recorded 4304. The RFID reader may be attached to the golfer as an independent module, or it may be incorporated into a golf device such as a GPS golf rangefinder (e.g. a SkyCaddie GPS rangefinder from SkyGolf). If the RFID reader is a separate module, it has a means to communicate with the golf device. When the reader is in proximity to multiple clubs, for example the golf bag full of clubs, it may query the clubs in the bag to determine if any of them are missing and transmit this information to the golf device.

Figure 36B:
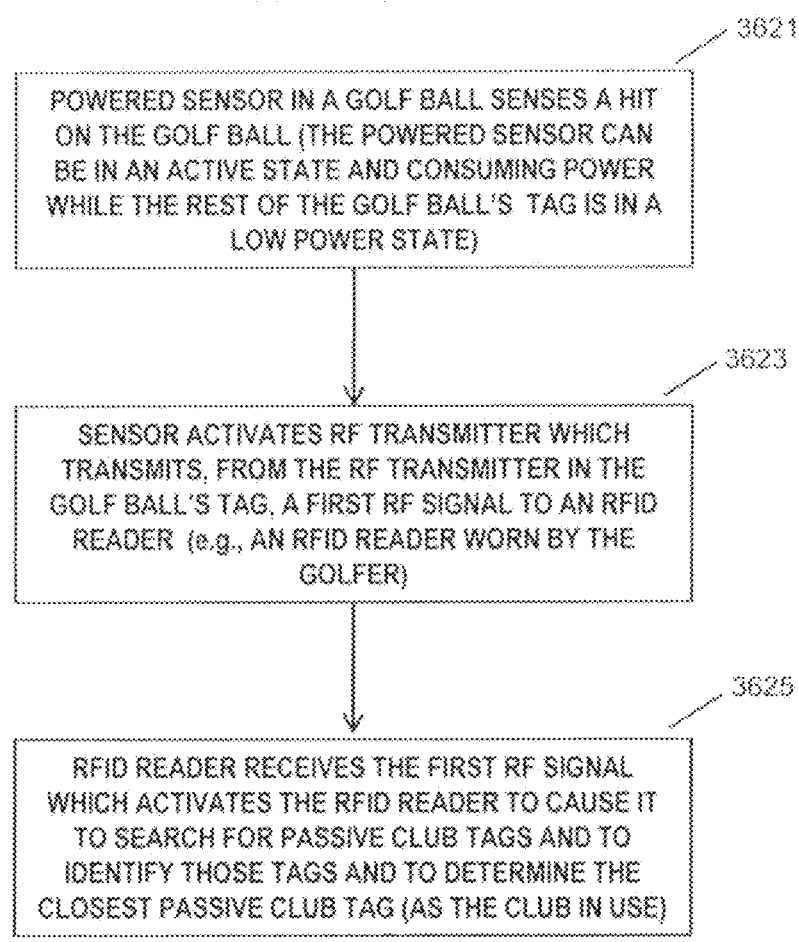
FIG. 36B is a flow chart which shows a method for using an active golf ball tag and a passive golf club tag.

FIG. 36B shows an example of a method in which an active golf ball, having a sensor, can activate an RFID reader in order to cause the reader to search for and to identify a golf club in use based upon signals received from one or more passive golf club tags. In operation 3612, a powered sensor in a golf ball senses a hit on the golf ball; this has been described herein and can involve a powered sensor that can be in an active state by periodically waking up to detect whether or not the ball has been hit through an impact and then going back to sleep and then repeating the process. Upon sensing a hit, the sensor can activate and cause power to be supplied to an RF transmitter to transmit a first RF signal, as shown in operation 3623, and this signal can be transmitted to an RFID reader, such as an RFID reader worn by a golfer as a golf accessory, or an RFID reader which is part of a golf GPS rangefinder which can be worn by a golfer. Then in operation 3625, the RFID reader receives the first RF signal which activates the RFID reader to cause it to search for passive club tags and to identify those tags and to identify those tags and to determine the closest passive club tag that will assume to be the tag and club in use. Received signal strength which is received by the RFID reader can be used to determine which of the passive club tags is the closest tag and hence should determine the club which is in use.

System Alerts

Twilight Function—Low Light Warning

The club tags transmit based on the sensing of light and darkness. There will be times when it is too dark for the system to function properly. Because some golfers will play early in the morning or late in the evening, when there is insufficient light for the tags to function properly, the system can include an alerting means—warning the golfer of such conditions. This way, the golfer will realize that it is too dark to rely on the system and not think that the system is working properly. In one preferred embodiment, photo sensors on the receiving unit or bag-mounted device or in a tag of a club can prompt an alert to the user based on the level of light sensed at the receiving unit or at the bag-mounted device or in a tag of a club. This sensor, for example, can be a light sensor coupled to the microprocessor 523 in the golf GPS device 511 shown in FIG. 5. The alert can be in the form of a message on a screen, a sound, a vibration, etc. In an embodiment in which the light sensor is not integrated with the receiving unit (such as an embodiment in which the light sensor is on the golf club or is on a bag mounted device that is separate from the receiving unit), then the signal indicating insufficient light can be transmitted to the receiving unit which can then present the message. In another embodiment the receiving unit (such as the golf GPS device 511), if equipped with time of day information (e.g. from on-board GPS) the receiving unit could rely on time of day information and sunrise/sunset information, including civil twilight information to alert the user when it is too dark to rely on the system. This latter approach may be less reliable as users could be using the system (e.g. learning tags) indoors at night with the lights on and receive a false indication that it is too dark to rely on the system. A combination of the two approaches could also be useful. For example, the receiving unit could first rely on light sensor information on board the receiving unit, then time of day information.

System Security Options and Methods

It is against the rules of golf for one golfer to obtain information about the golf club used by another golfer during a round of golf, other than by mere observation. Any physical act taken by one golfer to obtain such information is a breach of the rules of golf.

It is possible that the USGA and R&A would be concerned about the security of the club tag system described herein. There may be a concern that competitors would be able to find out what club another golfer is using by receiving the information that is transmitted by their competitor's club tag. If a person desires to cheat it is possible for them to do so. Features can be incorporated into the product, however, that would make cheating much more difficult.

In one embodiment, the system will require that club tags be "learned" by the receiving unit. As previously described, the receiving unit can have several embodiments. For example, the receiving unit could be a handheld GPS device, a golf-bag mounted device that communicates with tags and a handheld device, a cell phone or cell phone accessory, or several other embodiments. The receiving unit can be configured to receive or to transmit and receive communication with tags and other devices.

As described in this application and in application Ser. No. 12/405,223, one method for learning tags is as follows:

Each tag has a unique identifier.

The golfer changes the mode of the receiving unit (e.g. a golf GPS rangefinder) to "learn" (e.g. a learn tag mode in which information about a new tag for a golf club is stored/learned into the receiving unit).

The golfer is instructed to expose the club tags, one at a time, to light or darkness to cause the club tags to transmit the unique identifier.

Upon receipt of the club tag identifier, the receiving unit prompts the golfer to assign a name to the club or club tag, by either selecting a name from a pre-populated list or by assigning a custom name.

When all the clubs are learned in this manner the golfer is ready to use the system on the golf course, in "play" mode.

In the method of learning clubs described above it is possible that a golfer could cheat during a round of golf by using a receiving unit in learn mode in close proximity to another golfer. For example, if Golfer A is trying to cheat by obtaining club information from Golfer B, Golfer A could be in close proximity to Golfer B and Golfer A could have a receiving unit in learn mode. When Golfer B removes a club, Golfer A would receive the club identifier. If Golfer A could see which club Golfer B used (associated with the received identifier), Golfer A could now associated that club type with the identifier and Golfer A would be able to know whenever Golfer B removes that club from the bag again.

To make cheating during play more difficult, the following method can incorporated. This method would make cheating, using un-modified equipment, very difficult. This method would work for direct tag-to-receiving unit communication and for the configuration where there is a bag-mounted device communicating with the tags and receiving units.

When the receiving unit is in LEARN mode the user has to take a specific series of actions (that would be unnatural during normal play of the game) to successfully learn tags. One example of a more secure LEARN process is as follows:

The user is instructed to:
1) Attach all tags to clubs and replace all clubs in golf bag.
2) Configure the receiving unit (e.g. a golf club rangefinder) to be in LEARN mode (e.g. a learn tag mode in which information about a new tag on a golf club is stored/learned into the receiving unit).
3) Remove one club to learn it. The receiving unit receives the identifying code and prompts the user to:
4) Name the club or tag. After naming the club or tag, the user is prompted to:
5) CONFIRM the learning of that club. The user is asked, in one embodiment, to replace the club in the bag (receive a prompt) then remove the same club (within a period of time) from the bag to confirm the learning of that club. In another embodiment, the user is asked to press a button on the tag or grip.
6) When in LEARN mode, after the club is named, the user will have a limited amount of time to CONFIRM the learning of that club.
7) If the tag is not CONFIRMED, the tag code is not store or displayed on the receiving unit.

In a system with the security method described above the "cheater" that is trying to learn another golfer's clubs by using his own receiving unit in learn mode would not be able to as it is not normal for a golfer to remove a club, replace the same club and remove it again (within say 30 seconds or to repeatedly press a button on the tag or grip). The "cheater's" receiving unit would never store or display the other golfers unique tag codes as they would not be CONFIRMED.

Figure 22:
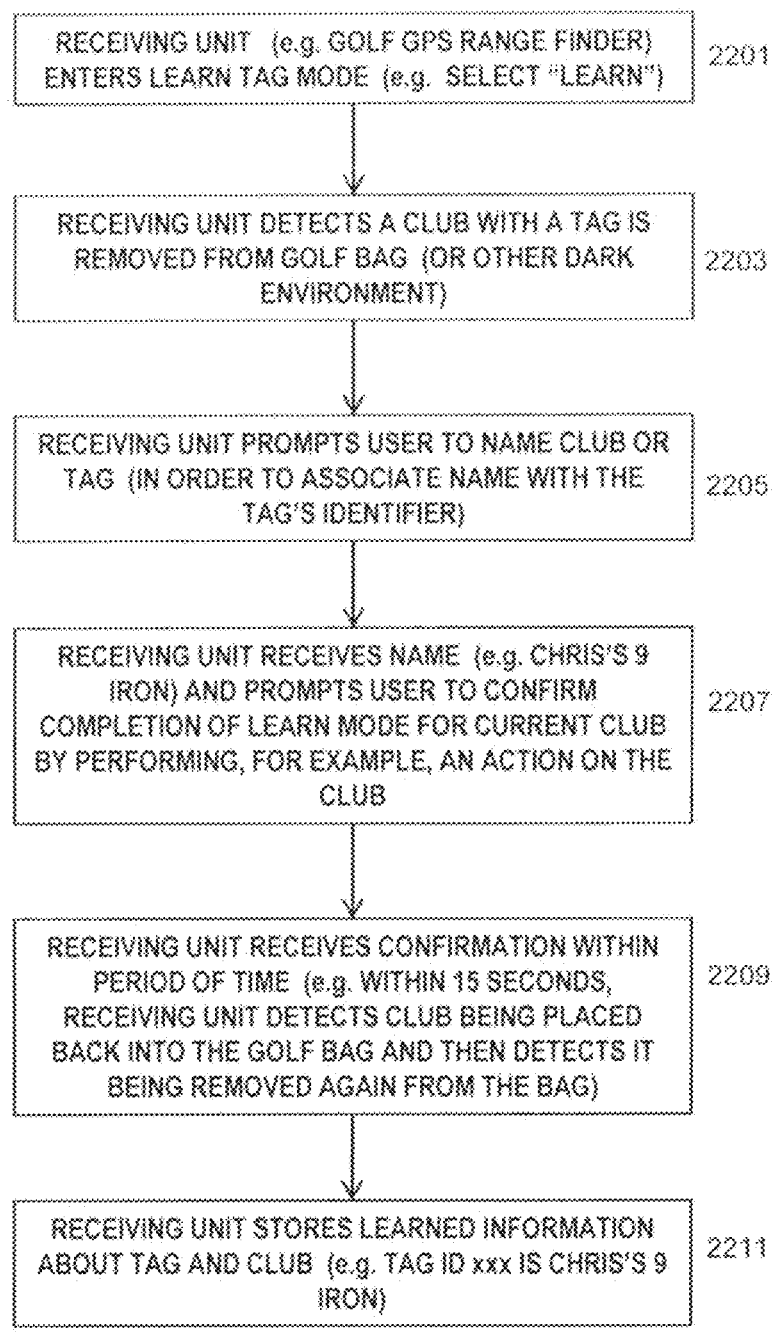
FIG. 22 is a flowchart that shows an example of a method for providing a more secure learn tag mode in one embodiment of the invention.

FIG. 22 shows a flowchart that represents one method of an embodiment that can implement a secure learn tag mode. In operation 2201, the receiving unit, which may be a golf GPS rangefinder, enters the learn tag mode in response to user selection of an option to place the receiving unit in that mode. In one embodiment, the user can collect together all golf clubs having new tags which need to be programmed into the receiving unit and insert those clubs into a golf bag so that the portion of the club having the new tag is in a dark environment, such as the bottom of a golf bag. Alternatively, the user could cover the golf grips containing the tags with a thick blanket to create a dark environment. Then the user can remove a club, one at a time, in order to program the receiving unit for that selected club. This is shown in operation 2203 in which the receiving unit detects a club with a tag has been removed from the golf bag (or other dark environment). The removal of the tag from the dark environment will cause the tag to wake up and will further cause the tag to transmit its identifier to the receiving unit. Because the receiving unit is in a learn mode, the receiving unit will respond, in operation 2205, by prompting the user to enter a name for the club or other information in order to associate the tag's identifier, which may be a unique number, with a name for the club. In operation 2207, the receiving unit receives, through user input, a name or other identifier provided by the user, and once the user has completed all of the data entry required by the receiving unit, the receiving unit can prompt the user to confirm completion of the learn mode for the current club by performing, for example, an action on the club. The action should be an unnatural action on a golf course which would reveal the actions of a cheater. In one embodiment, the action can be, for example, requiring the user to place the club back into the golf bag or other dark environment and then remove it quickly from the golf bag or dark environment and then quickly place it back into the golf bag or dark environment, all within a predetermined period of time, such as 15 seconds or 30 seconds. In another embodiment, the action can be requiring a user to press a button on the tag or on the grip of the golf club, or in another embodiment, the sequence of operations (in/out) may be reversed, etc. If the receiving unit does not detect the requested action within a predetermined period of time, the receiving unit will not confirm the learning and hence not store or associate the club's identifier with the name provided by the user. Hence a cheater's receiving unit will not be able to record a club name or other identifier of the club. In operation 2209, the receiving unit can receive confirmation within a period of time in one embodiment, and if confirmation is received, as shown in operation 2211, then the receiving unit stores the learned information about the tag and the club. In one embodiment, operation 2209 can require an action which includes putting the club back into the golf bag or other dark environment and then removing it from the bag or other dark environment and then putting it back into the bag or dark environment all within a predetermined period of time, such as 15 seconds or 30 seconds.

Further, the configuration described above simplifies the security measures required in the product. Without the method described above (requiring an unnatural confirmation step) other security means might be required in the product. Other security measure might include:

- Adding data (e.g. a pre-assigned bag-mounted device identifier) to the transmission from a bag-mounted device so that only receiving units that have already been "paired" with that specific bag-mounted device would be able to receive transmissions. Adding such data lengthens transmission time and could have a negative impact of transmission collisions.
- Programming the bag-mounted device with the ESN (Electronic Serial Number) from the receiving unit. Similar to above, once the bag-mounted device has the receiving unit ESN stored, the receiving unit ESN could be added to the data transmitted from the bag-mounted device. Programming the ESN into the bag-mounted device might require additional features such as: connection port in the bag-mounted device (e.g. USB) or additional RF components in either the receiving unit or the bag-mounted device.
- In a system with tags configured as transceivers there are more options for adding security. For example, in one embodiment the tag could send an initial transmission or transmissions that do not identify the club. Upon receipt of the transmissions the receiving unit could encode the response transmission (e.g. with an equipment serial number). Then the tags, upon receiving the response transmissions (with an ESN the tags have previously been "paired" with), add the tag identifier and return the transmission. This transmission or transmissions would only be receivable by the receiving unit with the matching ESN. This method, however, does require more transmissions and introduces more possibilities for collisions. Another example is an embodiment in which the tag, in its first learning session with a receiving unit, sends its initial identifier to the receiving unit and then the user enters a club name, etc. and upon completion of data entry, the user instructs the receiving unit to complete the learning process. Then the receiving unit sends a one-way hashed version of the tag's code to that tag and that code is used, on the next transmission from the tag, as the tag's identifier, and this process repeats so that the tag's identifier is updated after each transmission from the tag so that the tag's identifier changes over time and it is not used repeatedly.
- Using a minimum acceptable signal strength received from the tag to determine that this is the desired club to LEARN. In this way, clubs that are not close to the device are not recognized. Additionally, if the retailer offers a service to LEARN or "pair" clubs to a GPS device, the device would recognize only a nearby club and not a club a distance away. This would allow for several LEARN or "pair" stations at the retailer to coexist without interfering with each other.

These additional measures would add cost and complexity to the design of the product but might eliminate the need for a confirmation step during the learning process.

There are of course other methods of cheating that are not easy to remedy. For example, Golfer A could steal Golfer B's receiving device (bag mounted device or handheld device with RFID receiving capability) and monitor which clubs Golfer B was selecting from the golf bag. This would require that Golfer B did not notice the theft of the device and Golfer A would have to be in close enough proximity to Golfer B during the round to receive the signals from the club tags or a bag-mounted repeating device.

Also, with modified RF equipment and a means to obtain golf club information from a distance a person could still cheat, but this is an example of going to extraordinary measures to cheat at golf.

Method of Tracking Golf Clubs for Marketing Purposes

It is contemplated that the golf club tags or tag electronics can be built-in to the golf club grips at time of manufacture. A golf equipment manufacture may desire to maintain a database of golf equipment sold (e.g. golf clubs). This database could contain detailed information about the equipment. For example, in the case of golf clubs, the database could contain details of the various components of the club, such as shaft material, club head loft, etc. A tag could be included permanently in the golf club grip, and a corresponding bar code label could be attached to the outside of the grip. The bar code contains the same identifier as contained in the tag and the bar code label would travel with the tag throughout the manufacturing process of the tag. When the tag is embedded in the golf grip, the bar code label is attached to the exterior of the grip. This way golf equipment manufacturers can use bar code reading equipment (that they are likely already set up with). After the golf club is assembled, the bar code is scanned by the equipment manufacturer and the specific components are recorded into the equipment manufacturer's database. When the customer receives the product, the data can then be tracked by the equipment manufacturer, due to the wireless communication between the club tag and devices that can be connected to the Internet for data uploading and downloading. The data in the club tag contains the same identifier as the bar code, which also matches the identifier in the equipment manufacturer's database. The equipment manufacturer can now take advantage of observing use patterns of the golfer. Alternatively, in lieu of including a bar code and bar code reader in the process, the data can be tracked using the tag transmissions and a RF receiver to capture the data and record it in a database. This would eliminate the need for a bar code to travel with the tag as it is manufactured but would potentially require the equipment manufactures to modify their equipment and processes to receive the tag transmissions. Another option is to use the active tag in the club in conjunction with a passive RFID tag that could be read by a RFID reader. This concept with the passive RFID tags would be in lieu of active club tags plus bar code labels.

The golfer would in one embodiment register the club online with the GPS device company to take advantage of compiling data corresponding to the golf games played and club usage. Additionally, the system gathers information about which golf course the golfer is playing, how often he/she uses this club and how often they golf. This is valuable information that could be provided to the retailer in determining golfer's preferences.

Figure 23:
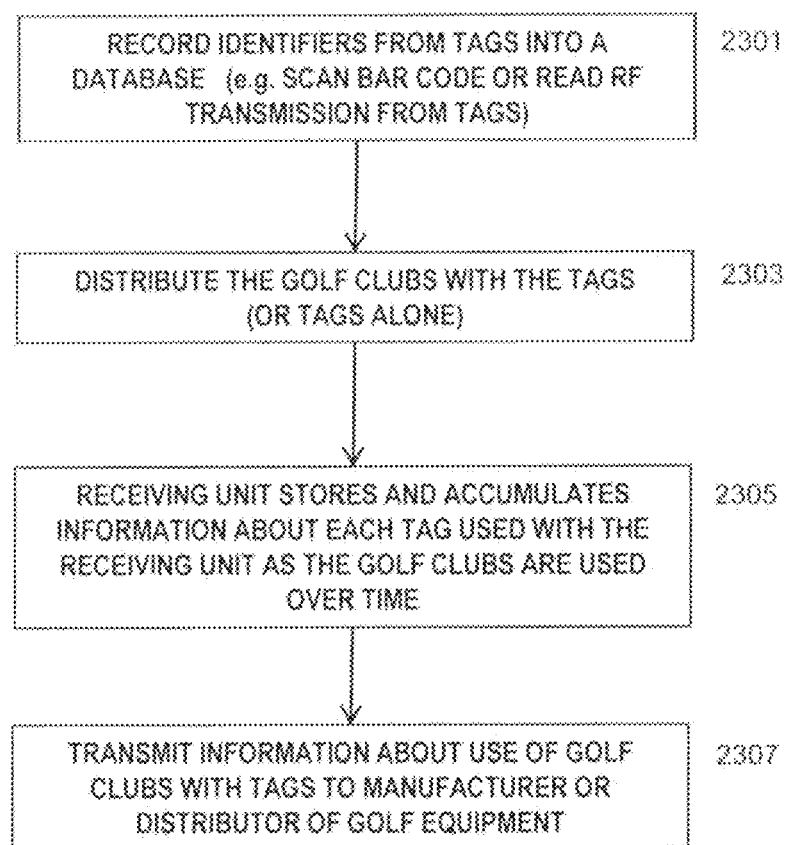
FIG. 23 is a flowchart that shows an example of a method for obtaining information about golf clubs after they are distributed to golfers according to another embodiment of the invention.

FIG. 23 shows an example according to one embodiment to operate a data collection system, such as a data collection system at a golf club manufacturer or golf equipment distributor, such as a retailer, etc. The data collection system, in one embodiment, uses a device that is a GPS golf rangefinder that accompanies the golfer and collects information about golf club usage in the presence of the device. In one embodiment, the golf club can be mounted with one or more of the tags described herein, such as the tag shown in FIG. 6A to create the system shown in FIG. 5, in which the tag communicates with the golf GPS device, such as the golf GPS device 511. The golf GPS device can accumulate information over many months about the usage of one or more golf clubs, and this information can include a list of golf courses played at, how often the club is used and how often the user plays golf. The golf GPS device can record the days or dates that golf was played on, how often the golf club was used on those days, and an identifier of each golf course played at by the golfer. The identification of a golf course can be derived from the location information obtained from the GPS receiver during playing of the golf games. This information can be accumulated over time and then provided through a data network, such as a cellular telephone network or the Internet, etc. to the manufacturer of the golf club or to another golf club manufacturer or to other golf equipment manufacturers or to retailers or other distributors of golf equipment. The accumulated information can be, in one embodiment, uploaded from the golf rangefinder (or other device) to a data processing system (e.g. a server) used by the manufacturer or manufacturers or retailers or other distributors, either directly from the golf rangefinder (e.g. through a WiFi or Ethernet or cellular telephone connection provided by the golf rangefinder), or the accumulated information can be copied to another device (e.g. a laptop computer or other data processing system) which in turn can upload the accumulated information to the data processing system used by the manufacturer or manufacturers or retailers or other distributors. In the method of FIG. 23, the golf club manufacturer can associate the identifiers from the tags with golf clubs having been made previously by virtue of operation 2301 in which the manufacturer records identifiers from the tags into a database. This can be performed by scanning a bar code or by reading the RF transmission from the tags on the golf clubs. This is performed prior to distributing the golf clubs with the tags in operation 2303. In other words, the golf club manufacturer or the tag manufacturer is recording this information into the database prior to distributing the golf clubs or the tags separately to golfers. When the golf GPS device transmits the information, as in operation 2307, that information will include the identifiers previously recorded, which will allow the golf club manufacturers or golf equipment distributors, to associate the information with the previously stored identifiers for each golf club or tag. The receiving unit, in operation 2305, stores and accumulates the information about each tag as described herein prior to transmitting that information in operation 2307.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An apparatus for determining whether a golf club has been removed from a golf bag, the apparatus comprising:
    a housing configured to be coupled to a golf club;
    a processing system coupled to the housing;
    at least one light sensor coupled to the processing system, the at least one light sensor being configured to activate the processing system from a sleep state and being configured to provide a current light meter value;
    an impact sensor coupled to the processing system, the impact sensor configured to detect an impact of the golf club hitting a golf ball;
    an RF transmitter coupled to the processing system, the processing system being configured to cause the RF transmitter to transmit an identifier of the golf club and an indicator of a status of the golf club relative to a golf club bag, wherein the status is one of: (a) in-bag or (b) out-of-bag; and
    wherein the processing system is configured to determine a motion status of the golf club, the motion status determined, by the processing system, from light meter values measured over time by the at least one light sensor; and
    wherein the processing system is configured to cause the RF transmitter to transmit a signal, to a golf GPS rangefinder, indicating that the golf club was used to take a stroke, the processing system causing the RF transmitter to transmit the signal based upon the combination of (1) the motion status indicating that the golf club was in motion and (2) data from the impact sensor that indicates the impact occurred.

2. The apparatus as in claim 1 wherein the impact sensor is one of: (a) a piezoelectric sensor; (b) a vibration sensor; (c) an accelerometer; or (d) a shock sensor; and
    wherein the at least one light sensor comprises a first light sensor and a second light sensor, the first light sensor configured to activate the processing system and the second light sensor; and
    wherein the second light sensor provides the light meter values from which the status of in-bag or out-of-bag are determined, and the second light sensor provides the light meter values from which the motion status is determined.

3. A method for operating a golf GPS rangefinder which includes a GPS receiver and an RF receiver configured to receive RF signals from one or more golf club tags, the method comprising:
    receiving, at the RF receiver, club status signals from one or more golf club tags;
    determining, by the GPS receiver, that the golf GPS rangefinder is in motion beyond a threshold motion amount;
    filtering the club status signals received while the golf GPS rangefinder is determined to be in motion, the filtering preventing those club status signals from changing a club status;
    determining, by the GPS receiver, that the golf GPS rangefinder is not in motion and processing club status signals received while the golf GPS rangefinder is determined to be not in motion.

4. The method as in claim 3 wherein the club status signals indicate at least one of (a) whether a club is used to hit a golf ball or (b) whether the club is in motion.

5. The method as in claim 4 wherein the club status signals do not include in-bag or out-of-bag status indicators.

6. The method as in claim 4 wherein the club status signals include signals to indicate in-bag or out-of-bag status.

7. A method for operating a golf club tag which includes at least one light sensor, an RF transmitter for transmitting RF signals to a golf GPS rangefinder, a motion sensor, and a processing system coupled to the at least one light sensor and coupled to the RF transmitter and coupled to the motion sensor, the method comprising:
    determining, through first light measurements by the at least one light sensor, an in-bag or out-of-bag status of a golf club coupled to the golf club tag;
    determining, through second light measurements by the at least one light sensor, whether the golf club is in motion or not in motion;

controlling power provided to the motion sensor based upon at least one of the first light measurements and the second light measurements.

8. The method as in claim 7 wherein the motion sensor is an accelerometer; and
wherein the accelerometer receives power for a predetermined period of time after the second light measurements indicate that the golf club is in motion.

9. The method as in claim 7 wherein the motion sensor is an accelerometer; and
wherein the accelerometer receives power for a predetermined period of time after the first light measurements indicate that the golf club has an out-of-bag status.

* * * * *